(12) United States Patent
Mishima et al.

(10) Patent No.: US 7,340,150 B2
(45) Date of Patent: Mar. 4, 2008

(54) DIGITAL VIDEO SIGNAL RECORD AND PLAYBACK DEVICE AND METHOD FOR SELECTIVELY REPRODUCING DESIRED VIDEO INFORMATION FROM AN OPTICAL DISK

(75) Inventors: Hidetoshi Mishima, Nagaokakyo (JP); Yoshinori Asamura, Nagaokakyo (JP); Yoshiko Hatano, Nagaokakyo (JP); Shuji Sotoda, Nagaokakyo (JP); Satoshi Kurahashi, Nagaokakyo (JP); Takahiro Nakai, Nagaokakyo (JP); Tadashi Kasezawa, Nagaokakyo (JP); Masato Nagasawa, Nagaokakyo (JP); Hiroyuki Oohata, Nagaokakyo (JP); Yoshinobu Ishida, Nagaokakyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1141 days.

(21) Appl. No.: 10/083,267

(22) Filed: Feb. 27, 2002

(65) Prior Publication Data

US 2002/0090207 A1    Jul. 11, 2002

Related U.S. Application Data

(60) Division of application No. 09/520,283, filed on Mar. 6, 2000, now Pat. No. 6,549,717, which is a division of application No. 09/329,333, filed on Jun. 10, 1999, now Pat. No. 6,134,382, which is a division of application No. 08/877,875, filed on Jun. 18, 1997, now Pat. No. 6,009,236, which is a continuation of application No. 08/533,109, filed on Sep. 25, 1995, now abandoned.

(30) Foreign Application Priority Data

| Sep. 26, 1994 | (JP) | .................................. 6-229620 |
| Oct. 18, 1994 | (JP) | .................................. 6-252098 |
| Nov. 7, 1994 | (JP) | .................................. 6-272107 |
| Feb. 16, 1995 | (JP) | .................................. 7-28277 |

(51) Int. Cl.
*H04N 5/76* (2006.01)
*H04N 7/26* (2006.01)
*H04N 5/00* (2006.01)

(52) U.S. Cl. .......................... 386/68; 386/111; 386/126
(58) Field of Classification Search ................... 386/6, 386/7, 8, 33, 68, 69, 70, 111, 112, 124, 125
See application file for complete search history.

(56) References Cited

U.S. PATENT DOCUMENTS 4,395,738 A    7/1983 Hedlund et al.
(Continued)

FOREIGN PATENT DOCUMENTS

CN    1013319 B    7/1991
(Continued)

OTHER PUBLICATIONS

Anil K. Jain, "Fundamentals of Digital Image Processing," Englewood Cliffs, New Jersey, Prentice Hall, Inc., 1989, pp. 521-532, ISBN 0-13-332578-4.
(Continued)

*Primary Examiner*—Thai Q. Tran
*Assistant Examiner*—Gelek Topgyal
(74) *Attorney, Agent, or Firm*—Birch, Stewart, Kolasch & Birch, LLP

(57) ABSTRACT

A digital video signal record and playback device for recording on a recording medium a digital video signal coded by using a motion compensation prediction and an orthogonal transform and playing back data from the recording medium. In a data arrangement of a digital video signal, an I picture which can be independently represented in a picture is divided into n areas in the vertical direction, and the data is arranged from the front of one GOP in the unit of area by giving a priority to an area located at the center of the screen. A playback picture is outputted by playing back the I picture read from the recording medium in the unit of area unit. In the case where the whole I picture area cannot be read within a definite time, the area which cannot be read are interpolated by the use of the data of the preceding screen.

15 Claims, 92 Drawing Sheets

U.S. PATENT DOCUMENTS

| | | | |
|---|---|---|---|
| 5,191,436 A | 3/1993 | Yonemitsu | |
| 5,247,363 A | 9/1993 | Sun et al. | |
| 5,305,113 A | 4/1994 | Iwamura et al. | |
| 5,455,684 A * | 10/1995 | Fujinami et al. | 386/111 |
| 5,473,377 A | 12/1995 | Kim | |
| 5,473,479 A | 12/1995 | Takakura | |
| 5,504,585 A | 4/1996 | Fujinami et al. | |
| 5,557,332 A | 9/1996 | Koyanagi et al. | |
| 5,572,333 A | 11/1996 | Moriyama et al. | |
| 5,596,564 A * | 1/1997 | Fukushima et al. | 386/70 |
| 5,602,956 A | 2/1997 | Suzuki et al. | |
| 5,729,649 A | 3/1998 | Lane et al. | |
| 5,781,690 A | 7/1998 | Juri et al. | |
| 5,845,041 A | 12/1998 | Ohkuma et al. | |
| 6,009,236 A | 12/1999 | Mishima et al. | |
| 6,016,382 A * | 1/2000 | Yamagishi et al. | 386/109 |
| 6,134,382 A | 10/2000 | Mishima et al. | |

FOREIGN PATENT DOCUMENTS

| | | |
|---|---|---|
| EP | 0632653 | 5/1994 |
| EP | 0600690 | 6/1994 |
| EP | 0606868 | 7/1994 |
| EP | 0607904 | 7/1994 |
| JP | 3-74982 | 3/1991 |
| JP | 4-79681 | 3/1992 |
| JP | 4114369 | 4/1992 |
| JP | 5-128810 | 5/1993 |
| JP | 0562845 A2 | 9/1993 |
| JP | 678289 | 3/1994 |
| JP | 698314 | 4/1994 |
| JP | 6-165113 A | 6/1994 |
| JP | 6-261303 | 9/1994 |
| JP | 6-303573 A | 10/1994 |
| JP | 7-123359 | 5/1995 |
| JP | 2004-282794 | 7/2004 |
| WO | 9417631 | 8/1994 |

OTHER PUBLICATIONS

Partial translation of "Disc System Using Variable Bit Rate Control Method," by Kenji Sugiyama et al., 1994 ITE Annual Convention, Technology Development Div., Victor Company of Japan, Limited.

* cited by examiner

621: SEQUENCE LAYER
622: GOP LAYER
623: SLICE
624: SLICE LAYER
625: MACROBLOCK LAYER
626: BLOCK LAYER

INPUT ORDER

OUTPUT ORDER

I: I-PICTURE
P: P-PICTURE
B: B-PICTURE

ARROW SHOWING PREDICTION

FIG. 17
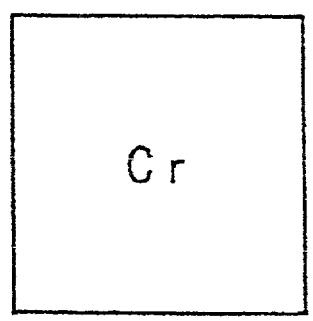
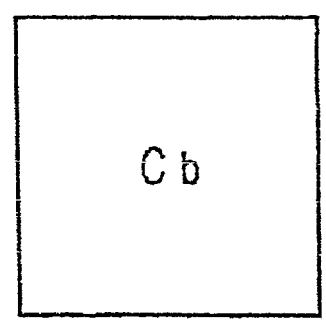

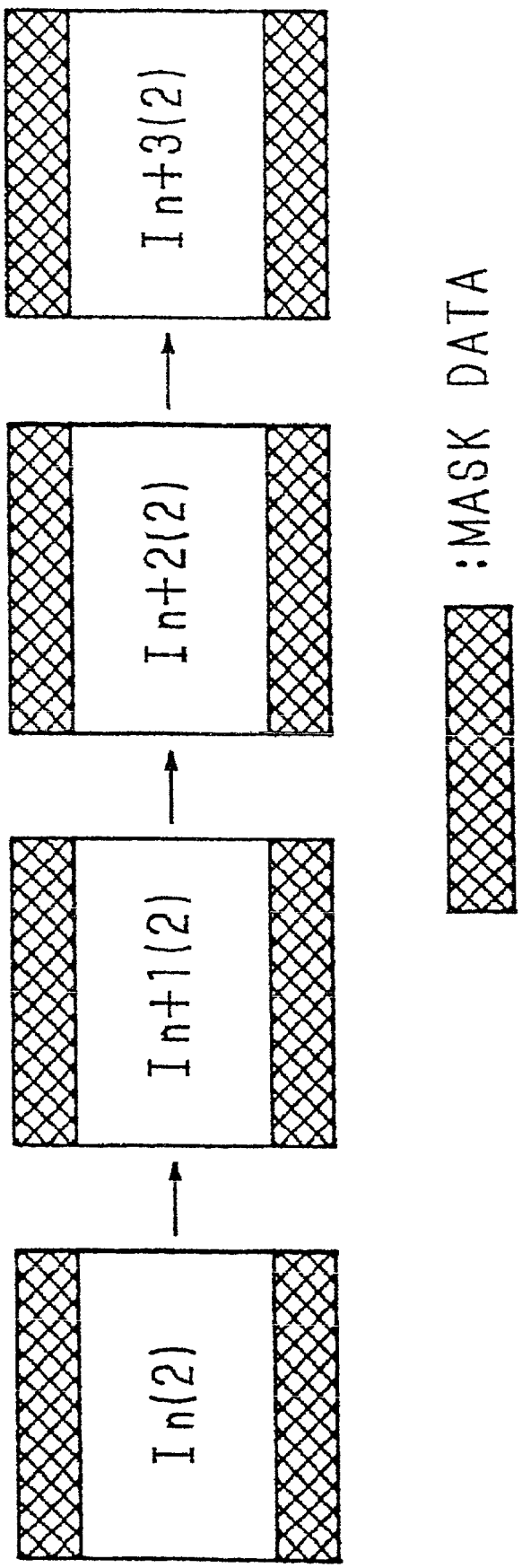

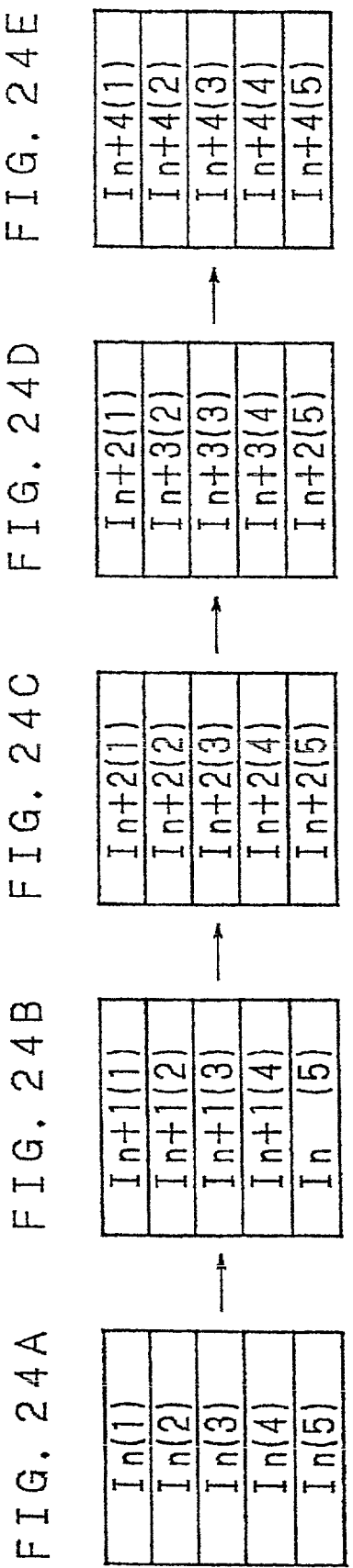

FIG. 25A

| I(3) | I(2) | I(4) | I(1) | I(5) | P1~P4 B1~B10 |
|---|---|---|---|---|---|

FIG. 25B

| I(3) 1 | I(3) 2 | ... | I(3) i | I(2) i+1 | I(2) i+2 | ... | I(2) j | I(4) j+1 | I(4) j+2 |
|---|---|---|---|---|---|---|---|---|---|

→ ERROR CORRECTION BLOCK

FIG. 26A
| In+4(1) | In+3(2) | In+2(3) | In+1(4) | In (5) |
FIG. 26B
| In+5(1) | In+4(2) | In+3(3) | In+2(4) | In+1(5) |
FIG. 26C
| In+6(1) | In+5(2) | In+4(3) | In+3(4) | In+2(5) |
FIG. 26D
| In+7(1) | In+6(2) | In+5(3) | In+4(4) | In+3(5) |

FIG. 27D
| In+5(1) | In+4(2) | In+3(3) | In+2(4) | In (5) |
FIG. 27C
| In+4(1) | In+3(2) | In+2(3) | In+1(4) | In (5) |
FIG. 27B
| In+2(1) | In+2(2) | In+1(3) | In (4) | In−1(5) |
FIG. 27F
| In+7(1) | In+6(2) | In+5(3) | In+4(4) | In+3(5) |
FIG. 27A
| In+2(1) | In+1(2) | In (3) | In−1(4) | In−2(5) |
FIG. 27E
| In+6(1) | In+5(2) | In+4(3) | In+3(4) | In+2(5) |

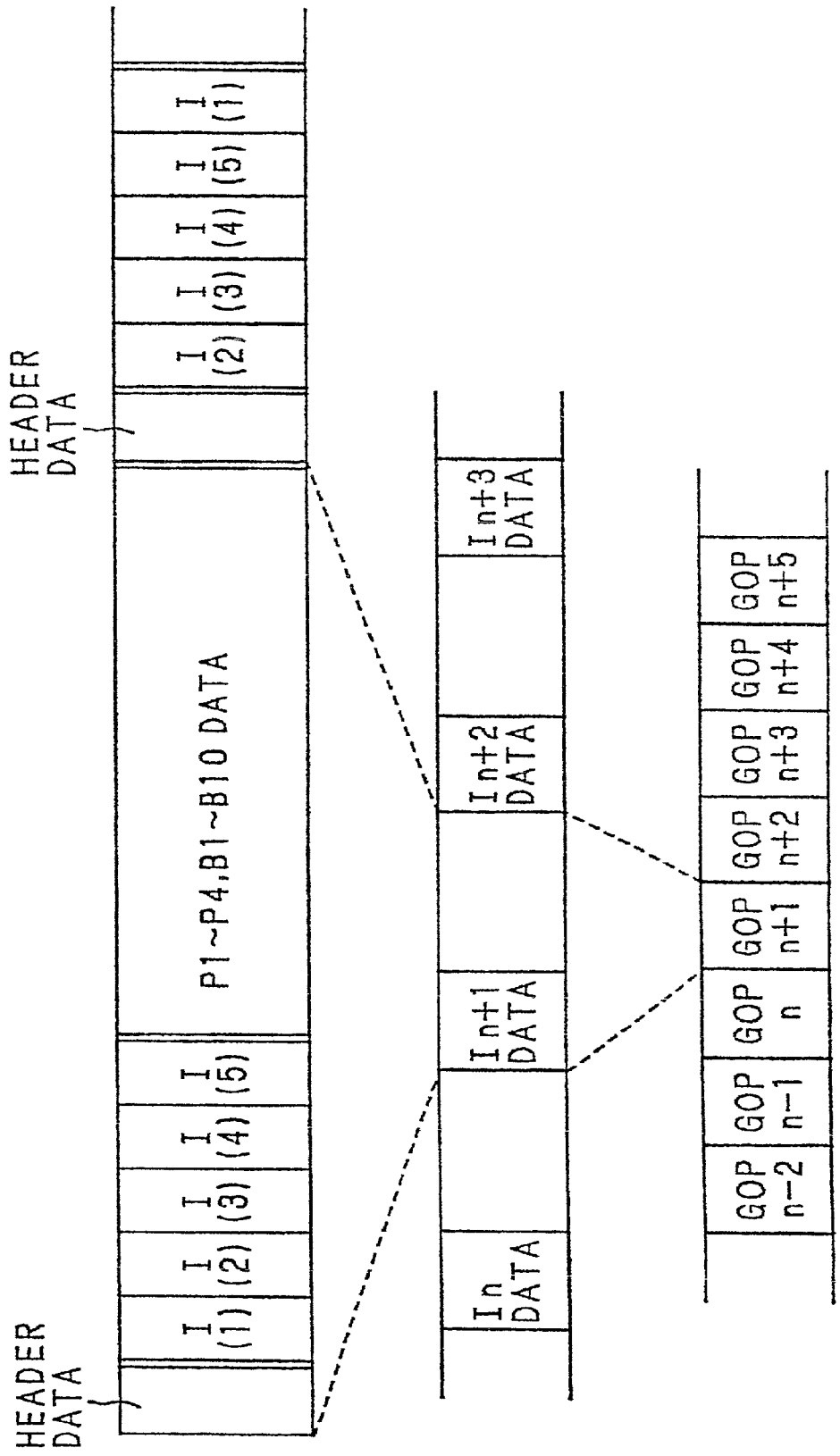

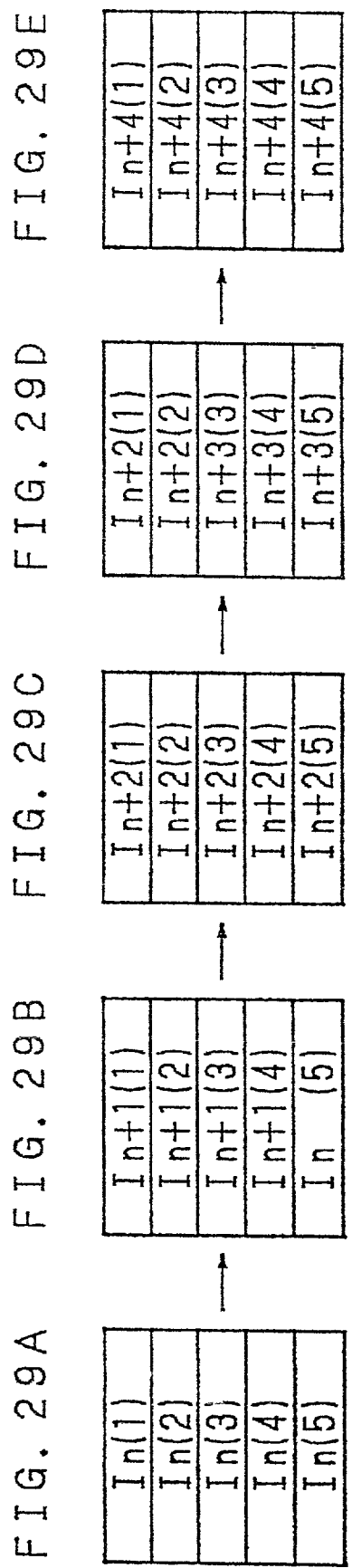

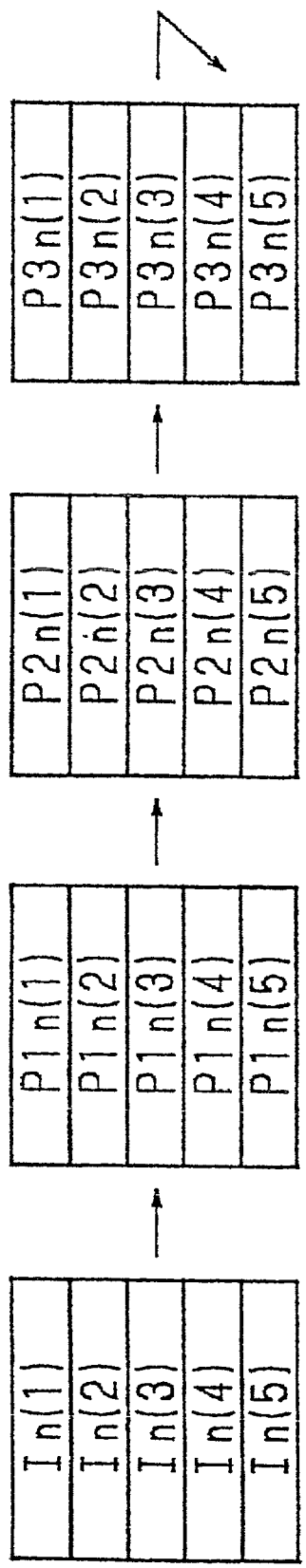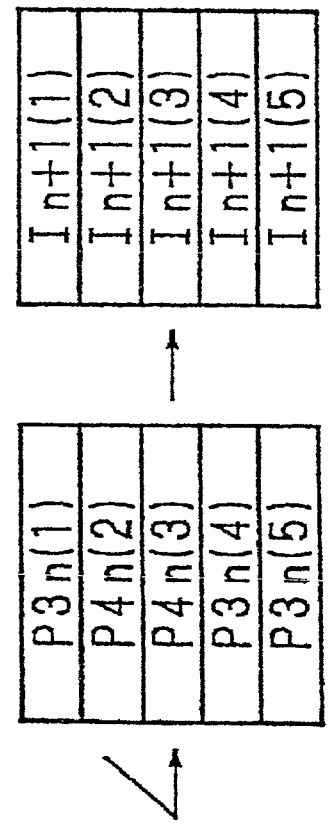

FIG. 32A

| I(3) | I(2) | I(4) | I(1) | I(5) | P1(3) | P1(2) | ... | P4(3) | P4(2) | B1~B10 DATA |

FIG. 32B

| I(5) i-1 | I(5) i | P1(3) i+1 | P1(3) i+2 | P1(3) i+3 | ... | P1(3) j | P1(2) j+1 | P1(2) j+2 |

→ ERROR CORRECTION BLOCK

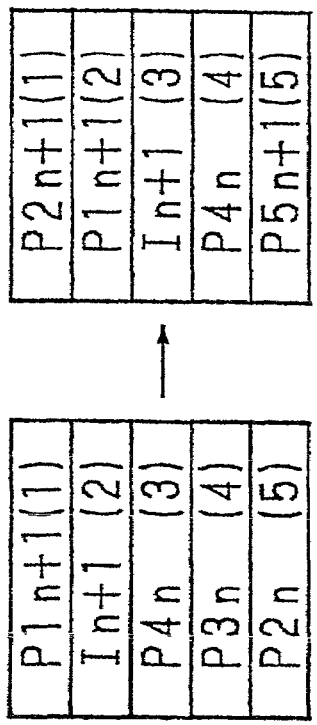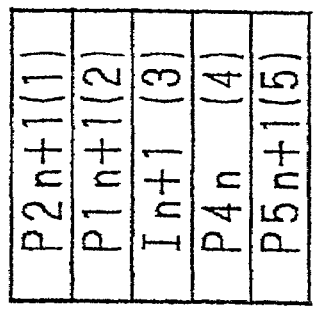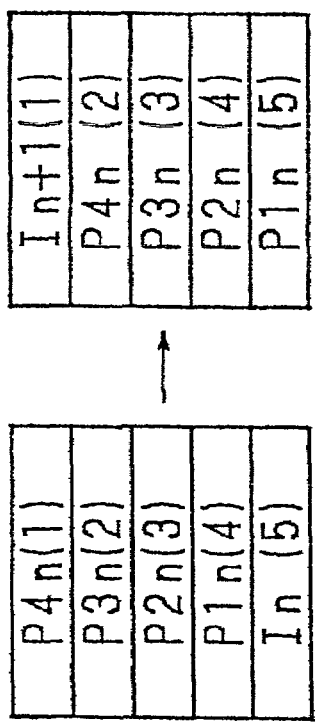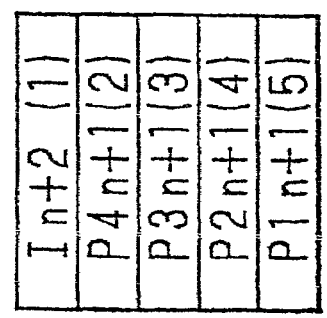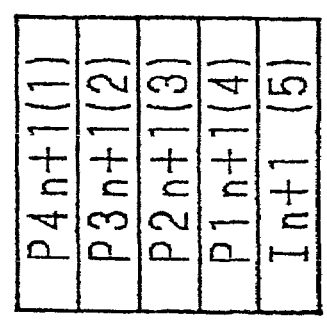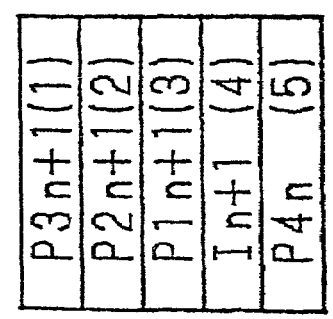

FIG. 34A / FIG. 34B / FIG. 34C / FIG. 34D / FIG. 34E / FIG. 34F

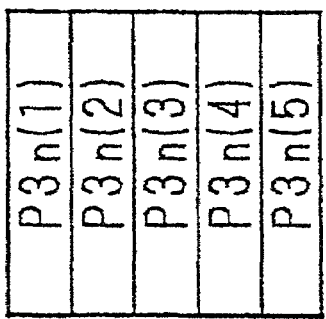
FIG. 36A  FIG. 36B  FIG. 36C  FIG. 36D
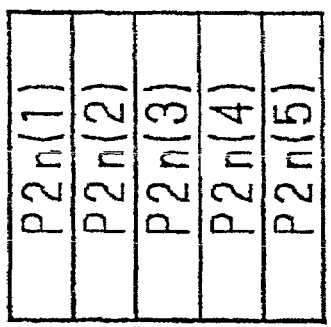
FIG. 36E  FIG. 36F
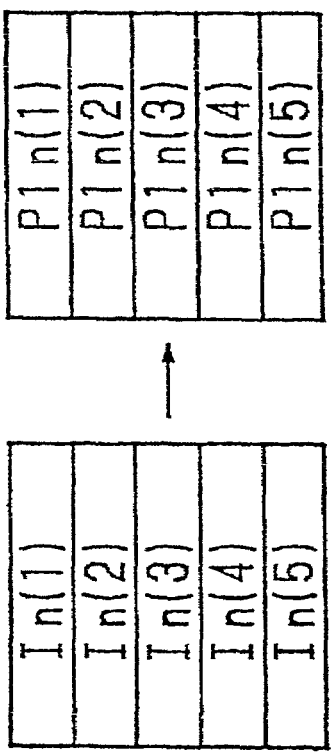

FIG. 40

```
sequence_scalable_extension(){
    extension_start_code_identifier
    scalable_mode
    layer_id
    if(scalable_mode=="spatial scalability"){
        lower_layer_prediction_horizontal_size
        maker_bit
        lower_layer_prediction_vertical_size
        horizontal_subsampling_factor_m
        horizontal_subsampling_factor_n
        vertical_subsampling_factor_m
        vertical_subsampling_factor_n
    }
    if(scalable_mode=="temporal scalability"){
        picture_mux_enable
        if(picture_mux_enable)
            mux_to_progressive_sequence
        picture_mux_order
        picture_mux_factor
    }
    next_start_code()
} slice(){
    slice_start_code
    if(vertical_size>2800)
        slice_vertical_position_extension
    if(<sequence_scalable_extention() is present in the bitstresm>)
        if(scalable_mode=="data partitioning")
            priority_breakpoint
    quantiser_scale_code
    if(nextbits()=='1'){
        intra_slice_flag
        intra_slice
        reserved_bits
        while(nextbits()=='1'){
            extra_bit_slice
            extra_information_slice
        }
    }
    extra_bit_slice
    do{
        macroblock()
    }while(nextbits()!='000 0000 0000 0000 0000 0000')
    next_start_code()
}
```

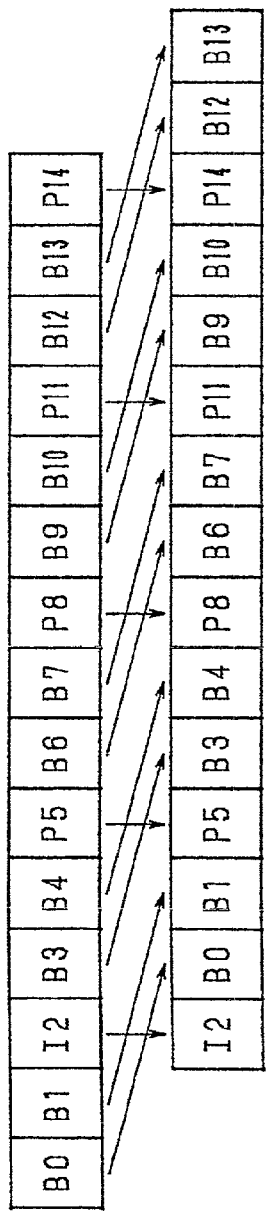
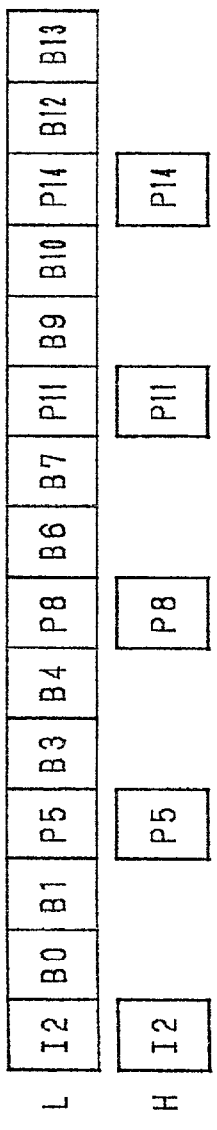
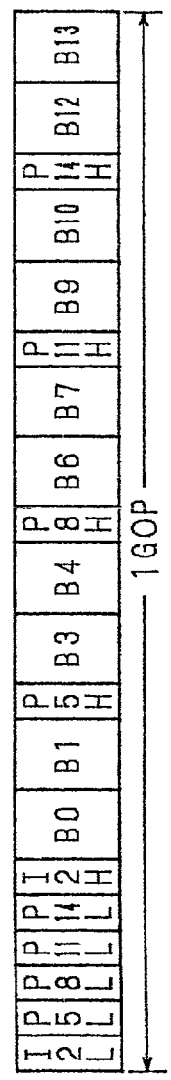
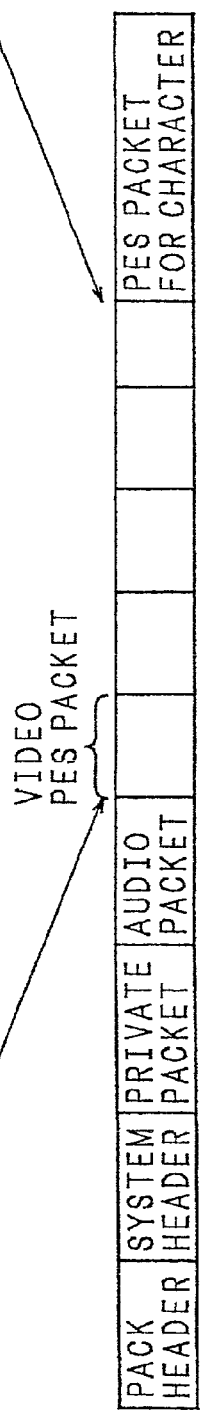
FIG. 41A BITSTREAM IN NO HIERARCHY
FIG. 41B BITSTREAM IN HIERARCHY
FIG. 41C REARRANGED BITSTREAM IN CONSIDERATION OF SPECIAL PLAYBACK
FIG. 41D PROGRAM STREAM FOR DISC RECORDING

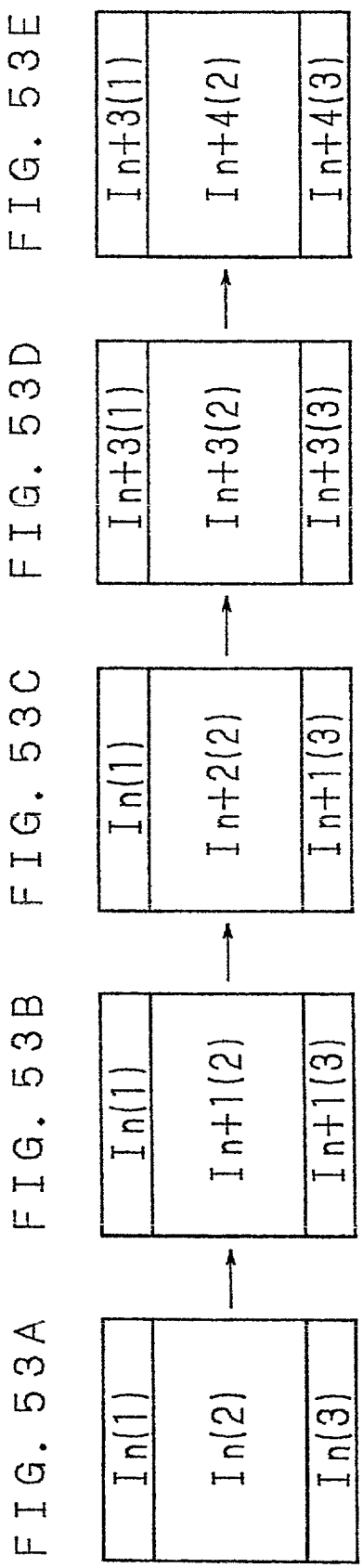

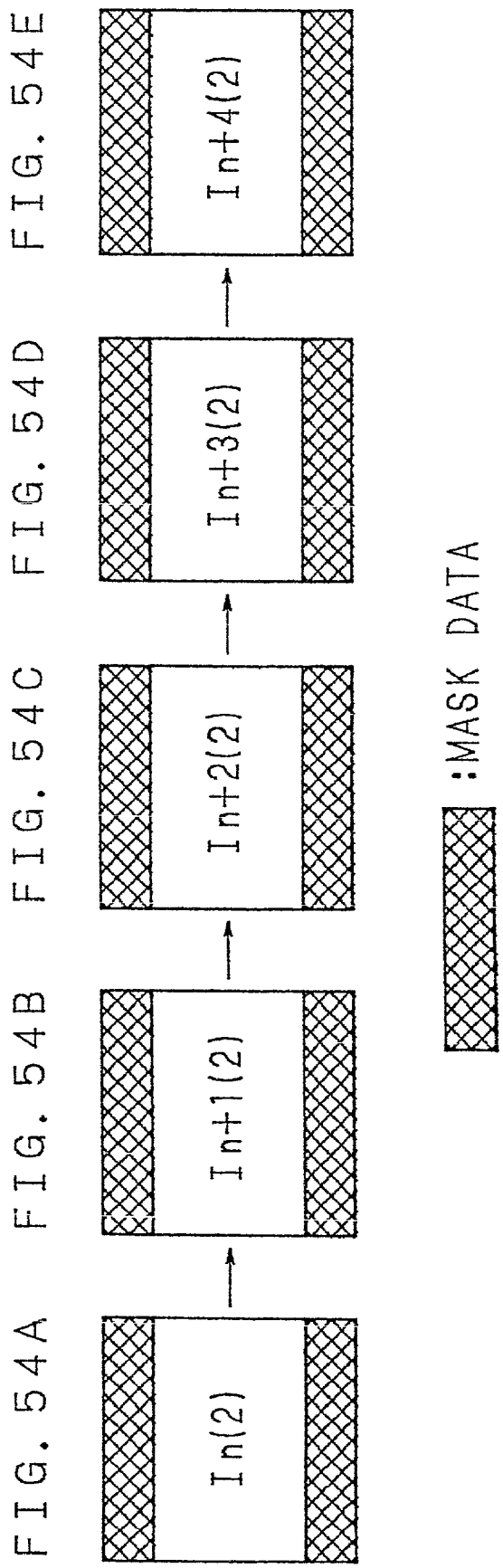

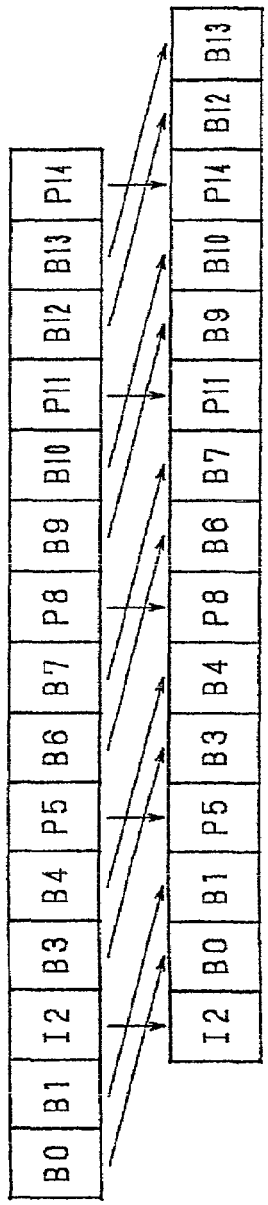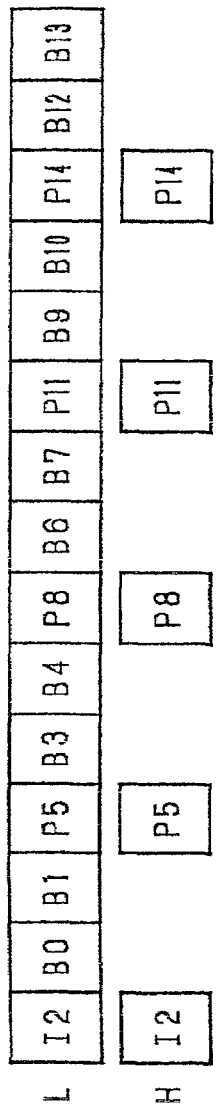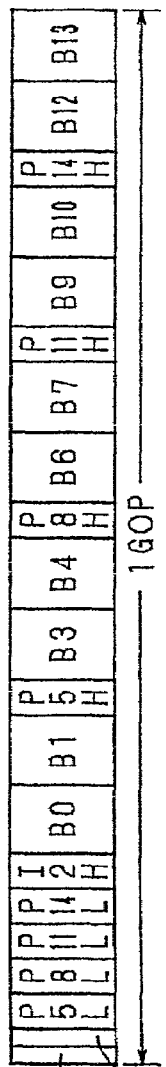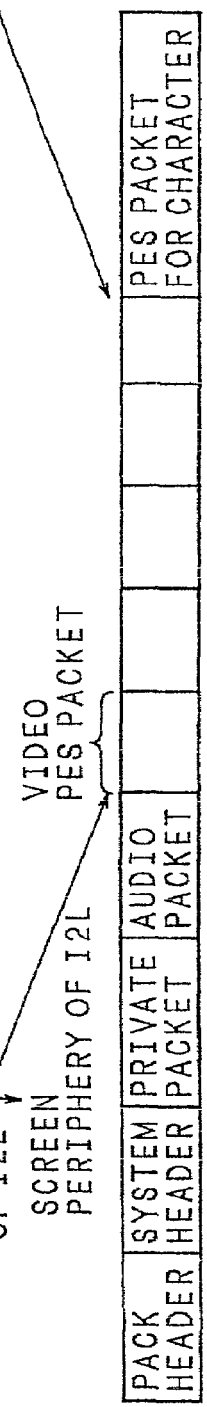
FIG. 59A BITSTREAM IN NO HIERARCHY
FIG. 59B BITSTREAM IN HIERARCHY
FIG. 59C REARRANGED BITSTREAM IN CONSIDERATION OF SPECIAL PLAYBACK
FIG. 59D PROGRAM STREAM FOR DISC RECORDING

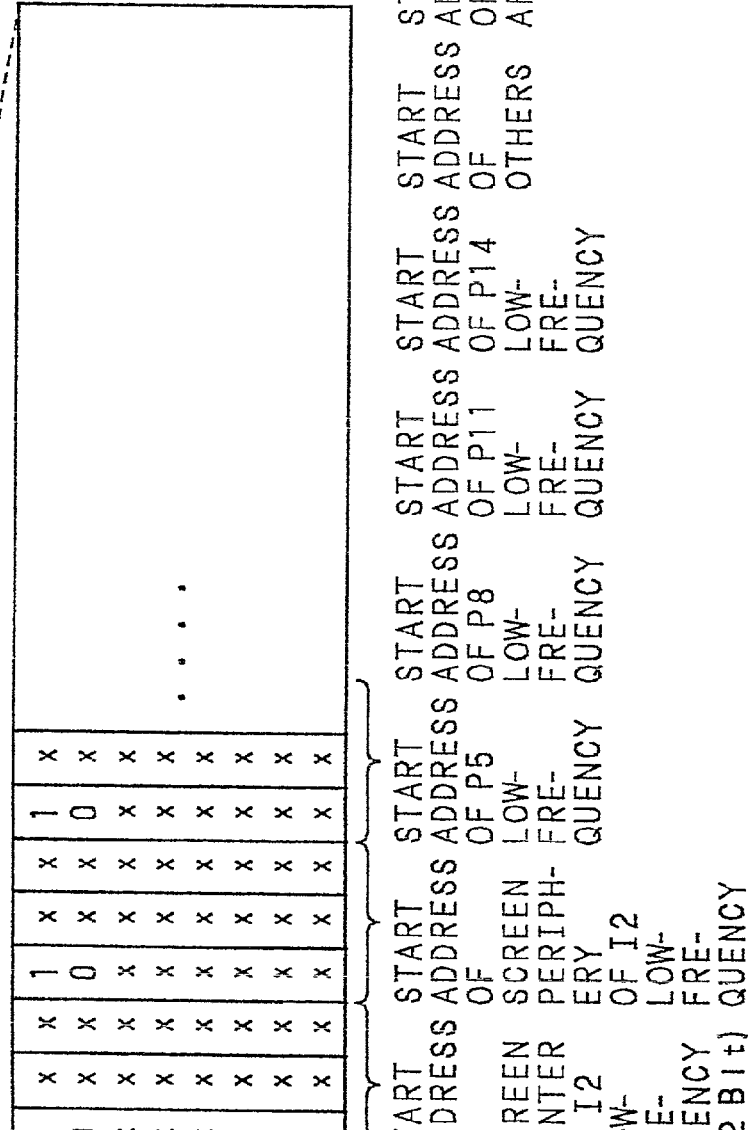

FIG. 70

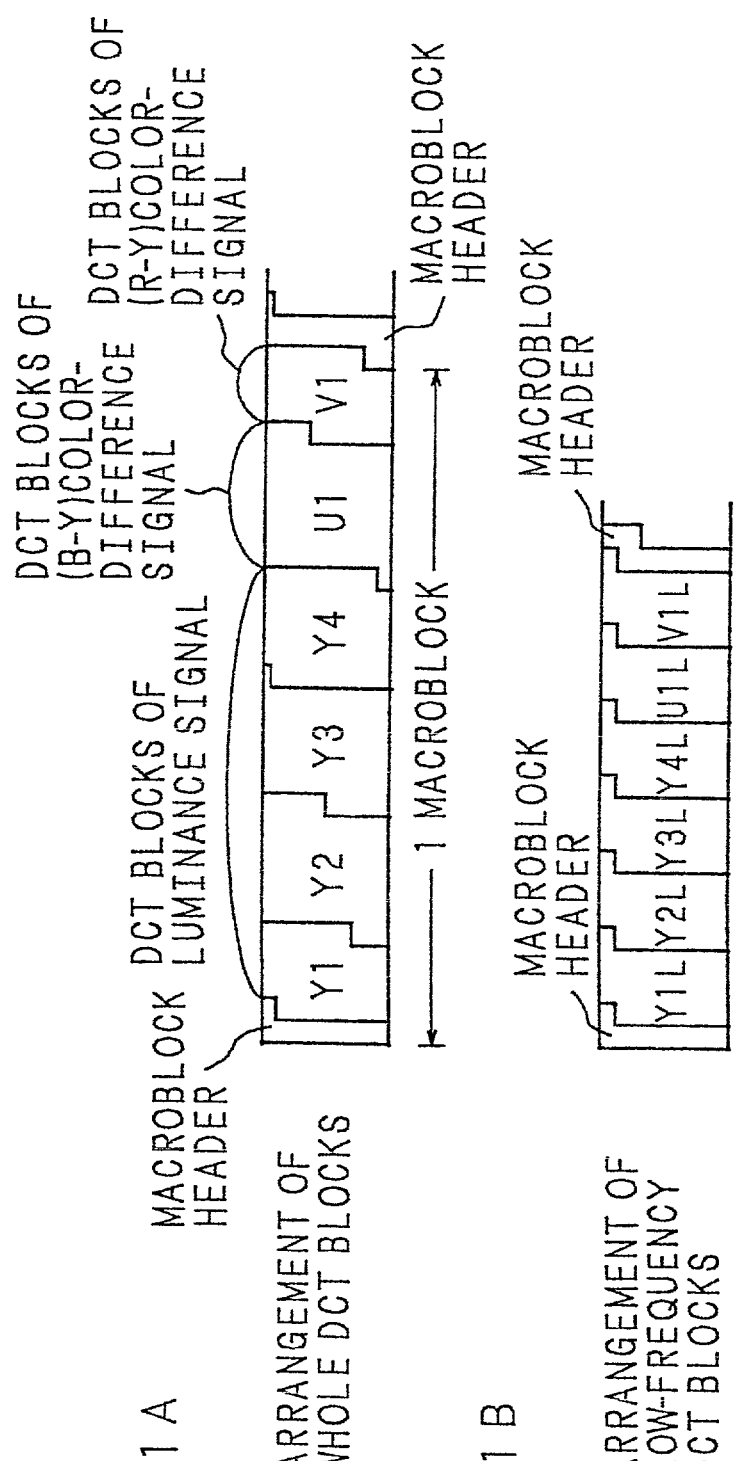
FIG. 71A ARRANGEMENT OF WHOLE DCT BLOCKS
FIG. 71B ARRANGEMENT OF LOW-FREQUENCY DCT BLOCKS
FIG. 71C ARRANGEMENT OF HIGH-FREQUENCY DCT BLOCKS

ARRANGEMENT OF FREQUENCY COMPONENT IN BITSTREAM OF 1 BLOCK

FIG. 72B
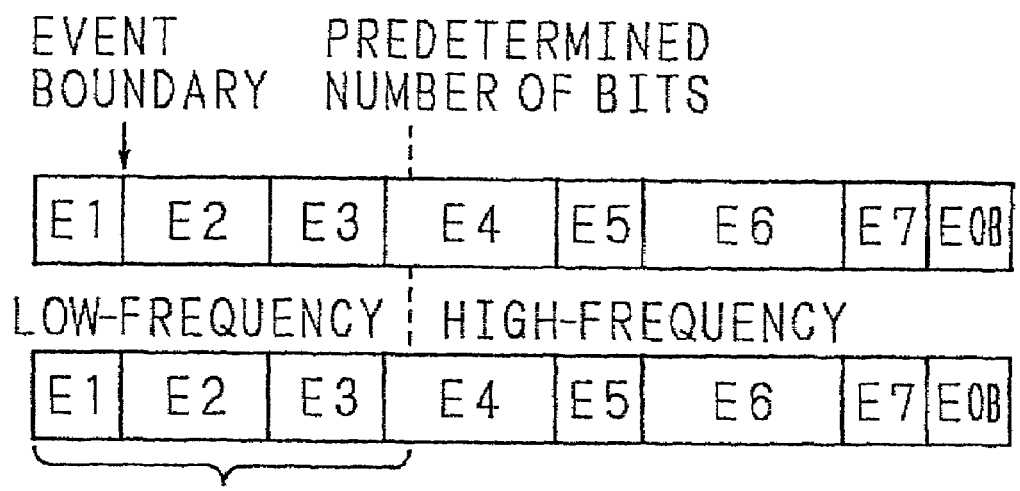
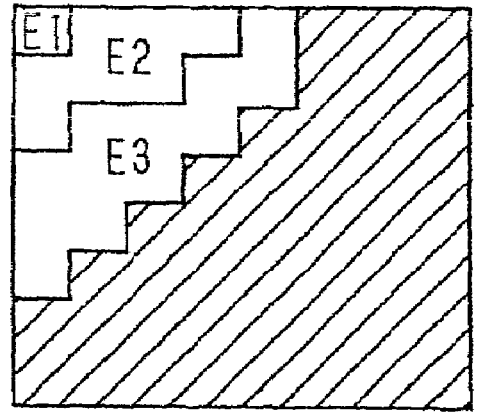

DIGITAL VIDEO SIGNAL RECORD AND PLAYBACK DEVICE AND METHOD FOR SELECTIVELY REPRODUCING DESIRED VIDEO INFORMATION FROM AN OPTICAL DISK

This application is a divisional of application Ser. No. 09/520,283, filed on Mar. 6, 2000 now U.S. Pat. No. 6,549,717, which is a divisional of application Ser. No. 09/329,333, filed on Jun. 10, 1999 and issued as U.S. Pat. No. 6,134,382 on Oct. 17, 2000; which is a divisional of application Ser. No. 08/877,875, filed on Jun. 18, 1997 and issued as U.S. Pat. No. 6,009,236 on Dec. 28, 1999; which is a continuation of application Ser. No. 08/533,109 filed Sep. 25, 1996 and now abandoned, the entire contents of which are hereby incorporated by reference and for which priority is claimed under 35 U.S.C. § 120; and this application claims priority of Application Nos. 6-229620; 6-252098; 6-272107 and 7-28277 filed in Japan on Sep. 26, 1994; Oct. 18, 1994; Nov. 7, 1994 and Feb. 16, 1995, respectively under 35 U.S.C. § 119.

BACKGROUND OF INVENTION

1. Field of the Invention

The present invention relates to a digital video signal record and playback device for recording and playing back a digital video signals and more particularly to a digital video signal record and playback device for recording and playing back on a medium such as an optical disc or the like, a digital video signal coded on the basis of a motion compensation prediction and an orthogonal conversion.

2. Description of Related Art

FIG. 1 is a block circuit diagram of a conventional optical disc record and playback device shown in the Japanese Patent Application Laid-Open No. HEI 4-114369 (1992). Referring to FIG. 1, reference numeral 201 denotes an A/D converter for converting a video signal, an audio signal or the like into digital information. Reference numeral 202 denotes a data compressing circuit, 203 a frame sector converting circuit for converting compressed data into sector data which is equal to integer times of a frame cycle, 204 an error correction coder for adding the error correction signal to sector data, 205 a modulator for modulating interference between codes in a recording medium into a predetermined modulation code to reduce the interference, 206 a laser driving circuit for modulating laser light in accordance with a modulation code, and 207 a laser output switch. Further, reference numeral 208 denotes an optical head for emitting laser light, 209 an actuator for tracking a light beam emitted from the optical head 208, 210 a traverse motor for sending the optical head 208, 211 a disc motor for rotating an optical disc 212, 219 a motor driving circuit, 220 a first control circuit and 221 a second control circuit. Further, reference numeral 213 denotes a playback amplifier for amplifying a playback signal from the optical head 208. Reference numeral 214 denotes a demodulator for obtaining data from a recorded modulation signal, 215 an error correction decoder, 216 a frame sector inverse converting circuit, 217 a data extending circuit for extending the compressed data, 218 a D/A converter for converting extended data into, for example, an analog video signal and an audio signal.

FIG. 2 is a block circuit diagram showing an inside structure of the data compressing circuit 202 in FIG. 1. In FIG. 2, a digital video signal inputted from the A/D converter 201 is inputted into a memory circuit 301. A video signal 321 outputted from the memory circuit 301 is provided as a first input of a subtracter 302 and a second input of a motion compensation predicting circuit 310. An output of the subtracter 302 is inputted to a quantizer 304 via a DCT (discrete cosine transform) circuit 303. An output of the quantizer 304 is provided as an input of a transmission buffer 306 via a variable-length encoder 305. An output of the transmission buffer 306 is outputted to the frame sector converting circuit 203. In the meantime, an output of the quantizer 304 is inputted to the inverse DCT circuit 308 via an inverse quantizer 307. An output of the inverse DCT circuit 308 is provided as a first input of an adder 309. An output 322 of the adder 309 is provided as a first input of a motion compensation predicting circuit 310. An output 323 of the motion compensation predicting circuit 310 is provided as a second input of the adder 309 and a second input of the subtracter 302.

FIG. 3 is a block circuit diagram showing an inside structure of the motion compensation predicting circuit 310 in FIG. 2. In FIG. 3, the output 322 of the adder 309 is provided as an input terminal 401a while the output 321 of the memory circuit 301 is provided as an input terminal 401b. The signal 322 inputted from the input terminal 401a is inputted to a frame memory 404a or a frame memory 404b via a switch 403. A reference picture outputted from the frame memory 404a is provided as a first input of a motion vector detecting circuit 405a. The video signal 321 inputted from the input terminal 40b is inputted to a second input of the motion vector detecting circuit 405a. An output of the motion vector detecting circuit 405a is inputted to a prediction mode selector 406. In the meantime, the reference picture outputted from the frame memory 404b is provided as a first input of a motion vector detecting circuit 40b. The video signal 321 inputted from the input terminal 40b is provided as the second input of the prediction mode selector 406. The video signal 321 inputted from the input terminal 401b is provided as a third input of the prediction mode selector 406. A zero signal is provided as a second input of a switch 407. A second output of the prediction mode selector 406 is provided as a third input of the switch 407. The output 323 of the switch 407 is outputted from a output terminal 402.

FIG. 4 is a block circuit diagram showing an inside structure of the data extending circuit 217 in FIG. 1. In FIG. 4, the video signal inputted from the frame sector inverse converting circuit 216 is inputted to a reception buffer 501. An output from the reception buffer 501 is inputted to a variable-length decoder 502, and the output therefrom is inversely quantized at an inverse quantizer 503. Then, the output is subjected to an inverse discrete cosine transform at an inverse DCT circuit 504. The output is provided as a first input of an adder 506. In the meantime, the output of the reception buffer 501 is provided as a prediction data decoding circuit 505 while an output of the prediction data decoding circuit 505 is provided as a second output of the adder 506. The output of the adder 506 is outputted to the D/A converter 218 via a memory circuit 507.

Next, operation of the device of FIG. 1 will be explained. As one high efficiency coding mode in the case of coding a video signal, there is an coding algorithm for a MPEG (Moving Picture Expert Group) mode. This is a hybrid coding mode which combines an inter-frame prediction coding using a motion compensation prediction and an intra-frame conversion coding. This conventional example uses a data compressing circuit 202 having a structure shown in FIG. 2 and adopts the aforementioned MPEG mode.

FIG. 5 shows a simplified data arrangement structure (layer structure) of MPEG mode. In FIG. 5, reference numeral 621 denotes a sequence layer comprising a group of pictures (hereinafter referred to as "GOP") comprising a plurality of frame data items, 622 a GOP layer comprising several pictures (screens), a 623 a slice which divides one screen into several blocks, 624 a slice layer which has several macroblocks, 625 a macroblock layer, 626 a block layer which includes 8 pixels×8 pixels.

This macroblock layer 625 is a block which includes a least unit of 8 pixels×8 pixels, for example, in the MPEG mode. This block is a unit for performing DCT. At this time, a total of 6 blocks, including adjacent four Y signal blocks, one Cb block which corresponds to the Y signal blocks in position, and one Cr block are referred to as a macroblock. A plurality of these macroblocks constitute a slice. In addition, the macroblocks constitute a minimum unit of a motion compensation prediction, and a motion vector for the motion compensation prediction is formed in macroblock units.

Subsequently, a process for the inter-frame prediction coding will be explained. FIG. 6 shows an outline of the inter-frame prediction coding. Pictures are divided into three types, namely an intra-frame coded picture (hereinafter referred to as an I picture), a one direction prediction coded picture (hereinafter referred to as a P picture), and a both direction prediction coded picture (hereinafter referred to as a B picture).

For example, in the case where one picture out of N pictures is set as an I picture, one picture out of M pictures is set as a P picture or I picture, (N×n+M)th picture constitutes an I picture, (N×n+M×m)th picture (m≠1) constitutes a P picture, pictures from (N×n+M×m+1)th picture to (N×n+M×m+M−1)th picture constitute B pictures, where n and m are integers and $1 \leq m \leq N/M$. At this time, pictures from (N×n+1)th picture to (N×n+N)th picture are referred to as a GOP (group of pictures) in summary.

FIG. 6 shows a case in which symbols N and M are defined as N=15 and M=3. In FIG. 6, the I picture is not subjected to the inter-frame prediction but only to the intra-frame conversion coding. The P picture is subjected to a prediction from the I picture immediately before the P picture or from the P picture. For example, the $6^{th}$ picture in FIG. 6 is a P picture. The $6^{th}$ picture is subjected to the prediction from the $3^{rd}$ I picture. Further, the $9^{th}$ P picture in FIG. 6 is subjected to the prediction from the $6^{th}$ P picture. The B picture is subjected to the prediction from I picture of the P picture immediately before and after the B picture, for example, in FIG. 6, the $4^{th}$ and $5^{th}$ B pictures are subjected to the prediction both from the $3^{rd}$ I picture and the $6^{th}$ P picture. Consequently, the $4^{th}$ and $5^{th}$ picture are subjected to coding after coding of the $6^{th}$ picture.

Now operation of the data compressing circuit 202 will be explained in accordance with FIG. 2. The memory circuit 301 outputs the digital video picture signals which are inputted after rearranging the signals in the coding order. In other words, as described above, for example, the first B picture is coded after the $3^{rd}$ I picture in FIG. 6. Consequently, the order of pictures are rearranged. FIG. 7 shows an operation of this arrangement. A picture sequence inputted as shown in FIG. 7A is outputted in the order shown in FIG. 7B.

Further, the video signal 321 outputted from the memory circuit 301 is subjected to DCT in the direction of space axis after a difference between pictures from the prediction picture 323 outputted from the motion compensation predicting circuit 310 at the subtracter 302 to reduce the redundancy in the direction of the time axis. The converted coefficient is quantized and variable-length coded followed by being outputted via the transmission buffer 306. In the meantime, the quantized conversion coefficient is inversely quantized and is subjected to an inverse DCT. After that, the coefficient is added to the prediction picture 323 at the adder 309 and a decoded picture 322 is obtained. The decoded picture 322 is inputted to the motion compensation predicting circuit 310 for the subsequent coding of pictures.

Subsequently, an operation of the motion compensation predicting circuit 310 will be explained in accordance with FIG. 3. The motion compensation predicting circuit 310 uses two reference pictures which are stored in the frame memory 404a and the frame memory 404b to perform a motion compensation prediction of the video signal 321 outputted from the memory circuit 301 for outputting the prediction picture 323.

In the beginning, in the case where the picture 322 coded and decoded as described above is either an I picture or a P picture, this picture 322 is stored in the frame memory 404a or the frame memory 404b for coding the subsequent picture. At this time, the switcher 403 is switched so that the frame memory out of the two frame memories 404a and 404b which is renewed prior to the other in time is selected. However, when the decoded picture 322 is a B picture, writing is not performed at the frame memory 404a and the frame memory 404b.

For example, when $1^{st}$ and $2^{nd}$ pictures in FIG. 7 are coded by such switching of the switcher 403, the 0th P picture and the $3^{rd}$ I picture are stored in the frame memory 404a and frame memory 404b, respectively. Further, when the 6th P picture is coded and decoded, the frame memory 404a is rewritten into the decoded picture of the $6^{th}$ P picture.

Consequently, when the 4th and the 5th B pictures are coded, the 6th P picture and the 3rd I picture are stored in the frame memories 404a and 404b, respectively. Further, when the 9th P picture is coded and decoded, the frame memory 404b is rewritten into the decoded picture of the 9th P picture. As a consequence, when the 7th B picture and the 8th B picture are coded, the 6th P picture and the 9th P picture are stored in the frame memories 404a and 404b, respectively.

When the video signal 321 outputted from the memory circuit 301 is inputted to the motion compensation predicting circuit 310, the motion vector detecting circuits 405a and 405b detect a motion vector on the basis of a reference picture stored in the frame memories 404a and 404b and output a motion compensation prediction picture. In other words, the video signal 321 is divided into a plurality of blocks. Then a block is selected so that the prediction distortion becomes the smallest in the reference picture with respect to each block. Then the relative position of the block is outputted as the motion block, and at the same time this block is outputted as the motion compensation prediction picture.

In the meantime, the prediction mode selector 406 selects a picture where the prediction distortion is the smallest out of two motion compensation prediction pictures outputted from the motion vector detecting circuits 405a and 405b or an average picture thereof. Then, the selected picture is outputted as a predicted picture. At this time, when the video signal 321 is not a B picture, the motion compensation prediction picture is always selected and outputted which corresponds to the reference picture which is inputted prior to the other before in time. Further, the prediction mode selector 406 selects either coding in pictures in which prediction is not performed or prediction coding by the selected prediction picture in such a manner that the selected coding has a better coding efficiency.

At this time, when the video signal 321 is an I picture, the coding in pictures is always selected. When the coding in pictures is selected, a signal representative of the coding in the picture mode is outputted as a prediction mode. In the meantime, when the prediction coding between pictures is selected, a signal representative of a selected prediction picture is outputted as a prediction mode. The switcher 407 outputs a zero signal when the prediction mode outputted from the prediction mode selector 406 is a mode of coding in pictures. If the prediction mode is not the mode of coding in pictures, the prediction mode selector 406 outputs the prediction picture.

It follows from the aforementioned fact that when the video signal 321 outputted from the memory circuit 301 is an I picture, the motion compensation predicting circuit 310 always outputs the zero signal as a prediction picture 323, the I picture is not subjected to the inter-frame prediction but to the intra-frame conversion coding. In the meantime, when the video signal outputted from the memory circuit 301 is the 6th P picture in FIG. 6, the motion compensation prediction circuit 310 performs the motion compensation prediction from the 3rd I picture in FIG. 6 and outputs the prediction picture 323. Further, when the video signal 321 outputted from the memory circuit 301 is the 4th B picture shown in FIG. 6, the motion compensation prediction circuit 310 performs the motion compensation prediction from the 3rd I picture and the 6th P picture shown in FIG. 6 and outputs the prediction picture 323.

Subsequently, an operation of the transmission buffer 306 will be explained. The transmission buffer 306 converts video data variable-length coded by the variable-length encoder 305 into a bitstream of the MPEG video signal. Here, the stream of the MPEG has a six layer structure shown in FIG. 5. Header information which is an identification code is added for a sequence layer 621, a GOP layer 622, a picture layer 623, a slice layer 624 and a block layer 626 to constitute the layer structure.

Further, the transmission buffer 306 decomposes a bitstream of a video signal and a bitstream of an audio signal into a plurality of packets respectively so that these packets are multiplexed including a synchronization signal thereby constituting a system stream of a MPEG2-PS (program stream). Here, the MPEG2-PS consists of a pack layer and a packet layer as shown in FIG. 8. Then the header information is added to the packet layer and the pack layer. In the conventional example, a system stream is constituted so that data of one GOP portion of the video data is included.

Here, the pack layer has a structure in which the packet layer is bound at the upper layer of the packet layer. Each packet layer which constitutes the pack layer is referred to as a PES packet. In addition, header information of the pack layer shown in FIG. 8 includes an identification signal of a pack and a synchronous signal which constitutes a basis of a video signal and an audio signal.

In the meantime, in the packet which constitutes the packet layer, three kinds of PES packets exist as shown in FIG. 9. Here, a second stage packet shown in FIG. 9 is a video/audio/private 1 packet wherein a code for identifying the front of the packet and time stamp information or the like (PTS and DTS) needed at the time of decoding each packet as header information are added before the packet data. However, the time stamp information PTS is a time control information of the reproduction output and is information for controlling a decoding order of data stream of each packet at the time of reproduction. Further, DTS is time control information at the start of decoding and is information for controlling the transmission order of decoding data.

The third stage packet shown in FIG. 9 is a private 2 packet where user data is written. Further, the lowest stage packet is a padding packet where all the packet data is masked with "1". The header information in the private 2 packet and padding packet is constituted of a start code of a packet and a packet length.

As described above, the video data and audio data items are converted into a system stream of the MPEG2-PS by the transmission buffer 306 and is converted for each of the frame sectors. This information is subjected to error correction processing, and at the same time, the information is modulated to minimize the interference between codes on the disc and is recorded on the optical disc 212. At this time, for example, data amount for each of the GOP unit is set to an approximately the same amount. Then, it is apparent that the edition for each of the GOP unit can be made by distributing the data into sectors which are equal to integer times of the frame cycle.

Subsequently, an operation at the time of playback will be explained. At the time of the playback, the video information recorded on the optical disc 212 is amplified with the playback amplifier 213. After the information is restored to digital data at the demodulator 214 and the error correction decoder 215 followed by being restored as pure original video data free of data such as an address and a parity at the frame sector inverse converting circuit 216. Then, the data is inputted into the data extending circuit 217 which has a structure shown in FIG. 4. The system stream which consists of a MPEG2-PS is inputted to the transmission buffer 501.

At the transmission buffer 501, the system stream which is inputted is decomposed into a pack unit. After that, each PES packet is decomposed in accordance with the header information thereby reconstructing the bitstream of the video data and audio data which is decomposed in the PES packet unit. Further, with respect to the video data, the stream is decomposed to the block layer shown in FIG. 5 so that the block data and the motion vector data is decomposed and outputted.

The block data outputted from the transmission buffer 501 is inputted in accordance with the variable-length decoder 502 so that the variable-length data becomes a fixed length data, inversely quantized and is subjected to the inverse DCT to be outputted to the adder 506. In the meantime, the prediction data decoding circuit 505 decodes the prediction picture in accordance with the motion vector outputted from the transmission buffer 501 to be outputted to the adder 506.

In this case, the prediction data decoding circuit 505, like the motion compensation predicting circuit 310, provides a frame memory for storing the I picture and P picture data which is decoded by the adder 506. Incidentally, with respect to a method for renewing the reference picture data an explanation will be omitted because the method is the same as the case of coding the data.

The adder 506 adds the output of the prediction data decoding circuit 505 and the output of the inverse DCT circuit 504 to be outputted to the memory circuit 507. Here, at the time of coding the data, the frame is rearranged in accordance with the order of coding the data as shown in FIG. 7 with respect to the video signals which are continuous in time. Therefore, in the memory circuit 507, the data inputted in the order shown in FIG. 7B is rearranged so that the picture data continues in time and is outputted to the D/A converter 218.

Subsequently, the picture retrieval and the high speed playback thereof will be shown in the case where data with such a coding structure is recorded on the optical disc. In the case where the coding structure shown in FIG. 6 is provided, the high speed playback of the picture can be performed when the data is played back in the unit of the I picture. In this case, the track jump is performed immediately after the I picture is played back. Then, the following or the preceding GOP is accessed so that the I picture is played back there. In the case shown in FIG. 6, the high speed feeding playback and rewinding playback can be actualized by repeating such an operation.

However, since this GOP rate is a variable bit rate, it is impossible to recognize at all where the front of the following GOP is located. Consequently, the optical head is allowed to appropriately jump to locate the front of the GOP. Thus, it is impossible to determine which track should be accessed.

In addition, the I picture has a large amount of data. Thus, when only the I picture is played back in a continuous manner, like a special playback, the picture cannot be played back at a frequency of 30 Hz like a normal animated picture because of a limit on the reading speed from the disc. Even when the optical head jumps after the completion of the I picture playback, the intermission for the renewal to the following I picture becomes longer so that the operation lacks in smoothness.

The conventional digital video signal record and playback device, is constituted in the aforementioned manner. In the case where a high speed playback is performed at several times speed by using the I picture and the P picture, the I picture data and the P picture data is read after the front of the GOP is detected from bitstreams which are recorded on a recording medium or the like such as an optical disc or the like. Consequently, in the case where the data amount of the I picture and the P picture become very large, or in the case where it takes much time to search the front of the GOP, time for reading the data from the recording medium becomes insufficient. Thus there arises a problem in that the data all the I picture and the P picture cannot be read so that the high speed playback cannot be realized.

In the conventional digital video signal record and playback device, it takes much time to input I picture data which has a large amount of data even when the high speed playback is performed only by using the I picture. Consequently the special playback which surpasses tens of times cannot be realized. In this case, a higher speed special playback can be realized by playing back one I picture for several GOP. There is a problem in that the interval for the renewal of played back picture will be prolonged so that the content of the picture will become vague.

Since the conventional video signal record and playback device is coded as described above, only the I picture having a large amount of data is decoded at the time of the skip search (watching data through a rapid playback). Consequently, the optical head is allowed to jump without playing back data sufficient for the decoding. Otherwise, when a sufficient amount of data is played back, the time for the playback of data is long, the destination to which the GOP is to jump must be set to a considerably far place causing a problem that the number of scenes outputted to the screen becomes few.

In addition, since the sector address of the following GOP cannot be recognized because of the variable rate, it is not verified whether or not the front of the GOP is located at the track to which the jump is made. Consequently, there arises a problem in that a plurality of disc rotation are required to locate the front of the GOP at the track of destination and the number of scenes which are outputted to the screen becomes much fewer at the time of the special playback. Further, there arises a problem in that if the sector address can be recognized, no means is available for judging to what extent data can be played back for the optical head jump with the result that no judgement can be made without passing through the video decoder, and the efficiency at which the optical head jumps is lowered.

As other conventional digital video signal record and playback devices, some devices are disclosed in, for example, Japanese Patent Application Laid-Open No. HEI 6-98314 (1994), Japanese Patent Application Laid-Open No. HEI 6-78289 (1994) and the like. One example is shown in FIG. 10. In FIG. 10, reference numeral 775 denotes a video signal generator such as a camera, a VTR or the like, 776 an audio signal generator such as a microphone, a VTR or the like, 762 a video signal encoder, 763 an audio signal encoder, 777 a system layer bitstream generator, 778 an error correction coder, 779 a digital modulator, 780 an optical disc, 756 a playback amplifier, 786 a detector, 781 a digital demodulator, 758 an error corrector, 759 a system stream processor, 782 a video signal decoder. 782 an audio signal decoder 784 a monitor and 785 a speaker.

Currently, optical discs generally used have a diameter of 120 mm. These optical discs are normally capable of recording 600 M byte or more data. Quite recently, these optical discs are capable of recording video signal and an audio signal for 74 minutes at a data rate of about 1.2 Mbps. At the time of data recording, a video signal is inputted to the video signal encoder 762 from the video signal generator 775 for encoding the video signal. From the audio signal generator 776, the audio signal is inputted to the audio signal encoder 763 for encoding the audio signal. The process for multiplexing the header or the like to these two encoded signals is carried out by the system layer bitstream generator 777. After the error correction code is appended by the error correction coder 778, the error correction signal is digitally modulated with a digital modulator 779 thereby generating a bitstream for recording. This bitstream creates a mother disc with a recording means (not shown), and the content of the mother disc is copied to the optical disc 780 with the result that a commercially available video software disc is prepared.

In a playback device for users, a signal obtained from the video software disc by the optical disc is amplified with the playback amplifier 756 to input a playback signal to the detector 786. After this playback signal is detected with the detector 786, the digital demodulator 781 digitally demodulates the signal to correct errors with an error corrector 758. After this, the video signal area is extracted from the signal which has been error corrected, and this extracted data is decoded at the video signal decoder 782 and outputted together with the audio signal decoded by the audio signal decoder 783 to the monitor 784 and the speaker 785 respectively.

A typical method for coding this video signal is an MPEG 1 and an MPEG 2 referred to as an MPEG (Moving Picture Experts Group) method which is an international standard coding method. A concrete example of coding method will be explained with respect to an example of MPEG 2.

FIG. 11 shows a block diagram of an video signal coding part in a conventional digital signal record and playback device for explaining the MPEG2 coding method. FIG. 12 is a block diagram of an video signal decoding unit in a conventional digital signal record and playback device for explaining a decoding method. Further, FIG. 13 is a view showing a concept of the mobile picture processing for the video signal coding in the conventional digital signal record and playback device for explaining the grouping of mobile pictures according to the coding method of the MPEG 2. Referring to FIG. 13, IBBPBBP designates - - - , I an I picture, B a B picture and P a P picture. For example, in FIG. 13A, mobile pictures from I to the one immediately before the appearance of another I are grouped in a definite number of frames. The number of frames of the pictures which constitute this group is normally 15 frames in many cases. However, the number is not limited to any specific number.

The GOP, a group of pictures which constitutes this group includes at least one frame of I picture which can be decoded completely in one frame. The GOP also includes a P picture coded through the motion compensation prediction by one direction prediction of the time system on the basis of the I picture and a B picture coded by both direction prediction of the time system on the basis of the I picture and the P picture. Incidentally, the arrows in FIGS. 13A and 13B represent prediction relations.

In other words, the B picture can be coded and decoded only after the I picture and the P picture are prepared. The initial P picture in the GOP can be coded and decoded after the I picture before the P picture is prepared. The second P picture and P picture after that can be coded and decoded when the P picture immediately before the P picture is prepared. Consequently, in the absence of the I picture, either the P or B pictures cannot be coded and decoded.

Referring to FIG. 11, reference numeral 787 denotes a picture rearranger, 788 a scan converter, 789 an encoder buffer, 790 a mode determiner, 702 a motion vector detector, 706 a subtracter, and 708 a DCT circuit which has a field memory, a frame memory, and DCT calculator. Reference numeral 710 denotes a quantizer, 714 an inverse quantizer, 716 an inverse DCT circuit, 718 an adder, 720 an image memory, 722 a rate controller and 726 a variable-length encoder.

Referring to FIG. 12, reference numeral 733 denotes a variable-length decoder, 736 an inverse DCT circuit, 737 an image memory, 788 an adder, 739 an inverse scan converter. Incidentally, the motion vector detector 702 and the mode determiner 790 combines together to represent a motion vector detecting unit.

Subsequently, on the basis of FIGS. 11 though 13, an operation of a digital video signal record and playback device will be explained. Referring to FIG. 11, the picture rearranger 787 rearranges pictures for coding in an order shown in FIG. 13. Then the scan converter 788 converts the scan from the raster scan to the block scan. This picture rearrangement and the conversion processing from the raster scan to the block scan are generally referred to as prepro-cessing. The picture rearranger 787 and the scan converter 788 are generally referred to as preprocessor. The inputted picture data is subjected to block scan in the order of encoding. When the picture is an I picture, the picture passes through the subtracter 706. When the picture is a P picture or a B picture, the picture is subtracted with the reference picture and the subtracter 706.

At this time, the motion vector detector 702 determines the motion direction and the notion quantity (the input of the original picture to this motion vector detector 702 may be a picture after the picture rearrangement or a picture after the block scan as an original picture, but the circuit size is smaller in the latter case. Further, the reference picture must be inputted from the image memory 720 but the reference arrow in the drawing is omitted) with the result that a signal in the area in consideration of the portion of the direction and quantity from the image memory 720 may be read. At this time, the mode determiner 790 determines whether both direction prediction is used or a one direction prediction may be used.

The substraction with the reference screen in consider-ation of the motion vector is performed at the subtracter 706. Even pictures with a small electric power are constituted so that the coding efficiency is heightened. The output from the subtracter 706 is collected either in a unit of field or in a unit of frame at the DCT circuit 708 to be subjected to a DCT process and converted into data in a frequency component. This data is inputted to the quantizer 710 where the weight is different for each of the frequency. The data is scanned in a zigzag manner in two dimensions over low frequency components and high frequency components to be subjected to a run length coding and a Huffman coding.

This data which has been subjected to the run length coding and Huffman coding is controlled for variable-length coding so that a quantizing table is scaled by using the rate controller 722 to allow the data to agree with a target code quantity. The data that has been subjected to variable-length coding is normally outputted via the encoder buffer 789. The quantized data is brought back to the inverse quantizer 714 to be brought back to an original picture space data by the inverse DCT circuit 716 with the result that data which is the same as the decoded data is obtained by the adder 718 by adding the original picture space data to the data referenced by the subtracter 706.

FIG. 12 shows a schematic block structure of a decoder. The variable-length decoder 733 decodes picture data including header information such as the motion vector, the coding mode, the picture mode or the like. After this decoded data is quantized, the inverse DCT circuit 736 performs the inverse DCT calculation (incidentally, in FIG. 12, the inverse quantizer located in the front stage of the inverse DCT circuit 736 is omitted). By referring to the picture data from the image memory 737 in consideration of the motion vector, the motion compensation prediction is decoded by adding the picture data that has been referred to with the data after the inverse DCT by the adder 738. This data is converted into a raster scan with the inverse scan converter 739 to obtain and output an interlace picture.

Further, in accordance with the variable transmission rate disc system introduced in "the variable transmission rate disc system and the code quantity control method" in a publication of Mr. Sugiyama et al, at the 1994 annual meeting of the Television Society, a proposal is made on a higher quality digital video signal encoding method. This is a method in which an encoding rate is fixed with one program (for example, a first set) so that each GOP is set at a rate depending on the difficulty of the design and encoded. FIG. 14 is a block diagram showing a video signal coding unit in a conventional digital signal record and playback device. In FIG. 14, reference numeral 791 denotes a motion compensation predictor, 792 a code amount memory, 793 a GOP rate setting unit, 794 a code amount assigning unit, 795 a subtracter, and 796 a code amount counter and 797 a switch. The GOP rate setting unit 793 shown in FIG. 14 is set to change the setting of the quantizing value according to the difficulty of the design pattern. In other words, while the switch 797 is connected to the virtual coding side, the output of the variable-length encoder 726 is inputted to the code amount counter 796 so that the code amount counter 796 counts the code amount to be stored in the code amount memory 792.

The GOP rate setting unit 793 determines the virtual code amount in the whole one program on the basis of the code amount stored in this code amount memory 792 to set and calculate the optimal encoding rate in each GOP. The code assignment at this time is calculated from the code amount assigning unit 794 for the preparation of the actual encoding. When the switch 797 is connected to the actual coding side, the code amount assignment amount and the value of the code amount counter 796 are compared so that the switch 797 is operated to control the quantizer 710 on the basis of the actual code amount. In this manner, a small code amount is assigned to an easy design and a large code is assigned to a difficult amount so that the coding difficulty that gradually changes in the program is absorbed. As a consequence, it has been reported that the picture quality of what is recorded at a rate of 3 Mbps by using this method is approximately the same as the picture quality of what is coded at a rate of 6 Mbps.

In consideration of the possibility of the skip search in the digital video signal record and playback device using an optical disc, when the I picture and the P picture are played back for fast rewinding even when the front of the GOP can be accessed at a high speed, the P picture is located at an appropriate position in the GOP so that there arises a need of operating the optical head while searching data on the bitstream. However, such a control cannot be made in time because of the time constant of a servo such as an actuator or the like. One GOP normally includes 15 frames of pictures, and in NTSC scanning method, 0.5 second is available for finding the front of the GOP. However, in order to detect the front of a certain GOP, the bitstream requires the reading of ½ or more for reading ⅓ picture at a frame rate even when an attempt is made to read the I picture or the P picture at the time of the skip search with the result that the reading speed has to be set to 2.5 times faster or even faster than the normal speed when the head movement time is set to 200 milliseconds. This exceeds the response limit of the actuator. In a normal playback method, the skip search is substantially impossible to carry out.

In accordance with the conventional digital video signal record and playback device, the signal is coded in this manner. Thus, when an attempt is made to perform the skip search like a video tape recorder, a perfect playback picture cannot be obtained in the case where the data is played back which does not allow obtaining a complete original picture from one picture data item like the B picture. Particularly, in the skip search, jerkiness (unnatural movement) is generated with respect to the output processing in the unit of frame. When a variable rate recording is performed with a good playback picture quality, there arises a problem in that the difficulty of accessing the front of the GOP itself increases since the position of the front address of the GOP changes, with the result that a space is formed in a disc area due to disuniform unit of the GOP.

SUMMARY OF THE INVENTION

An object of the present invention is to provide a digital video signal record and playback device which is capable of performing a special playback by using an I picture with a large data amount and obtaining a playback picture with a good quality, and a method for recording and playing back the same.

Another object of the present invention is to provide a digital video signal record and playback device which is capable of performing a high speed playback by using an I picture and a P picture with a large data amount and obtaining a playback picture with a good quality, and a method for recording and playing back the same.

Still another object of the invention is to provide a digital video signal record and playback device which is capable of realizing an improvement in the access characteristics of the GOP under the presupposition of adopting the coding of a variable bit rate while obtaining a favorable skip search, and a method for recording and playing back the same.

Further another object of the invention is to provide a digital video signal record and playback device which is capable of realizing an improvement in the access characteristics of the GOP and an effective use of space area on a storing medium under the presupposition of adopting the variable rate coding while performing a skip search, and a method for recording and playing back the same.

With the digital video signal record and playback device of the present invention, when the video signal is recorded in the unit of GOP, one frame is divided into n areas with respect to the I picture so that each area is coded and recorded at the front of one GOP in order from the area located at the central part of the screen. At the same time, the address information of each area of the I picture is simultaneously recorded as header information. At the time of the special playback, only the data of the I picture in the area located at the central part of the screen is read, and a special playback picture is outputted by masking a definite value of data with respect to the area where the data is not read. Consequently, compared with the case where all the I pictures having a great amount of data are played back, a special playback can be realized at a faster speed.

In the aforementioned video signal record and playback device, special playback pictures are outputted by extending the central area that is read over the whole screen. Consequently, since the data at the center portion of the screen is extended to synthesize the playback picture, the area in which data cannot be read becomes inconspicuous and the played back picture becomes favorable to watch.

With the digital video signal record and playback device of the present invention, the video signal is recorded in the unit of GOP, and one frame is divided into n areas with respect to the I picture so that each area is coded and recorded at the front of one GOP in order from the central part of the screen. When the video signal is read and played back from a recording medium such as an optical disc where the address information of each area in the I picture is simultaneously recorded as header information, at the time of the special playback only the data of the I picture in the area located at the central part of the screen is read. With respect to an area where the data is not read, the special playback picture is outputted by masking the data to a definite value. Consequently, compared with the case where all the I pictures are played back, the special playback can be realized at a faster speed.

In the aforementioned digital video signal record and playback device, special playback pictures are outputted by extending the read central part of the area over the whole screen. Consequently, the area in which data cannot be read becomes inconspicuous and the playback picture becomes favorable to watch.

With another digital video signal playback device of the present invention, when the video signal is recorded in the unit of GOP, one frame is divided into n areas so that each area is coded and is recorded in order from an area located at the central part of the screen at the front of the one GOP. At the same time, the address information of each area of the I picture is simultaneously recorded as header information. At the time of the special playback, only the data of the I picture is read in the unit of area and is outputted as a playback picture. In the case where all the areas in the I picture cannot be read during a definite time, the special playback picture is outputted by interpolating the picture with the data of the preceding screen. Consequently, the area located at the central part of the screen is given a priority to be played back with the result that the interpolated playback picture becomes favorable to watch.

With still another digital video signal record and playback device of the present invention, when the video data is recorded in the unit of GOP, one frame is divided into n areas with respect to the I picture so that each area is coded and recorded in order from the central part of the screen at the front of the one GOP. At the same time, the address information of each area of the I picture is simultaneously recorded as header information. At the time of the special playback, only the data of the I picture is read in the unit of area, and regions in the areas 1, 2, - - - n are read one by one from consecutive n I pictures with the result that pictures for one screen portion is synthesized and is outputted as a playback picture. When all the areas of the I picture cannot be read in a definite time, the special playback picture is outputted by interpolating the picture with the preceding screen data. Consequently, the area located in the central part of the screen is given a priority to be reproduced. Since one screen is synthesized with n I pictures, the interpolated playback picture becomes inconspicuous.

With still another digital video signal record and playback device of the present invention, when the video picture is recorded in the unit of GOP, one frame is divided into n areas with respect to the I picture so that each area is coded. When the I picture is recorded at the front of one GOP in summary for each area, the position of the area which is initially recorded in the unit of GOP is scrolled for recording. At the same time, the address information of each area in the I picture is simultaneously recorded as header information. At the time of the special playback, only the data of the I picture is read in the unit of area and is outputted as a playback picture. In the case where all the I pictures can not be read in a definite time, the special playback picture is outputted by interpolating the picture with data of the preceding screen. Consequently, the position of the area is scrolled in the unit of GOP, one screen can be played back in an even manner.

With still another digital video signal record and playback device of the present invention, when the video data is recorded in the unit of GOP unit, one frame is divided into n areas with respect to the I picture so that each area is coded, is divided into an error correction block unit, and is recorded in order from the area located in the central part of the screen at the front of the one GOP. At the same time, the address information of each area of the I picture is simultaneously recorded as header information. At the time of the special playback, only the data of the picture is read in the unit of error correction block and is outputted as a playback picture. In the case where all the I picture cannot be read in a definite time, the special playback picture is outputted by interpolating the picture with the data of the preceding screen. Consequently, since the area located at the central part of the screen is given a priority to the playback, the playback picture becomes favorable to watch.

With still another digital video signal record and playback device of the present invention, when the picture data is recorded in the unit of GOP, one frame is divided into n areas with respect to the I picture and the P picture so that each area is coded and the area located in the central part of the screen is recorded in order from the area located in the center at the front of the one GOP. At the same time, the address information of each area of the I picture and the P picture is simultaneously recorded as header information. At the time of the special playback, the data of the I picture and the P picture are read in the unit of area and is outputted as a playback picture. In the case where all the areas of the I picture or the P picture cannot be read within a definite time, the special playback picture is outputted by interpolating the picture with the data of the preceding screen. Consequently, since the area located at the central part of the screen is given a priority in playback, interpolated playback picture becomes favorable to watch.

With still another digital video signal record and playback device of the present invention, when the video signal is recorded in the unit of GOP, one frame is divided into n areas with respect to the I picture and the P picture so that each area is encoded and is recorded in order from an area located at the central part of the screen at the front of one GOP. At the same time, the address information of each area of the I picture is simultaneously recorded as header information. At the time of the special playback, only the data of the I picture and the P picture are read in the unit of area, and regions of areas 1, 2, - - - , n are read from continuous n I pictures and P pictures to synthesize a picture of one screen portion and is outputted as a playback picture. In the case where all the areas of the I picture or the P picture cannot be read within a definite time, the special playback picture is outputted by interpolating the picture with the data of the preceding screen. Consequently, since the area located at the central part of the screen is given a priority in playback, interpolated playback picture becomes inconspicuous.

With still another digital video signal record and playback device of the present invention, when the video signal is recorded in the unit of GOP, one frame is divided into n areas with respect to the I picture and the P picture so that each area is encoded in the unit of frame. When the divided frame is fixed for each area at the front of one GOP and is recorded, the position of the area which is initially recorded in the unit of frame is scrolled. At the same time, the address information of each area in the I picture is simultaneously recorded as header information. At the time of the special playback, only the data of the I picture is read in the unit of area and is outputted as a playback picture. In the case where all the I pictures can not be read in a definite time, the special playback picture is outputted by interpolating the picture with data of the preceding screen. Consequently, the order in which the area of the I picture and the P picture is recorded is scrolled in the unit of GOP, a playback picture for one screen portion can be played back in an even manner.

With still another digital video signal record and playback device of the present invention, when the video signal is recorded in the unit of GOP unit, one frame is divided into n areas with respect to the I picture and the P picture so that each area is encoded and is divided in the error correction block unit. Then the divided frame is recorded in order from an area located at the central part of the screen at the front of the one GOP. At the same time, the address information of each area of the I picture is simultaneously recorded as header information. At the time of the special playback, only the data of the I picture is read in the unit of error correction and is outputted as a playback picture. In the case where all the I pictures cannot be read within a definite time, the special playback picture is outputted by interpolating the picture with the data of the preceding screen. Consequently, since the area located at the central part of the screen is given a priority in playback, interpolated playback picture becomes favorable to watch.

In accordance with the digital video signal playback method (device), at least the I picture which is subjected to the intra-frame coding is divided depending on the frequency area, quantizing level or space resolution so that a bitstream of video data is constituted wherein the data more important as a picture out of data divided as least with respect to the I picture is arranged at the front. Then the address information of the divided data is arranged as header information at the front of the bitstream of the video data to constitute a packet. The data recorded on the recording medium is rearranged at the time of the normal playback in the data order before dividing the data in accordance with the header information in the packet to be outputted. At the time of the special playback, data arranged at the front is decoded and outputted for the special playback. Consequently, the data decreases which is to be accessed at the time of the special playback by dividing data depending on the frequency area, quantizing level or the space resolution with the result that a smooth special playback picture can be obtained. Further, since the address of the divided data is recorded as header information of the system stream, the number of bytes that should be instantly played back at the time of the playback can be known with the result that the optical head can effectively jump at the time of the special playback. Further, at the time of the normal playback, the data is rearranged on the basis of the address with the result that disadvantage resulting from the division of data can be prevented when played back.

In accordance with the digital video signal record and playback method (device), at least the I picture which is subjected to the intra-frame coding is divided depending on the frequency area, the quantizing level and the space resolution, so that a bitstream of video data is constituted wherein the data more important as a picture out of data divided as least with respect to the I picture is arranged at the front. Then the address information of the divided data is arranged as header information at the front of the bitstream of the video data to constitute a packet. The data recorded on the recording medium is rearranged at the time of the normal playback in the data order before dividing the data in accordance with the header information in the packet to be outputted. At the time of the special playback, data arranged at the front is decoded and outputted for the special playback. Consequently, the data decreases which is to be accessed at the time of the special playback by dividing data depending on the frequency area, quantizing level or the space resolution with the result that a smooth special playback picture can be obtained. Further, since the address of the divided data is recorded as header information of the system stream, the number of bytes that should be instantly played back at the time of the playback can be known with the result that the optical head can effectively jump at the time of the special playback. Further, at the time of the normal playback, the data is rearranged on the basis of the address with the result that disadvantage resulting from the division of data can be prevented when recorded and played back.

In accordance with another digital video signal record and playback method (device), at least the I picture which is subjected to the intra-frame coding at the time of recording is divided into n areas (n>1) so that the I picture divided into n areas is rearranged in the unit of area so that a bitstream of video data is constituted wherein the area located at the center on the screen is arranged at the front. Then, the address information of the I picture divided into n areas is arranged at the front of the bitstream of data to constitute a packet and is recorded on the recording medium. At the time of the normal playback, the data of the I picture is rearranged in the unit of area and is outputted in accordance with the header information arranged at the front of the packet. At the time of the special playback, the special playback can be performed by outputting only the data of the I picture that can be read in a definite time from the front of the packet. Consequently, the data that should be accessed at the time of the special playback decreases by dividing data in the area of the screen at the time of recording. Since the address of the divided data is recorded as header information of the system stream, the number of bytes that should be instantly played back at the time of the playback can be known with the result that the optical head can effectively jump at the time of the special playback the address jump can be performed in a certain time unit. Further, at the time of the normal playback, the data is rearranged on the basis of the address with the result that disadvantage resulting from the division of data can be prevented when recorded and played back.

In accordance with another digital video signal record and playback method (device), at least the I picture data which is subjected to the intra-frame coding is divided into n areas (n>1) so that the I picture divided into n areas is rearranged in the unit of area so that a bitstream of video data is constituted wherein the area located at the center on the screen is arranged at the front. Then, the address information of the I picture divided into n areas is arranged at the front of the bitstream of video data as header information to constitute a packet. At the time of the normal playback, the I picture data rearranged for each area in accordance with header information arranged at the front of the packet is rearranged in the area unit and is outputted from the recording medium on which the data is recorded. At the time of the special playback, the special playback is performed by outputting only the data which can be read in a definite time. Consequently, the address jump can be performed in a certain time unit at the time of the special playback by dividing the data in the area on the screen with result that the data to be addressed at the time of the special playback decreases. Further, since the address of the divided data is recorded as header information to the system stream, the number of bytes that should be played back can be instantly detected at the time of the playback with the result that the jump of the optical head at the time of the special playback can be efficiently performed. Further, since the data is rearranged on the basis of the address at the time of the normal playback, the data can be played back without causing the disadvantage resulting from the data division.

In accordance with still another digital video signal record and playback method (device), at least the I picture which is subjected to the intra-frame coding at the time of recording are divided with the low frequency area, the high frequency area, the quantizing level and the space resolution with the result that the basic data out of the divided I picture are rearranged in the unit of each area on the screen to constitute a bitstream of the video data where the area located at the central part of the screen in the I picture is arranged at the front. The divided areas, the data division, and the address information of the picture is arranged at the front of the bitstream of the video data as header information to constitute a packet and is recorded on a recording medium. At the time of the normal playback, the data is rearranged in the unit of area in accordance with the header information which is arranged at the front part of the packet and the data is outputted. The divided data is rearranged in the order of the original data. At the time of the special playback, only the data of the I picture which can be read in a definite time from the front of the packet is outputted for performing a special playback. Consequently, at the time of the recording, the data is divided depending on the frequency, the quantization and the space resolution, and is divided in the unit of area on the screen. As a consequence, at the time of the special playback, the data to be accessed decreases so that a smooth special playback can be obtained by gradually decreasing the data amount to be accessed at the time of the special playback. Further, since the address of the divided data is recorded as header information and the number of bytes that should be played back can be instantly detected at the time of the playback, the jump of the optical head at the time of the special playback can be efficiently performed. Further, regarding the data divided by a plurality of dividing means, the amount of data to be read can be adjusted in accordance with the special playback speed to cope with a wide scope of the special playback speed. Further, since the data is rearranged on the basis of the address at the time of the normal playback, the data can be played back without causing the disadvantage resulting from the data division.

In accordance with still another digital video signal playback method (device), at least the I picture which is subjected to the intra-frame coding are divided in accordance with the low frequency area, the high frequency area, the quantizing level or the space resolution with the result that the basic data out of the divided I picture is rearranged in each area on the screen to constitute a bitstream of the video data where the area located at the central part of the screen in the I picture is arranged at the front. The divided areas, the data division, and the address information of the picture is arranged at the front of the bitstream of the video data as header information to constitute a packet and is recorded on a recording medium, from which the data is outputted at the time of the normal playback by rearranging the data in the unit of area in accordance with the header information arranged at the front part of the packet. The divided data is rearranged in the order of the original data. At the time of the special playback, only the data of the I picture which can be read in a definite time from the front of the packet is outputted for performing a special playback. Consequently, the data is divided depending on frequency, quantization and space resolution, and is divided in the unit of area on the screen. As a consequence, the data to be accessed at the time of special playback is decreased by dividing the data in the unit of area on the screen. Further, since the address of divided data is recorded as header information and the number of bytes that should be played back is instantly detected at the time of the playback, the jump of the optical head at the time of the special playback can be efficiently performed. Further, regarding the data divided by a plurality of dividing means, the amount of the data to be read can be adjusted in accordance with the special playback speed to cope with a wide scope of the special playback speed. Further, since the data is rearranged on the basis of the address at the time of the normal playback, the data can be played back without causing the disadvantage resulting from the data division.

In accordance with still another digital video signal record and playback method (device) (or a digital video signal playback method (device)), only the area that is located at the central part of the screen of the I picture is read. With respect to the data in the area which is not read, the playback picture is synthesized by masking the data to a definite value. Consequently, compared with the case where all the I picture which has a large amount of data is played back, the special playback can be realized at a higher speed.

In accordance with still another digital video signal record and playback method (device) (or a digital video signal playback method (device), only the area that is located at the central part of the screen of the I picture is read. The playback picture is synthesized by extending the read-out area over the whole screen. Consequently, compared with the case where the whole I picture having a large data amount is played back, the special playback can be realized at a higher speed with the result that the area where the data cannot be read becomes inconspicuous.

The digital video signal record device of the present invention includes first coding means for coding a video signal comprising a coded picture including at least a picture subjected to the intra-frame coding out of the digital video signal coded by using the motion compensation prediction and the orthogonal transform, second coding means for coding a residual component through coding using the first coding means output of the video signal, data arrangement means for arranging each of the output data outputted from the first and the second coding means at a predetermined position in each picture group data for each of the picture group data. Compared with the case in which the first coding means codes all the video signals, the area to be accessed at least is decreased by coding a basic part of the mobile picture. The second coding means codes video information which is not coded with the first coding means so that all the video information is coded with two coding means. Further, the data arrangement means rearranges data obtained by two coding means so that the data is favorable for the access of the head. Consequently, coding can be made possible so that the amount of code that should be accessed at least at the time of the special playback is decreased. Thus, the arrangement of data that should be accessed at least at the time of the special playback can be efficiently performed.

In the aforementioned digital video signal record device, the video information is coded which is thinned at a predetermined interval with respect to the video picture comprising coded picture including at least a picture coded in the frame. Consequently, the first coding means codes the thinned video picture so that the area to be accessed at least is decreased. When only the data of the first coding means is accessed, the video picture can be coded so that the scene can be sufficiently understood when the picture is decoded.

In the aforementioned digital video signal record device, the first coding means codes only the low frequency area which is orthogonally converted. The first coding means codes the picture data which is partial in terms of frequency so that the area which is to be accessed at least is decreased. When only the data of the first coding means is accessed, the video picture can be coded so that the scene can be sufficiently understood when the picture is decoded.

In the aforementioned digital video signal record device, the first coding means roughly quantizes on a quantization level to be coded. The first coding means codes the data of the upper bit which exerts a deep influence on the picture through the rough quantization so that the area to be accessed at least is decreased to be coded without decreasing the resolution. When only the data of the first coding means is accessed, the video picture can be coded so that the scene can be sufficiently understood when the picture is decoded.

Another digital video signal record device of the present invention extracts data in the low frequency component from a data array in which the video signal is segmented by predetermined bits, the video signal comprising a coded picture including at least a picture subjected to the intra-frame coding out of the video signal which is coded using the motion compensation prediction and the orthogonal transform. The low frequency area of the video signal is segmented by segmenting the data by predetermined bits for each block. Consequently, it is easy to limit the code amount to be within a fixed length. Besides, when the data in the low frequency area is decoded, the data can be coded so that the content of the picture can be roughly understood.

The digital video signal playback device of the present invention rearranges data in the low frequency area and data in the high frequency area into a predetermined order so that either of the mode for decoding the rearranged data or the mode for selectively decoding the data in the low frequency area. At the time of the normal playback, a complete decoded picture can be obtained by connecting two segmented coded data. At the time of the special playback, only the data in the low frequency area is decoded. Consequently, data can be decoded depending on the operation state of the device with the result that a picture can be obtained to an extent that the rough content of the picture can be grasped.

In the aforementioned digital video signal playback device, when the data is decoded in a mode of decoding only the data in the low frequency area, only the data that can be decoded is decoded. The data which cannot be decoded in the vicinity of the boundary of a predetermined number of bits is discarded so that the data in the high frequency area is replaced with the fixed value for an inverse orthogonal transform. When the low frequency area out of two segmented coded data is decoded at the time of the special playback, only the data that can be decoded is decoded and the bit that cannot be decoded is discarded. The decoding of the abnormal data can be avoided. With respect to the remaining high frequency area, the data is replaced with the fixed value and decoded with the result that a decoded picture can be obtained free from data distortion.

Still another digital video signal record device adds an end of the block code to a coded data in each block of the video signal comprising a coded picture including at least a picture subjected to the intra-frame coding out of the coded digital signals by using the motion compensation prediction and the orthogonal transform when a predetermined number of bits as data in the low frequency area is attained. The aforementioned coded data which exceeds a predetermined number of bits is coded as a high frequency region data. Both the low frequency area and high frequency area of the block are coded in such a manner that the block is ostensibly terminated in the end of block (EOB) code. Consequently, when only data in the low frequency area is decoded, coded data can be obtained that can be decoded without requiring a redundant circuit such as discarding of the data.

Still another digital video signal record device of the present invention reconstructs data on the basis of the data in the low frequency area, the data in the high frequency area and the EOB code. Then, either a mode of decoding the reconstructed data or the mode of selectively decoding only data in the low frequency area is selected so that the coded data reconstructed on the basis of the result of selection is decoded. With respect to the high frequency area, the data is replaced with a fixed value to perform an inverse orthogonal transform. At the time of the normal playback, a complete decoded picture is obtained from the coded data segmented by the EOB respectively can be obtained. At the time of the special playback, only data in the low frequency area is decoded out of the coded data so that both the normal and special playback modes can be operated depending on the operation state of the device with the result that a rough picture can be obtained which allows us to understand the scene. Further, when the low frequency area is decoded out of the coded data, the remaining high frequency area of the block is replaced with the fixed value and is decoded with the result that the area can be decoded free from data distortion. Both the high frequency area and the low frequency area of the block can be decoded as if the block is ostensibly ended at the EOB.

Still another digital video signal record device of the present invention includes a low resolution coding means for coding data of the low resolution component in which pixels are thinned with respect to a video signal comprising a coded picture including at least a picture in the frame out of the coded digital picture by using the motion compensation prediction and the orthogonal transform, differential component coding means for coding a differential component with the picture before thinning the pixels by interpolating the output data of the low resolution coding means, and information adding means for constituting data by dividing the output of the low resolution coding means and the differential component coding means into predetermined areas for adding an error correction codes. When the picture data thinned in space is coded so that only this coded data is accessed, the picture data can be coded so that the scene can be sufficiently understood when the picture is decoded. The decoded data from the low resolution coding means is interpolated thereby obtaining a differential component by comparing the picture with the picture before the low resolution conversion with the result that the picture data of the high resolution portion which cannot be obtained by low resolution coding means is coded. Thus the picture information other than the low resolution degree can be coded.

Still another digital video signal playback device of the present invention synthesizes the data of the low resolution component with the data of the differential component to be decoded. At the time of the normal playback, the coded data of the low resolution component and the coded data of the high resolution component which is the differential component between the low resolution portion and the data before being thinned into a low resolution are synthesized so that a picture with a complete resolution component can be decoded.

In the aforementioned digital video signal playback device of the present invention, a mode of decoding a picture by synthesizing the data of a low resolution component with the data of the differential component is switched over with a mode of decoding only the low resolution component. At the time of the normal playback, a low resolution coded data segmented into two is synthesized with the coded data of a high resolution component which is a differential component between data before being thinned to a low resolution and the data of the low resolution portion are synthesized so that a picture with a complete resolution can be decoded. At the time of the special playback, a decoding mode is switched over in accordance with the operating state of the device so that a rough picture can be decoded by decoding only the coded data of low resolution.

In the aforementioned digital video signal playback device, when the low resolution picture is decoded, only the picture interpolated after decoding is generated. At the time of the special playback, when only the coded data of low resolution is decoded, the video data of the low resolution component is interpolated to bring back the size of the picture to the original size thereof.

Still another digital video signal record device of the present invention includes judging means for judging the degree of picture deterioration at the time of coding and decoding on a basis of the motion compensation prediction and the orthogonal transform, adaptive coding means for coding a data rate by adaptively changing the rate on the basis of the judgment output from the judging means, information adding means for adding an audio signal, additional information such as header or the like, and error correction code, and a data rate setting means for setting a discrete value for the adaptively changed data rate. In the coding means for a variable rate, the rate is limited only to a limited value. Consequently, the data rate information of the GOP (which corresponds to the code amount of the GOP) can be represented with a small number of bits.

Still another digital video signal record device of the present invention includes judging means for judging the degree of picture deterioration at the time of coding and decoding on the basis of the motion compensation prediction and the orthogonal transform, adaptive coding means for coding a data rate by adaptively changing the rate on the basis of the judgment output from the judging means, information adding means for adding an audio signal, additional information such as header or the like, and error correction code, wherein the device is so constituted that data rate information is multiplexed on the head or the like, or is written in a predetermined area on the recording medium. The data rate set information in the case where the picture data is coded at a variable rate is recorded on the recording medium apart from the video data. Consequently, the data rate information can be read in summary so that information can be recorded which allows immediate recording of the position of the predetermined GOP which occupies a disc.

Still another digital video signal record device includes judging means for judging the degree of picture deterioration at the time of coding and decoding on the basis of the motion compensation prediction and the orthogonal transform, information adding means for adding an audio signal, additional information such as header or the like, and error correction code, first coding means for coding a video signal thinned at a predetermined interval with respect to a video signal comprising a coded picture including a picture subjected to the intra-frame coding, second coding means for coding with respect to the remaining component by coding using the first coding means out of the video signal, wherein the device is so constituted that the data rate at least in either of the coding means out of the first or the second coding means is adaptively changed and coded on the basis of a judgment output from the judging means. A high quality coding can be realized by the variable rate. In the GOP in which the rate has largely increased, the video data thinned in space is coded and coding can be performed so that the area which is accessed at least is decreased.

Still another digital video signal record device of the present invention includes judging means for judging the degree of picture deterioration at the time of coding and decoding on the basis of the motion compensation prediction and the orthogonal transform, information adding means for adding an audio signal, additional information such as header or the like, and error correction code, first coding means for coding only a low frequency area orthogonally transformed with respect to a video signal comprising a coded picture including a picture subjected to the intra-frame coding, second coding means for coding with respect to the remaining component by coding the signal using the first coding means out of the video signal, wherein the device is so constituted that the video signal is coded by adaptively changing the data rate in at least either of the coding means out of the first coding means or the second coding means on the basis of the judgment output from the design judging means. A high quality coding can be realized with the variable rate. With the GOP in which the rate has largely increased, the video data in a partial frequency area is coded for each block, and the coding can be performed so that the area accessed at least is decreased.

Still another digital video signal record device includes judging means for judging the degree of picture deterioration at the time of coding and decoding on the basis of the motion compensation prediction and the orthogonal transform, information adding means for adding additional information such as an audio signal, a header or the like and an error correction code, first coding means for coding a video signal through a rough quantization on a quantization level with respect to a video signal comprising a coded picture including a picture subjected to the intra-frame coding, second coding means for coding with respect to the remaining component by coding the signal using the first coding means out of the video signal, wherein that the video signal is coded by adaptively changing the data rate in at least either of the coding means out of the first coding means or the second coding means on the basis of the judgment output from the design judging means. A high quality coding can be realized with a variable rate. In the GOP in which the rate has largely increased by the variable rate, the data in the upper bit which deeply affects the picture is coded, and the coding can be performed so that the area accessed at least is decreased.

Still another digital video signal playback device of the present invention switches over a playback mode between the normal playback mode and the special playback mode thereby extracting data rate information. At the time of the special playback mode, the position of the recording medium where data for the special playback exists is calculated on the basis of the data rate information at the time of the special playback mode. When the GOP with a different data rate is played back by extracting the data rate information of each GOP, the coded data divided into two are synthesized and decoded at the time of the normal playback. At the time of the special playback, the position of the GOP on the recording medium which is to be accessed is calculated. Then, the data to be accessed at least is played back to access the next target GOP. At this time, the position information on the recording medium where the GOP to be accessed is calculated to facilitate the special playback and retrieval of a high quality variable rate.

In the aforementioned digital video signal playback device, a head position is controlled to a position on the recording medium depending on the result of the position calculation and the special playback rate. The position information on the disc where the GOP which constitutes the access target is calculated on the basis of the special playback rate. The position of the optical head can be controlled to the position of the target GOP depending on the special playback rate so that a high quality variable rate can be played back in a special mode at variety of speed.

With still another digital video signal record device of the present invention, a code amount is controlled corresponding to an area assigned to one picture group which is formed by the digital video signal coded on the basis of the motion compensation prediction and the orthogonal transform, and the device of the present invention includes coding means for coding, code amount comparing means for comparing an output from the coding means with a predetermined amount of data, and a data feeding means for embedding superfluous data in a blank area of picture groups having the blank area. In the case where the data is coded and recorded at a variable rate, the access time can be shortened by locating the GOP at a position wherein the head is easily accessed so that the data is coded and recorded increasing the read data amount in the special playback. Further, unnecessary parts such as blank parts on the disc at that time can be filled as much as possible thereby using such parts for the improvement in the picture quality or contributing to the extension of the recording time by those parts.

Still another digital video signal playback device of the present invention includes data reconstructing means for reconstructing embedded video signal coded data into original group of pictures, and data decoding means for decoding data reconstructed by data reconstructing means. A coded data in which other GOP data is embedded in a blank part can be reconstructed so that the data can be decoded without distortion. Further, the data amount still increases at the time of the special playback, and a high quality playback picture can be still obtained.

Still another digital video signal playback device of the present invention switches over on the basis of the special playback speed as to which of the three decoding means, first decoding means for decoding a first and second coded data and obtaining a playback picture, a second decoding means for decoding the first coded data and obtaining the playback picture which corresponds to the low frequency region of the picture subjected to the intra-frame coding, the number of pixels thinned out or a rough quantization, and a third decoding means for decoding the first coded data and obtaining a playback picture corresponding to the low frequency region of the intra-frame coded picture and the inter-frame prediction picture, the number of pixels thinned out, or the rough quantization. Since the mode is switched over between a mode of decoding and displaying only the I picture and the mode of displaying the I picture and the P picture, the special playback of the I picture and the P picture can be realized at a relatively slow special playback (for example, a double-speed playback) with the result that a fine special playback free from frame jumping can be realized compared with the special playback of only the I picture. Further, at the time of the special playback at a high speed, various playback speeds can be treated such as the special playback of the I picture.

Still another digital video signal playback device of the present invention includes video data extracting means for extracting data corresponding to the video signal from the playback code, picture data decoding and playback means for decoding and playing back the video data outputted from the video data extracting means, and mode switching means for switching a normal playback mode, a mode for playing back and displaying either an odd number field or an even number field, and a mode for displaying either the odd number field or an even number field by reversing the field structure thereof. At the time of the special playback, the field structure is optimized depending on the mode. At the time of the reverse playback, the display is given so that the device is operated in a reverse manner until the field display. At the time of the playback of the frame jumping such as fast winding or the like, a special playback picture can be obtained which is easy to watch by outputting the same video picture both in the even number field and in the odd number field to set the number of fields to a definite level.

The above and further objects and features of the invention will more fully be apparent from the following detailed description with accompanying drawings.

BRIEF DESCRIPTION OF THE DRAWINGS

FIG. 17 is a conceptual view for illustrating macro blocks.

FIGS. 20A through 20D are conceptual views for illustrating a playback method in a special playback.

FIGS. 24A through 24E are conceptual views for illustrating a method for performing the special playback according to embodiment 3.

FIGS. 25A and 25B are conceptual view for illustrating an error correction block arrangement according to embodiment 3.

FIGS. 26A through 26D are conceptual views for illustrating a method for performing the special playback according to embodiment 4.

FIGS. 27A through 27F are conceptual views for illustrating a method for performing the special playback in the case where the data interpolation in embodiment 4 is performed.

FIG. 28 is a conceptual view for illustrating a data arrangement in embodiment 5.

FIGS. 29A through 29E are conceptual views for illustrating a playback method in a special playback according to embodiment 5.

FIGS. 31A through 31F are conceptual views for illustrating a method for performing the special playback in embodiment 6.

FIGS. 32A and 32B are conceptual views for illustrating an error correction block arrangement in embodiment 6.

FIGS. 33A through 33G are conceptual views for illustrating a playback method in embodiment 7.

FIGS. 34A through 34F are conceptual views for illustrating a method for performing the special playback in the case where the data interpolation in embodiment 7 is performed.

FIGS. 36A through 36F are conceptual views for illustrating a method for performing the special playback in embodiment 8.

FIG. 40 is a view for illustrating a header in a bitstream in embodiment 9.

FIGS. 41A through 41D are views showing rearrangement of the bitstream in embodiment 9.

FIGS. 53A through 53E are views showing an example of a playback screen in which the picture can be played back at the time of the playback.

FIGS. 54A through 54E are views showing an example of the playback screen in embodiment 10 wherein only the central part of the screen is outputted at the time of the playback.

FIGS. 59A through 59D are views showing an example of a system stream in embodiment 11.

FIG. 60 is a view showing an example of address information of the system stream in embodiment 11.

FIG. 70 is a view showing one example of a processing sequence in embodiments 12, 13 and 14.

FIGS. 71A through 71D are views illustrating one example of arrangement outline of a frequency component in a bitstream of the DCT block in embodiment 15 and in one block.

FIG. 72B is a view illustrating an operation concept of a digital video signal decoding processing in embodiment 15.

DESCRIPTION OF THE PREFERRED EMBODIMENTS

The present invention will de explained in detail on the basis of the drawings showing embodiments.

Embodiment 1

Figure 15:
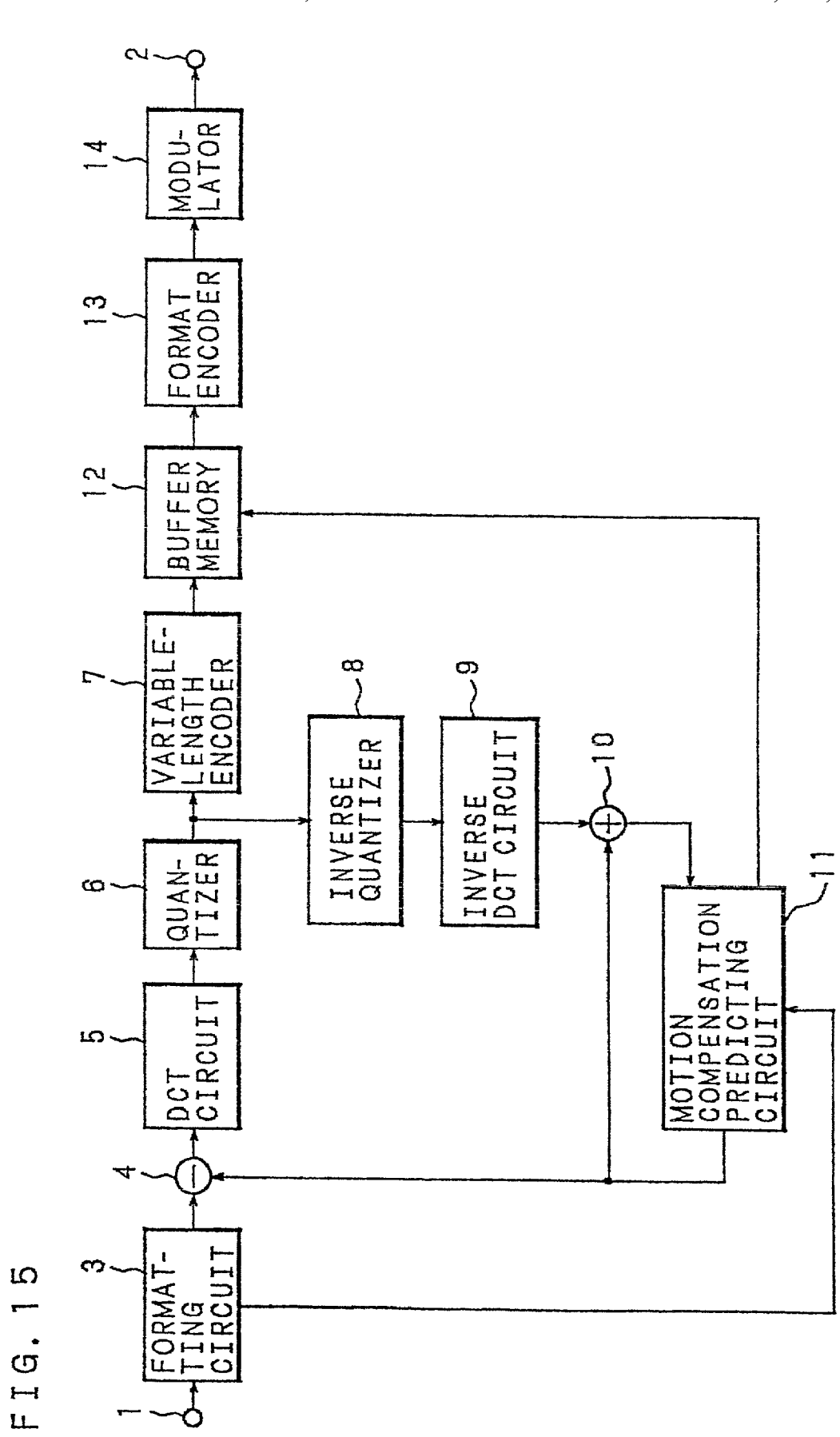
FIG. 15 is a block diagram of a record system in a digital signal record and playback device according to embodiment 1.

Embodiment 1 of the present invention will be explained. FIG. 15 is a block circuit diagram showing a recording system of a digital video signal record and playback device in embodiment 1. Referring to FIG. 15, a digital video signal outputted from an input terminal 1 is inputted to a formatting circuit 3. The video signal which is outputted from the formatting circuit 3 provided as to a first input of a subtracter 4 and a second input of a motion compensation predicting circuit 11. An output of the subtracter 4 is inputted to a quantizer 6 via a DCT circuit 5. An output of the quantizer 6 is provided as a first input of a buffer memory 12 via a variable-length encoder 7. In the meantime, the output of the quantizer 6 is also provided as an inverse DCT circuit 9 via an inverse quantizer 8. An output of the inverse DCT circuit 9 is given to a first input of an adder 10.

An output of the adder 10 is provided as a first input of the motion compensation predicting circuit 11. A first output of the motion compensation predicting circuit 11 is provided as a second input of the adder 10 and a second input of the subtracter 4. Further, a second output of the motion compensation predicting circuit 11 is provided as a second input of the buffer memory 12. An output of the buffer memory 12 is inputted to a modulator 14 via a format encoder 13. An output of the modulator 14 is recorded on a recording medium such as an optical disc or the like via an output terminal 2.

Figure 16:
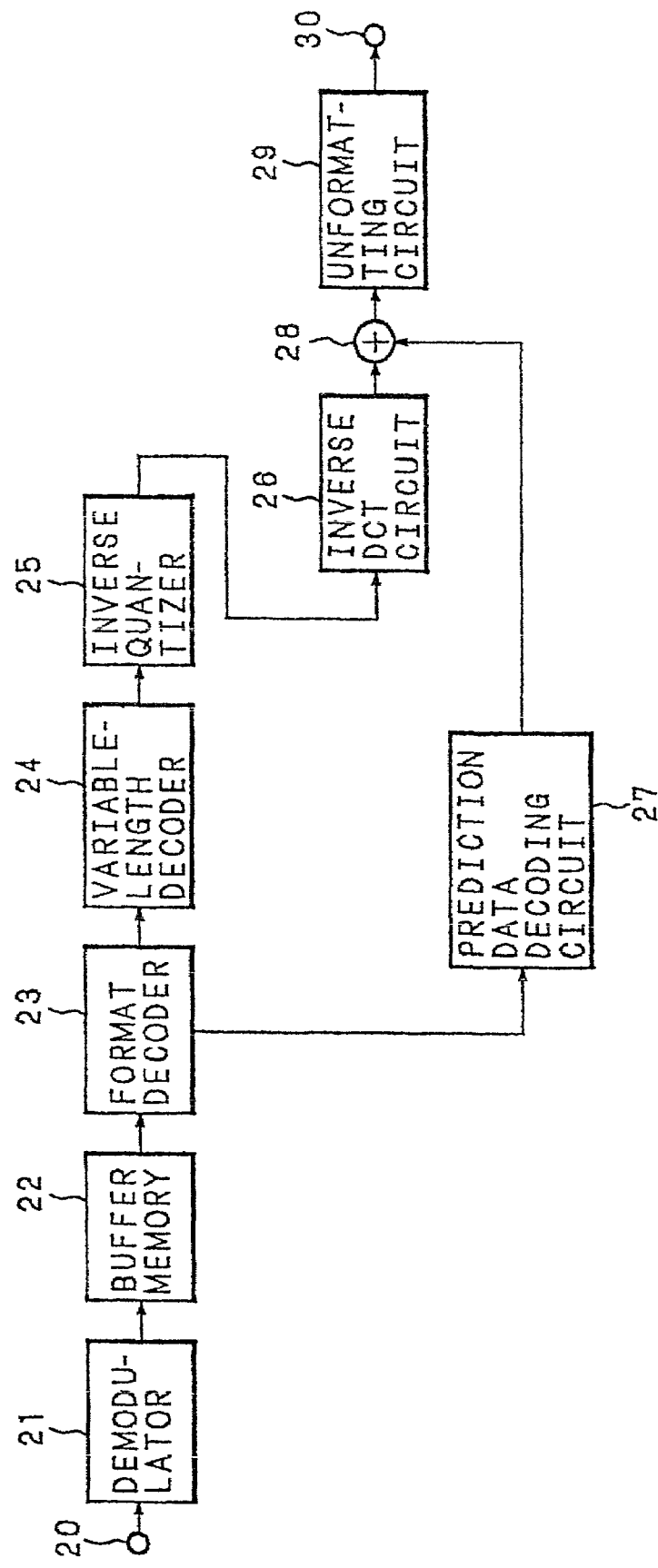
FIG. 16 is a block diagram of a playback system in the digital record and playback device according to embodiment 1.

FIG. 16 is a block circuit diagram showing a playback system in the digital video signal record and playback device according to embodiment 1. Referring to FIG. 16, video information read from the recording medium is inputted from an input terminal 20 to a demodulator 21. An output from the demodulator 21 is inputted to the format decoder 23 via a buffer memory 22. The first output of a format decoder 23 is inputted to a variable-length decoder 24, and inversely quantized by an inverse quantizer 25. Then the output is subjected to an inverse DCT at an inverse DCT circuit 26 to be provided as the first input of an adder 28. In the meantime, the second output of the format decoder 23 is inputted to a prediction data decoding circuit 27. Then, the output from the prediction data decoding circuit 27 is given to the second input of the adder 28. The output of the adder 28 is outputted from an output terminal 30 via an unformatting circuit 29.

Figure 1:
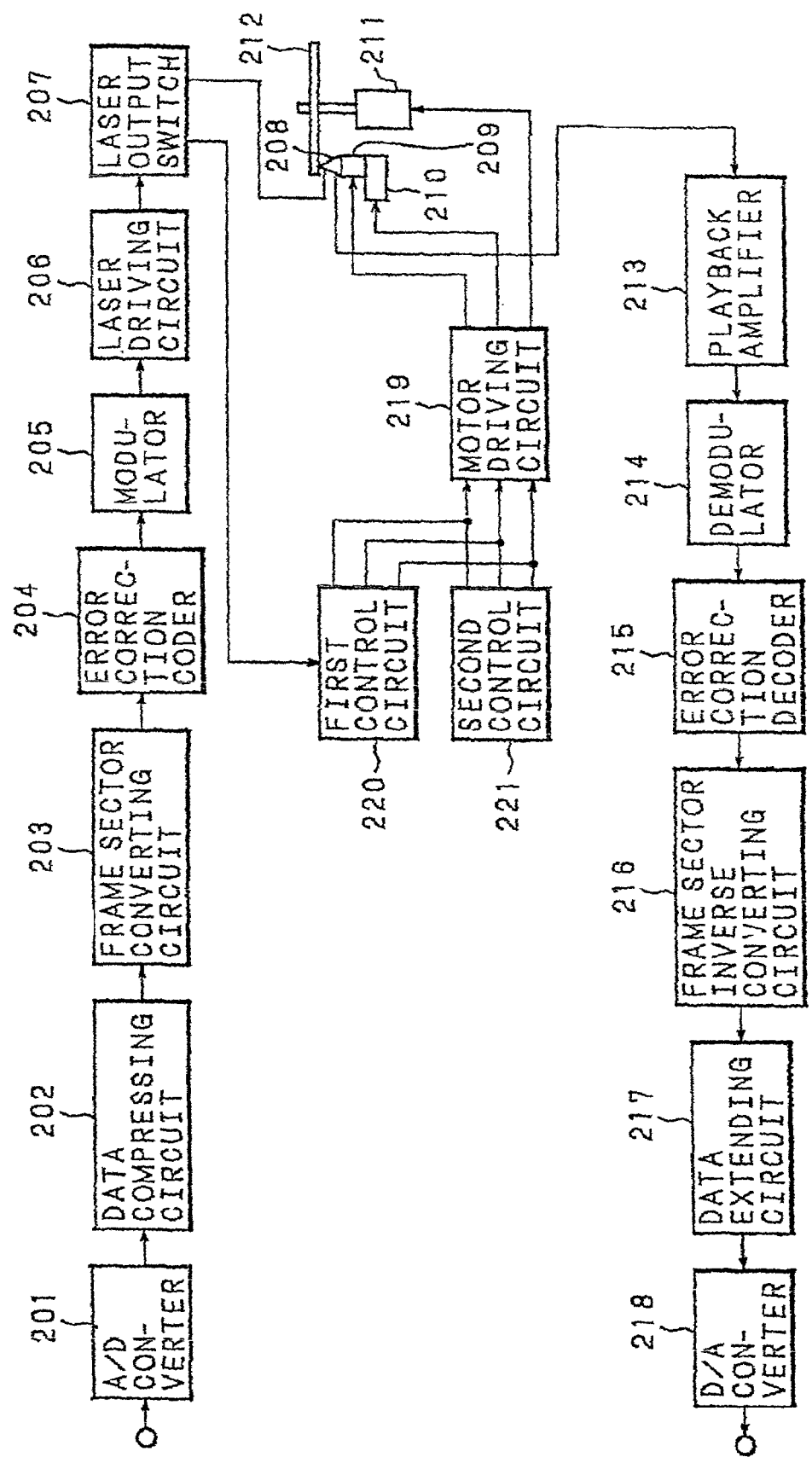
FIG. 1 is a block diagram of a conventional optical disc record and playback device.
Figure 2:
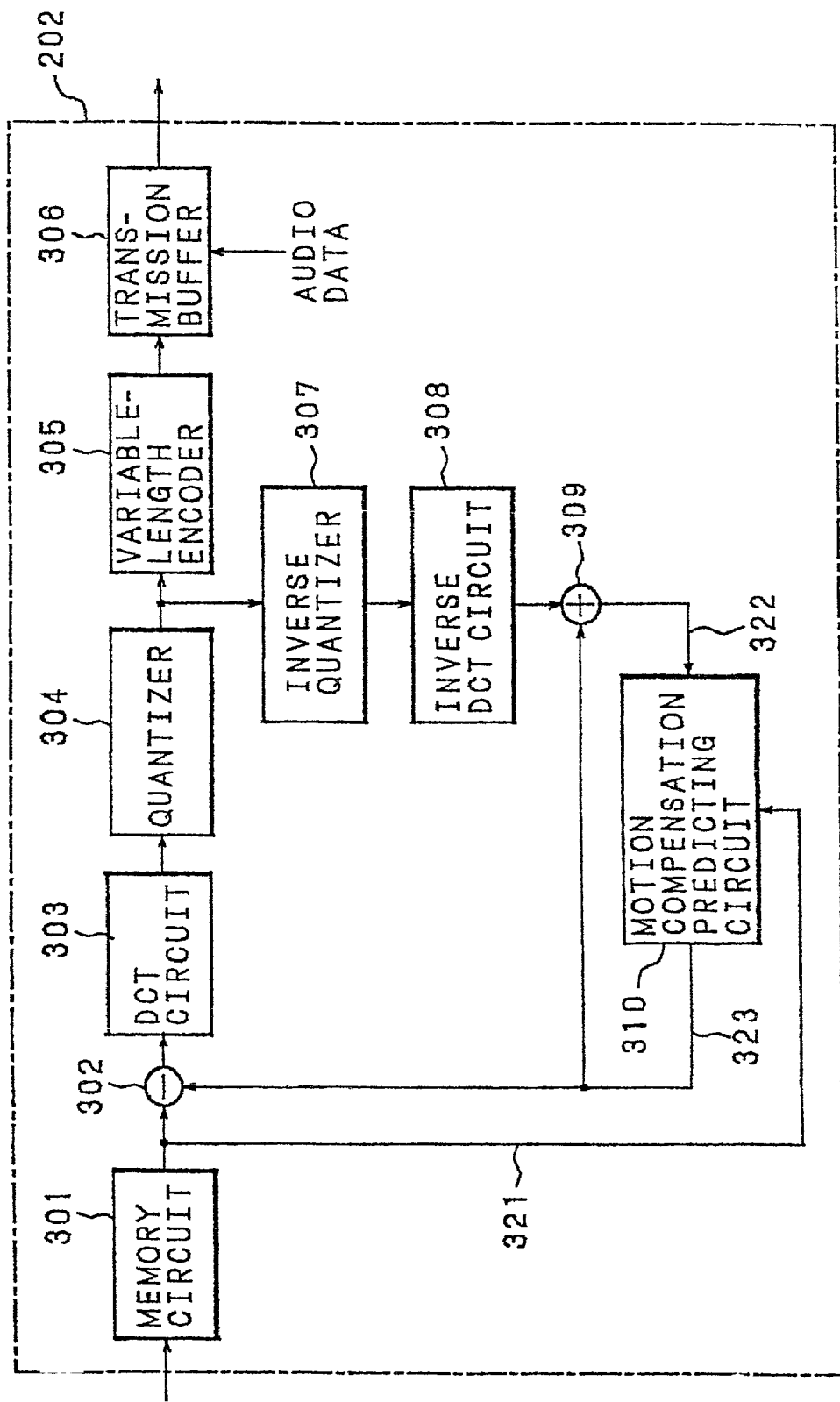
FIG. 2 is a block diagram of a video signal coding unit in a conventional MPEG.
Figure 3:
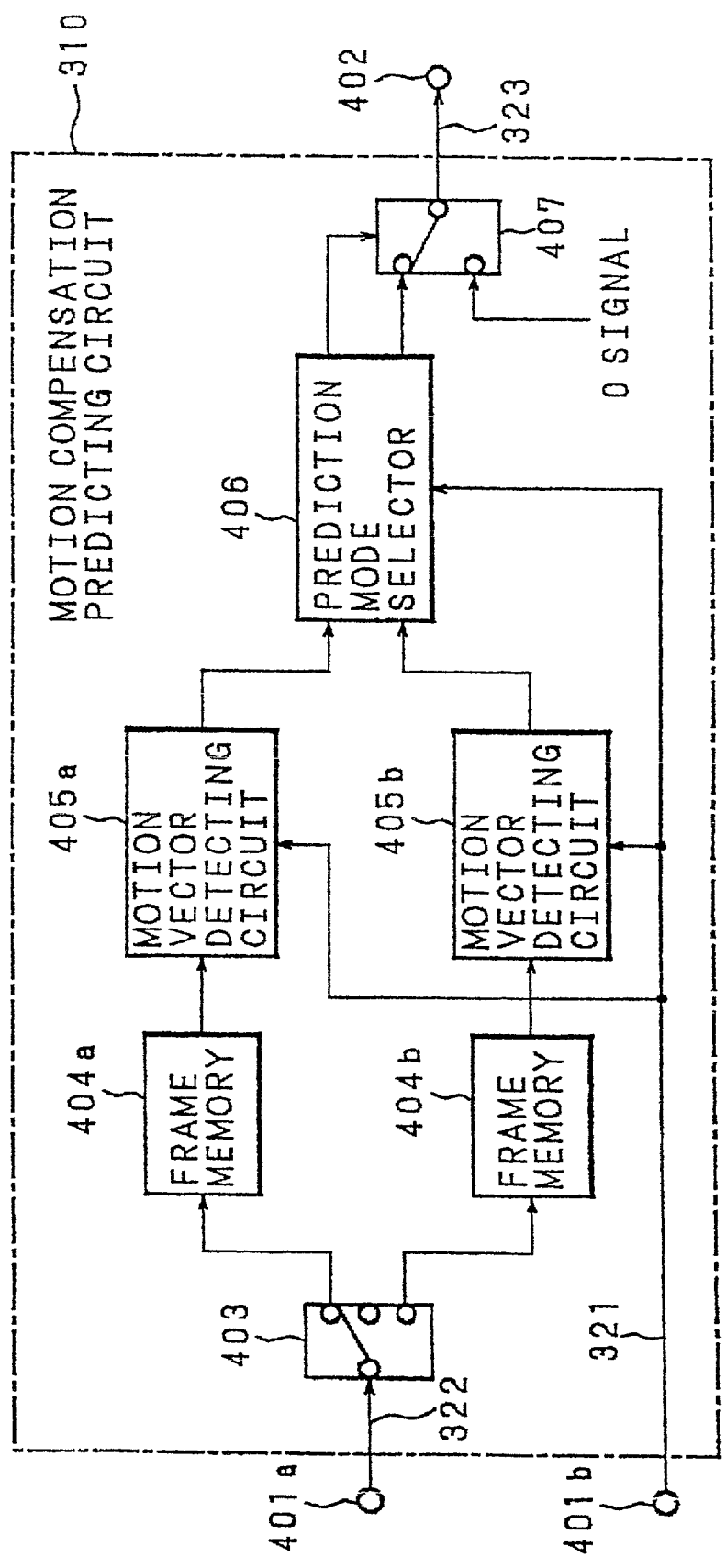
FIG. 3 is a block diagram of a conventional motion compensation predicting circuit.
Figure 4:
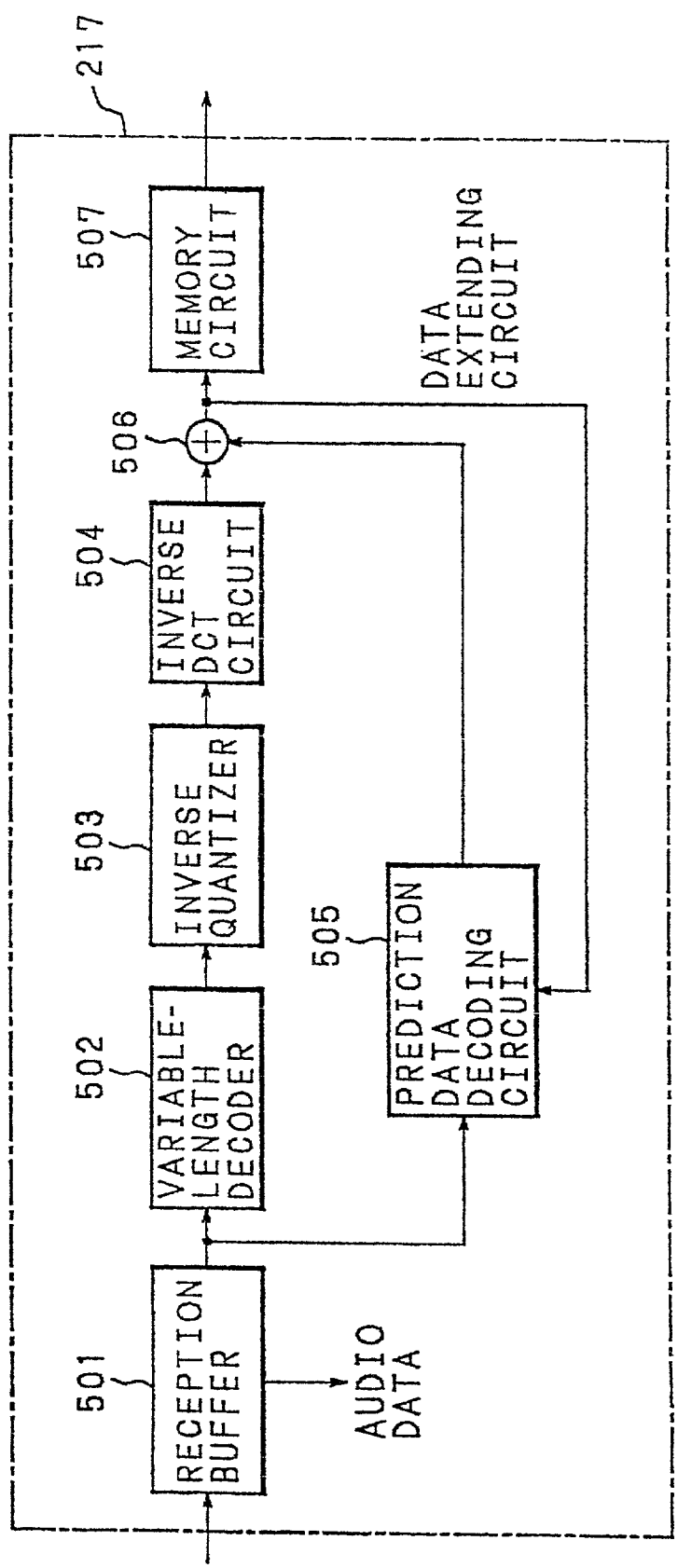
FIG. 4 is a block diagram of a video signal decoding unit in the conventional MPEG.
Figure 5:
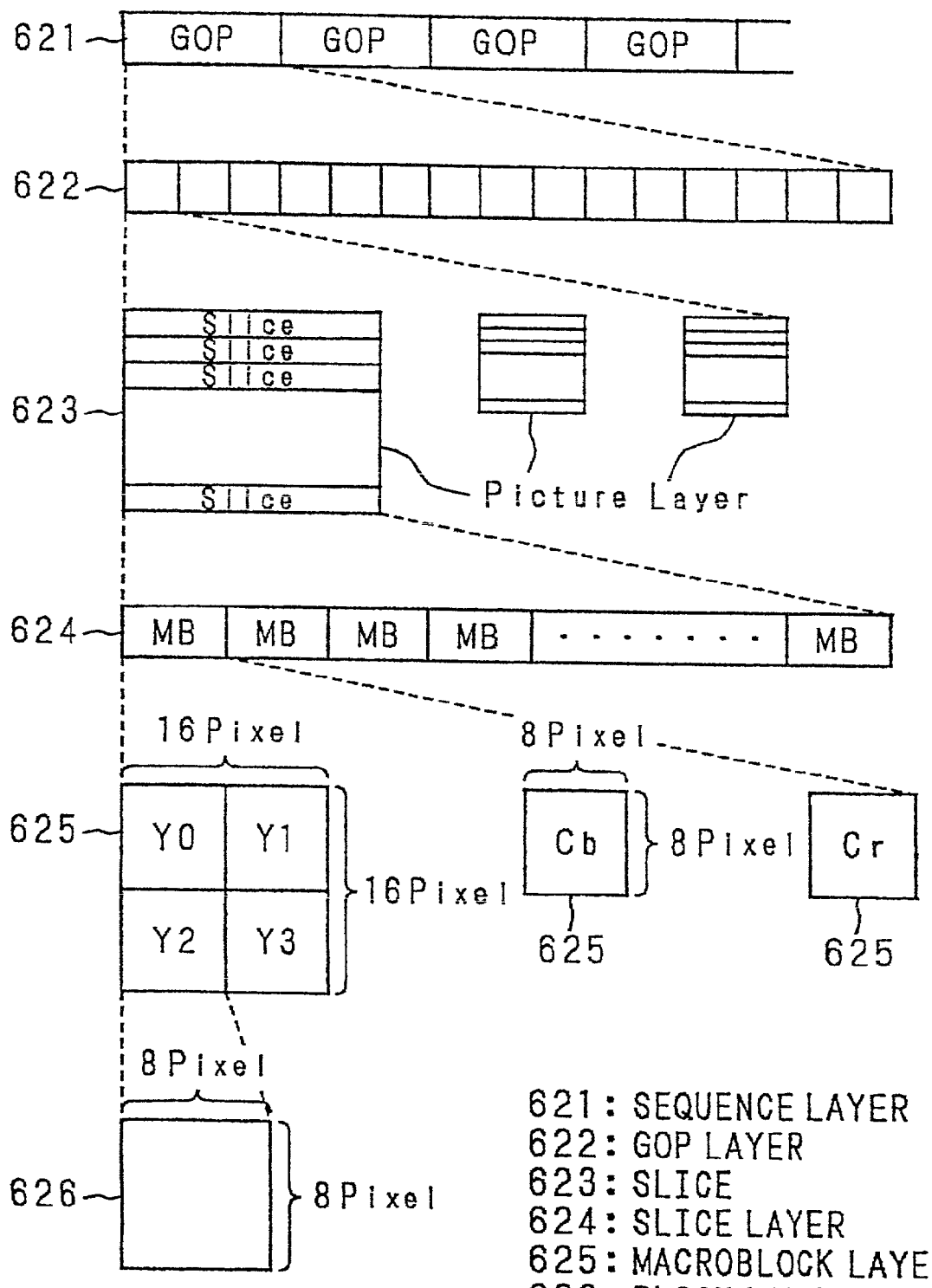
FIG. 5 is a view showing a data arrangement structure of a video coding algorithm of the conventional MPEG.
Figure 6:
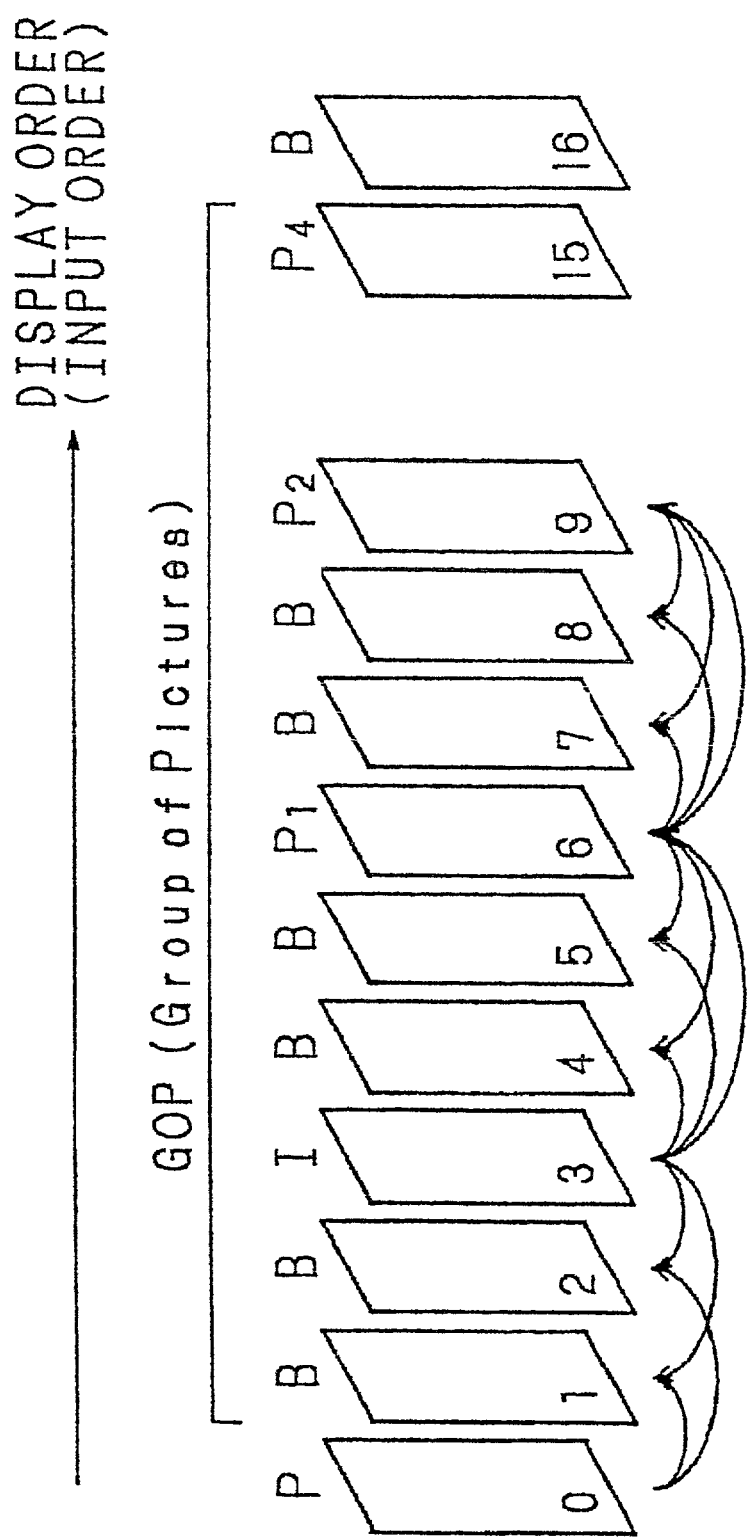
FIG. 6 is a view showing an example of a GOP structure of a video coding algorithm of the conventional MPEG.

Next, operation of the device will be explained. The digital video signal is inputted from the input terminal in units of lines, and is supplied to the formatting circuit 3. Here, in the motion compensation prediction, one GOP is set to 15 frames as shown in FIG. 6 as in the conventional example to perform prediction coding with one frame of I picture, 4 frames of P pictures (P1 through P4), and ten frames of B pictures (B1 through B10). In this case, in the formatting circuit 3, the video data inputted in a consecutive manner is rearranged and outputted in the units of frames in the order shown in FIG. 7.

Further, the data inputted in the units of lines is rearranged in the units of blocks of 8×8 pixels so that macroblocks (six blocks in total, such as adjacent four luminance signal Y blocks and two color difference signals Cr and Cb blocks which correspond in position to the Y block) is constituted. The data is outputted in units of macroblocks. Here, the macroblocks are determined in the minimum unit of the motion compensation prediction while the motion vector for the motion compensation prediction is determined in the units of macroblocks.

Figure 18:
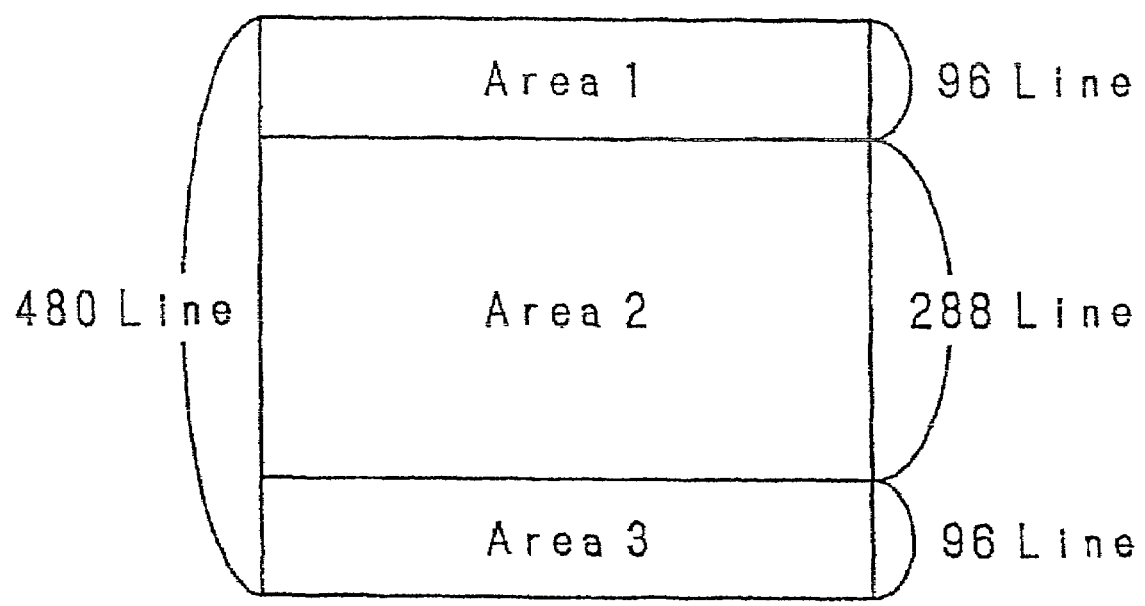
FIG. 18 is a conceptual view for illustrating a screen division.

Further, with the formatting circuit 3, with respect to the I picture, one frame of video data is divided into three areas so that blocking is performed in this area in the unit of 8×8 pixels and the macroblock is constituted and outputted. Here, the three divided areas are set as areas 1, 2 and 3 from the top of the screen as shown in FIG. 18. In FIG. 18, the area 2 located at the central part of the screen has a size of 720 pixels×288 lines while the areas on both ends of the screen have a size of 720 pixels×96 lines. In the meantime, in the P picture and the B picture, the blocking is performed without being divided into each area and is outputted in the units of macroblocks.

An output of the formatting circuit 3 is inputted to the subtracter 4 and the motion compensation predicting circuit 11. The operation of the subtracter 4, the DCT circuit 5, the quantizer 6, the variable-length encoder 7, the inverse quantizer 8, the inverse DCT circuit 9, the adder 10 and the motion compensation predicting circuit 11 is the same as the conventional embodiments, and the explanation thereof is omitted.

The video data outputted from the variable length encoder 7 and the motion vector outputted from the motion compensation predicting circuit 11 are inputted to the buffer memory 12. In the buffer memory 12, the video data and the motion vector for one GOP portion are recorded and the data is subsequently outputted in sequence to the format encoder 13. The output of the format encoder 13 is inputted to the modulator 14 and an error correction codes or the like are added and recorded on the recording medium such as an optical disc or the like.

Figure 19:
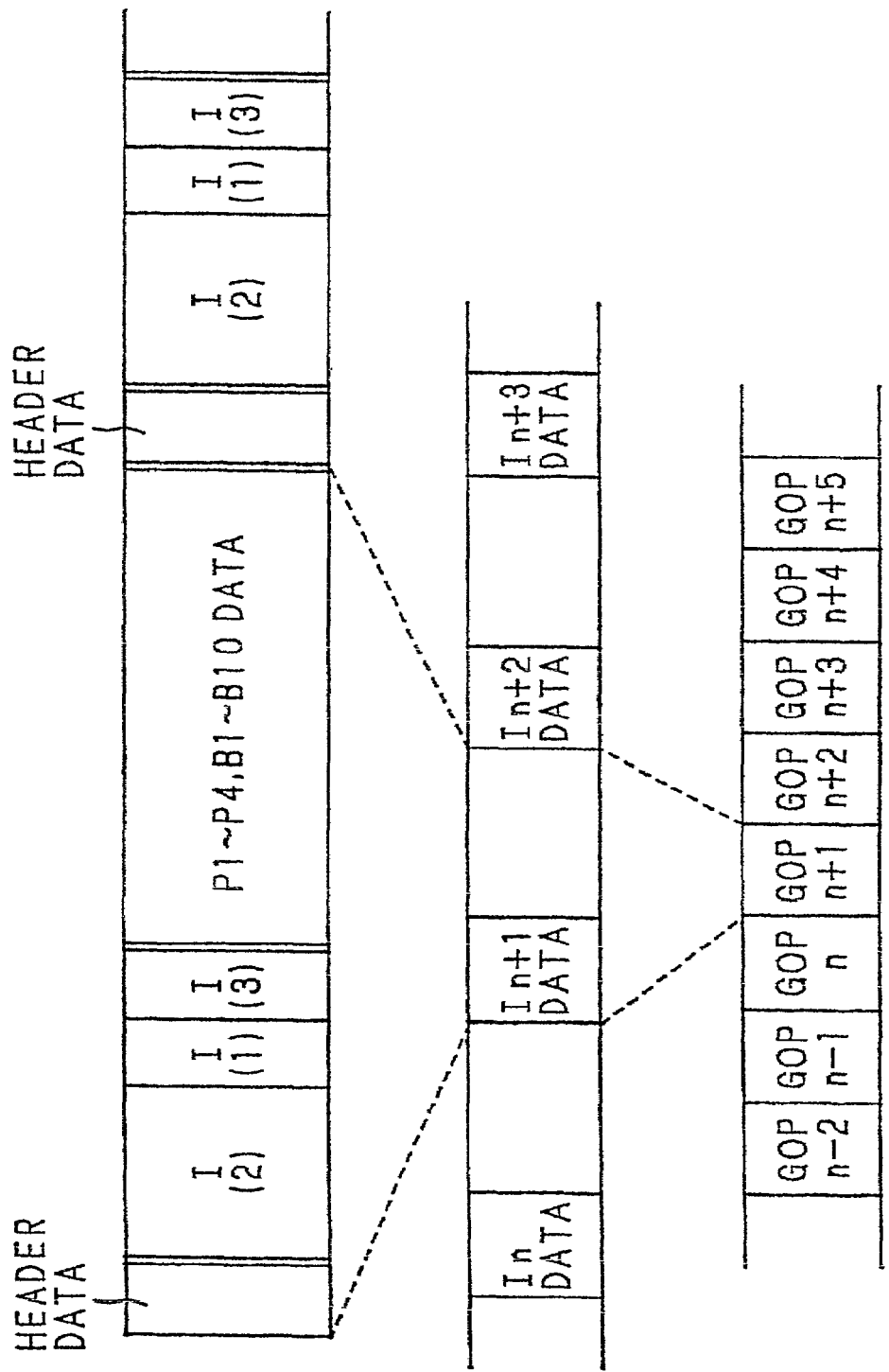
FIG. 19 is a conceptual view for illustrating a data arrangement.

In the format encoder 13, the video data for the one GOP portion is rearranged in the data arrangement as shown in FIG. 19 and is outputted to the modulator 14. Here, the I picture is divided into three areas as shown in FIG. 18. When the data of the I picture corresponding to these areas 1 through 3 are set to I(1), I(2) and I(3), the data of the I picture is constituted so that the data is recorded in the order of I(2), I(1) and I(3) at the front part of the data string of one GOP portion.

Further, the address where th data of each picture area is stored at the front of the GOP is recorded as header information. The number of bytes which is occupied in the data format shown in FIG. 19 by the data in each area divided into three parts is recorded as header information. Consequently, depending on the number of bytes occupied by each area which is recorded in the header information, the end position of each area can be recognized as a relative address from the front of the GOP at the time of playback. Consequently, the optical head jumps to the front address of the GOP in the unit of the definite time at the time of the special playback so that data can be read in each area in accordance with the header information from the front of the GOP.

With a general video signal record and playback device, on the data format at the time of data recording, the I picture is recorded in the units of frames. In contrast, in FIG. 19, a priority is given to an area located at the central part of the screen out of the I picture data which is divided into three parts so that the area is located at the front of one GOP. Consequently, in the case where only a part of the area of the I picture can be decoded in a definite time at the time of a high speed playback, at least the playback picture at the central part of the screen can be outputted.

Subsequently, an operation at the time of playback will be explained in accordance with FIG. 16. The demodulator 21 performs an error correction processing so that the video signal recorded in a format shown in FIG. 19 in the buffer memory 22 is divided into the motion vector and the video data at the format decoder 23 to be outputted to the predicting data decoding circuit 27 and the variable-length decoder 24, respectively. Here, an operation at the time of the normal playback is the same as the conventional embodiment, and an explanation thereof is omitted.

At the time of a high speed playback, with respect to the data recorded in one GOP unit on the recording medium such as an optical disc or the like, the optical head jumps to the front of the one GOP in the unit of definite time so that the data part of the I picture is read in the unit of area in accordance with the header information recorded at the front so that the data is demodulated at the demodulator 21 and is input to the buffer memory 22. Here, in the case where data is read from the recording medium such as an optical disc or the like at the time of a high speed playback, waiting time for the disc rotation arises at the time of jumping to the front of the GOP even when the front address of the GOP which is recorded on the disc is known. Consequently, when the high speed playback speed is increased, the time for reading the data on the disc becomes short. Since the waiting time for the disc rotation varies, it becomes impossible to read all the I picture data in a stable manner.

Consequently, when the high speed playback speed is increased, after only the data of the area 2 located at the central part of the screen is read the optical head jumps to the front of the subsequent GOP so that only the data in the area 2 that can be read is inputted to the buffer memory 22. In this case, the format decoder 23 decodes only the area 2 of the I picture that can be read. On the other hand, the areas 1 and 3 whose data are not read are masked by the gray data, and a high speed playback picture is outputted. Consequently, in the case where one GOP is set to 15 frames, a 15 times speed special playback picture can be obtained.

FIG. 20 shows a playback picture in the case where a high speed playback is performed by playing back only the area 2 of the I picture from the nth GOP of one GOP up to the n+3th GOP. In FIG. 20, the areas 1 and 3 on both ends of the screen in FIG. 20 are masked by the gray data. Further, when the information amount of the I picture is small and the disc rotation wait time is short, and time is available for reading data in the areas 1 and 3, the data of the areas 1 and 3 is not decoded. This is because all the data of one screen portion cannot be read in a stable way at the time of a high speed playback, and if a screen is outputted only when the data in the areas 1 and 3 can be read, these areas cannot be outputted in a definite interval so that a high speed playback picture becomes unnatural.

As described above, since the I picture used for the special playback as shown in FIG. 19 is arranged so that a priority is given to the area located in the center of one screen is recorded on the recording medium at the front of G82 one GOP, only the data of the area 2 located at the center is read for a high speed play back even when the high speed playback speed is increased with the result that the content of the playback picture is easy to see. Further, since only the data in the region of the area 2 is read from the recording medium, a higher speed special playback can be realized compared with a case in which the whole I picture is read.

In, the aforementioned embodiment 1, the I picture is divided into three areas in the vertical direction as shown in FIG. 18 and is recorded, the picture is not necessarily divided into three areas. The area may be divided into n areas (n>1) in the unit of slice defined in the international standard MPEG for recording the data. Here, the slice has a one dimension structure of macroblocks of a arbitrary number of lengths (one or more) so that when the right end of the screen is attained, the display continues to the left end one line below.

Embodiment 2

Next, embodiment 2 of the present invention will be explained with respect to drawings. FIG. 21 is a conceptual view for explaining a method for special playback in the case where data extension in embodiment 2 is performed. In embodiment 1, the I picture is divided into three areas as shown in FIG. 18 so that only the data of the area 2 located at the center of the area is read and played back. Thus, with respect to the areas 1 and 3, the mask data is outputted. However, the data of the area 2 is extended to a size of one screen as shown in FIG. 21.

In this case, at the time of converting the video signal into data in units of lines with the unformatting circuit 29, the data of the area 2 is interpolated to be extended to a size of one screen portion and is outputted. In the case of FIG. 21, the area 2 has a size of 720 pixels×288 lines and is constituted in 144 line symmetric in vertical directions from the center of the screen.

Figure 21A:
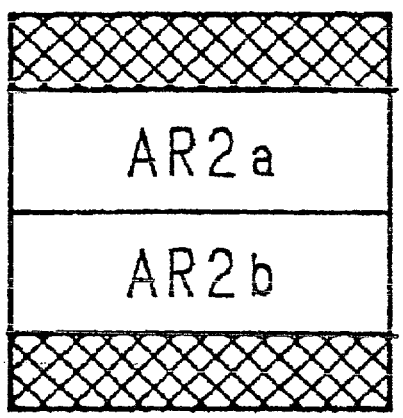
FIGS. 21A and 21B are conceptual views for a method for performing the special playback in the case where the data is extended.
Figure 21B:
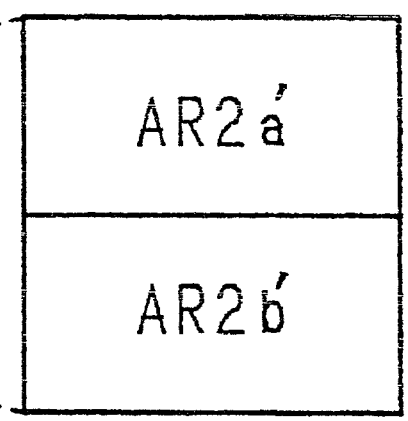

Here, at the time of the special playback, when the upper half part of the area 2 is set to AR2a and the lower half part is set to AR2b as shown in FIG. 21A, AR2a and AR2b are extended by 1.5 times in the vertical direction respectively to synthesize playback pictures AR2a' and AR2b' as shown in FIG. 21B. With respect to the method for extending the pictures, when the data in the unit of each line of AR2a is defined as AT(l)(l: line number $1 \leq l \leq 144$), and line data in the upper half part of the extended screen is set to DT(m) ($1 \leq m \leq 240$), extension is made which is represented by the following expressions.

$$DT(3n-2)=AT(2n-1)$$

$$DT(3n-1)=AT(2n-1)$$

$$DT(3n)=AT(2n)(n=1 \text{ to } 80)$$

In the meantime, when the data in the unit of each line of AR2b is defined as AB (l) (l: line number $1 \leq l \leq 144$), and line data in the lower half part of the extended screen is set to DB(m) ($1 \leq m \leq 240$), extension is made which is represented by the following expressions.

$DB(3n-2)=AB(2n-1)$ $DB(3n-1)=AB(2n-1)$ $DB(3n)=AB(2n)(n=1 \text{ to } 80)$

As described above, only the data of the area 2 located at the center of screen at the time of the high speed playback is read and is extended to a size of one screen portion and is outputted as a playback picture. Consequently, since both ends of the playback picture at the time of a high speed playback is not masked, the playback picture cease to be favorable to watch.

In the aforementioned embodiment 2, the screen is extended in the vertical direction by inserting data simply in the unit of line. The line data may be linearly interpolated with respect to the vertical direction.

Embodiment 3

Embodiment 3 of the present invention will be explained. A structure of a recording system and a playback system of the digital video signal record and playback device in embodiment 3 is the same as embodiment 1 (see FIGS. 15 and 16).

Figures 7A, 7B:
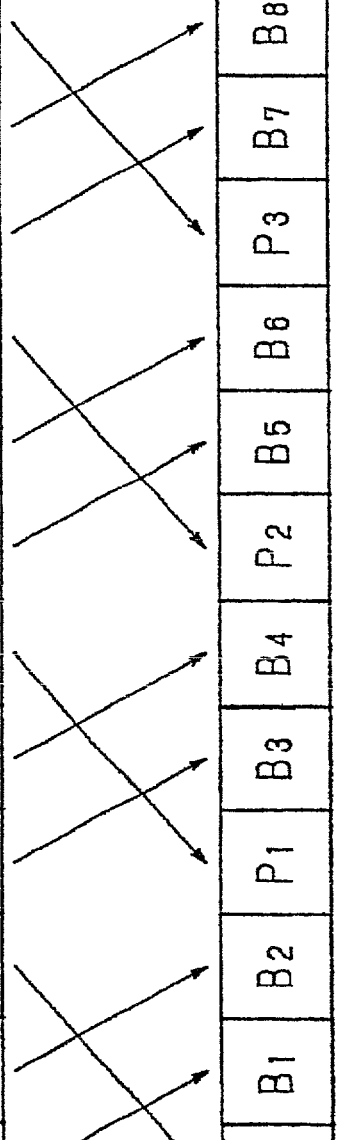
FIGS. 7A and 7B are views showing one example of a video bitstream of the conventional MPEG.
Figure 8:
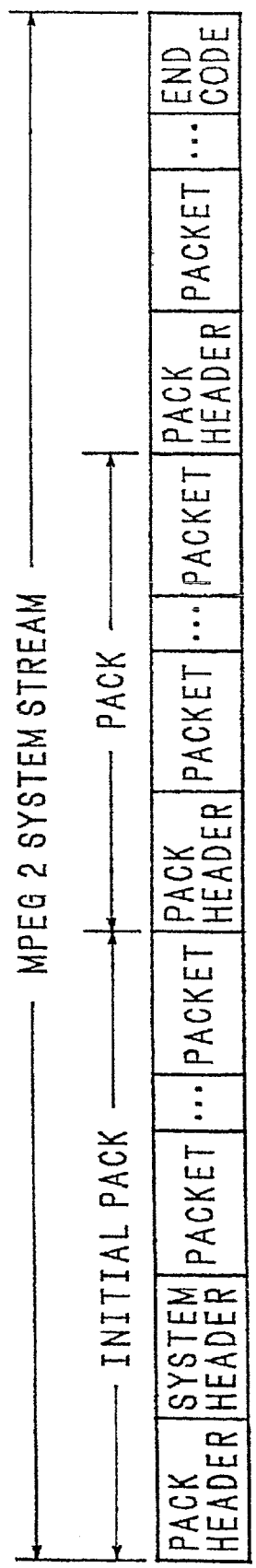
FIG. 8 is a view showing an example of a system stream in the PS in the conventional MPEG.
Figure 9:
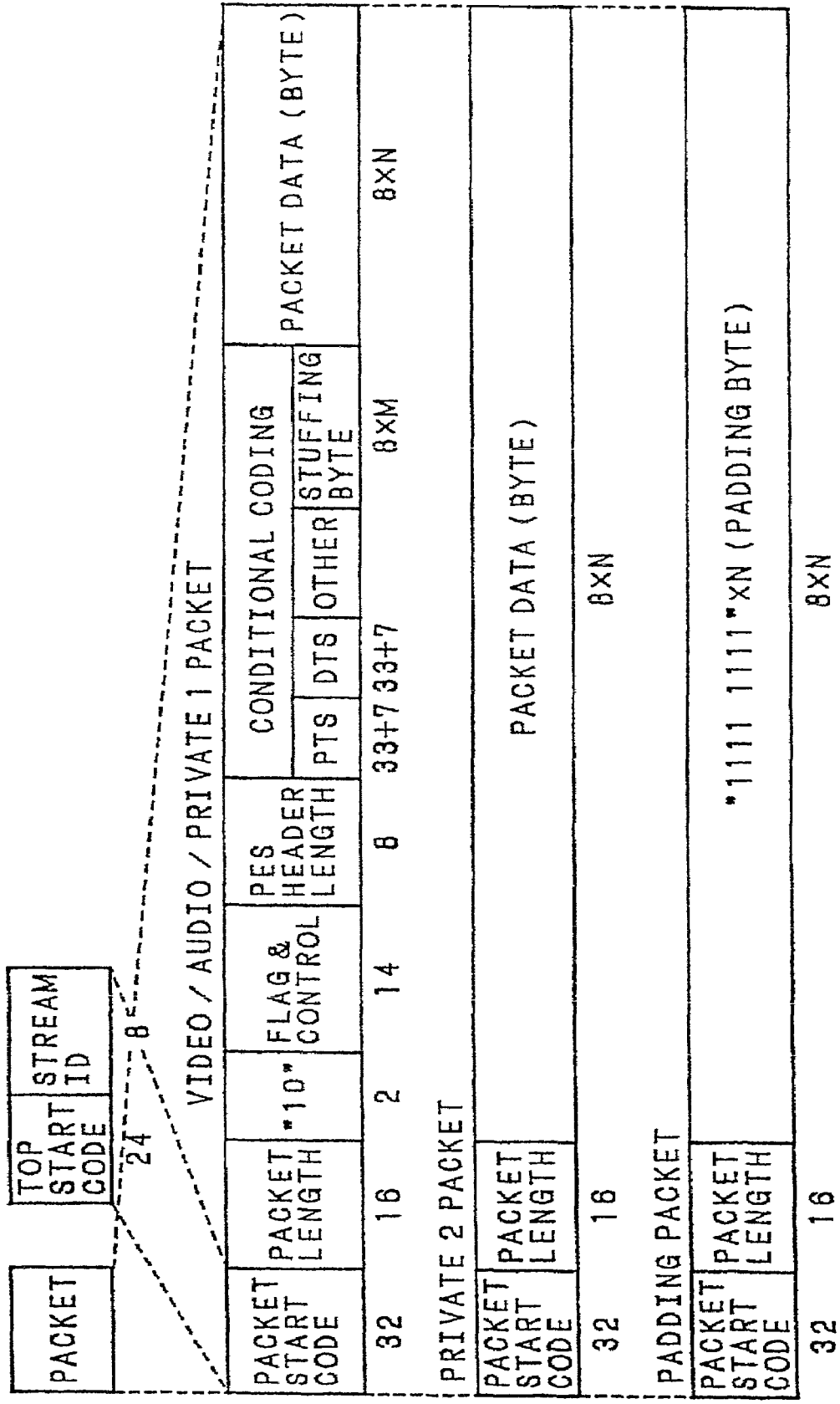
FIG. 9 is a view showing an example of a PES packet stream of the conventional MPEG.
Figure 10:
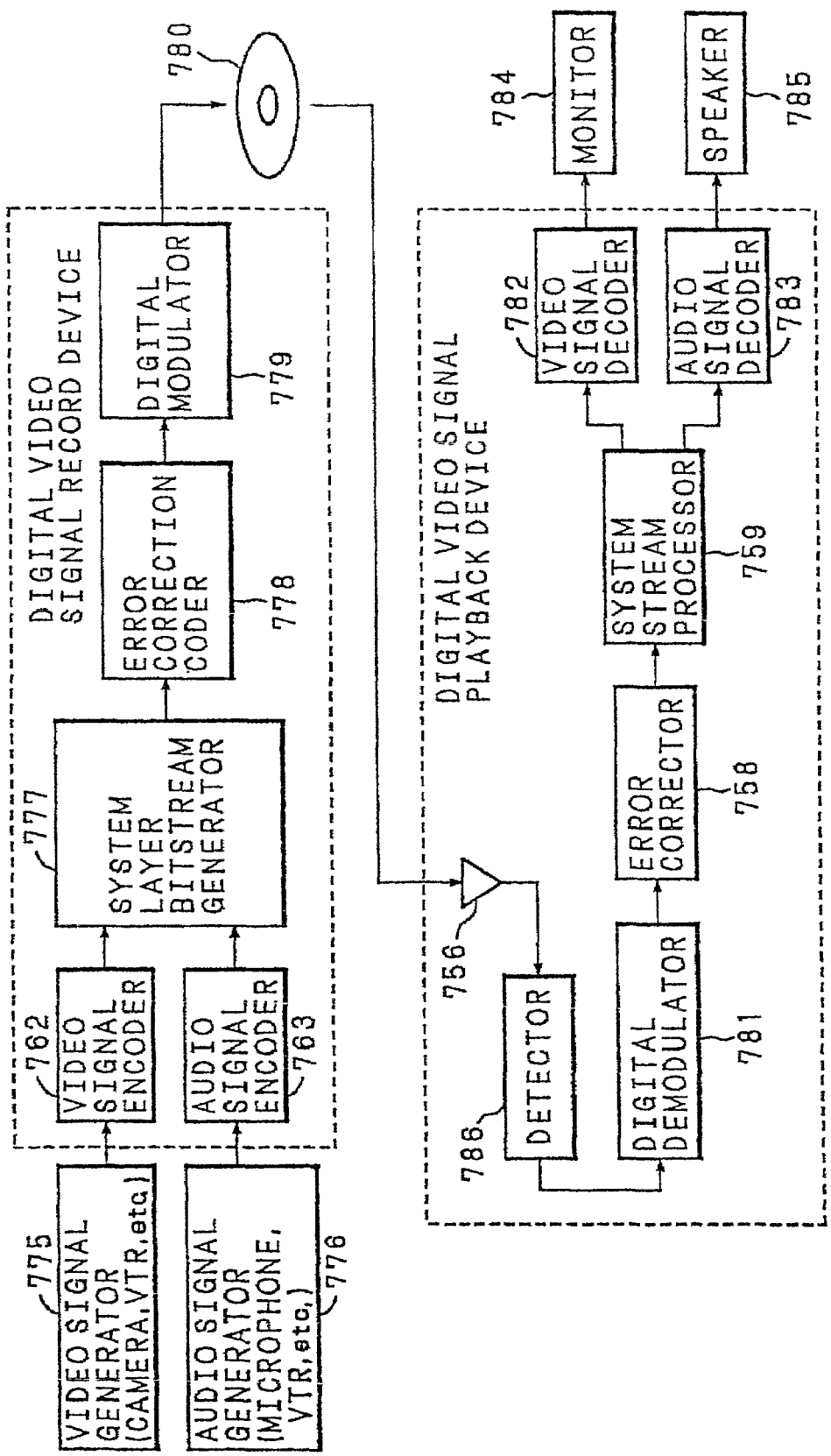
FIG. 10 is a block diagram of the conventional digital signal record and playback device.
Figure 11:
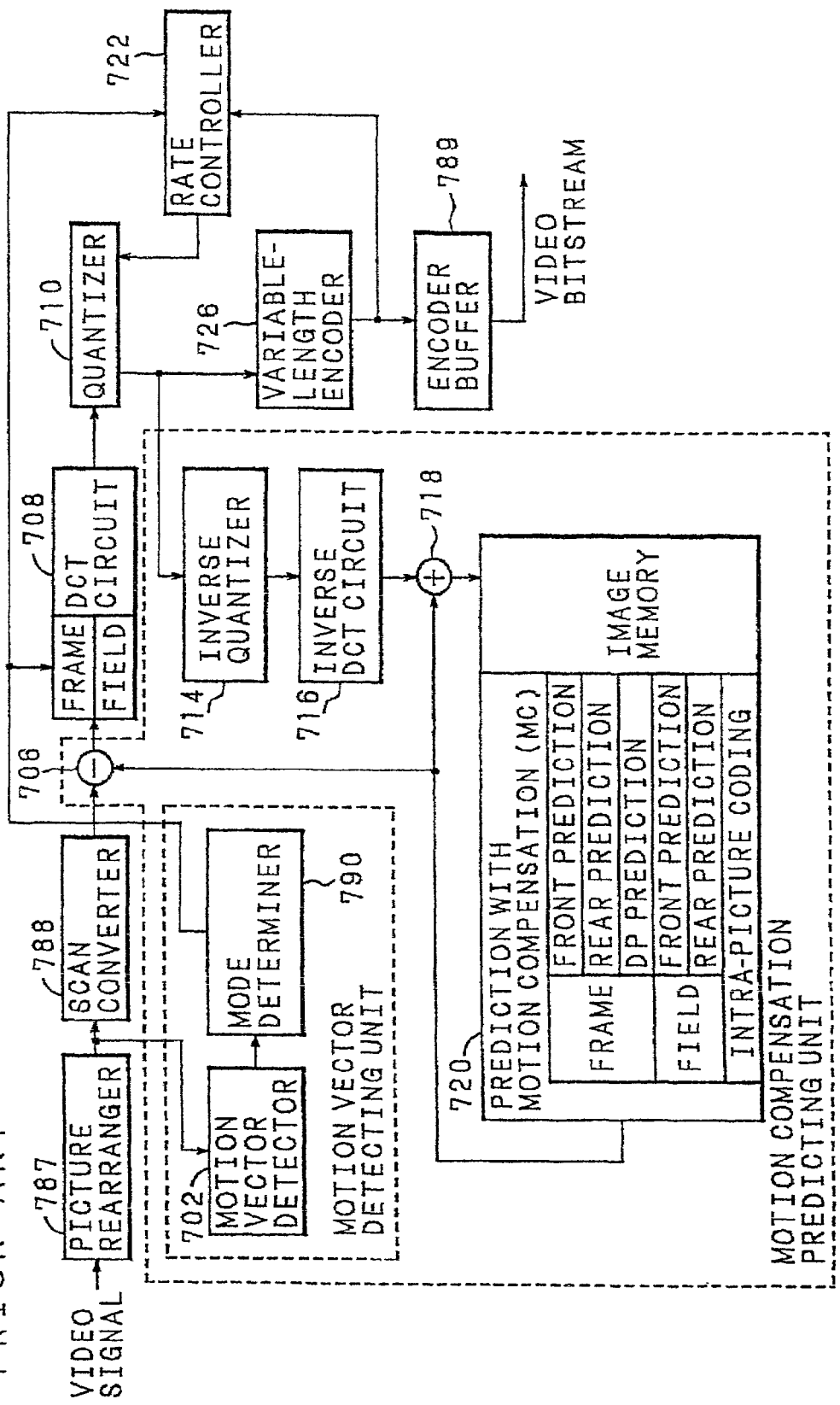
FIG. 11 is a block diagram of a video signal coding unit in the conventional digital video signal record and playback device.
Figure 12:
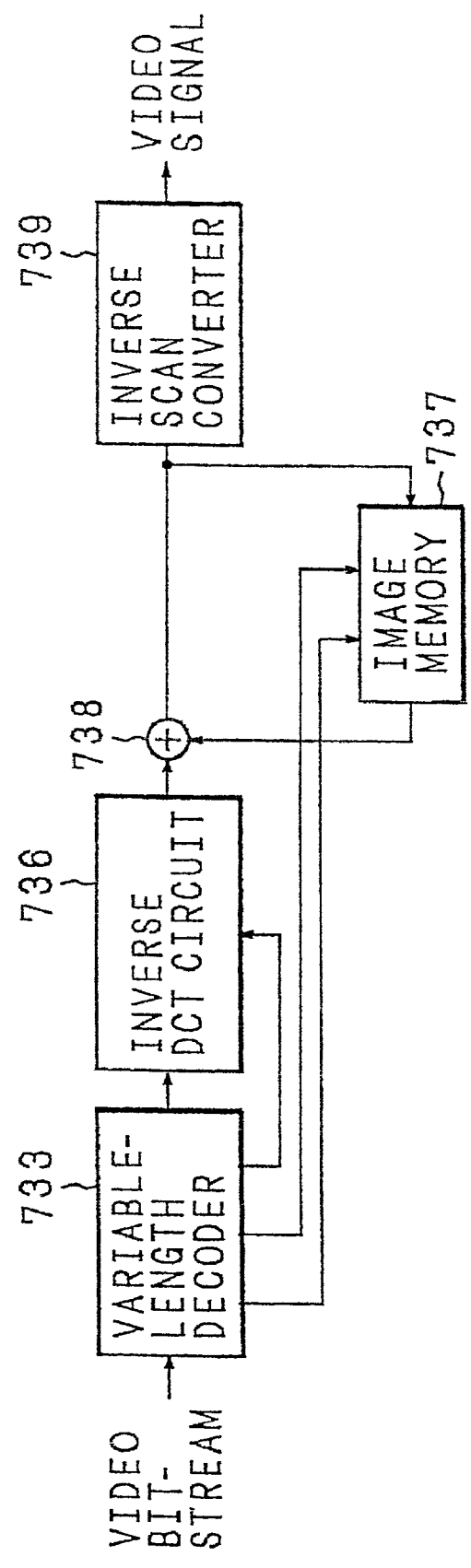
FIG. 12 is a block diagram of a video signal decoding unit in the conventional digital video signal record and playback device.
Figure 13A:
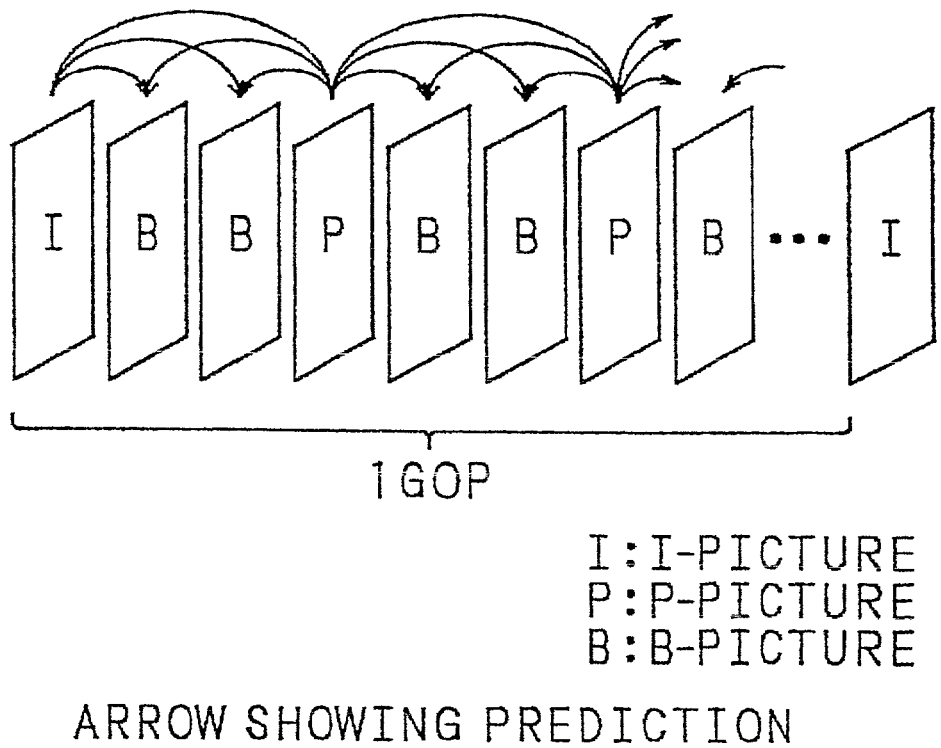
FIGS. 13A and 13B are views illustrating a concept of mobile picture processing in the conventional digital signal record and playback device.
Figure 13B:
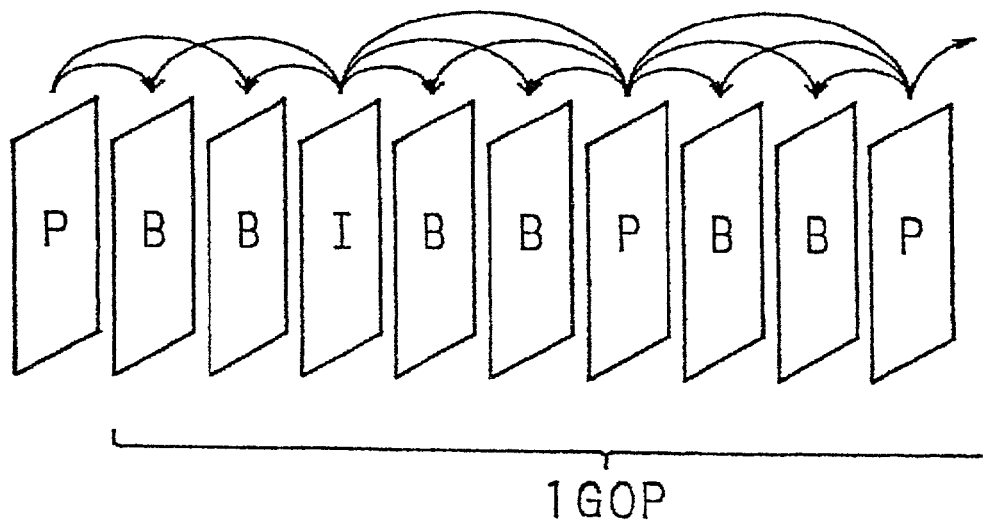
Figure 14:
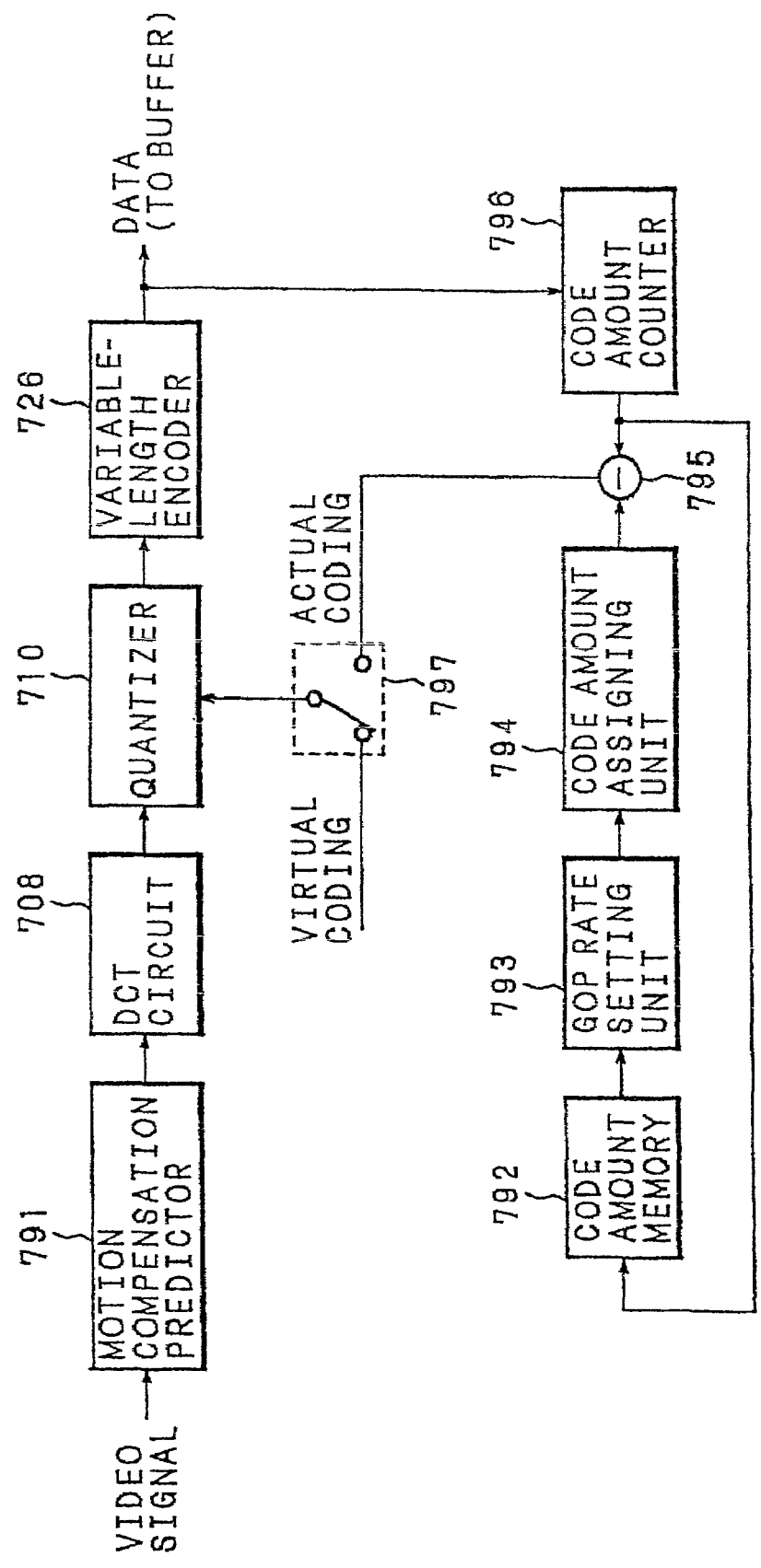
FIG. 14 is a block diagram of a video signal coding unit in the conventional digital signal record and playback device.

Next, an operation of the device will be explained. A digital video signal is inputted in the unit of lines from the input terminal 1 and is supplied to the formatting circuit 2. Here, in the motion compensation prediction, one GOP is set to 15 frames like the conventional example as shown in FIG. 6. Then, the GOP is subjected to the prediction coding as one frame of I picture, four frames of P pictures (P1 through P4), 10 frames of B pictures (B1 through B10). In this case, in the formatting circuit 3, the video data, inputted in a continuous manner like the conventional example is rearranged in the unit of frame in an order as shown in FIG. 7 and is outputted. Further, the data inputted in units of lines is rearranged in the unit of block having 8×8 pixels to constitute a macroblock (a total of six blocks of adjacent four luminance signal Y blocks and two color difference signals Cr and Cb blocks) shown in FIG. 17 so that data is outputted in the units of macroblock. Here, the macroblock is the minimum unit of the motion compensation prediction, and the motion vector for the motion compensation prediction is determined in the unit of macroblocks.

Further, in the formatting circuit 3, the I picture is divided into five areas for each of 720 pixels×96 lines in the vertical direction of one frame of video data. In this area, 8×8 pixels are blocked to constitute a macroblock for the output. In this case, divided five areas are defined as areas 1, 2, 3, 4 and 5. In the meantime, the P picture and the B picture are blocked without being divided into areas and is outputted in the unit of macroblocks.

The output of the formatting circuit 3 is inputted to the subtracter 4 and the motion compensation predicting circuit 11, but the operation of the subtracter 4, the DCT circuit 5, the quantizer 6, the variable length encoder 7 and the inverse Quantizer 8, the inverse DCT circuit, the adder 10, and the motion compensation predicting circuit 11 is the same as the conventional embodiment and an explanation thereof is omitted. outputted to the format encoder 13 in sequence. The output of the format coder 13 is inputted to a modulation circuit 14 so that an error correction code or the like is added and is recorded on the recording medium such as an optical disc or the like.

Figure 22:
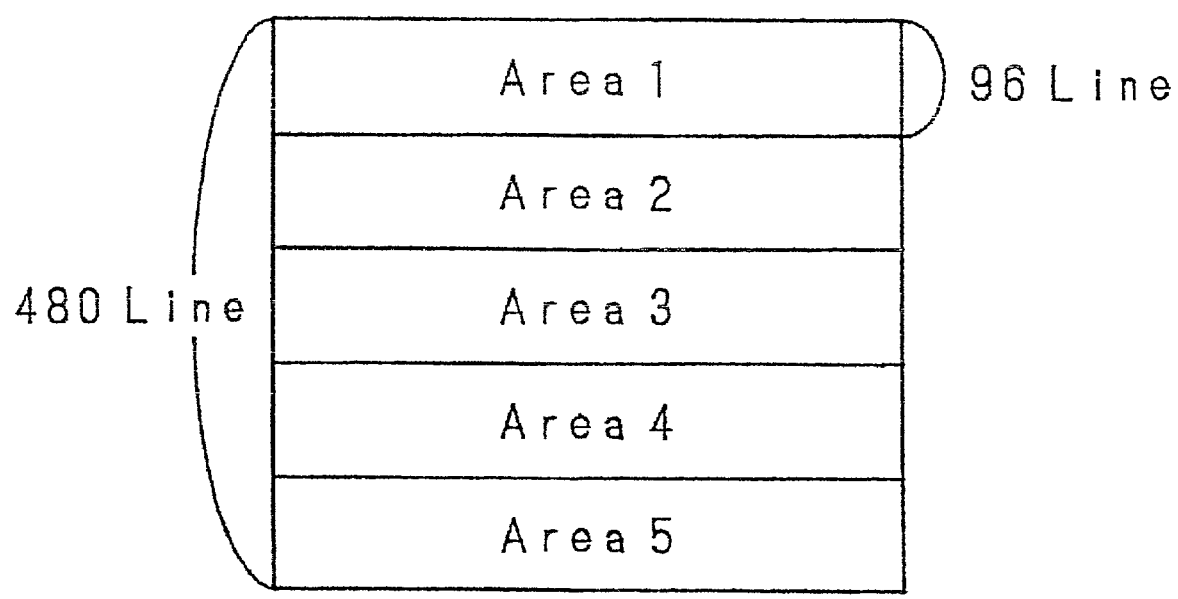
FIG. 22 is a conceptual view for illustrating a screen division according to embodiment 3.
Figure 23:
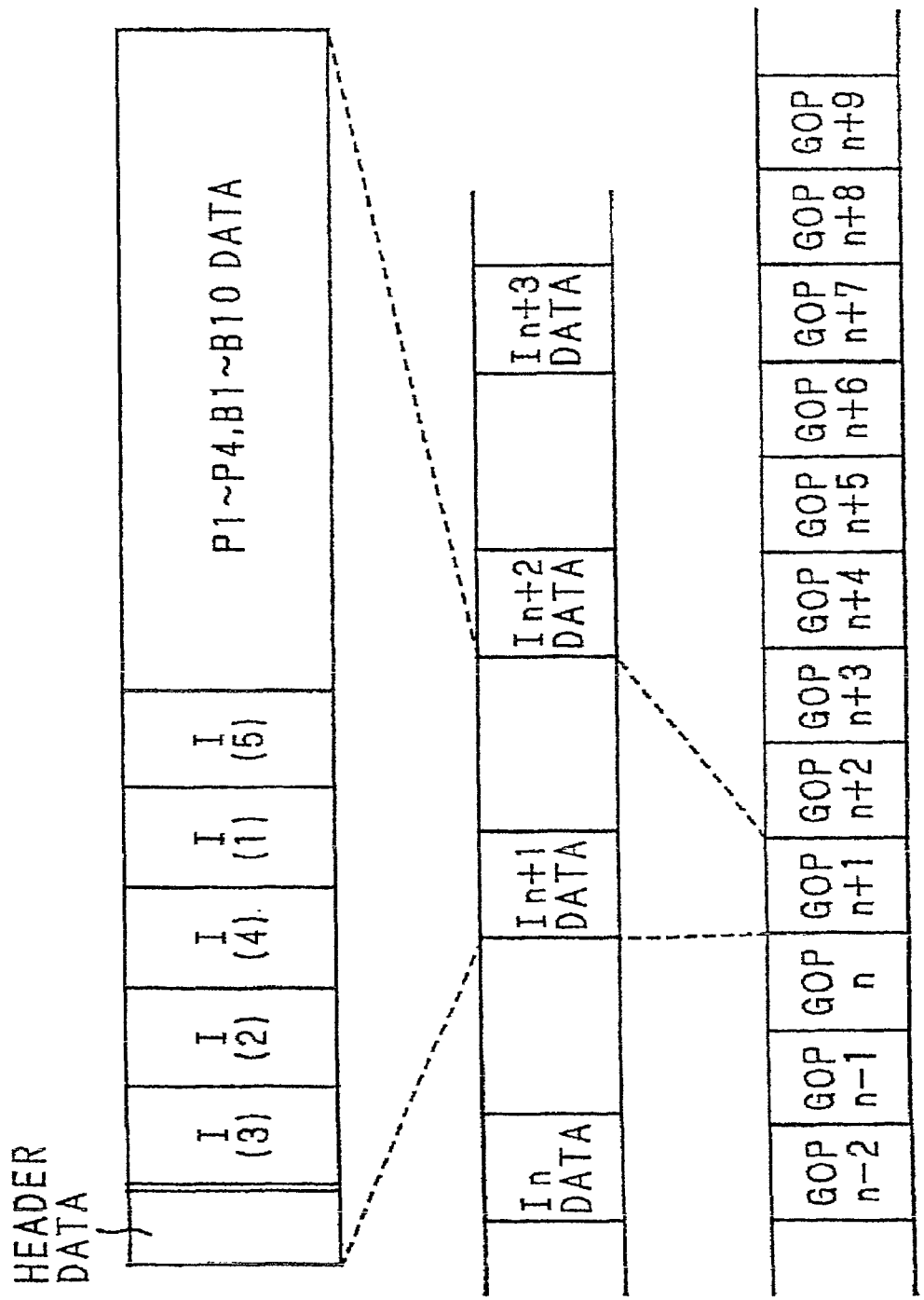
FIG. 23 is a conceptual view for illustrating a data arrangement according to embodiment 3.

In the format encoder 13, the data of the GOP portion is outputted to the modulator 14 by rearranging the video signal in the data arrangement as shown in FIG. 23. The I picture are divided into five areas as shown in FIG. 22 so that the data of the I picture corresponding to areas 1 through 5 are defined as I(1), I(2), I(3), I(4) and I(5). In FIG. 23, the data of the I picture is constituted to be recorded in the order of I(1), I(2), I(3), I(4) and I(5) at the front of a data stream for one GOP so that priority is given to the area which comes to the center of the screen.

Further, in FIG. 23, the address where the data of each I pictures is stored is written as header information. As the header information, the number of bytes which the data in each area occupies on the data format is recorded, the area being obtained by dividing the I picture into five parts. Consequently, at the time of the playback, it is possible to recognize the end position of each area as a relative address with respect to the front of the GOP on the basis of the number of bytes occupied by each area which is recorded in header information at the time of the playback. As a consequence, the optical head jumps to the front address of the GOP in the unit of a definite time so that the data of the I picture can be read in the unit of area in accordance with the header information from the front of the GOP.

With a general video signal record and playback device in common use, in the data format at the time of recording, the I picture is recorded in units of frames. In contrast, in FIG. 23, a priority is given to an area located at the central part of the screen out of the five areas obtained by dividing the I picture to be arranged at the front of one GOP with the result that the playback picture at least at the central part of the screen can be outputted even in the case where only the area in part of the I picture can be decoded.

Subsequently, an operation at the time of playback will be explained in accordance with FIG. 16. A video signal which is subjected to an error correction processing in the demodulator 21 and is recorded in a format of FIG. 23 in the buffer memory 22 is divided into the motion vector and the video data which are outputted to the prediction data decoding circuit 27 and the variable-length decoder 24, respectively. Here, the operation at the time of the normal playback, is the same as the conventional embodiments, a detailed explanation thereof is omitted.

At the time of a high speed playback, with respect to the data recorded on the recording medium such as an optical disc or the like, the optical head jumps to the front of the GOP in the unit of a definite time to read the data part of the I picture in accordance with the header information and the data is demodulated at the demodulator 21 to be inputted to the buffer memory 22. However, in the case where the information amount of the I picture is too large to be read in a definite time, the data which has been half read is read to the last item of the data, and the optical head jumps to the front of the subsequent GOP to input only the data that can be read into the buffer memory 22. In such a case, in the format decoder 23, only the area of the I picture that can be read is decoded and is outputted as a high speed playback picture. Consequently, when one GOP is set to 15 frames, a 15 times speed special playback picture can be obtained.

FIG. 24 shows a playback picture in the case where only the I picture of one GOP is played back. In this case, the information amount of all areas of the I pictures is too large to be read from the recording medium, with respect to the area which cannot be read, data of the preceding area is held as they are to be outputted thereby synthesizing the high speed playback picture. In FIG. 24, in the case where the n+1th GOP area 5 and n+3th GOP areas 1 and 5 cannot be read, the playback picture immediately before the playback picture is held as it is.

In this manner, the I picture used in the special playback as shown in FIG. 23 is positioned so that the priority is given to the area located at central part of the screen just above the screen to be recorded on the recording medium at the front of one GOP. Thus even when the whole I pictures cannot be read, the central part of the screen is given a priority in playback so that the content of the playback picture is easy to understand.

In the aforementioned embodiment 3, when the whole I pictures cannot be read, the playback picture is interpolated in the unit of area, the interpolation may not be made in the unit of area, but may be made in the unit of error correction block.

In this case, the demodulator 21 segments data into several byte-long packets with respect to the data arrangement shown in FIG. 23, and a error correction code is added to each packet. FIG. 25 shows an example of a case in which data in five areas inputted in a consecutive manner is divided into packets in the unit of error correction block units. FIG. 25A shows a data string before the packet division. FIG. 25B shows data after the packet division. Five areas of the I picture are divided into packets with a definite volume and the area I(3) is divided into packets from 1 through I and the I(4) is divided into packets I through j for the input.

At the time of a high speed playback, the optical head jumps to the front of the GOP in the unit of a definite time with respect to data recorded on the recording medium such as an optical disc or the like in the unit of GOP to read the data portion of the I picture in the unit of area in accordance with the header information. The data portion is demodulated by the demodulator 21 to be inputted to the buffer memory 22. However, in the case where the whole I picture cannot be read in a definite time because the information amount of the I picture is large, the optical head jumps to the front of the subsequent GOP even when the one area portion of data is being read. Further, data which can be read is subjected to the error correction processing so that the data which can be error corrected is inputted to the buffer memory 22. In this case, the format decoder 23 recognizes an address of the I picture area which can be decoded to the midway so that the data which can be read is decoded in units of macroblocks and is outputted as a high speed playback picture. In this case, with respect to the macroblock which cannot be decoded, data of the preceding screen is held and outputted at it is.

In the aforementioned embodiment 3, data in each area of the I picture is divided into packets in a consecutive manner. However, data may be divided so that the data in two or more areas may not be included in one packet. In this case, data in one area portion is closed in integer times of the error correction block with the result that the data can be rearranged in the unit of area immediately after the error correction processing. When data in each area is divided into the unit of packet, data is inputted halfway to the last packet of each area so that the residual data is required to be placed in data masking (for example, all the data is masked to "1").

In addition, in the aforementioned embodiment 3, a priority is given in the order of 3, 2, 4, 1 and 5. However, the order is not limited to this order. The order may be, for example, 3, 4, 2, 5 and 1.

In addition, in the aforementioned embodiment 3, the I picture is divided into five areas in the horizontal direction and recorded as shown in FIG. 22. The data is not required to be divided into five areas, but the data may be divided into n areas (n>1) in the unit of slice defined by the international standard MPEG. Here, the slice has a one dimensional structure of macro blocks with an arbitrary number of lengths (one or more). The slice is a belt which continues to the left end one line below upon reaching the right end of the screen.

Embodiment 4

Next, embodiment 4 of the present invention will be explained with respect to drawings. FIG. 26 is a view showing a special playback method in embodiment 4. In embodiment 3, a special playback is performed with a playback method shown in FIG. 24. However, the special playback may be performed so that the playback picture as shown in FIG. 26 is outputted. In this case, the format decoder 23 synthesizes one screen by playing back each one area from the I pictures of five GOP's which are continuous as shown in FIG. 26. For example, in FIG. 26A, one screen portion of the playback picture is synthesized from the I pictures of nth to the n+4$^{th}$ GOP so that the I picture of the n+4$^{th}$ GOP is played back in area 1, the I picture of the n+3th GOP is played back in area 2, the I picture of the n+2th GOP is played back in area 3, the I picture of the n+1th GOP is played back in area 4, and the I picture of the nth GOP is played back in area 5. Further, referring to FIG. 26, when an attention is paid to the area 5, the I picture of the nth, n+1th, n+2th - - - GOP are played back as the played back video data.

Further, when the whole I picture cannot be read during a definite time because the information amount of the I picture is large, the data preceding by one screen is held as it is and is outputted to synthesize a higher speed playback picture. FIG. 27 is a playback picture when the n+1th GOP area 5, and n+3th GOP areas 1 and 5 cannot be read. In this case, since the data arrangement is recorded on the recording medium by giving a priority to the an area located at the central part of the screen as shown in FIG. 23, the central portion of the screen is given a priority in the playback even in the case where the whole I picture cannot be read in terms of time with the result that it never happens that the playback picture is hard to see. Further, even in the case where data in two or more areas cannot be read, one screen is divided into five areas. Since the frame played back in each area is different, it is hard to detect that data is lacking in the playback picture.

Embodiment 5

Next, embodiment 5 of the present invention will be explained with respect to the figures. FIG. 28 is a view showing an arrangement structure of a digital video signal data according to embodiment 5. In embodiment 3, the data arrangement is written in the order of the areas 3, 2, 4, 1 and 5 with respect to the I picture as shown in FIG. 23. The arrangement may have a structure shown in FIG. 28. In FIG. 28, when the data of the I picture is recorded at the front portion of the data arrangement of one GOP portion, the area number at the front of each of the GOPs is scrolled. In other words, as shown in FIG. 28, when the I picture data is recorded in the order of I(5), I(1), I(2), I(3) and I(4) in the nth GOP, the I picture data is recorded in the order of I(1), I(2), I(3), I(4) and I(5) in the n+1th GOP. Further, I(2) comes first in the n+2th GOP. When the GOP number becomes n+3 and n+4 and - - - , the front area is sequentially scrolled and recorded in the order of I(3), I(4), I(5), I(1) and - - - .

Further, at the front of the GOP, the address where data in each I picture is stored and information for recognizing the kind of the front area are written as header information. As header information, the area number recorded at the front and the number of bytes indicating data amount occupied on the data format of each area as shown in FIG. 27. Consequently, at the time of the playback, the data order of the I picture area and the end position of the each area on the recording medium can be recognized as relative addresses with respect to the front of the GOP, with the front area number recorded in the header information and the number of bytes occupied by each area on the recording medium. Consequently, at the time of the special playback, the optical head jumps to the front address of the GOP in the unit of a certain period of time, so that the I picture data can be read for each area from the front of the GOP in accordance with the header information.

In this case, the position where the I picture area divided into five areas is recorded is scrolled in the unit of GOP so that the area which cannot be decoded is not concentrated on the fixed position on the screen even when only part of the area of the I picture can be decoded at the time of the special playback.

At the time of the high speed playback, the optical head jumps to the front of the GOP in the unit of certain time with respect to the data recorded on the recording medium such as an optical disc or the like to read the data portion of the I picture in the unit of area in accordance with the header information and is demodulated at the demodulator 21 and is inputted to the buffer memory 22. However, when the information amount of the I picture is too large to read the whole I picture in a certain time, the optical head jumps to the front of the subsequent GOP after reading to the last data in the area which is read halfways to input only the data in the area that can be read into the buffer memory 22. In this case, the format decoder 23 decodes only the area of the I picture that can be read, which is outputted as a high speed playback picture. Consequently, in the case where one GOP is set to 15 frames, a 15 times speed special playback picture is obtained.

FIG. 29 shows a playback picture in the case where the I picture of one GOP is played back in a high speed playback. In this case, the I picture is to be recorded on the recording medium in an order as shown in FIG. 28. Here in the case where the information amount of the I picture is large, and the whole I picture cannot be read in time, the data of the preceding screen is held as it is and is outputted so that a high speed playback picture is synthesized. FIG. 29 shows a case in which n+1th GOP area 5 and n+3th GOP areas 1 and 2 cannot be read completely. In this case, the data of the preceding screen is held as it is.

As described above, the order of recording the I picture used for the special playback as shown in FIG. 28 is scrolled in the unit of GOP. Consequently, even in the case where only some areas of the I picture can be decoded at the time of the special playback, the area that can not be decoded is not concentrated on the fixed position on the screen.

Embodiment 6

Figure 30:
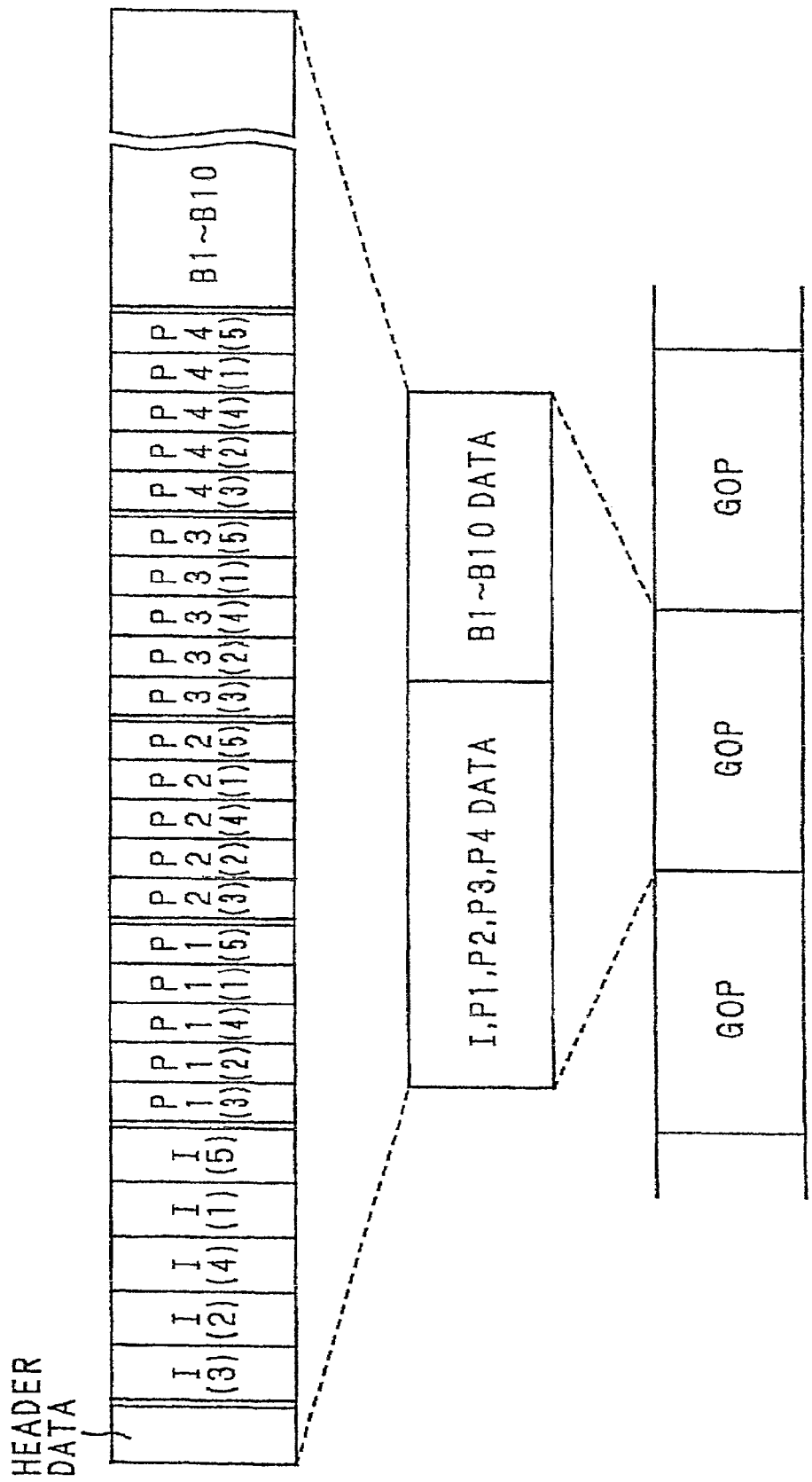
FIG. 30 is a conceptual view for illustrating a data arrangement in embodiment 6.

Next, embodiment 6 of the present invention will be explained with respect to figures. FIG. 30 is a view showing a data arrangement structure of a digital video data according to embodiment 6. In this case, the I picture and the P picture are divided into five areas each having 720 pixels×96 lines so that each area is blocked in the unit of the macroblock and is coded as shown in FIG. 22. However, the P picture is divided into five area. The motion compensation prediction is performed and coded in such a manner that the retrieval scope of the reference pattern of the motion compensation prediction closes in the area. Here, the divided five areas are defined as areas 1, 2, 3, 4 and 5 from the top. Further, with respect to the B picture, the motion compensation prediction is performed and coded without being divided into areas.

With the format encoder 13, the data of one GOP portion is used to rearrange the video signal with the data arrangement shown in FIG. 30 and is outputted to the modulator 14. Here, with respect to the I picture and the P picture, one screen is divided into five areas as shown in FIG. 22. The I picture, and the P1, P2, P3 and P4 pictures are defined as I(1) through I(5) and Pi(1) through Pi(5) (i=1 through 4). In FIG. 30, the data of the I picture, the P1, P2, P3 and P4 pictures is constituted to be recorded in the order of 3, 2, 4, 1 and 5 from the front of the data string for one GOP portion, so that the area located at the central part of the screen is given a priority. Further, in FIG. 30, the data amount of each area is recorded as header information at the front of one GOP so that the address of the data in each I picture and P picture area can be recognized.

At the time of the high speed playback, the optical head jumps to the front of the GOP with respect to the data which is recorded in the unit of one GOP on the recording medium such as optical disc or the like with the result that the data portion of the of the I picture and the P picture is read in the unit of area and is demodulated by the demodulator 21 and is inputted to the buffer memory 22. However, when the information amount of the I picture and the P picture is too large to read the whole I pictures and P pictures in a definite time, the areas read halfways are read to the last. Then the optical head jumps to the front of the GOP in the unit of a certain time so that only the data that can be read is inputted to the buffer memory 22. In this case, the format decoder 23 decodes only the areas of the I picture and the P picture that can be read and then output the data as a high speed playback picture. Consequently, in the case where the one GOP is set to 15 frames, a triple speed special playback picture can be obtained.

Further, since the area located at the central part of the screen is given a priority to be arranged at the front of one GOP out of the I picture divided into five sections, at least a playback picture at the central part of the screen can be outputted even in the case where only a part of either the I picture or the P picture can be decoded. Further the pictures are recorded on the recording medium in the order of the I picture, the P1 picture, the P2 picture, the P3 picture and the P4 picture. Consequently, it never happens that the reference data cannot be played back at the prediction data decoding circuit 27 even when all the data cannot be read.

FIG. 31 shows a play back picture in the case where a high speed playback of the picture is performed by playing back only the I picture and the P picture in one GOP. In this case, when the whole I picture and the whole P pictures cannot be read from the recording medium in a definite time because the information amount of the I picture and the P pictures are large, the data of the preceding screen is held as it is and outputted to synthesize a high speed playback picture with respect to the area that cannot be read. FIG. 31 shows the case where the areas 3, 4 and 5 of the P4 of the nth GOP cannot be read. In this case, the data of the preceding screen is held as it is.

As described above, as shown in FIG. 30, the I picture and the P pictures are played back to output a special playback picture at the time of the special playback by collecting and arranging the I picture and the P picture used at the time of special playback in the unit of area at the front of the one GOP. Further, in the case where the whole I picture and the whole P picture cannot be read because of time limit, the data of the preceding screen is interpolated to allow output of the playback picture.

In the aforementioned embodiment 6, in the case where the whole I picture and the whole P picture cannot be read, the playback picture is interpolated in the unit of areas. However, the interpolation may not be performed in the area units, but it may be performed in units of error correction codes.

In this case, the demodulator 21 segments the data into packets of several bytes with respect to the data arrangement shown in FIG. 30 so that an error correction code is added to each of the packets. FIG. 32 shows a case in which the data of five areas inputted to FIG. 32 in a continuous manner is divided into packets of error correction blocks. FIG. 32A shows the data string before the packet division. FIG. 32B shows the data after the packet division. In FIG. 32, the data is divided into ith through jth packets in the area P1(3).

At the time of the high speed playback, the optical head jumps to the front of the GOP in units of a definite time with respect to the data which is recorded in the unit of GOP on the recording medium such as an optical disc or the like with the result that the data portion of the I picture is read in units of area in accordance with the header information and is demodulated at the demodulator 21 and is inputted to the buffer memory 22. However, in the case where the information amount of the I picture is so large that the whole I picture and the whole P pictures cannot be read in a definite time, the optical head jumps to the front of the next GOP even in the midst of reading the data in one area portion. Further, the data that has been read is subjected to an error correction processing, and the data that can be error corrected is inputted to the buffer memory 22. In this case, the format decoder 23 recognizes the address of the I picture and the P pictures that can be decoded halfways so that the data that can be read is decoded in the unit of macroblock and is outputted as a high speed playback picture. In this case, with respect to the macroblock that cannot be decoded, the data of the preceding screen is held at it is and is outputted.

In the aforementioned embodiment 6, in the motion compensation prediction, the scope of retrieval is set to be closed in each area, but it is not always required to be closed.

Embodiment 7

Next, embodiment 7 of the present invention will be explained with respect to FIG. 33. FIG. 33 is a view showing a method for a special playback according to embodiment 7. In embodiment 6, the special playback is performed in a playback method as shown in FIG. 31. However, the special playback may be performed so that the playback picture is outputted as shown in FIG. 33. In this case, the format encoder 23 synthesizes one screen by playing back areas one by one from continuous five frames as shown in FIG. 33. In FIG. 33A, a playback picture of one screen portion is synthesized from the I picture, the P1 through P4 pictures. Further, in FIG. 33A, the P4 picture is played back in the area 1, the P3 picture is played back in the area 2, the P2 picture is played back in the area 3, and the P1 picture is played back in the area 4 and the I picture in the area 5. Further, in FIG. 33, the area 5 is noted with the passage of time. The played back video data includes the I picture of the nth GOP, the P1, P2, P3 and P4, and the I picture of the n+1th GOP picture, and the P1 picture.

Further, in the case where the information amount of the I picture and the P picture is so large that all the I picture and the P picture cannot be read in a definite time, the data of the preceding screen is held as it is and is outputted to synthesize a high speed playback picture. FIG. 34 shows a playback picture in the case where the areas 1, 4 and 5 of the n-th GOP cannot be read. In this case, as shown in FIG. 30, with respect to the data string, the area located at the center on the screen is given the priority to be recorded on the recording medium with the result that it never happens that the playback picture is hard to see because the central part of the screen in given the priority in the playback. Further, even in the case where the data in two or more areas can not be read, one screen is divided into five areas and the frame played back in each area is different, it is hard to see that the data is lacking in the playback picture.

Embodiment 8

Figure 35:
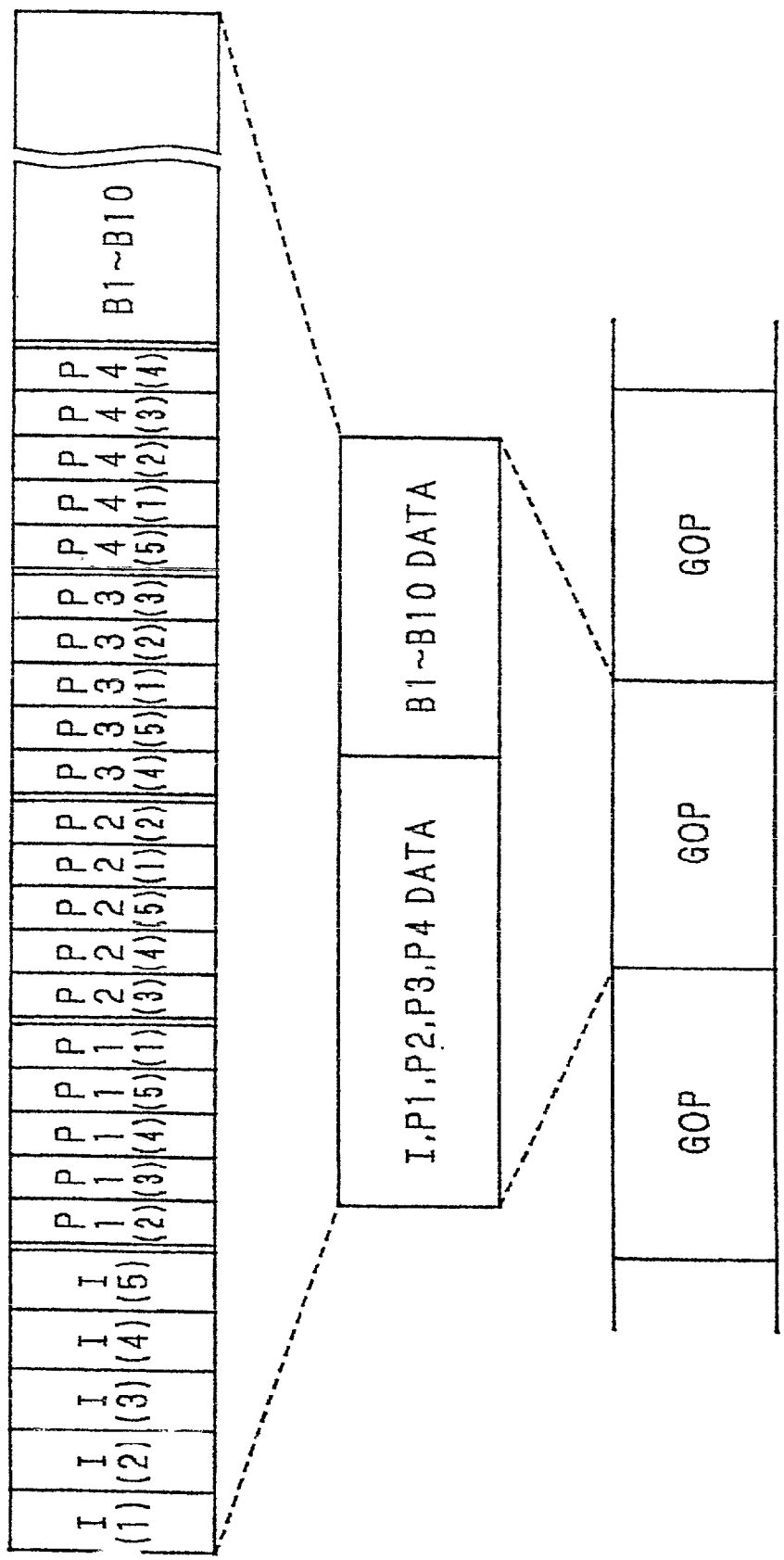
FIG. 35 is a conceptual view for illustrating data arrangement in embodiment 8.

Next, embodiment 8 of the present invention will be explained with respect to the figures. FIG. 35 is a view showing a digital video data arrangement structure in embodiment 8. In embodiment 6, the data arrangement is written in the order of the areas 3, 2, 4, 1 and 5 as shown in FIG. 30, but the arrangement may have a structure as shown in FIG. 35.

In FIG. 35, when the data in the I picture and the P pictures are recorded at the front of the data arrangement for one GOP portion, the area number at the front is scrolled for each of the frames. In other words, as shown in FIG. 28, in the nth GOP, the I picture data is recorded in the order of the P1(2), P1(3), P1(4), P1(5) and P1(1). Further, in the P2 picture, P2(3) comes to the front. In the P3 picture, and the P4 picture, the front areas are scrolled and recorded sequentially like P3(4) and P4(5).

Further, at the front of the GOP, the address where the data of the I picture and the P picture are stored, and information for identifying the kind of the area at the front of each frame are recorded as header information. Here, as header information, the area number which is recorded at the front of each area and the number of bytes indicating the data amount in each area which is divided into five parts are recorded. Consequently, the optical device jumps to the front of the GOP in the unit of a certain time at the time of the special playback so that the data can be read in the unit of area in accordance with the header information.

In this case, since the position where the I picture and P picture areas divided into five parts are scrolled in the unit of frame, it never happens that the area which is not decoded is not concentrated on the fixed position on the screen even in the case where only a part of the areas of the I picture and the P picture can be decoded.

At the time of the high speed special playback, the data which is recorded on the recording medium such as an optical disc or the like in units of one GOP is read in units of area unit in accordance with header information. Then, the data is demodulated by the demodulator 21 and is inputted to the buffer memory 22. However, when the information amount of the I picture and the P picture is so large that the whole I picture and the whole P picture cannot be read in a definite time, the data is read to the last with respect to the area read halfways. Then, the optical head jumps to the front of the GOP to input data only of the area which can be inputted into the buffer memory 22. In this case, the format encoder 23 decodes only the area of the I picture and the P picture, and is outputted as a high speed playback picture.

FIG. 36 shows a playback picture in the case where only the I picture and the P picture in one GOP are played back for a high speed playback. In this case, when the data amount of the I picture and the P picture is so large that the whole I picture and P picture cannot be read in a definite time, a high seed playback picture is synthesized by holding and outputting the data of the preceding screen as it is. FIG. 36 shows a case where the areas 3, 4 and 5 of the P4 of the nth GOP cannot be read. In this case, the data of the preceding screen is held as it is.

As described above, since the order of recording the I picture used for the special playback is scrolled in the unit of GOP a shown in FIG. 35, the area which cannot be decoded is not concentrated on the fixed position on the screen even in the case where only a part of the areas of the I picture can be decoded at the time of the special playback.

Embodiment 9

Figure 37:
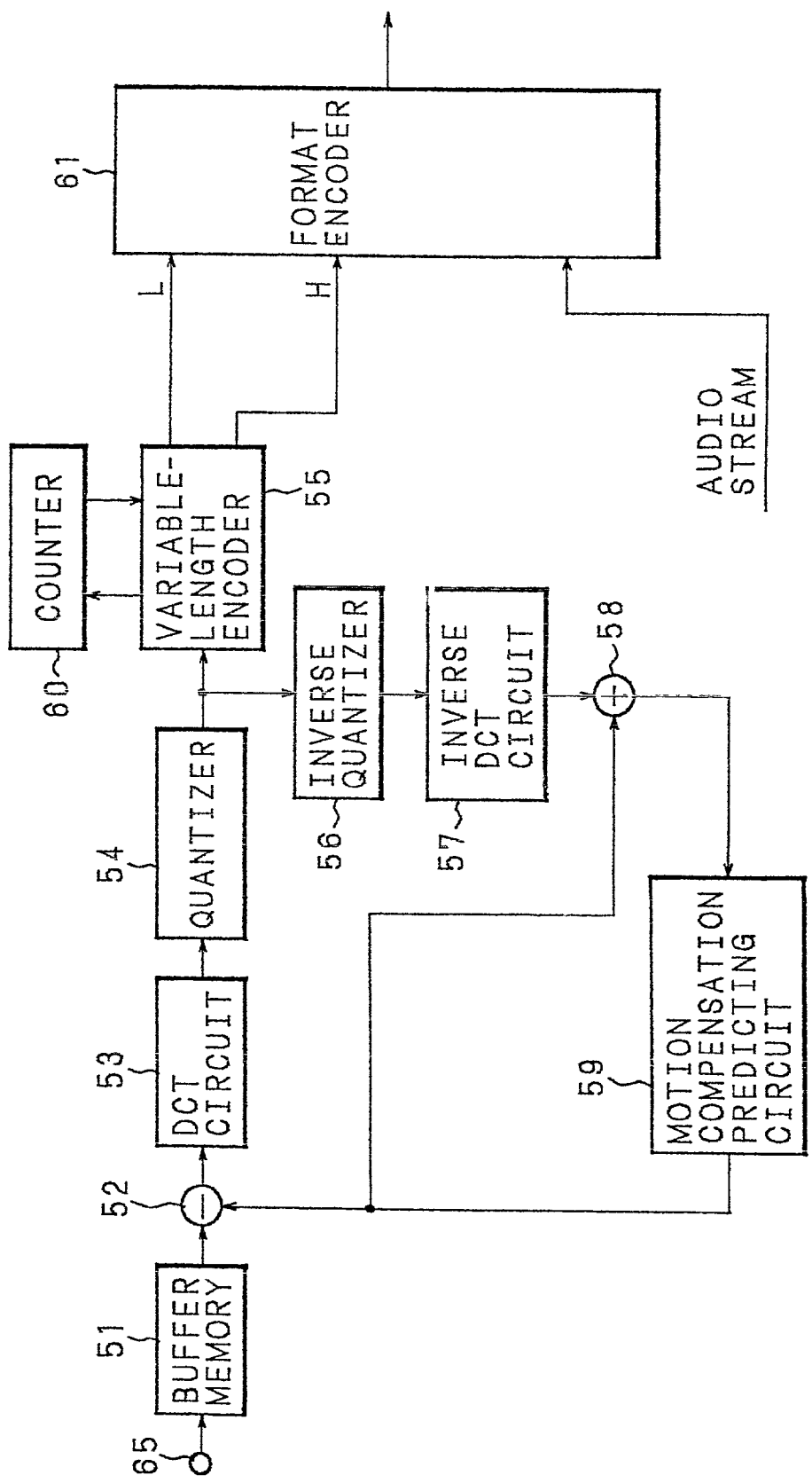
FIG. 37 is a block diagram of a digital video signal coding unit in embodiment 9.

Next, embodiment 9 of the present invention will be explained with respect to FIG. 37. FIG. 37 is a block diagram on the recording side showing a digital video signal coding processing unit in a digital video record and playback device wherein the DCT block is divided into stages in the low frequency area and the high frequency area so that only the low frequency area is located at the front of the GOP. In FIG. 37, reference numeral 51 denotes a buffer memory, 52 a subtracter, 53 a DCT circuit, 54 a quantizer, 55 a variable-length encoder, 56 an inverse quantizer, 57 an inverse DCT circuit, 58 an adder, 59 a motion compensation predicting circuit, 60 a counter for counting the number of events and a code amount, 61 a format encoder, and 65 an input terminal.

Next, an operation of the device will be explained. The video data to be inputted is an interlace picture which has an effective screen size of horizontal 704 pixels and vertical 480 pixels. Here, the operation of the subtracter 52, the DCT circuit 53, the quantizer 54, the variable-length encoder 55, the inverse quantizer 56, the inverse DCT circuit 57, the adder 58 and the motion compensation predicting circuit 59 are the same as the counterparts shown in conventional embodiments. Thus, an explanation thereof will be omitted.

Figure 38:
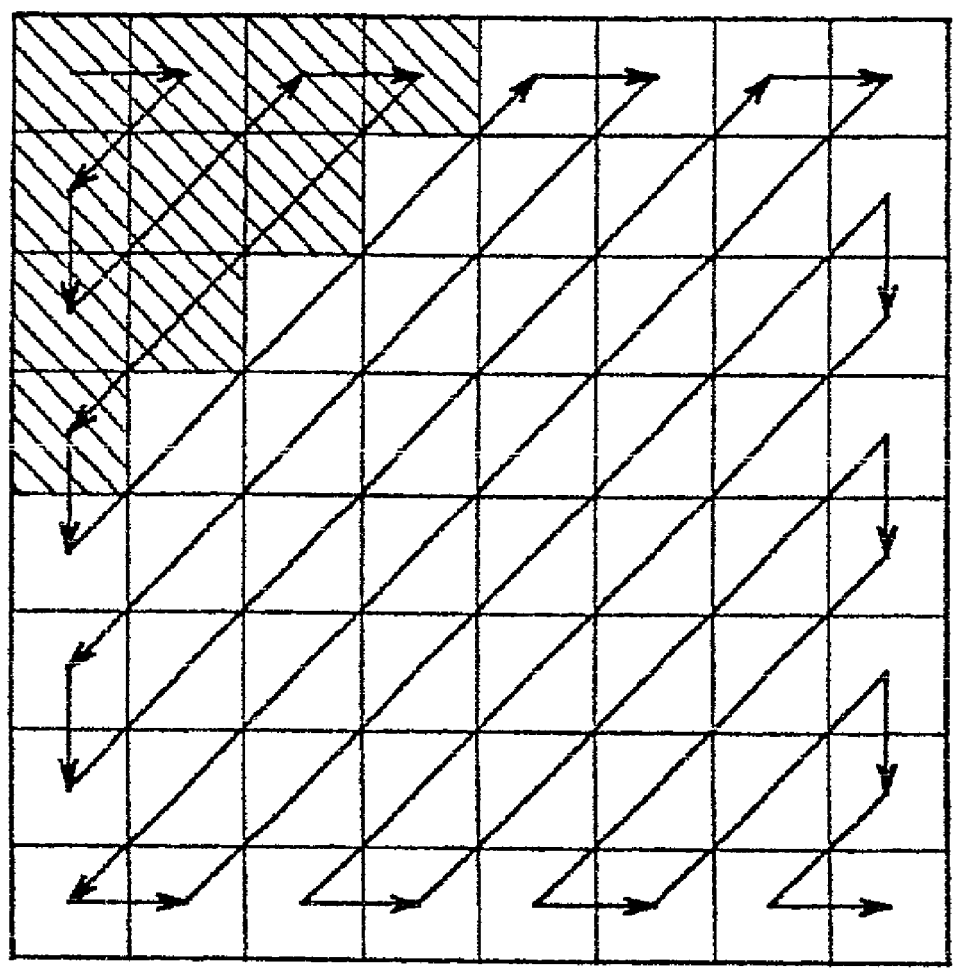
FIG. 38 is a view showing a concept of a frequency division in embodiments 9 and 11.

An operation of the variable-length encoder 55 will be explained with respect to FIG. 38. FIG. 38 shows a data arrangement of DCT coefficients inside of a DCT block. In FIG. 38, a low frequency component is located at the upper left portion and the data of the DCT coefficient of a high frequency component is located at the lower right portion. The data of the low frequency coefficient up to a specific position (the end of the events) (for example, the hatching part in FIG. 38) out of the data of the DCT coefficient arranged in the DCT block is coded into a variable-length code as a variable-length area and is outputted to the format encoder 61. Then, the variable-length coding is applied to the data of the DCT coefficient after the data of the DCT coefficient at the aforementioned position. In other words, the data in the space frequency area is coded through partitioning.

A boundary between the low frequency area and the high frequency area is referred to as a breaking point. The breaking point is set to assume a predetermined code amount in the low-frequency area which the optical head can assess at the time of the special playback. The variable-length encoder 55 divides the DCT coefficient into the low-frequency area and the high-frequency area in accordance with the breaking point to be outputted to the format encoder 61.

The determination of the coding area is performed at the boundary of the event. It goes without saying that the determination can be made by other methods. For example, the determination of the coding area can be made at the boundary of the fixed number of events. The data may be divided with the quantizer 54 with the quantization data subjected to a rough quantization with the quantizer 54 and a differential value between a fine quantization and a rough quantization. Further, the data may be divided with coding of a picture whose space resolution is thinned to a half level with the buffer memory and a coding of a differential picture between a picture whose resolution is brought back from the half level and a picture with an original resolution. In other words, the data division is not limited to the division of the frequency area. It goes without saying that the high efficiency coded data of the picture may be divided by the quantization and the division of the space resolution.

At this time, more important data as a picture is a low frequency area data in the division by the frequency. When the division is the division by quantization, the data is subjected to a rough quantization for coding. When the data is divided with the space resolution, the thinned picture is coded. By decoding only these important data, a decoded picture can be obtained which can be easily perceived by man. In this manner, one high efficiency coded data is divided into more fundamental and important data and other data (this process is referred to as hierarchization). An error correction code is added and modulation is performed to be recorded on a disc.

In this manner, since only the low-frequency component of the I picture and the P picture are divided, reading and playing back only these low-frequency components at the time of the special playback largely reduces the amount of data which is read at the time of the special playback. As a consequence, time for reading data from the medium becomes shorter so that a high speed playback of a smooth movement can be realized at the time of skip search. Further, when only the I picture and the P picture are arranged in a consecutive manner, the data of the low-frequency component of the I picture and the P picture can be easily read from the disc to be decoded. In this case, more efficient data structure can be made by extracting and arranging only the low-frequency component Than by arranging the whole area of the I picture and the P picture at the front of the GOP.

Figure 39:
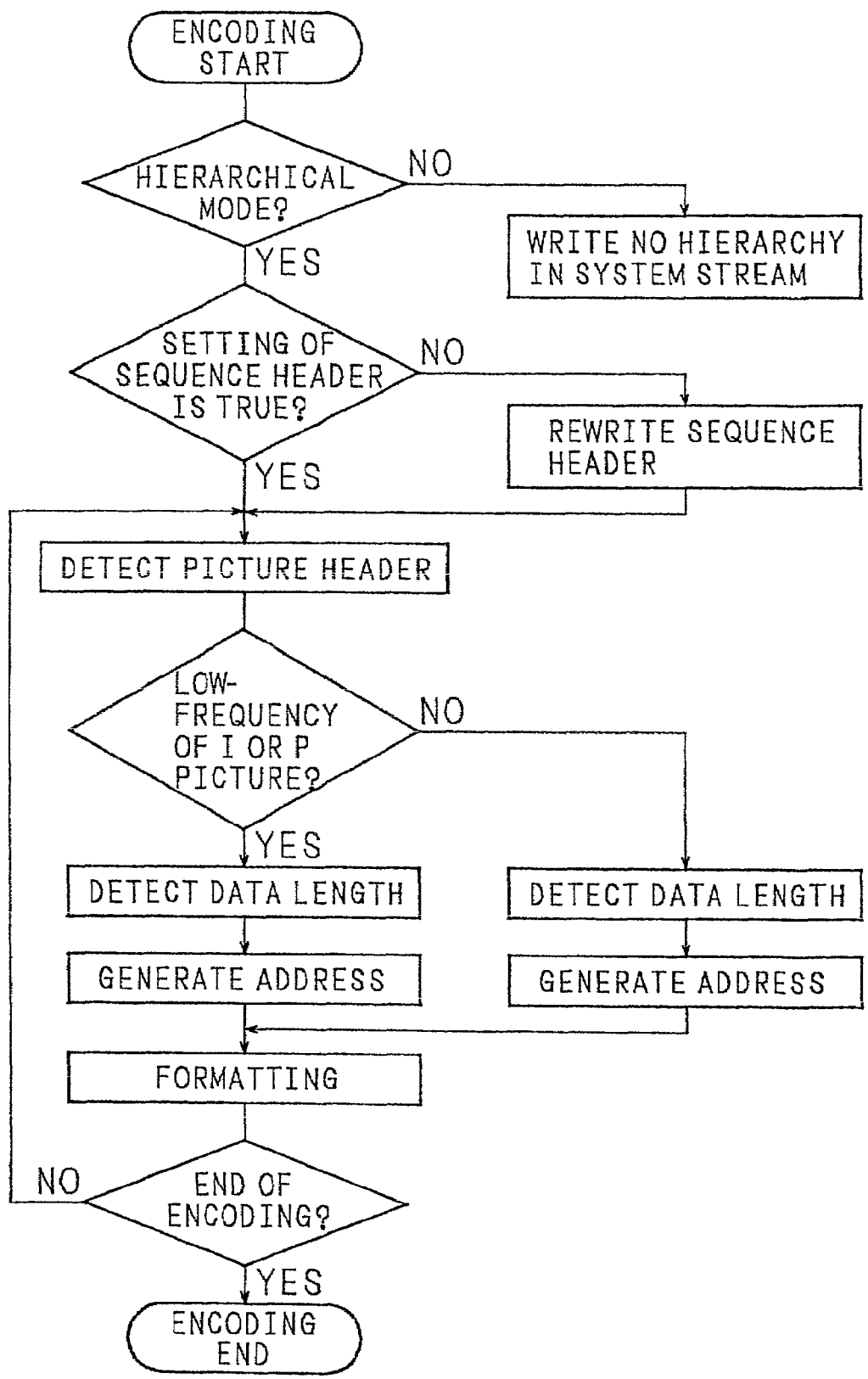
FIG. 39 is a flowchart of a digital video signal coding processing in embodiment 9.

Next, an operation of the format encoder 61 will be explained. FIG. 39 is a flowchart showing a movement of a format encoder. In the beginning, when the encoding operation is started, it is judged that the encoding mode is in a hierarchical mode or not. When the mode is not the hierarchical mode, information is inserted into a system stream which information is representative of the fact that the mode is a non-hierarchical mode to follow the conventional stream structure. In the case of the hierarchical mode, the setting of the sequence header is confirmed. Specifically, the data of the sequence scalable extension is confirmed. When the data is written correctly, the front of the picture is recognized so that the I picture and four P pictures are separated into the data of the low-frequency component and the data of the high area component to detect respective data lengths.

In the meantime, the length of the data of the B picture is detected for each of the pictures. Further, a packet is prepared where only address information is recorded in the case where the data of the low-frequency component of the I picture and the P pictures area is arranged to follow the front of the GOP. In this packet, address information for the low-frequency component of the I picture and the P picture, the high-frequency component of the I picture of the four P pictures and ten B pictures are contained so that the data length for the respective data is recorded.

Consequently, the front position of respective data stream is obtained as a relative address with respect to the front of the GOP header from this data length. The packet containing this address information and the low-frequency component of the I picture and four P pictures as well as the remaining data are sequentially arranged to be formatted.

Out of them, the confirmation of the scalable mode on the scalable extension of the aforementioned sequence header refers to the confirmation of the scalable mode setting which is determined in the syntax of the MPEG2 of FIG. 40 and the confirmation of the description of the priority break point on the slice header. The priority break point is located at a predetermined number of events of FIG. 40 (corresponding to the aforementioned breaking point) and refers to the data representative of the boundary between the divided low-frequency component and the high-frequency component.

When a scramble mode assumes "00" it is shown that the following bitstream is a bitstream of a data partitioning. It is also shown that the bitstream which is divided into the low-frequency component and the high-frequency component continues. Then the B picture consists of the low-frequency component so that no high-frequency component is generated, the B picture is not divided.

One example of the bitstream which is generated in this manner is shown in FIG. 41. FIG. 41A shows a bitstream which is not hierarchized. When the bitstream is hierarchized with a circuit shown in FIG. 37, the bitstream is divided and hierarchized as shown in FIG. 41B. When this data is arranged in an array in consideration of this special playback, the low-frequency component of the I picture and the P picture is arranged at the front of the GOP as shown in FIG. 41C.

FIG. 41D shows a data arrangement in the case where address information is contained in the private packet as shown in a flowchart in FIG. 39. In this case, the address information may be represented with a relative address with respect to the front of the GOP header as described above. However, the address information may be represented in such a manner that which byte of which packet is the front of each picture. It goes without saying that the address information may be represented with a sector address on the disc as well.

Figure 42:
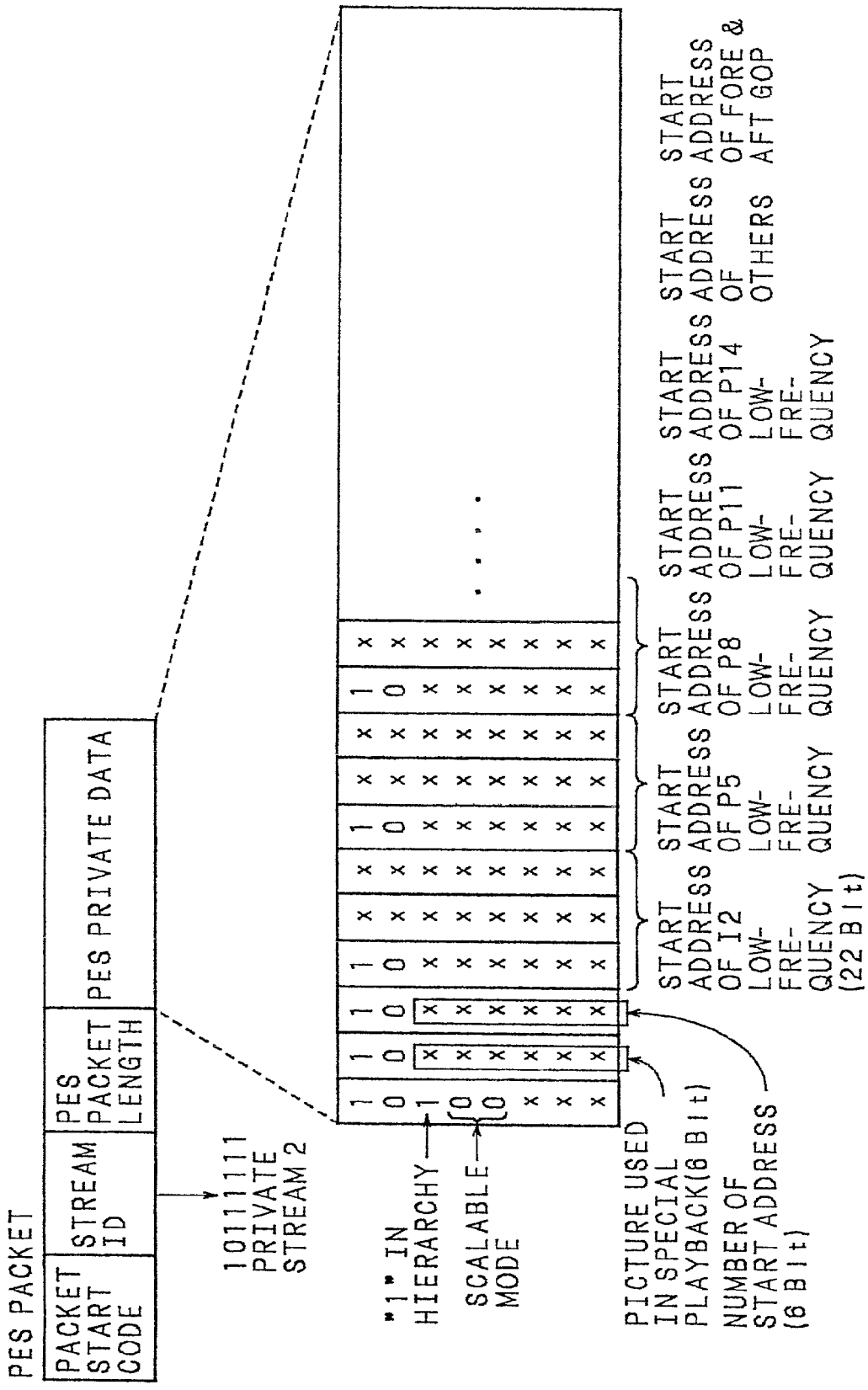
FIG. 42 is a view showing an example of address information of a system stream in embodiment 9.

FIG. 42 shows an example in which address information is contained in a private packet. When a packetized elementary stream (which is referred to as PES) packet is used as a private packet, the stream ID is specified in BF (hexadecimal number representation). After describing the packet length, the byte MSB is set to 1 and the subsequent bit is set to 0 so that the code does not become the same as all the start codes (start code of packet and the start code of the bitstream). Then the hierarchical mode, the kind of hierarchization, the kind of picture to be used at the time of the special playback, and the number of the start addresses or the like are described with the remaining six bits.

After that, the 21 bit long address information is described so that the GOP data amount can be represented up to a maximum length of 2 Mbytes. However, 100 (represented in binary representation) is inserted into the first 3 bits out of 21 bits of data so that the data does not become the same as the front 24 bits 000001 (hexadecimal representation) of the start code as described above. Here, the start address includes a start address of the low-frequency component of the I picture, a start address of the high-frequency component of four P pictures and a start address of the high-frequency component of the I picture, the high-frequency component of four P pictures, and a start address of ten B pictures. Further, a sector address on a disc where the data of the preceding and succeeding GOP is recorded is added to jump an optical head at the time of the special playback.

When the 1 bit parity is added to the 21 bit addresses, the reliability of the data is heightened. In this case, 10 (binary representation) may be added to the front with respect to 21 bits+1 bit. Further, in consideration of the high-speed times of the special playback, the variation in the high-speed times of the special playback is widened when the sector address of the several front and rear GOPs is added as well as the address of the preceding and succeeding GOP. Further, it is shown that address information is described in the private two packets of the PES packet. It goes without saying that the sector address may be written on other user areas or the like such as private descripter of a program stream map or the like.

Figure 43:
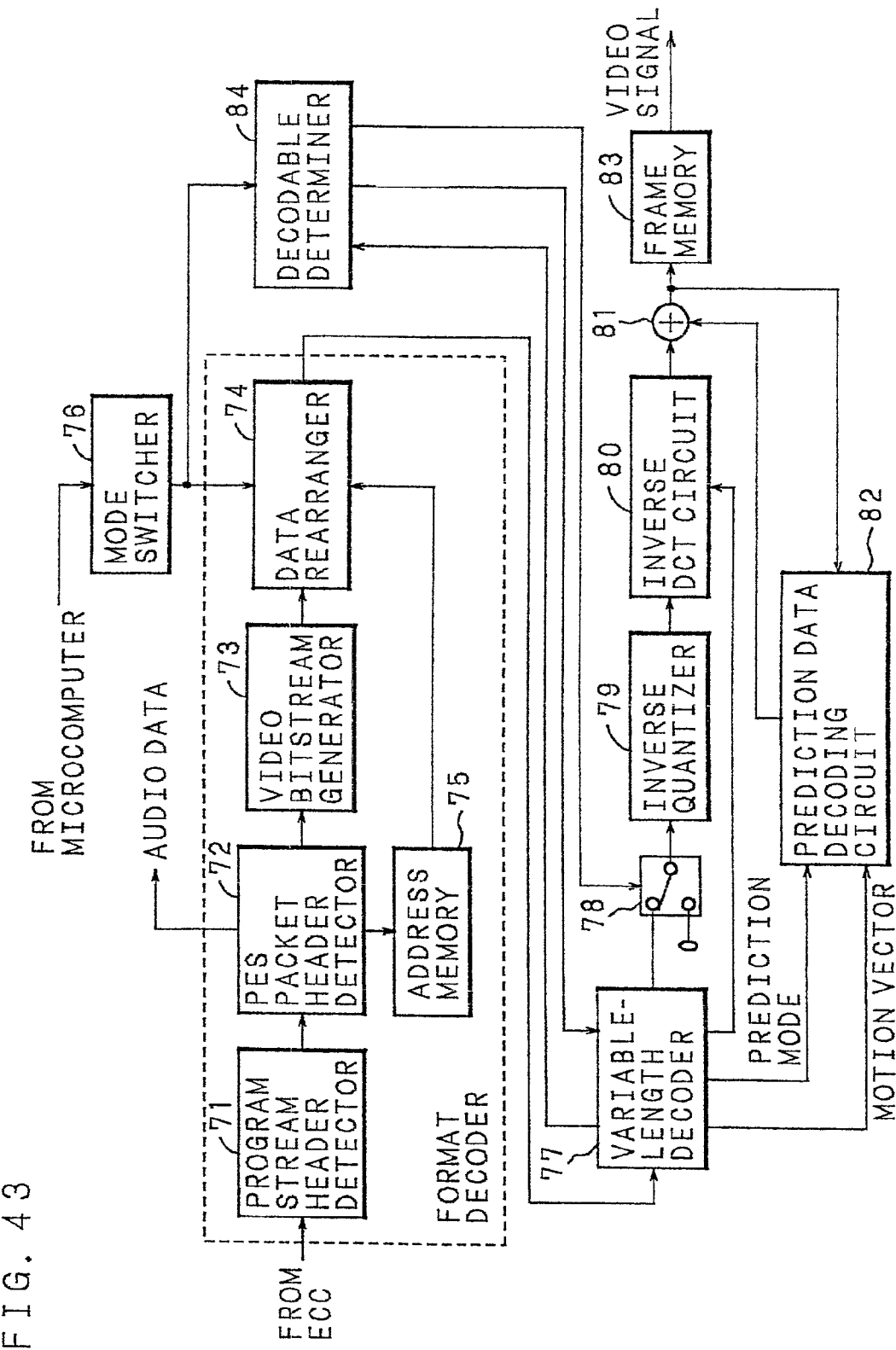
FIG. 43 is a block diagram of a digital video signal decoding unit in embodiment 9.
Figure 44:
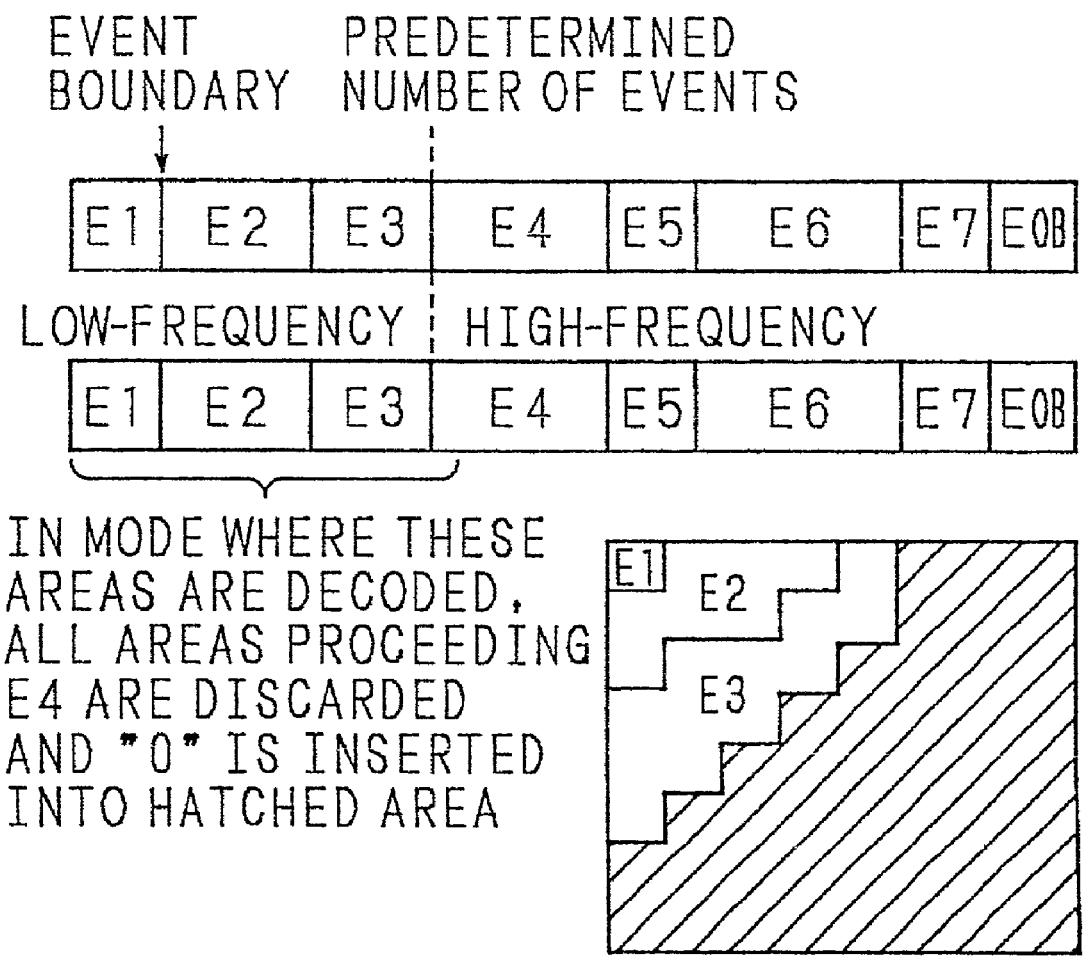
FIG. 44 is a view showing a concept of decoding processing in embodiment 9.

The playback side of embodiment 9 will be explained with respect to FIG. 43 and FIG. 44. FIG. 43 is a block diagram of a digital video signal decoding processing part. In FIG. 43, reference numeral 71 denotes a program stream header detector, 72 a PES packet header detector, 73 a video bitstream generator, 74 a data rearranger, 75 an address memory, 76 a mode switcher, 77 a variable-length decoder, 78 a switch, 79 an inverse quantizer, 80 an inverse DCT circuit, 81 an adder, 82 a prediction data decoding circuit, 83 a frame memory and 84 a decodable determiner. FIG. 44 is a view showing an operation concept of FIG. 43.

Figure 45:
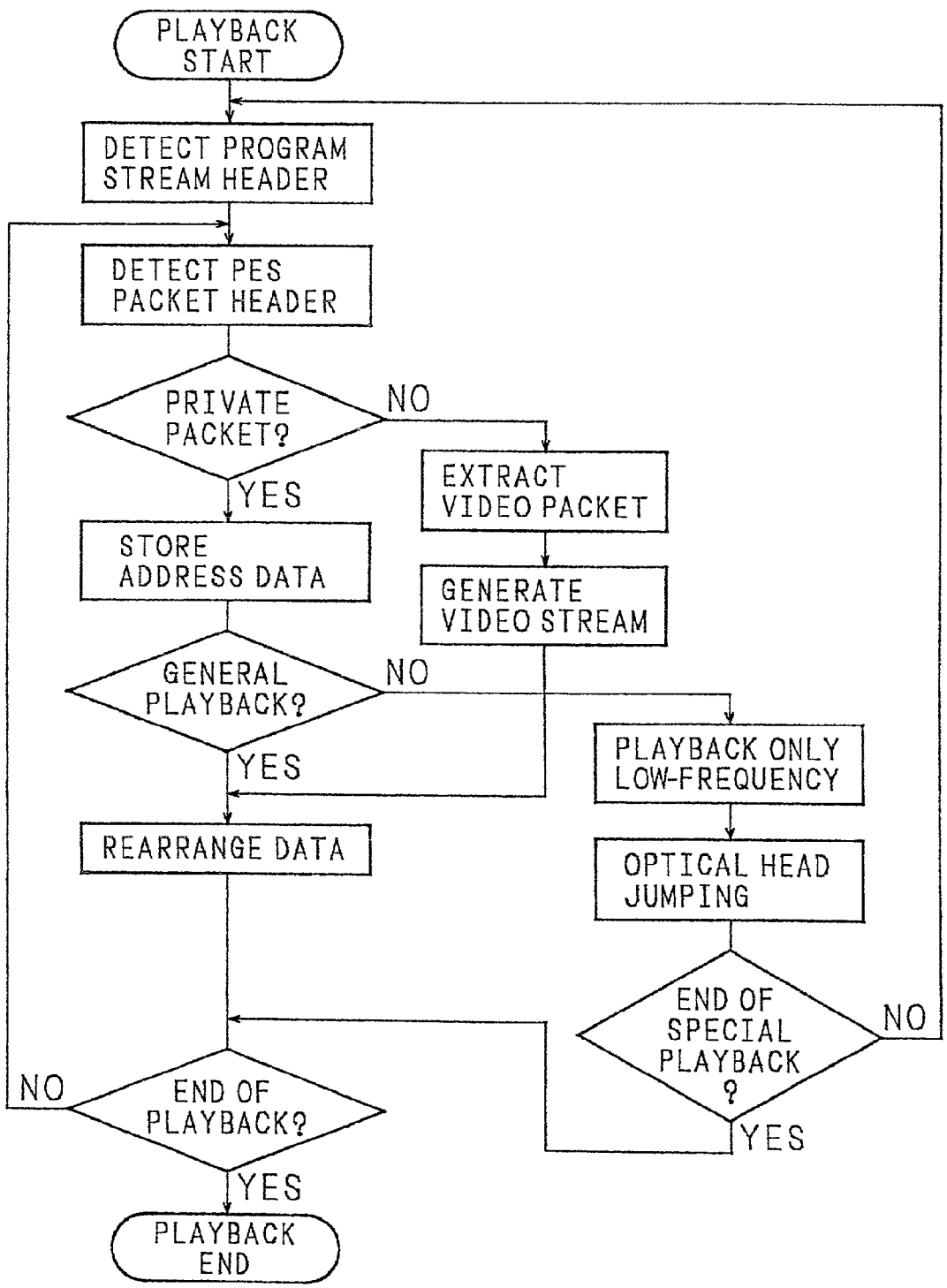
FIG. 45 is a flowchart of decoding processing in embodiment 9.

Next, an operation of FIG. 43 will be explained with respect to FIG. 45. FIG. 45 is a flowchart showing an operation of a format decoder at the time of the playback. The bitstream outputted from the ECC is detected the header of a program stream to be divided into each PES packet. Further, the PES packet header is detected to differentiate a private packet including address information and a video packet.

In the case of a private packet, the address information contained in the packet is extracted and stored. In the meantime, in the case of the video packet, the bitstream of the video data is extracted. Here, in the case of the normal playback, the data of the low-frequency component and the high-frequency component is extracted from the bitstream stream of the video data with respect to the I picture and the P picture so that the data is rearranged and a playback picture is outputted. In the meantime, at the time of the special playback, only the low-frequency component of the video data is extracted and played back. Here, after the low-frequency component is played back, the optical head is allowed to jump to the front of the subsequent GOP.

In this case, when these addresses are described in the video stream, the address information is extracted and stored after being converted into the bitstream. Consequently, in the case where the address information is described in the private descripter of the program stream map, the address information is extracted and stored at a level of the detection of the program stream header. It goes without saying that the address information may be either a relative address or an absolute address.

In actuality, a mode signal of such as skip search and a normal continuous playback or the like is inputted to the mode switcher 76. In the meantime, a playback signal from a disc or the like is amplified by an amplifier so that the signal is played back with a clock which has been subjected to a phase synchronization and outputted from a PLL or the like. Next, a differentiation operation is performed for digital demodulation. Then, after an error correction processing is performed, the program stream header detector 71 obtains data information that follows the header.

Further, the PES packet header detector 72 detects, for example, address information for each picture described in the private 2 packet of the PES packet and address information of the data for the special playback and the information is stored in the address memory 75. Here, the PES packet for the audio, the PES packet for such as characters or the like and the PES packet for the video are classified so that only the packet for the video is outputted to the video bitstream generator 73.

Here, the video bitstream generator 73 erases added information from the PES packet and constructs a bitstream. Specifically, the data such as each kind of control code and the time stamp is eliminated. After this, in accordance with the address information obtained from the address memory 75, with the output of the mode switcher 76, the bitstream is rearranged at the time of the normal playback by the data rearranger 74.

The output (control signal) of the mode switcher 76 is supplied to the data rearranger 74 and the decodable determiner 84. The data rearranger 74 either reconstructs the data before the division from the low-frequency component and the high-frequency component divided and hierarchized by obtaining the control signal. Otherwise, only the low-frequency component is outputted to the variable-length decoder 77. In other words, each of the low-frequency components is synthesized with the high-frequency component at the time of the normal playback so that the device is operated in such a manner that the data is rearranged in an order of the original picture. At the time of the special playback, either the low-frequency component only of the I picture or the low-frequency component of the I picture and the P picture is outputted depending on the high-speed times.

At the time of the special playback that allows the passage only of the low-frequency component, the time stamp is not used. In contrast, the variable-length decoder 77 extracts the boundary of the events in the low-frequency component area designated by the priority break points of the slice header together with the decodable determiner 84 so that the data is decoded up to the boundary and is outputted to the switch 78. This switch 78 is connected so that zero is not inserted at the time of the normal playback. In the meantime, at the time of the special playback, the switch 78 is controlled with the decodable determiner 84 so that zero is inserted into the high-frequency component area after the priority break point at the time of the special playback.

The aforementioned operation will be explained with respect to FIG. 44. Referring to FIG. 44, when the partitioning breaking point is E1 through E3, E1 through E3 is stored in the stream of the low-frequency component. E4 through EOB are stored in the stream of the high-frequency component. In the stream of the low-frequency component, the low-frequency component data in the subsequent DCT block following E3 is stored.

Here, at the time of the normal playback, the data rearranger 74 extracts the data E1 through E3 from the low-frequency component stream and the data E4 through EOB from the high-frequency component stream. Further, the data rearranger 74 extracts the data respectively to reconstruct the DCT data in sequency. In contrast, at the time of the special playback, the data rearranger 74 extracts the data E1 through E3 followed by variable-length decoding by the variable-length decoder 77, the decodable determiner 84 detects the priority break point so that zero is inserted into a portion provided with a hatching shown in FIG. 44 to constitute a DCT block by using only a low-frequency component.

The data which is converted into the DCT block is decoded in accordance with the motion vector. Here, an explanation of the decoding by the motion vector will be omitted because the decoding is the same as the conventional example. However, the reference used in the decoding of the P picture at the time of the special playback is decoded by using the I picture or the P picture which is decoded only with the low-frequency component.

The data which is decoded in the unit of block is inputted to the frame memory 83. Here, the frame memory 83 restores the picture in the original order of the structure of the GOP, and outputs through the conversion from the block scan to the raster scan. Incidentally, the frame memory 83 can be commonly used with the memory incorporated in the prediction data decoding circuit 82.

The coding area is defined at the boundary of the events, but it goes without saying that the definition of the boundary can be made by other methods. In other words, the high efficiency coded data of the picture may be divided either with the quantization or the division of the space resolution in addition to the division of the frequency area.

At this time, data more important as a picture is data of the low-frequency area in the case of the frequency division. In the case of the division of the quantization, the data refers to data coded by a rough quantization. In the case of the data divided with the space resolution, the data refers to the data obtained by coding the thinned picture. In this case, in the playback picture decoded by using only these data items, the area which can be easily perceived by men is defined as important data. In other words, one high efficiency coded data is divided into basic and important data and data which is not so important (this process is referred to as hierarchization) so that only basic and important data can be played back at the time of the special playback when the data is played back from the disc.

Embodiment 9 describes a case in which the recording side corresponds to the playback side. It is also considered that in the case where the record and the playback is combined in a set such as a hard disc or the like, only the playback side is considered on the presupposition that the data is recorded in accordance with the concept of the conventionally available compact disc or the like.

Embodiment 10

Figure 46:
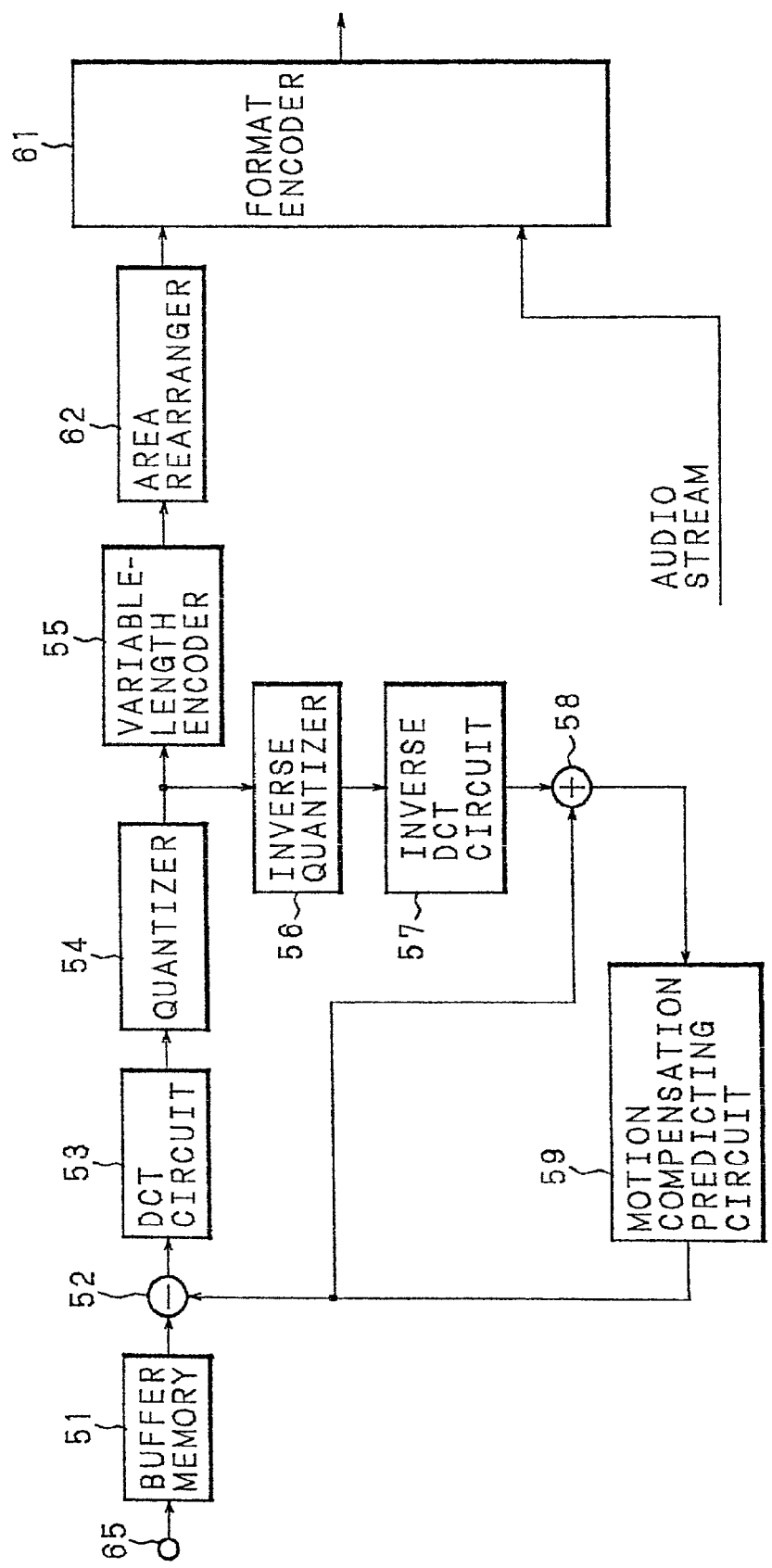
FIG. 46 is a block diagram of a digital video signal coding unit in embodiment 10.

Next, embodiment 10 of the present invention will be explained. FIG. 46 is a block diagram showing a record system of the digital video signal record and playback device according to embodiment 10 of the present invention. Like numerals in FIG. 46 denote like parts or corresponding parts in FIG. 37. Reference numeral 65 denotes an input terminal, 51 a buffer memory, 52 a subtracter, 53 a DCT circuit, 54 a quantizer, 56 an inverse quantizer, 57 an inverse DCT circuit, 58 an adder, 59 a motion compensation predicting circuit, 55 a variable-length encoder, 62 an area rearranger, and 61 a format encoder.

Figure 47:
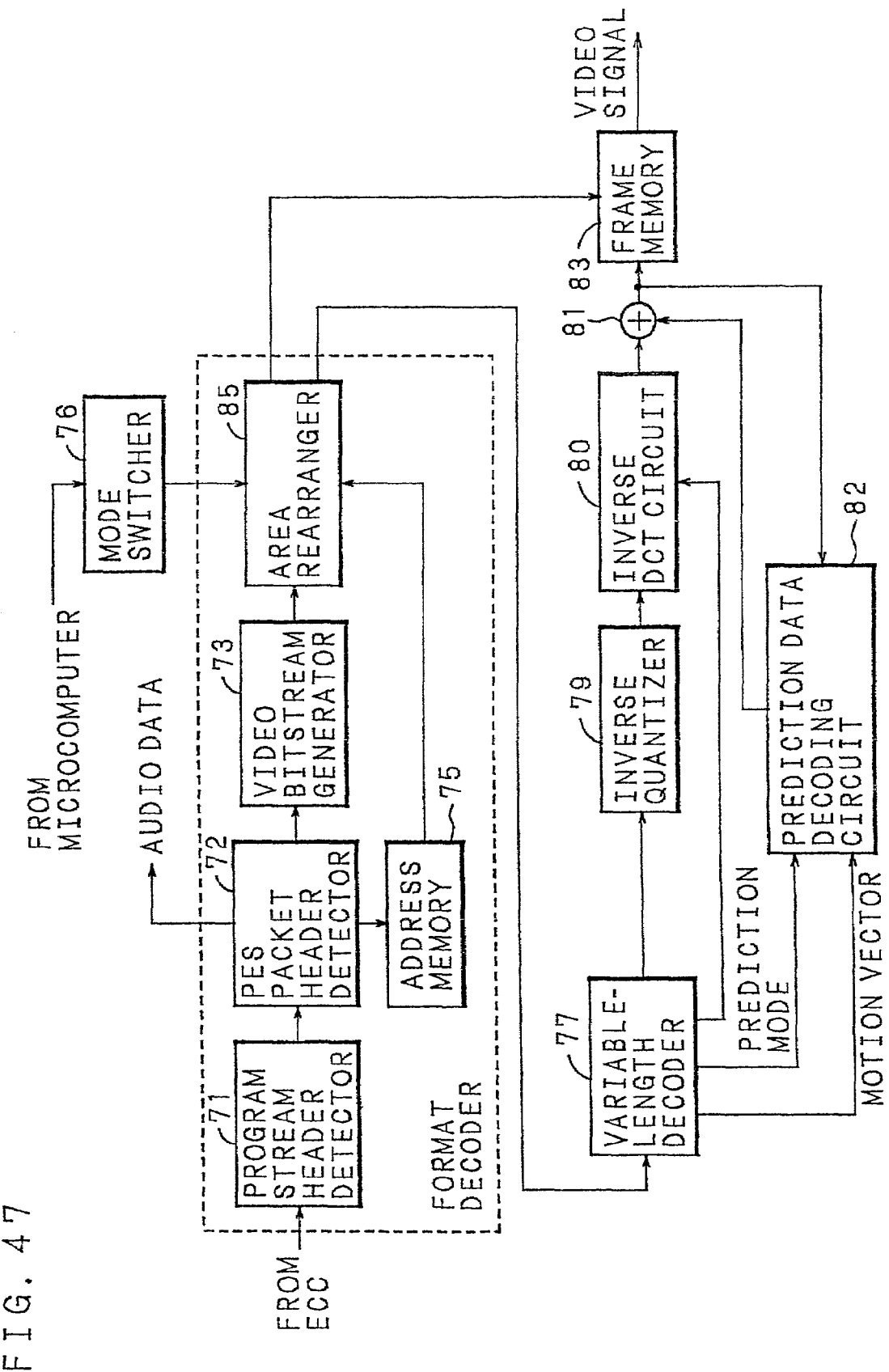
FIG. 47 is a block diagram of a digital video signal decoding unit in embodiment 10.

FIG. 47 is a block circuit diagram showing a playback system of a digital video signal record and playback device according to embodiment 10 of the present invention. Like numerals in FIG. 47 denotes like parts or corresponding parts in FIG. 43. Reference numeral 71 denotes a program stream header detector, 72 a PES packet detector, 73 a video bitstream generator, 85 an area rearranger, 75 an address memory, 76 a mode switcher, 77 a variable-length decoder, 79 an inverse quantizer, 80 an inverse DCT circuit, 81 an adder, 82 a prediction data decoding circuit, and 83 a frame memory.

Next, an operation of embodiment 10 will be explained. The digital video signal is inputted in the unit of line from the input terminal 65, and is supplied to the buffer memory 51. Here, an operation from the buffer memory 51 to the variable-length encoder 55 is the same as the aforementioned example, and an explanation thereof will be omitted.

Figure 48:
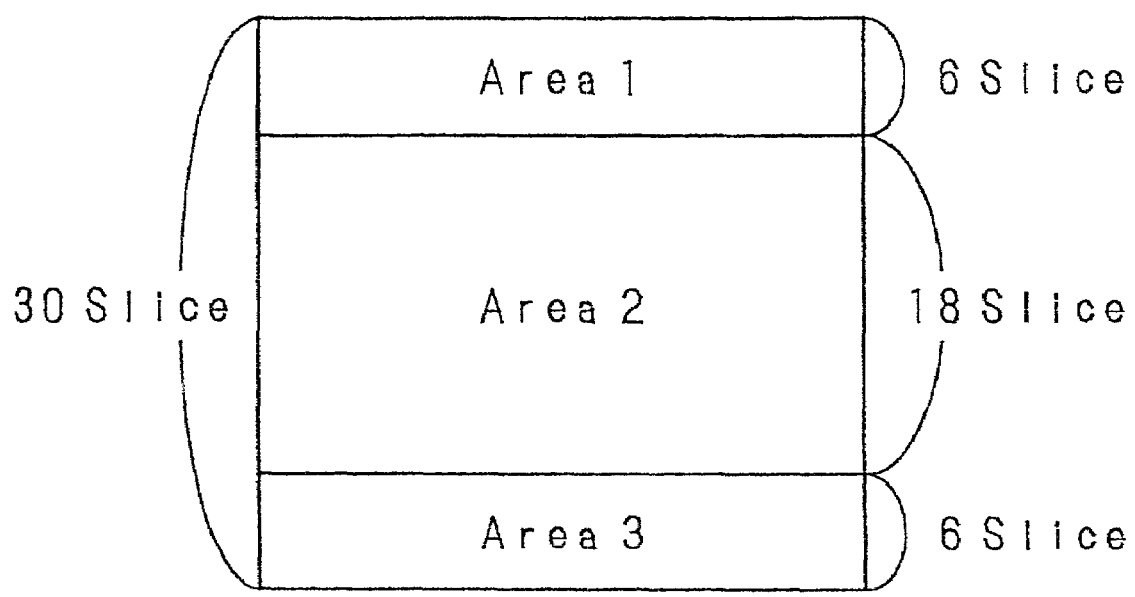
FIG. 48 is a view showing an example of an area of a screen in embodiment 10.

The area rearranger 62 rearranges data with respect to the I picture in a bitstream of video data outputted in the unit of GOP from the variable-length encoder 55, so that an area located at the central part of the screen is arranged at the front of the bitstream. Here, the I picture is divided into three areas as shown in FIG. 48. The data of the I picture corresponding to the areas 1 through 3 are defined as I(1), I(2), and I(3). However, each area shown in FIG. 48 is a collection of a plurality of MPEG slice layers. In FIG. 48, the area 1 and 3 consists of six slices and the area 2 consists of 18 slices.

Figure 49:
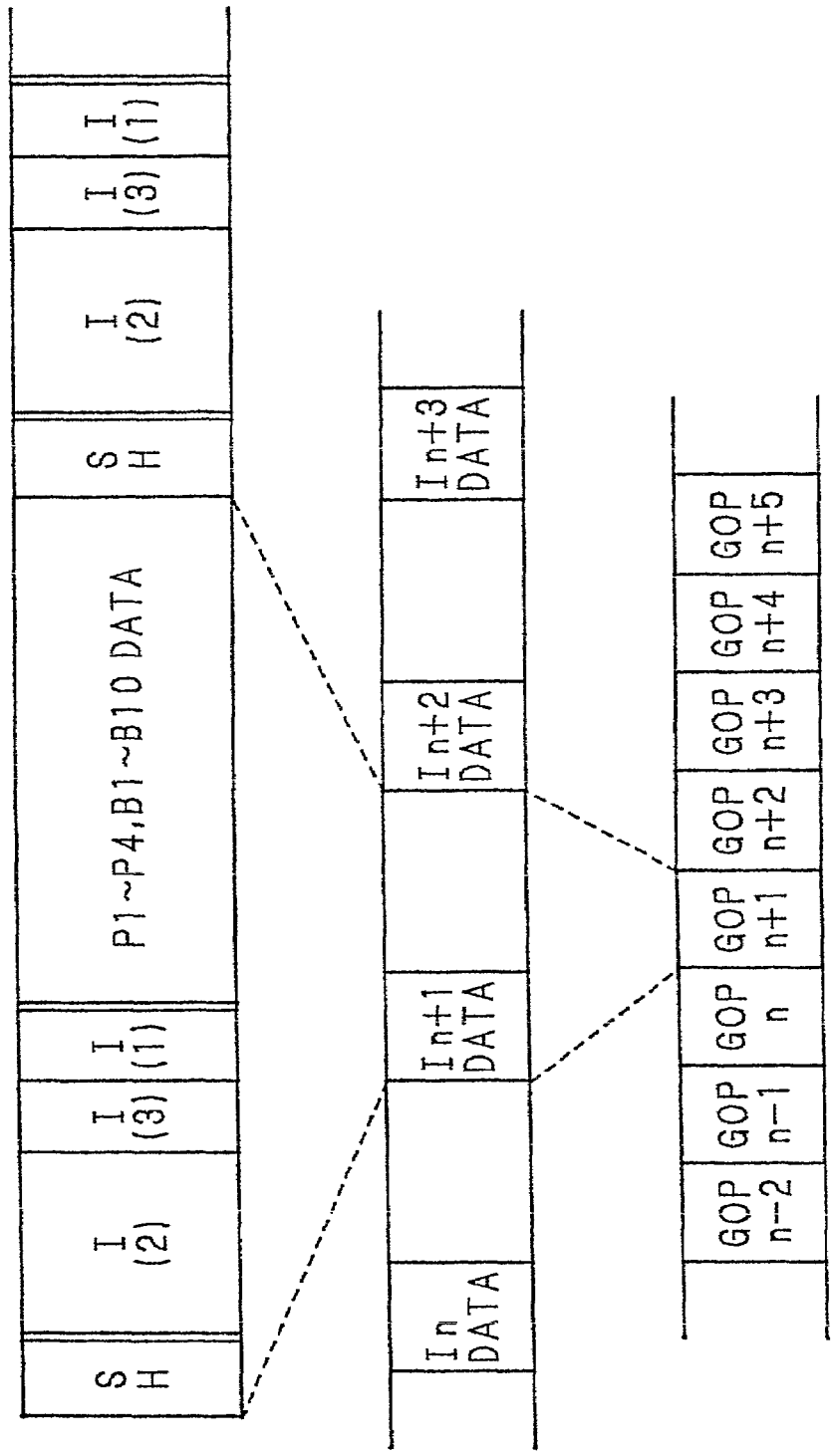
FIG. 49 is a view showing an example of a bitstream when the video data is rearranged in the unit of area of the screen in embodiment 10.

In actuality, the area rearranger 62 detects the slice header of the I picture on the bitstream and classifies each slice into three areas shown in FIG. 48 thereby forming a bitstream for each of the areas for rearranging the bitstreams arranged for each of the areas. In other words, as shown in FIG. 49, the bitstreams are rearranged in the unit of area so that the bitstream is arranged in the order of I(2), I(3) and I(1) at the front of the GOP. Further, the rearranged bitstreams are outputted to the format encoder 61 in the unit of GOP.

Figure 50:
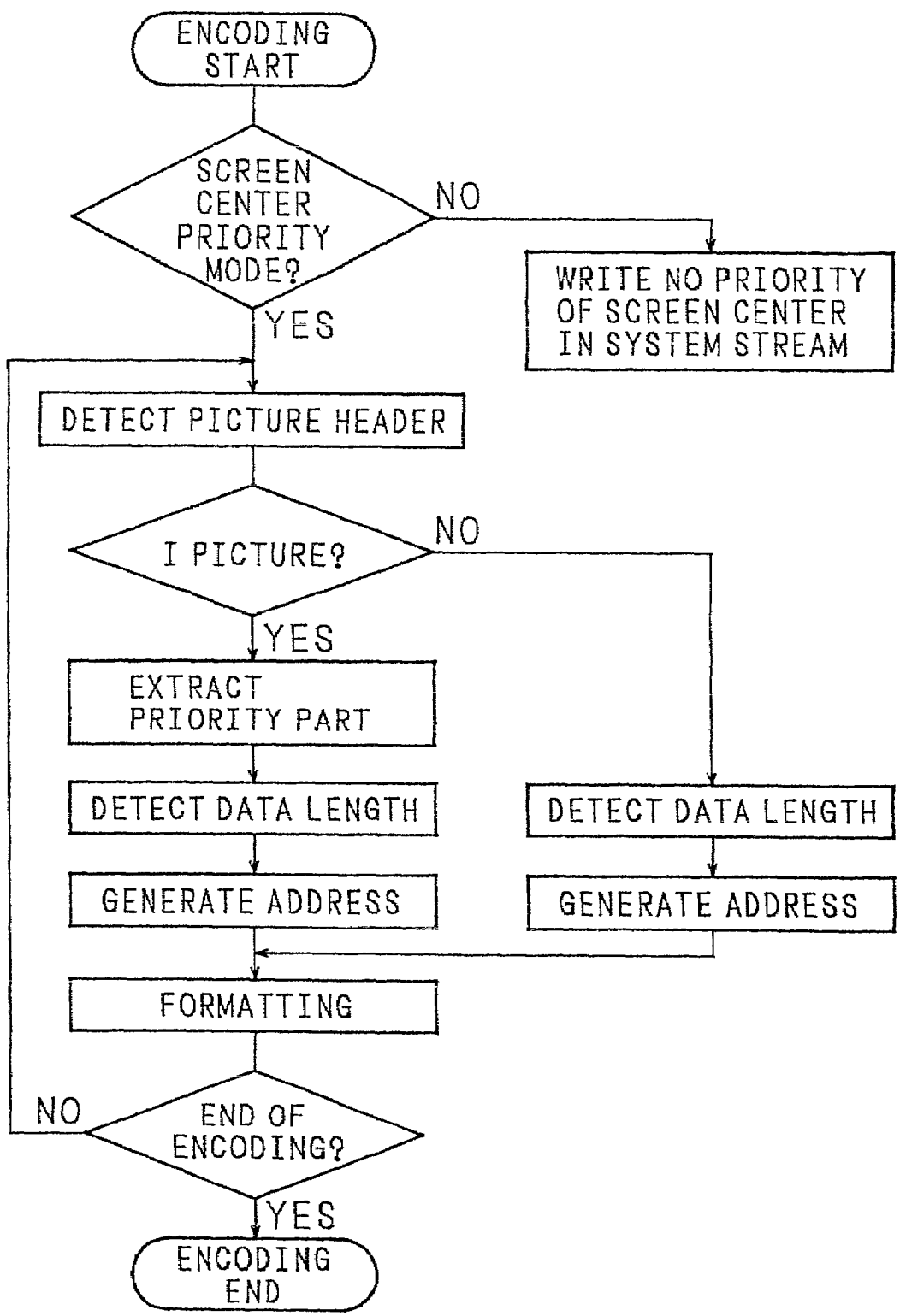
FIG. 50 is a flowchart of a digital video signal coding processing in embodiment 10.

Next, an operation of the format encoder 61 will be explained in accordance with FIG. 50. FIG. 50 is a flowchart showing an algorithm for formatting the video data into the PES packet in the unit of GOP. In the case of the screen central part priority mode, the picture header of the bitstreams to be inputted is detected and the picture information is detected. Here, in the case of the I picture, the central parts of the screen I(2), I(3) and I(1) shown in FIG. 49 are extracted and respective data lengths are detected so that the data length of each area thus detected is converted into a binary number of 24 bit width thereby preparing an address information. On the other hand, the data lengths are detected in the unit of picture with respect to the P picture and the B picture so that the data lengths are converted into a binary number of 24 bit (3 bytes) width thereby preparing address information.

Further, the formatting unit collects the input address information and the bitstreams of the video data into two kinds of the PES packets. In other words, the PES packet having only the address information and the PES packet having only the audio are constituted.

Figure 51:
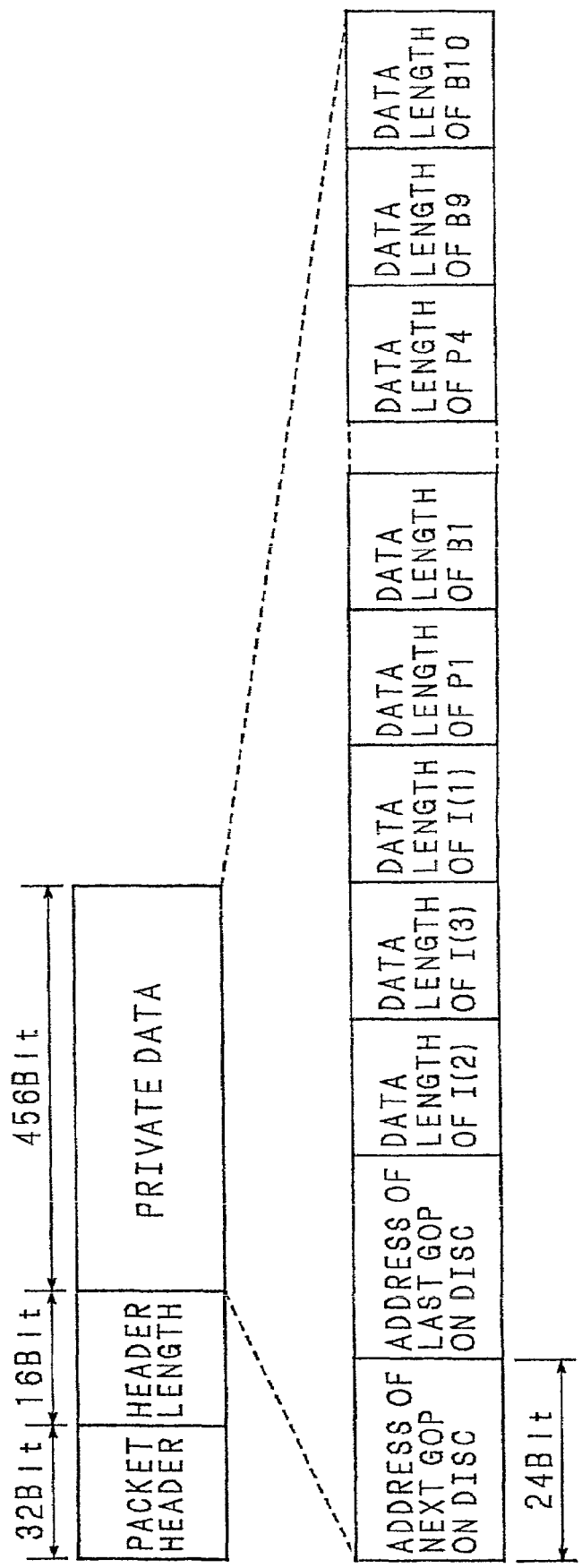
FIG. 51 is a view showing an example of address information of a system stream in embodiment 10.

Consequently, when one GOP consists of 15 frames as shown in FIG. 6, there are 17 kinds of pictures as the address information, such as three kinds of I pictures, four kinds of P pictures, 10 kinds of B pictures. Further, as address information at the time of the special playback, there are two kinds of address information of the preceding and succeeding GOP on the disc (absolute addresses on the disc) These items of the address information are collected in one packet and are formatted as the PES packet. In actuality, these items of address information are collected in one packet and are formatted as a private 2 packet of the PES packet shown in FIG. 51. In FIG. 51, the absolute address on the preceding and succeeding GOP on the disc is arranged at the front of the packet data. Then, the address information of each picture is arranged in order. However, since 3 bytes (24 bits) long information is assigned to each address information, the packet has a length of 57 bytes.

In the meantime, with respect to one GOP portion of bitstreams other than the address data, the bitstreams are formatted into PES packets (video packets) by dividing the bitstreams into a plurality of packets and adding header information such as synchronous signals or the like.

Figure 52:
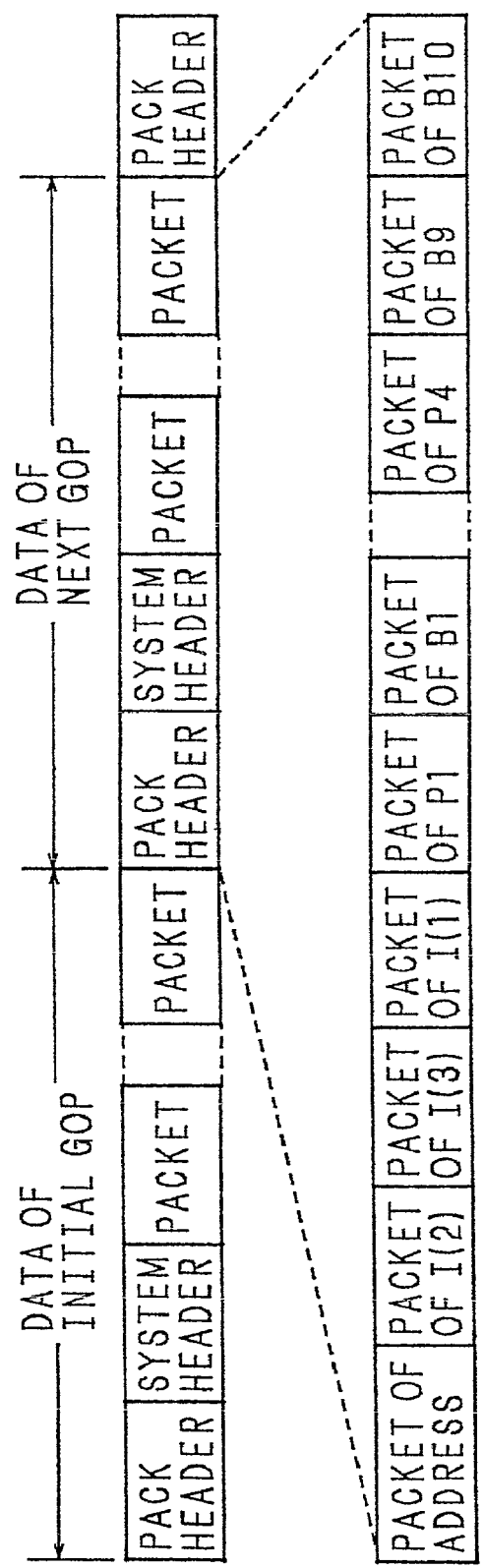
FIG. 52 is a view showing an example of a system stream in embodiment 10.

In addition, the format encoder 61 divides the bitstreams of the inputted audio data into PES packets to constitute an MPEG2-PS system stream together with the PES packets of the video data. In actually, as shown in FIG. 52, the bitstreams of one GOP portion of the video data and the bitstreams of the audio data are divided and arranged into a plurality of packets in one pack. In this case, a packet representative of the aforementioned address information is arranged at the front packet of the system stream as shown in FIG. 52. Subsequently, the device is constituted in such a manner that the packet containing the bitstream at the central part of the screen of the I picture is arranged.

Next, an operation at the time of the playback will be explained with respect to FIG. 47. In FIG. 47, since an operation of the program stream header detector 71, the PES packet header detector 72, the video bitstream generator 73 and the mode switcher 76 is the same as conventional examples, an explanation thereof will be omitted.

In the decoded video bitstreams, the data at the central part of the screen of the I picture is located at the front of the bitstream. Consequently, the area rearranger 85 rearranges the I picture data in the order of I(1), I(2) and I(3) for each area in accordance with the data length of bitstreams of I(2), I(3) and I(1) which is outputted from the address memory 75. The rearranged bitstreams are inputted to the variable-length decoder 77 to be decoded into the block data, the motion vector or the like. Here, since an operation which follows the variable-length decoding at the time of the normal playback is the same as conventional examples, an explanation thereof will be omitted.

In a high speed playback, since one GOP portion of data is assigned to one pack of a system stream as described above, there is considered a method by which an optical head jumps to the front address of each GOP when reading data from a disc to read only the data of the I picture which is arranged at the front of the system stream so that the optical head jumps to the front of the subsequent GOP. In such a case, the PES packet is detected which has a record of address information arranged at the front of th system stream to control the disc drive by decoding the address on the disc of the subsequent GOP and the address information of the I picture.

In the case shown in FIG. 6, when all the I pictures in each GOP can be read within one frame, a 15 times high-speed playback can be realized. When the I pictures in each GOP are read within 2 frames, a 7.5 times high-speed playback can be realized. In this manner, when the higher speed of playback can be realized, time for reading data from the disc becomes shorter.

Further, in the case where data is read from the recording medium such as an optical disc or the like, even if the front address is known, there arises disc rotation waiting time at the time when the optical head jumps to a location of the disc where the data is actually recorded. Further, when the video signal is coded with a variable rate, the amount of information of the I picture is not definite and time required for reading the I picture also varies. Consequently, when the speed in the high-speed playback becomes higher, time for reading data on the disc becomes shorter. Further, since the waiting time for the disc rotation is not definite, it becomes impossible to read stably the whole data of the I picture.

Consequently, in embodiment 10, the optical head jumps to the front of the GOP in the unit of a definite time with respect to the data recorded in the unit of GOP on the recording medium such as an optical disc or the like at the time of the high-speed playback. Thus the data part of the I picture is read from the disc. In this case, even if the whole data of the I picture cannot be read, the optical head jumps to the front of the subsequent GOP. In other words, the optical head jumps to the front address of each GOP in the unit of a certain time to read data as much as possible from the front of the system stream and then jumps to the front of the subsequent GOP.

In this case, the PES packet including the address on the disc or the like of the subsequent GOP and the PES packet including the data at the central part of the I picture are arranged at the front part of the system stream. Consequently, even in the case where the whole data of the I picture can not be read at the time of the special playback, at least the address on the subsequent GOP disc and the data at the central part of the I picture can be decoded, the address and the data being required for controlling the disc drive.

In the case where only the central part of the screen can be decoded at the time of the special playback, only the data which can be decoded by the area rearranger 85 is outputted to the variable-length decoder 77 so that the variable-length decoded video data is inputted to the frame memory 83 through the inverse quantization and inverse DCT. In the meantime, the area rearranger 85 inputs the area information which cannot be decoded into the frame memory 83. With respect to the area which cannot be decoded, the data outputted in the preceding frame is held as it is and is outputted.

FIG. 53 shows one example of playback picture in the case where a high-speed playback is performed by playing back only the I pictures from the nth GOP to the n+4th GOP. FIG. 53A shows a case in which the whole I picture can be decoded. FIG. 53B shows a case in which areas 2 and 3 can be decoded. In the area 1 which cannot be decoded, the value in the preceding frame is held as it is and outputted. In addition, FIG. 53C shows a case in which only the area 2 can be decoded. In the areas 1 and 3, the value in the preceding frame is held as it is.

Here, in the general video signal record and playback device, a format is adopted in which the I picture is recorded in the unit of frame at the time of recording. In contrast, in FIG. 52, the area located at the central part of the screen out of the I picture data which is divided into three parts is arranged at the front of one GOP by giving a priority to the area. Consequently, even in the case where the area of only part of the I picture can be read from the disc in a definite time at the time of the special playback, the playback picture at least at the central part of the screen can be outputted.

As described above, in embodiment 10, as shown in FIG. 52, with respect to the I picture for use in the special playback, data of the area located at the center of the screen is arranged at the front of one GOP so that the area is given a priority to be recorded on the recording medium so that the area 2 located at the central part of the screen is given a priority to be played back even when the speed in high-speed playback is high so that the content of the high speed playback picture is easy to see. Further, the special playback is performed in which the optical head jumps to the front of the GOP in the unit of a definite time with the result that an output screen can be renewed at a predetermined high-speed.

Incidentally, the aforementioned embodiment may be constituted so that data of an area that can be decoded at the time of the special playback is all outputted, and for the area whose data cannot be decoded, the data of the preceding frame is held as it is. However only the central part of the screen may be played back at the time of the special playback.

In this case, the area rearranger 85 decodes the data only of the area of the I picture which is read from the disc. With respect to the areas 1 and 3 whose data is not decoded, for example, it is masked by a gray data to output a high speed playback picture at the frame memory 83.

FIG. 54 shows a playback picture in the case where only the area 2 of the I picture from the nth GOP to the n+4th GOP is played back for the high speed playback. In FIG. 54, the areas 1 and 3 on both ends of the screen in FIG. 54 are masked by gray data. Further, even in the case where the information amount of the I picture is small, the waiting time for the disc rotation is short, and sufficient time is available for reading the data of the areas 1 and 3, the data of the areas 1 and 3 are not decoded.

This is because the high speed playback picture becomes unnatural if the data of the areas 1 and 3 are outputted on the screen only when they can be read, and the areas 1 and 3 are not renewed in a certain interval. Consequently, when only the central part of the screen of the I picture is played back at the time of the special playback, the area to be renewed becomes constant so that the playback picture becomes free from unnaturalness.

Further, in the aforementioned embodiment, only the area of the central part of the I picture which can be decoded at the time of the special playback is displayed to mask both ends of the screen. However, the central part of the screen may be extended to a size of one screen and outputted.

Figure 55A:
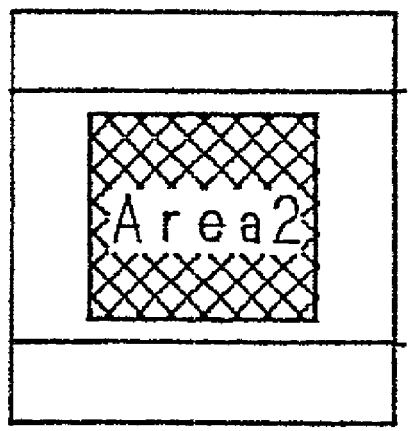
FIGS. 55A and 55B are views showing an example the playback screen in embodiment 10 in which an area in the central part of the screen is magnified and displayed.
Figure 55B:
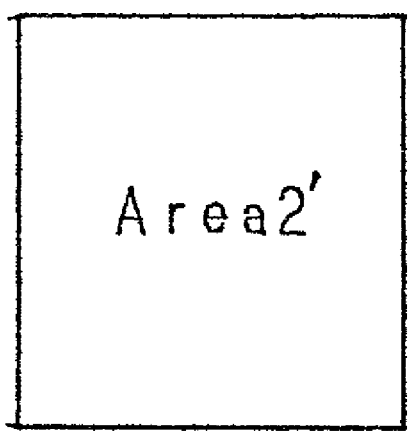

In this case, in the frame memory 83, the data of the decoded area 2 is extended to a size of one screen as shown in FIG. 55. However, in the case of FIG. 55, the central part (FIG. 55A) of the area 2 surrounded by a dot line is extended to double the size by linear interpolation in the horizontal and vertical directions. In other words, in the case of FIG. 55, the part surrounded by a dot line has a size of horizontal 360 pixels×vertical 240 lines. This dot part is extended by linear interpolation to a size of one screen consisting of horizontal 720 pixels×vertical 480 lines.

Accordingly, when only data of the area of the central part of the screen is decoded at the time of the special playback to extend the central part to a size of one screen. The area whose data is outputted become small. In this way, however, the masked part at the both ends of the screen which is conspicuous when only the central part of the screen is outputted can be eliminated.

In the aforementioned embodiment, only the central part of the screen of the I picture is given priority to be arranged on the bitstream. However, another constitution is also possible in which the central part of the screen of the P picture as well as that of I picture are given priority. In this case, the data of the central part of the screen of the P picture is arranged after the bitstream of the I picture.

In the aforementioned embodiment, the picture data is rearranged in the unit of area after the data is converted into the bitstreams. However, the picture data may not necessarily be rearranged after the data is converted into the bitstreams. The picture data may be rearranged before the data is converted into the bitstreams.

Figure 56:
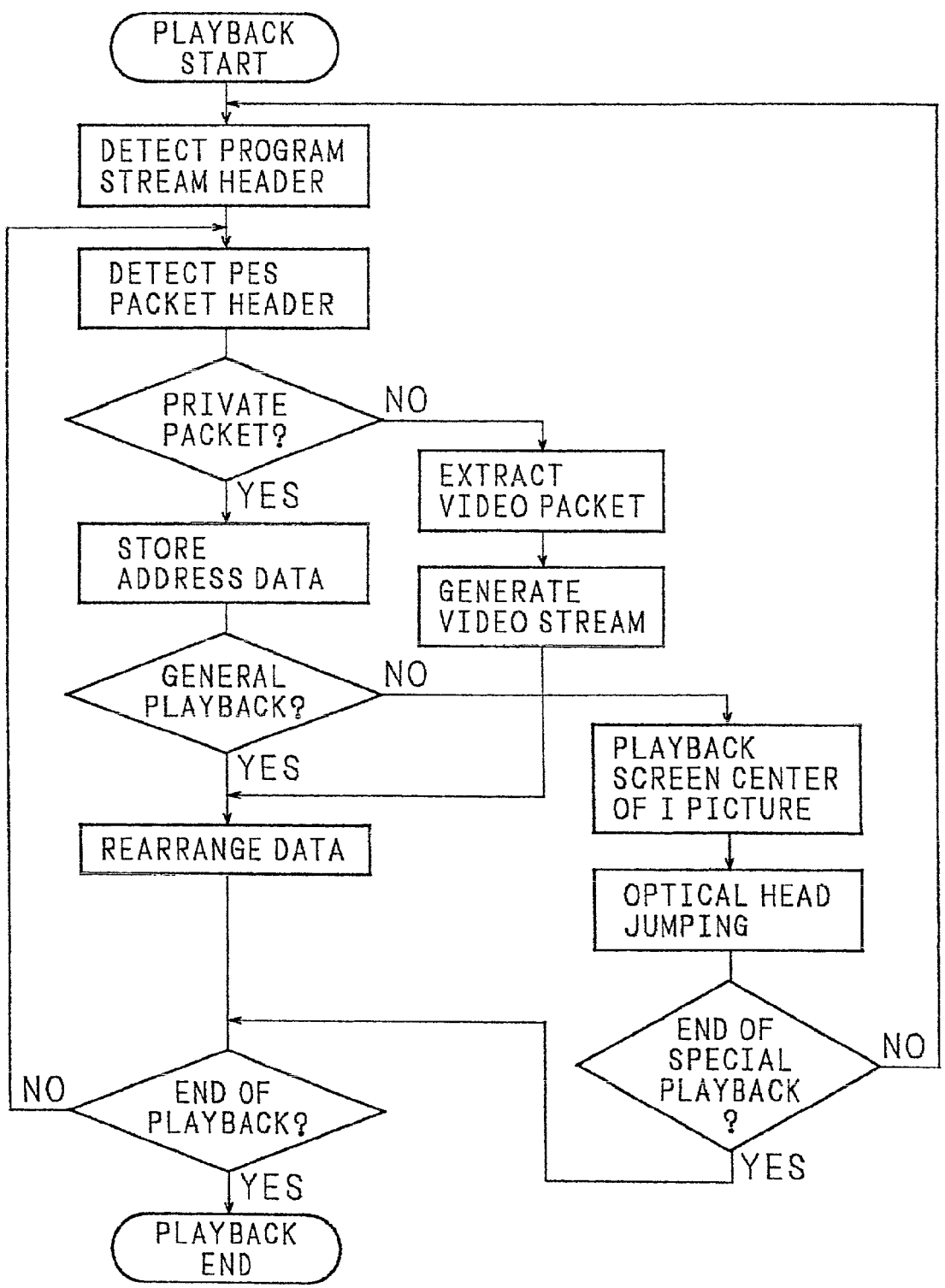
FIG. 56 is a flowchart of a digital video decoding processing in embodiment 10.

FIG. 56 shows a flowchart of the playback side of embodiment 10. The procedure of the flowchart is already described above and is omitted here.

Embodiment 10 is described by corresponding the recording side with the playback side. There is also considered a case in which the record and playback constitute a pair like a hard disc. There is also considered a case where the playback side on a presupposition that data is recorded in accordance with the supposition like a current compact disc. Further, it goes without saying that the data rearrangement of the screen in the unit of area can be realized in the prediction data decoding circuit 82 and the frame memory 83 by using the data of the lower 8-bit long slice vertical position of the slice start code in the slice head.

Embodiment 11

Figure 57:
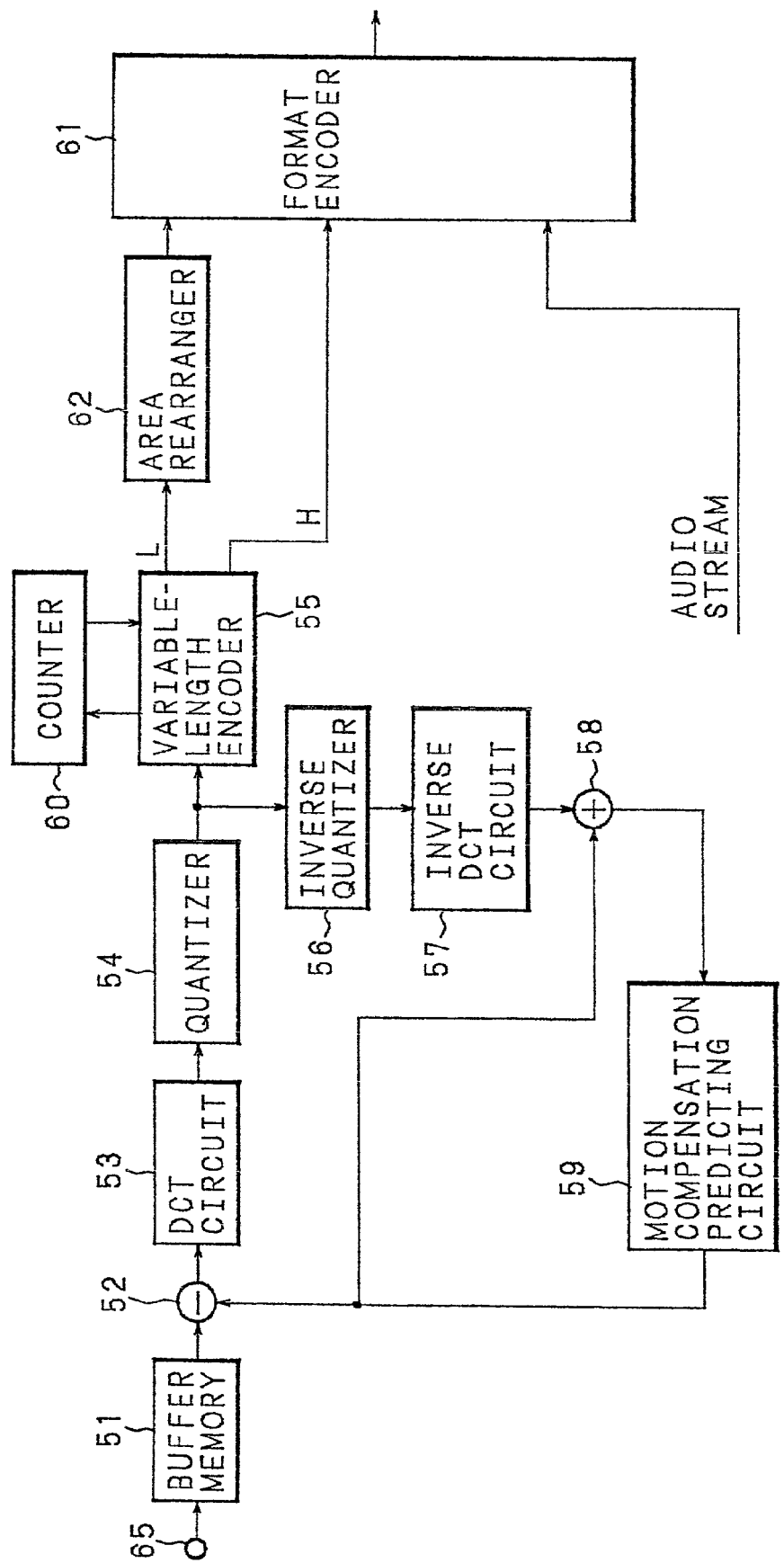
FIG. 57 is a block diagram of a digital signal coding unit in embodiment 11.

Next, embodiment 11 of the present invention will be explained. FIG. 57 shows a digital video signal coding processing unit in a digital video signal record and playback device wherein the DCT block is hierarchized into a low-frequency are and a high-frequency area. Further, FIG. 57 is a block diagram on the recording side in which the screen is divided into a plurality of areas so that the central part of the screen of the low-frequency area is given a priority to be arranged at the front of the GOP. In FIG. 57, reference numeral 62 denotes an area rearranger. Like parts and corresponding parts in FIG. 57 are denoted by like numerals and an explanation thereof will be omitted.

Next, an operation of the device will be explained. This video data to be inputted includes an effective screen size with horizontal 704 pixels×vertical 480 pixels. The motion compensation and the DCT are used to apply high efficiency coding to the picture data. Here, the operation up to the data division and hierarchization is the same as embodiment 9, and an explanation thereof will be omitted.

Embodiment 11 is the same as embodiment 9 in that the data may be divided with the quantification and space resolution as well as with the frequency area with respect to the division hierarchization. In embodiment 11, important data further divided and hierarchized with the data rearranger 62 is divided for each area of the screen as shown in embodiment 10 so that the central part of the screen is given a priority to be arranged at the front of the GOP. In other words, the data is divided into important data and data which is not important so that the data is recorded on the disc in the priority order which is preliminarily determined in an area.

In this manner, the low-frequency components of the I picture and the P pictures are divided so that the central part of the screen is given a priority in the arrangement. When only the central part of the screen of these low-frequency components are read and played back at the time of the special playback, the data amount which is read at the time of special playback will be largely decreased. Consequently, an allowance can be made for the reading speed from the recording medium so that an extremely fast skip search can be actualized at a speed of more than ten times speed or tens of times speed.

Here, the central part of the screen of the low-frequency of the screen is arranged at the front of the GOP, and the data of the P pictures are arranged following the data of the peripheral part of the screen in the low-frequency area of the I picture with the result that a high-speed playback can be realized at more than ten times speed or tens of times of speed by playing back only the central part of the screen in the low-frequency of the I picture. Further, the central part of the screen for the low-frequency component of the I picture and the P picture for the special playback has a small amount of data so that the data in the central part of the screen can be easily read and decoded from the disc. Thus a high-speed playback can be realized at several times speed. In other words, since the data amount at the central part of the screen for the low-frequency component of the I picture and the P picture has a smaller amount of data than that of entire low-frequency component, the special playback can be realized at a speed faster than embodiment 9.

Figure 58:
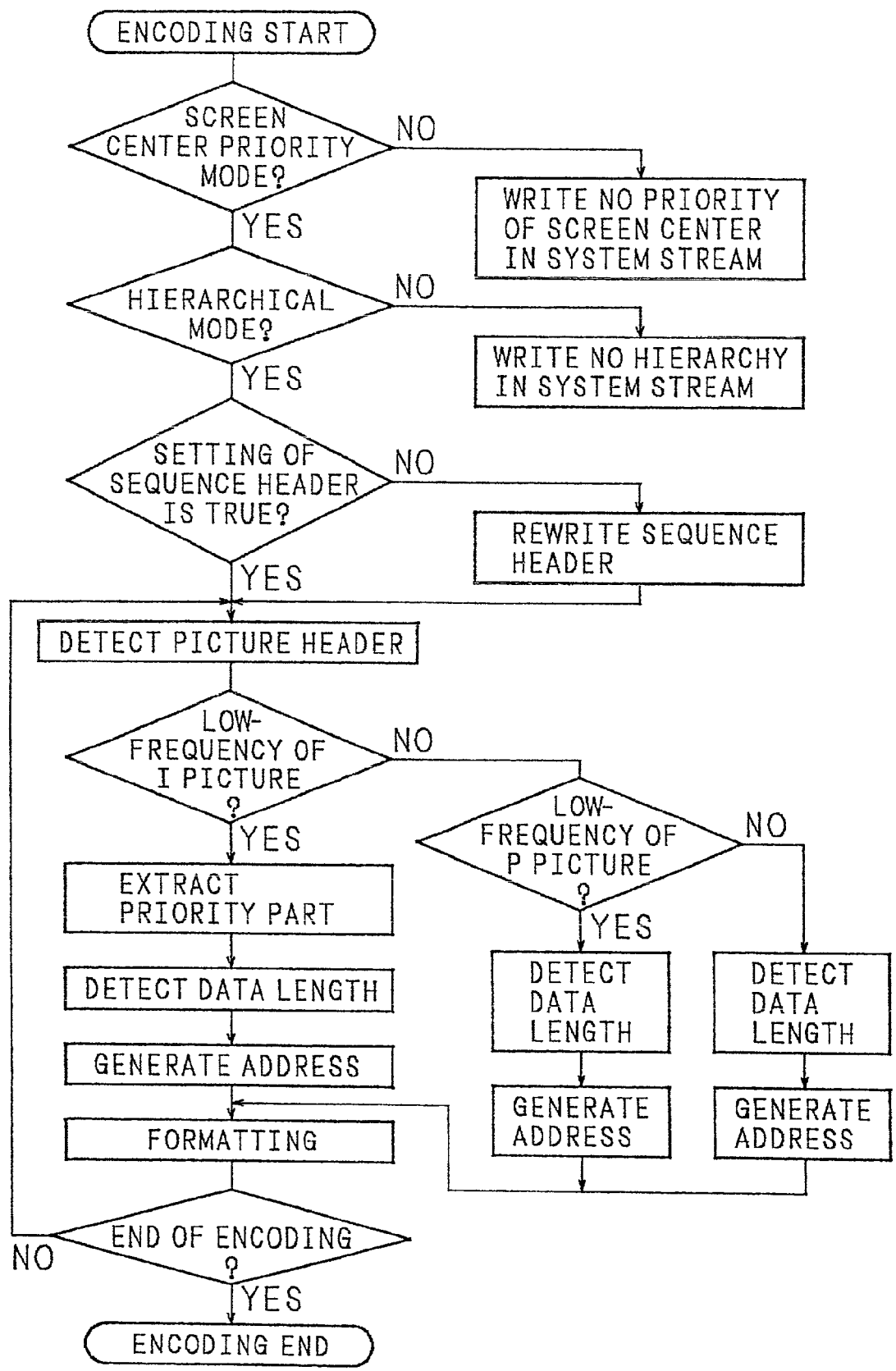
FIG. 58 is a flowchart of a digital video signal coding processing in embodiment 11.

Next, an operation of the area rearranger 62 and the format encoder 61 will be explained. FIG. 58 is a flowchart thereof. In the beginning, when the encoding is started, the slice header of the I picture of the low-frequency component partition is detected so that each slice is classified into three areas shown in FIG. 48. Then bitstreams for each area are prepared for rearranging the bitstreams collected for each area. In other words, the data is rearranged for each area so that the bitstreams are arranged in the order of a low-frequency area I(2), a low-frequency area I(3), and a low-frequency area I(3) at the front of the GOP with respect to the low-frequency area I picture like FIG. 49.

Then, in the case of the screen central part priority mode, the picture header of the bitstreams to be inputted is detected to detect the picture information. Here. In the case of the low-frequency area I picture, the central part I(2) of the low-frequency area screen, the low-frequency area I(3) and the low-frequency area I(1) are extracted to detect the data length thereby preparing address information from the data length of each area. In the meantime, in the case of the P picture and the B picture the data length is detected in the unit of picture thereby preparing address information. In modes other than the screen central part priority mode, the operation follows embodiment 9.

Next, the hierarchical mode is judged. In modes other than the hierarchical mode, information is inserted into the system streams which represents that the mode is non-hierarchical thereby following the structure of the conventional streams. In the case of the hierarchical mode, the setting of the sequence header is confirmed. Specifically, the data of the sequence scalable extension is confirmed. In the case where the data is correctly described, the front of the picture is recognized with the picture header so that the low-frequency area data in the I picture and the P picture rearranged in the screen area is extracted and the data length is detected. In the meantime, the data length of the B picture is detected for each picture.

Further, a packet is prepared wherein only address information is recorded in the case where the screen central part of the low-frequency area of the I picture and the P pictures is collected at the front of the GOP. This packet includes the screen central part of the low-frequency area part of the I picture and the P picture, the peripheral part of the screen, the high-frequency area part of the I picture and P pictures, and address information of the B picture so that the data length of respective data is recorded. Consequently, the front position of respective data streams are obtained as relative address with respect to the front of the GOP header.

FIG. 59 shows bitstreams prepared in this manner. As shown in FIG. 59C, the low-frequency areas of the I picture and the P pictures rearranged in the unit of area are arranged at the front of the GOP. Consequently, FIG. 59D shows a case in which the rearranged data of low-frequency areas are packetted so that the address information is arranged in the private 2 packet as shown in the flowchart of FIG. 58. In this case, the address information may be represented with a relative address with respect to the front of the GOP head as described above. Otherwise the address information may be represented in such a manner that which byte of which packet falls on the front of each picture. It goes without saying that the address information may be represented with a sector address on the disc in addition to it.

FIG. 60 shows an example in the case where the address information is contained in the private 2 packet. In the case where the PES packet is adopted as the private 2 packet, the stream ID is set, so that the hierarchical mode, the kind of hierarchization, the kind of picture used at the time of the special playback and the number of start addresses are described. Here, the start address refers to the start address of the screen central part of the low-frequency area of the I picture, the start address of screen peripheral part of the low-frequency area of the I picture, the start address of the remaining B picture.

Further, a sector address of the preceding and succeeding GOP on the disc is added for allowing the optical head to jump at the time of the special playback. In this case, when the sector address of the several front and rear GOP is further added in addition to the address of the preceding and succeeding GOP in consideration of the high-speed times at the time of the special playback, the variation of high-speed times of the special playback will be widened. Further, it is shown that the address information is described in the private 2 packet of the PES packet. It goes without saying that the address information may be described in the private descripter of the program stream map, other user areas or the like.

Figure 61:
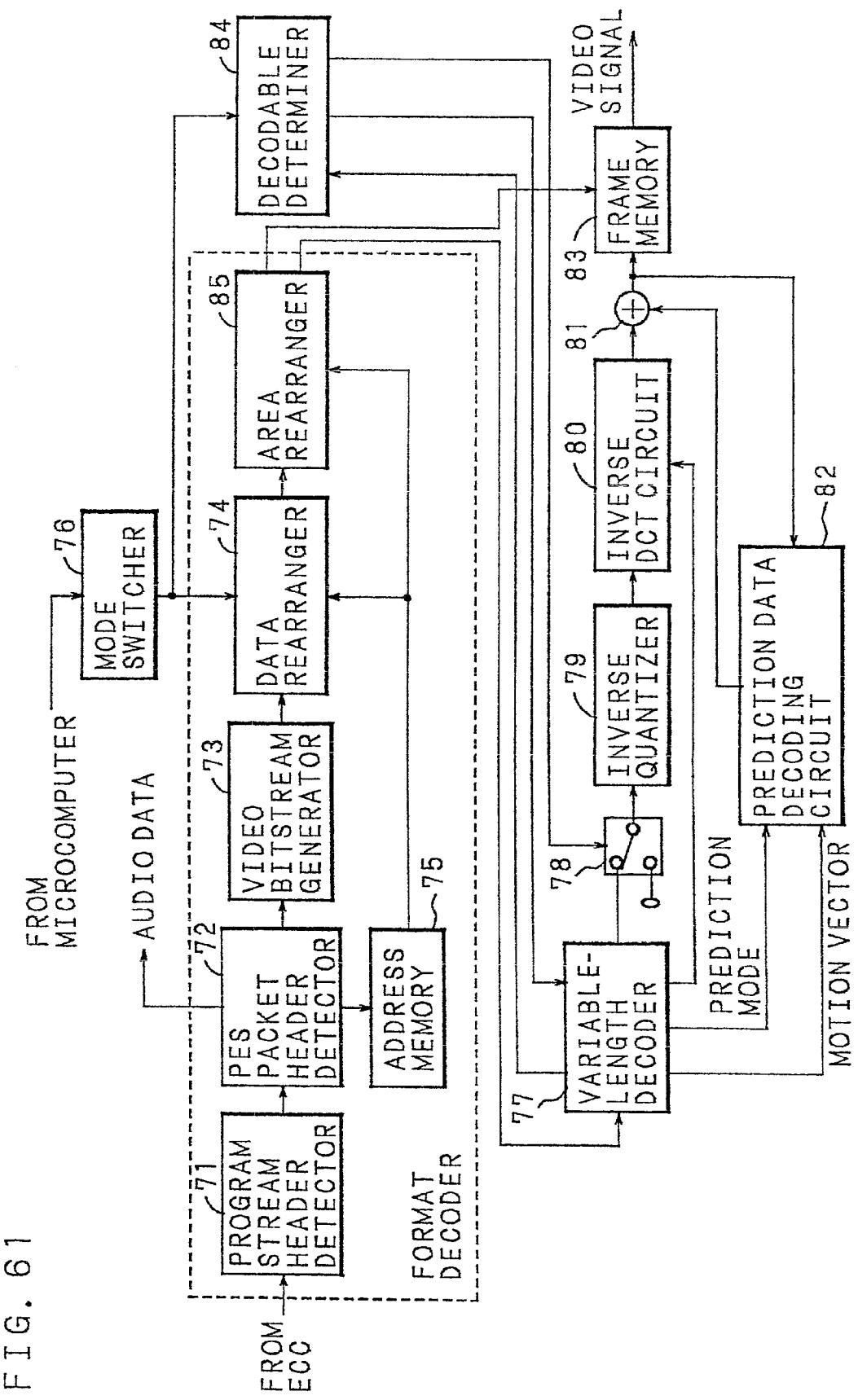
FIG. 61 is a block diagram of a digital video signal decoding unit in embodiment 11.

The playback side of the device in embodiment 11 will be described in accordance with FIG. 61. FIG. 61 is a block diagram of the digital video signal decoding unit. Like parts or corresponding parts in the figure are denoted by like numerals, and an explanation thereof will be omitted.

Figure 62:
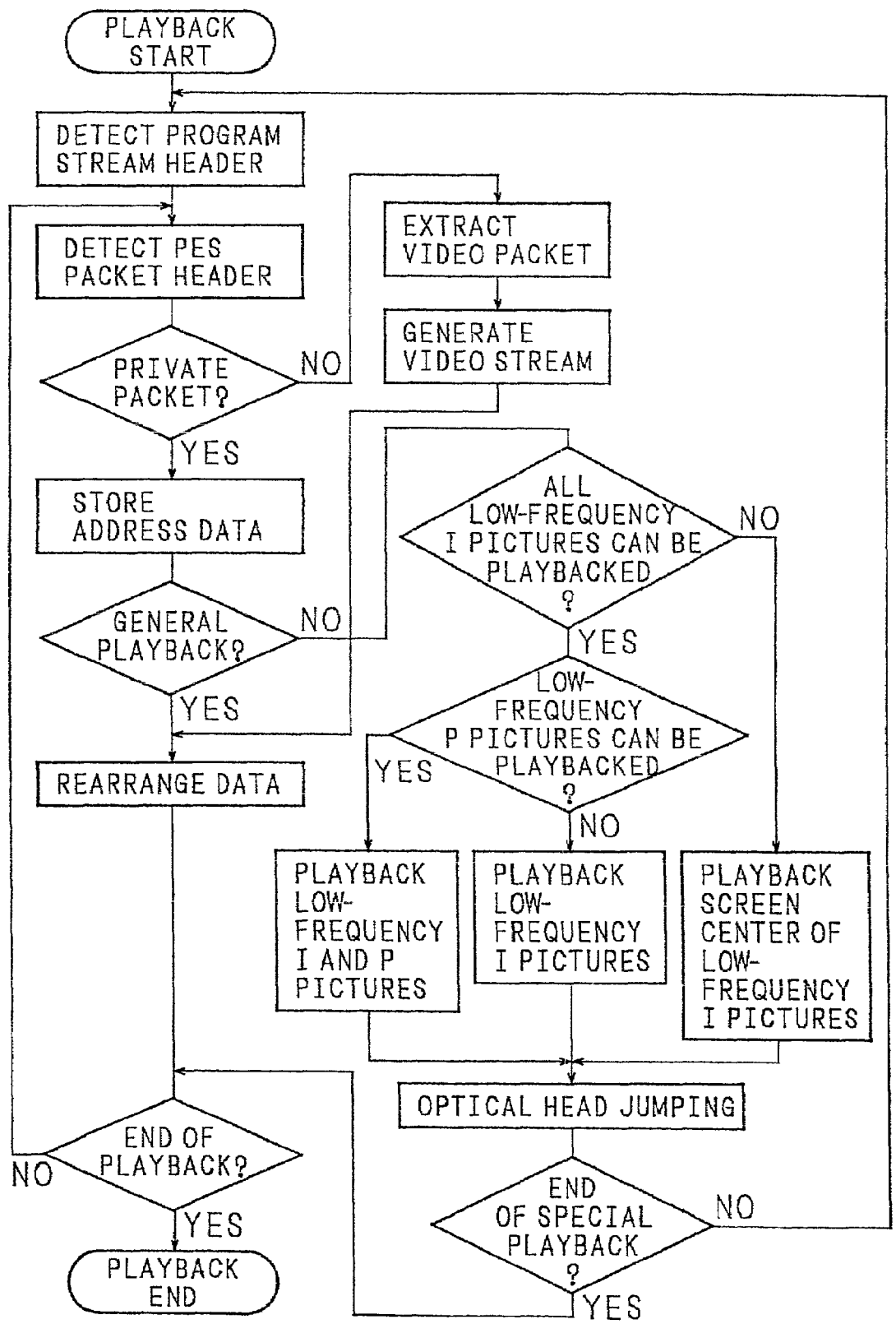
FIG. 62 is a flowchart of a digital video signal decoding processing in embodiment 11.

Next, an operation of FIG. 61 will be explained in accordance with FIG. 62. FIG. 62 is a flowchart showing an operation of the format decoder at the time of the playback. The bitstream outputted from the ECC is detected the header of the program stream and is separated for each of the PES packet. Further, the bitstream is detected the header of the PES packet to differentiate the private packet containing the address information and the video packet.

In the case of the private packet, the address information contained in the packet is extracted and stored. In the meantime, in the case of the video packet, the bitstreams of the video packet is extracted. Further, in the case of the private packet and normal playback, or in the case of the video packet, the data of the low-frequency component and the high-frequency component is extracted from the bitstreams of the video data of the I picture and the P pictures so that the data is rearranged for outputting a playback picture.

In the meantime, in the case of the private packet and the special playback, it is judged in the beginning whether or not time is available for playing back the whole low-frequency I picture In the case where time is available for the playback, it is further judged whether time is available for playing back the low-frequency P pictures. The aforementioned two or one judgements are made. Thus, in the case where time is available for playing back the low-frequency I picture and P pictures, the I picture and the P pictures are played back. In the case where time is available for playing back the whole low-frequency I picture but time is not available for playing back the low-frequency P pictures, only the low-frequency I picture is played back. Further, in the case where time is not available for playing back the whole I picture, the central part of the screen of the low-frequency I picture is played back. In the aforementioned three cases, the optical head is allowed to jump to the front of the next GOP.

In the case where these addresses are described in the bitstreams, the address information is extracted and stored after the bitstreams are formed. In the case where these addresses are described in the private descripter of the program stream map, the address information is extracted and stored at the level of detecting the program stream header. It goes without saying that the address information may be either relative address of the program or the absolute address of the program.

In actually, as shown in FIG. 61, the mode signal for skip search, normal continuous playback or the like is inputted to the mode switcher 76 from the microcomputer. In the meantime, the playback signal from the disc is amplified by an amplifier and the signal is played back with a clock which is outputted from a PLL and in which the phase is synchronized. Then, the signal is digitally modulated and an error is corrected to restore a program stream. Further, information is obtained as to the data which follows the header by the program stream header detector 71 for detecting each head of the program stream.

Furthers the address information for each picture and special playback data (low-frequency data and data arranged by the area of the screen) which are described in the private 2 packet of the PES packet is detected by the PES packet header detector 72 and the information is stored in the address memory 75. Here it is judged whether the PES packet is an audio PES packet, a PES packet such as characters, or a video PES packet so that only the video PES packet is outputted to the video bitstream generator 73. The video bitstream generator 73 eliminates the header removal of the PES packet to output the bitstreams. After this, in accordance with the address information obtained from the address memory 75, the data rearranger 74 rearranges the bitstreams outputted from the mode switcher 76 and outputs the bitstreams in the normal playback.

The output (control signal) from the mode switcher 76 is supplied to the data rearranger 74 and the decodable determiner 84. Here, the data rearranger 74 synthesizes the low-frequency component and the high-frequency component hierarchized and rearranged for each of the areas and outputs the synthesized components. In the meantime, either the data only of the low-frequency component or the data only of the low-frequency components at the central part of the screen are outputted to the variable-length decoder 77 at the time of the special playback. In other words, at the time of the normal playback, the low-frequency components of the I picture and the P pictures are rearranged in the order of areas on the screen. Then the low-frequency components are synthesized with the high-frequency components so that the device is operated to rearrange the data in the original order of pictures. At the time of the special playback, the area of the low-frequency components of the I picture at the central part of the screen and the area of the low-frequency components of the I picture and the P picture at the central part of the screen are switched over to be outputted. The time stamp of the PTS and the DTS are not used at the time of the special playback which uses only the low-frequency components.

In contrast, the variable-length decoder 77 extracts the boundary of the events in the low-frequency components region denoted by the priority break point of the slice header together with the decodable determiner 84 so that the data up to the boundary is decoded to be outputted to the switch 78. The switch 78 is connected so as not to insert 0 at the time of the normal playback. At the time of the special playback, the switch 78 is controlled by the decodable determiner 84 so that 0 is inserted into the high-frequency components after the priority break point.

An operation concept of the decoding of the low-frequency is the same as FIG. 44. An explanation thereof will be omitted. Further, at this time, the rearrangement on the screen area is the same as explained in embodiment 10. An explanation thereof will be omitted.

The coding area is defined at the boundary of the events, but it is needless to say that the boundary of the events may be defined by other methods. For example, the coding area may be divided by the end of a predetermined number of events, or the coding area may be defined by dividing the data by the data subjected to a rough quantization by the quantizer 54, and a differential value between the rough quantization and a fine quantization. Further, the data may be divided with the coding of the picture whose space resolution is decreased to the half by thinning and the picture whose resolution has been restored to the original level from the half level and the differential picture with the picture with the original resolution. In other words, it goes without saying that the high efficiency coded data of the picture may be divided by the division of the quantization and the space resolution in addition to the division of the frequency region.

At this time, more important data as a picture refers to the data in the low frequency region in the case of the frequency division. In the division of by the quantization, the more important data refers to the data coded by the rough quantization. In the case of the data divided by the space resolution, the more important data refers to the data obtained by coding a thinned picture. In such a case, with respect to the playback picture decoded by using only these items of data, a region which can be easily perceived by man constitutes the more important data. In other words, one high efficiency coded data is divided into more basic and more important data and the data which is not important so that the data which is basic and important is played back at the time of the playback from the disc.

Embodiment 11 is described by corresponding the recording side to the playback side. There may be a case where record and playback constitute a pair like a hard disc. Further, a case is considered wherein only the playback side is given on a supposition that the data is recorded in accordance with the presupposition like compact discs. Further, with respect to the component rearrange for each of the areas of the screen, it goes without saying that a method for outputting a screen as shown in FIG. 54 and FIG. 55 in embodiment 10 is available. Further, it goes without saying that the rearrangement in the unit of area on the screen can also be realized with the prediction data decoding circuit 82 and the frame memory 83 when the data of the slice vertical position in the slice header. Further, in embodiment 11, only the basic data of the I picture is divided by the area of the screen. It is needless to say that the data may be divided with the low-frequency of the P picture or others.

Embodiment 12

Figure 63:
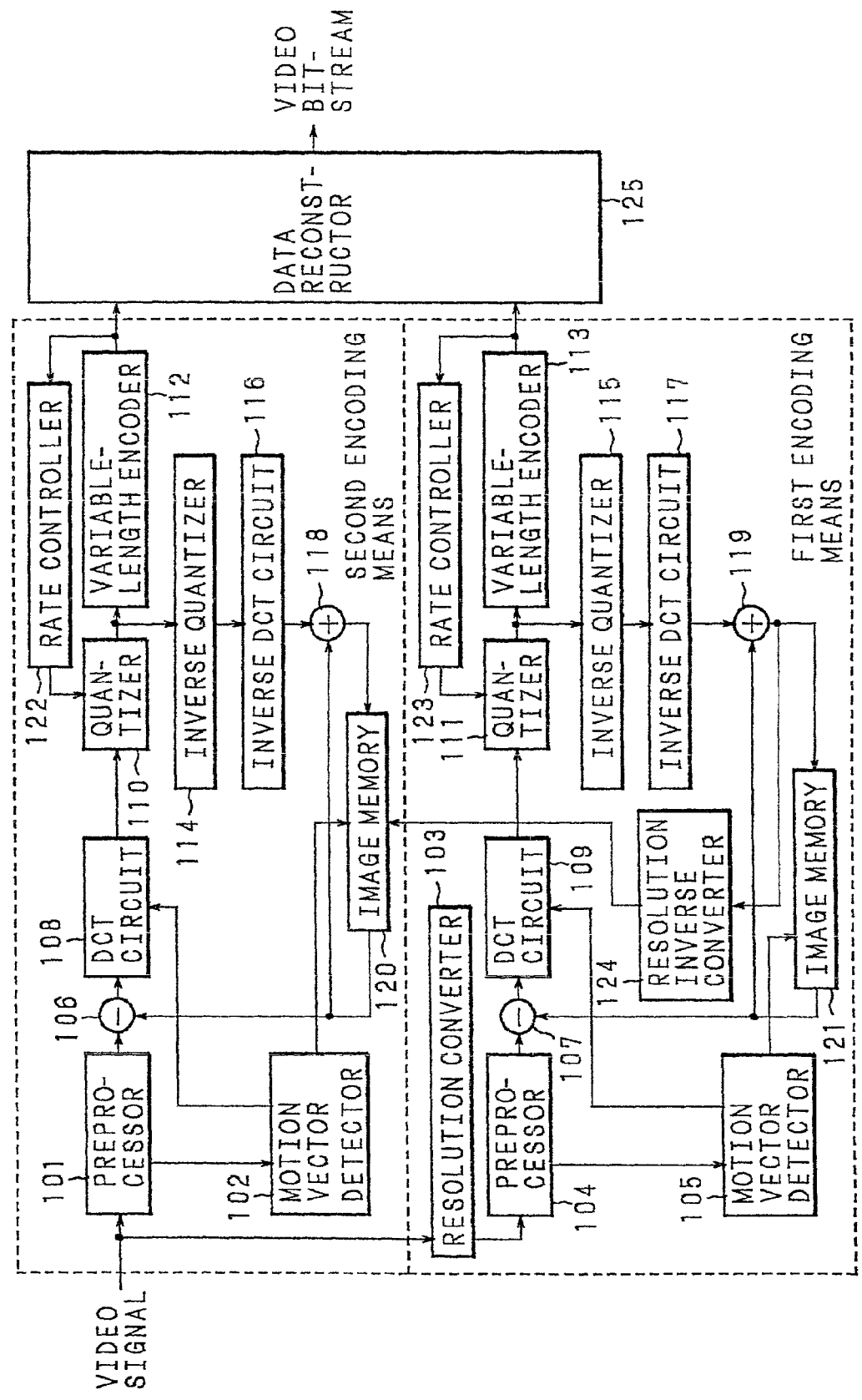
FIG. 63 is a block diagram of a digital video signal coding unit in embodiment 11.

Embodiment 12 of the present invention will be explained with respect to FIG. 63. FIG. 63 is a block diagram showing a digital video signal coding processing unit in a digital video signal record and playback device. In FIG. 63, reference numeral 101 and 104 denote preprocessors, 102 and 105 motion vector detectors, 103 a resolution converter, 106 and 107 subtracters, 108 and 109 DCT circuits, 110 and 111 quantizers, 112 and 113 variable-length encoders, 114 and 115 inverse quantizers, 116 and 117 inverse DCT circuits, 118 and 119 adders, 120 and 121 image memories, 122 and 123 rate controllers, 124 a resolution inverse converter and 125 a data reconstructor as a data arranging means. Further, FIG. 63 shows a first encoding means and a second encoding means as one example. In particular, the subtracter 106 outputs a differential component between the first encoding means and the second encoding means in the course of two coding.

Figure 64:
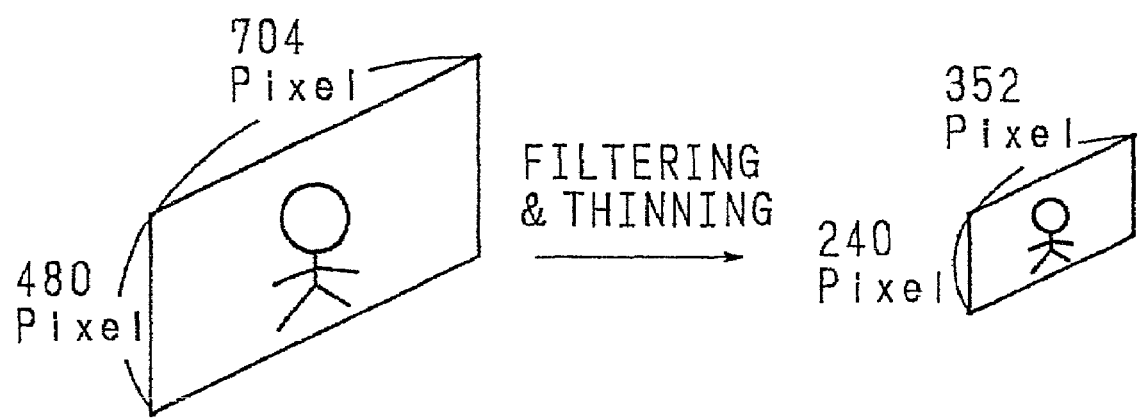
FIG. 64 is a view showing a concept of a resolution conversion in embodiment 12 on the screen.

Next, an operation of embodiment 12 will be explained. The video data is inputted to the resolution converter 103 in an order of the raster scan of the interlace. The inputted video data is filtered and thinned for preventing repetitive noises in the high-frequency region with the resolution converter 103. FIG. 64 is an explanatory view explaining the concept of this resolution conversion on the picture. For example, in the case of the data of horizontal 704 pixels and vertical 480 pixels, the data is filtered followed by being thinned into horizontal 352 pixels and vertical 240 pixels with a half resolution thereof respectively thereby being converted into a low resolution screen data.

This low resolution screen data is converted from a raster scan into a block scan by being inputted into the preprocessor 104. Here, the block scan means that the data is sent in an order of the block of DCT. The I picture is coded without performing a calculation between frames using the output of the frame memory for intra-frame coding.

In the case of the I picture, the image memory 121 which is an input of the subtracter 107 outputs nothing so that the video signal passes through the subtracter 107. This data is orthogonally converted into the frequency component by the DCT circuit 109. This orthogonally converted data is inputted into the quantizer 111 and quantized in an order of being scanned in a zigzag manner from the low frequency region. Further, the quantized picture data is converted into an entropy code via the variable-length encoder 113 to be outputted to the data reconstituting device 125.

In the meantime, the data quantized by the quantizer 111 is subjected to the inverse quantization with the inverse quantizer 115. Then, the picture data is inversely converted into data of a space component from a frequency component data by the inverse DCT circuit 117. The I picture is decoded without calculation between frames performed by using the output of the frame memory which is subjected to the intra-frame coding. Consequently, in the case of the I picture, since there is no input from the image memory 121 of the adder 119, the data passes through the adder 119. An output of the adder 119 is used as data stored in the picture memory 121. At least, the I picture data, or the I picture data and the P picture data is required to be stored in the picture memory. That is because the data of I picture and P picture is needed for decoding the B picture normally at the MPEG1 and MPEG2 as reference data.

Further, the image memory 120 inputs the output from the adder 118 of the decoded data and the result of the restored number of pixels by interpolating the pixel by the resolution inverse converter 124 to store the decoded data of the picture averaged with a certain weight. With respect to this weighting, there is described a case in which a weight of 1 is used as the output of the resolution inverse converter and a weight of 0 is used as the output of the adder 118 for simplicity.

Further, the input video data is buffered by the preprocessor 101 to be scan-converted from the raster scan to the block scan. Then, the video data is subtracted by the subtracter 106 from the data of the image memory 120 which stores a signal subjected to the aforementioned low resolution processing (this is referred to as resolution residual component). The resolution degree residual component is orthogonally converted into a frequency region to be converted into the scan from the low-frequency region to be appropriately quantized by the quantizer 110. This data is coded into an entropy coded via the variable-length encoder 112 and is outputted to the data reconstructor 125.

In the meantime, the data quantized by the quantizer 110 is inversely quantized by the inverse quantizer 114 and is inversely converted in the data in the space region at the inverse DCT circuit 116. The adder 118 adds the input from the image memory 120 which is the inversely converted data subjected to the low resolution processing with converted data with the output of the inverse DCT circuit 116 to obtain the result of decoding of the data which is formed into two layers with the low resolution data and the data of the residual component as one example of the data other than the low resolution data. This layer is determined by the frequency of resolution conversion. It is possible to form the layer into three layers by performing two resolution conversions. In the same approach, it is possible to prepare data in any number of layers with the similar approach.

With respect to coding of the normal MPEG, the I picture and the P picture are decoded and stored as a decoded data to code the B picture by performing a bidirectional prediction with the I picture and the P picture. In this manner, the I picture and the P picture are coded followed by the processing of the B picture.

Figure 65:
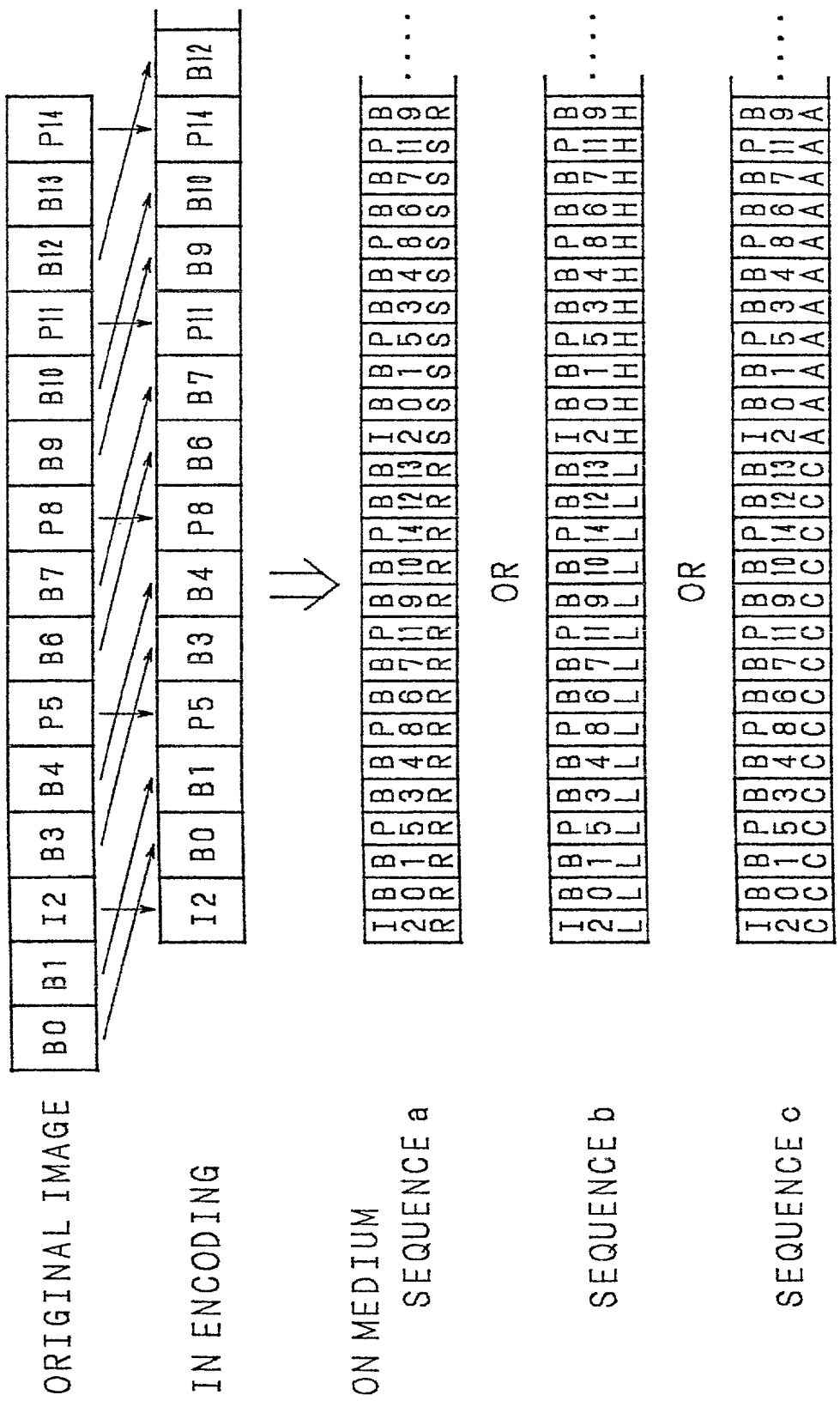
FIG. 65 is a view illustrating one example of data constitution results in embodiments 12, 13 and 14.

The aforementioned coding processing of the I picture, P pictures and B picture are performed with respect to both the low resolution component and the high resolution component. In this manner, a sequence can be constituted wherein the low resolution component R (hereinafter referred to as R component) and the resolution residual difference component S are arranged side by side. The operation is performed by the data reconstructor 125 so that the data is arranged at a place such as the front of the GOP to which the optical head can favorably access. For example, the data is arranged as shown in sequence a of FIG. 65. Then the data is rearranged as shown in FIG. 65 and the half of the area which is occupied by the L component, the low resolution component can be played back. The resolution residual difference component has a smaller data amount than the non-resolution residual difference component, and the data can be efficiently hierarchized. In other words, here, a first encoding means for coding in accordance with predetermined conditions and a second encoding means for coding the residual difference of coding using the first encoding means as an example of a video information other than coded by the first encoding means out of video data are provided for an efficient hierarchization.

FIG. 65 is a view showing an example of the result of data constitution. In FIG. 65, a sequence a is a sequence generated by the coding processing of embodiment 12. A sequence b is a sequence generated by the coding processing in another embodiment. A sequence c is a sequence generated by the coding processing in further another embodiment. In the sequence b, symbol L denotes a low frequency component, and H a high frequency component. In the sequence c, symbol C denotes a component coded by a rough quantization, and A a residual component by the rough quantization, respectively. As shown in the sequence a in FIG. 70, the aforementioned operation is performed with respect to only the I picture and P pictures. Only the component may be arranged in summary at the front of the GOP.

In this manner, when only the low resolution component is arranged in summary at the front of the GOP, the ratio of the L component occupying the whole largely reduces so that an allowance can be made in the reading speed from the medium so that the skip search can be easily realized. In addition, like a sequence a, when only the R component of the I picture and the P picture are arranged in summary at the front of the GOP, the operation is performed so that only the low resolution data of the I picture and the P picture are decoded. In the aforementioned embodiment, an explanation is given to a case in which the thinning ratio is horizontal ½ times, and vertical ½ times. It goes without saying the ratio can be set to a value different from the aforementioned value, but an arbitrary ratio can be applied to the embodiment.

Further, the coding mode includes the MPEG1, MPEG2 and JPEG or the like. In the hierarchization of the resolution, a common coding technique is not necessarily adopted. That is because when the data is coded by lowering the resolution, it is possible to sufficiently correspond to the coding with the MPEG1 mode. In addition, in the JPEG mode, the lamination of one frame on another constitutes a mobile picture. Consequently, it is possible to decode correctly the data even when the data occupies a specific position of the GOP. In addition, the explanation is given with respect to two degrees of resolution, but is goes without saying that larger number of hierarchies can be used. The differential component may be coded in the following manner: the data of the low resolution component is coded with the first encoding means in FIG. 63; the output from this first encoding means is interpolated; the differential component with the picture before thinning the pixels and the interpolated data is obtained with the subtracter 106; and the differential component is coded by a differential component encoding means.

The frame read from the image memory is normally brought from the prediction reference frame. With the existence of the low resolution frames, the data is required to be stored in the memory (including the memory address) by favorably adjusting the time axis. It goes without saying that an information adding means may be provided to add additional information such as an audio signal, a header or the like, and an error correction signal to the differential component.

Embodiment 13

Figure 66:
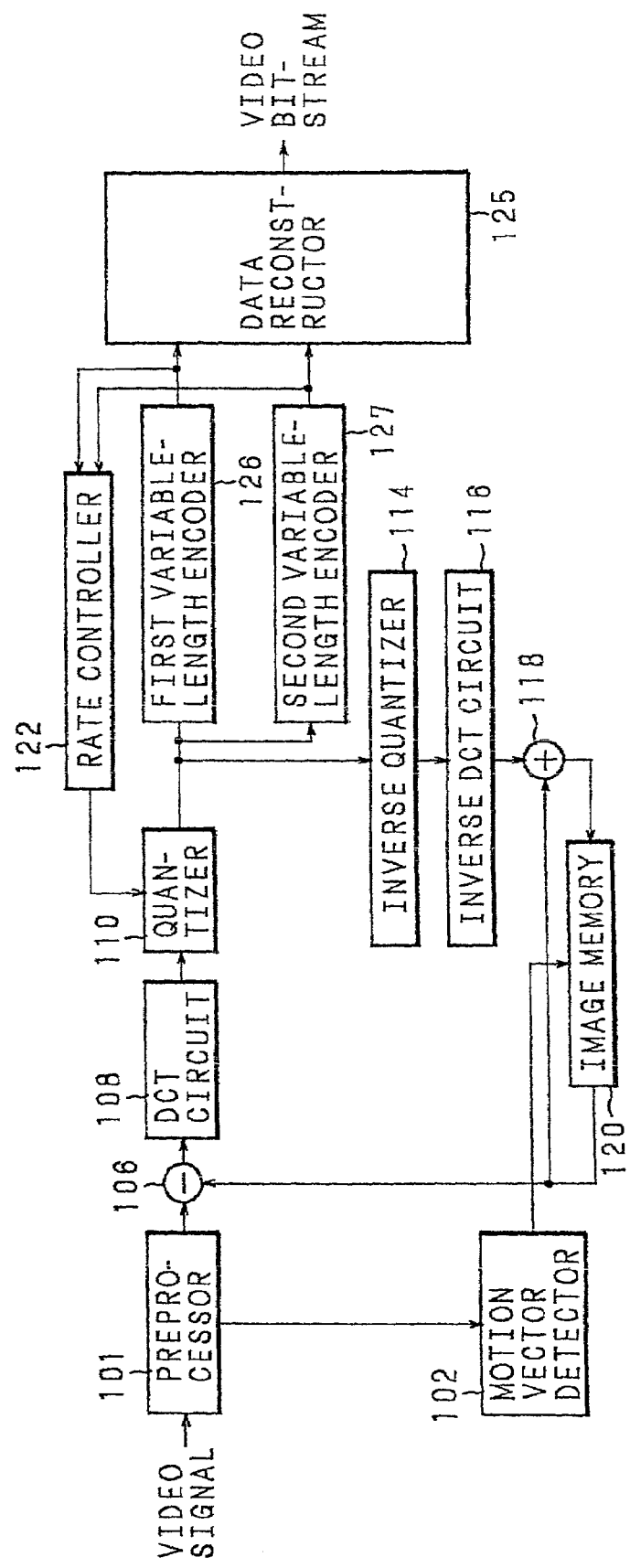
FIG. 66 is a block view of a digital video signal coding unit in embodiment 13.

Embodiment 13 of the present invention will be explained on the basis of FIG. 66. In embodiment 13, the DCT block is divided into the layers of a low-frequency region and a high-frequency region so that only the low frequency region is arranged at the front of the GOP. FIG. 66 is a block diagram of the digital video signal coding processing unit. In FIG. 66, reference numerals 126 and 127 denote first variable-length encoder and a second variable-length encoder, respectively. Like parts or corresponding parts in FIG. 66 are denoted by like numerals in FIG. 63, and an explanation thereof will be omitted.

Next, an operation will be explained. This interlace video data is a data item which has, for example, an effective screen size of horizontal 704 pixels and vertical 480 pixels. Since the I picture is decoded without performing calculations between frames using the output of the frame memory subjected to the intra-frame coding, the video data is passed through and outputted. This video data is orthogonally converted into the frequency component by the DCT circuit 108, and is converted into the block scan from the low frequency region. Then the video data is converted into a block scan from the low frequency region to be appropriately quantized by the quantizer 110.

Figure 67:
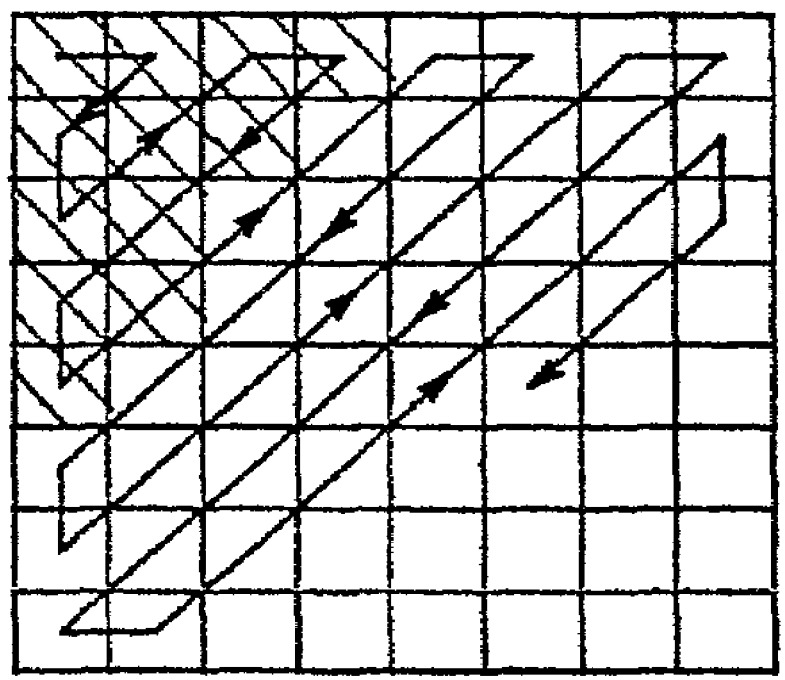
FIG. 67 is a view illustrating one example of a data arrangement of a DCT coefficient inside of a DCT block.

The data arrangement of the DCT coefficient inside of the DCT block is shown in FIG. 67. In FIG. 67, a low frequency component is located at an upper part on the left and high frequency component is located at a lower part on the right. Out of the DCT coefficient data arranged in this DCT block, the DCT coefficient data (for example, a hatched part in FIG. 67) in the low-frequency region up to the data of the DCT coefficient at a specific position is entropy coded via the first variable-length encoder 126 as a low frequency region extracting means and is outputted to the data reconstructor 125. Further, the second variable-length encoder 127 performs the variable-length coding of the data of the DCT coefficient after the data of the DCT coefficient at the aforementioned specific position. That is, in this manner, the data is partitioned and coded in the frequency region.

With respect to the coding of the motion vector and the DC component, the coding may be performed only by the first variable-length encoder 126. The second variable-length encoder 127 is not required. That is because at the time of the normal playback, the output data of the first variable-length encoder 126 and the output of the second variable-length encoder 127 may be synthesized and coded.

The determination of the coding region is performed at the fixed position of the DCT coefficient. The determination can be made by other methods. For example, the coding region may be determined with the fixed number of events. In other words, a unit for providing a Huffman code which is a variable-length code is an event. The coding region may be set with a predetermined number of events such as a unit of three or the like. In an example of the output bitstreams at the data reconstructor 125 with the arrangement of sequence b in FIG. 65, the low frequency region picture can be played back when only the first half of the low-frequency region is read. The coding region may be determined in a variable manner at the arrangement such as sequence b shown in FIG. 70.

In the meantime, the data quantized by the quantizer 110 is subjected to an inverse quantization. Then the data is inversely converted into the data in the space region by the inverse DCT circuit 116. The I picture is decoded without performing the calculation between frames using the output of the frame memory subjected to the intra-frame coding. Consequently, in the case of the I picture, there is no input from the image memory 120 of the adder 118. Consequently, the data is allowed to pass through the adder 118. The output of the adder 118 is used as data stored in the image memory 120.

At least, the I picture and the P pictures are required to be stored in the image memory. That is because the data of the I picture and the P picture is normally required as reference data for the decoding of the B picture normally at MPEGs 1 and 2.

When constituted in this manner, the ratio of the L component largely reduces so that an allowance can be made in the reading from the medium, enabling to realize a skip search. Further, as to be described later, when only the I picture and the P picture are arranged in summary, the device can be operated so that only the data of the low-frequency component can be easily decoded. Since the data in the high-frequency region has smaller amount of data than all other regions of data, the efficient constitution of data can be made possible than extracting data in the low-frequency region and storing the data before the data in all the regions.

When the coding of the I picture is ended by allowing the I picture to pass through the subtracter 106, the B picture is coded in the bidirectional prediction with the last P picture in the GOP preceding in terms of time. The output of the preprocessor 101 and the data from the memory of the reference frame (arrow in the drawing omitted) are compared with each other so that the motion vector is detected and the prediction mode and the frame structure are judged. On the basis of the result of judgement, the data of the reference frame memory in which the output of the preprocessor 101 and the data from the reference frame memory most favorably agree with each other is read as the data in the forward direction portion and the backward direction portion from the frame memory 120. Consequently, the data read in this manner and the output result of the preprocessor 101 of the B picture are subjected to subtraction by the subtracter 106. (This result is referred to as Lime residual component with respect to both the P picture and the I picture). This time residual component is subjected to the DCT calculation so that the result is quantized and is subjected to the variable-length coding.

Embodiment 14

Figure 68:
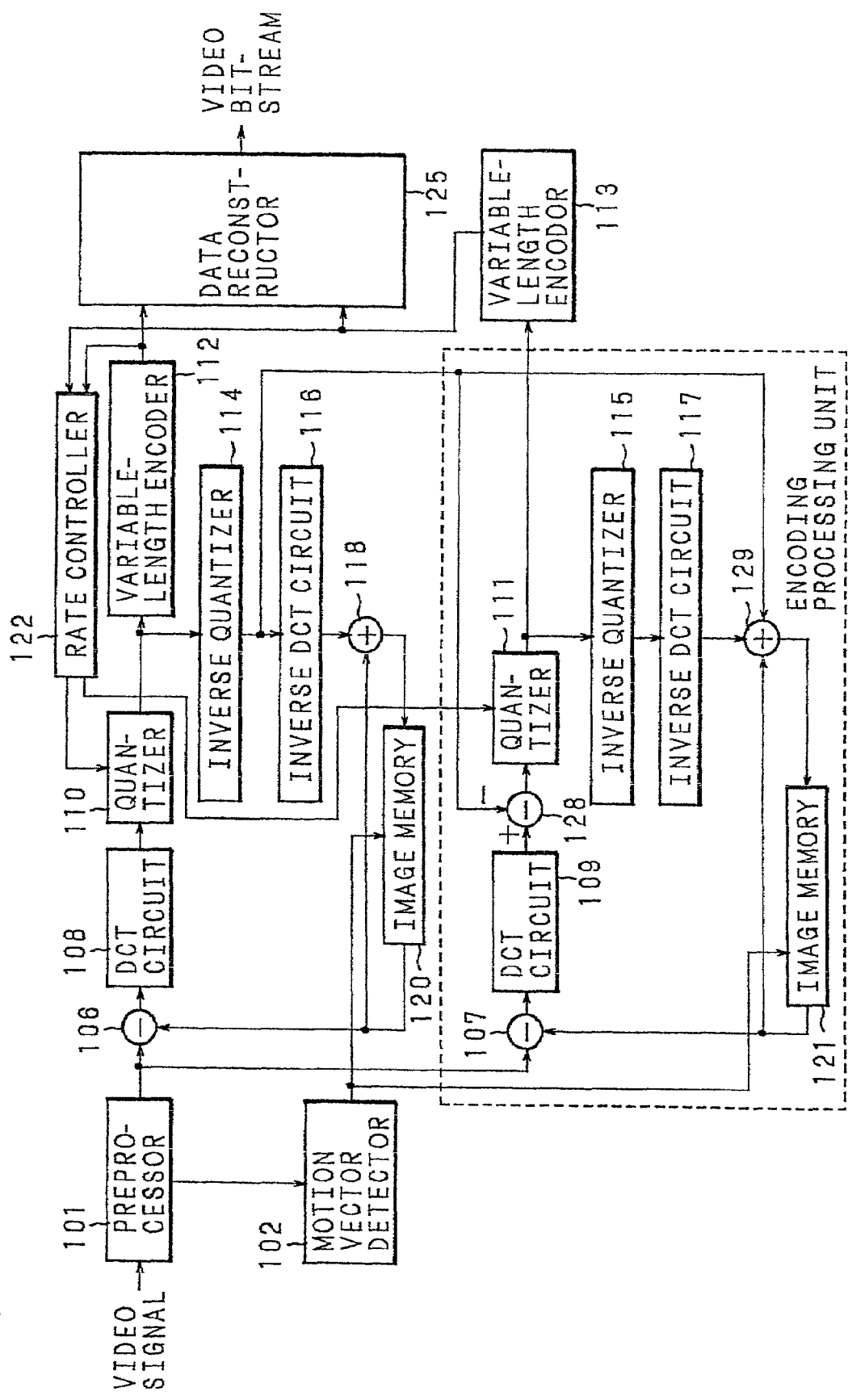
FIG. 68 is a block diagram of a digital video signal coding unit in embodiment 14.

Embodiment 14 of the present invention will be explained on the basis of FIG. 68. In embodiment 14, the data is divided into the rough quantization component of the DCT coefficient and the rough residual difference component hierarchy as an example of the data other than the rough quantization component so that the rough quantization component is arranged at the front of the GOP. FIG. 68 is a block diagram showing a digital video signal coding processing unit. In FIG. 68, reference numeral 128 denotes a subtracter and 129 an adder. Like parts or corresponding parts in FIG. 68 are denoted by like numerals in FIG. 63, and an explanation thereof will be omitted.

Next, an operation of embodiment 14 will be explained. The input picture of this interlace has, for example, an effective screen size of horizontal 704 pixels and vertical 480 pixels. The I picture is decoded without performing the calculation between frames using the output of the frame memory which is subjected to the intra-frame coding. Consequently, in the case of the I picture, nothing is inputted to the picture memory which is the input of the subtracter 106 with the result that the video signal passes through the subtracter 106. This data is orthogonally converted into the frequency component and the DCT circuit 108, and is converted into the block scan from the low frequency region. Then, the quantizer 110 performs an appropriate rough quantization which reduces the coded data amount to less than half. This quantized data is coded into an entropy code via the variable-length encoder 112 to be outputted to the data reconstructor device 125.

In the meantime, the data quantized by the quantizer 110 is subjected to inverse quantization (the result is referred to as the result of the rough quantization). The data subjected to the inverse quantization is sent to a different coding processing unit (part denoted by a dot line frame in FIG. 68). In the meantime, the data is inversely converted into the data in the space region. Here, the coding of the I picture is described. Although there is no output from the image memory 121, in normal cases, the coding result at this coding processing unit is stored in the image memory 121 so that the data is subjected to motion vector detection at the motion vector detector 102, the prediction mode is determined and the DCT block mode is determined. The position data suitable for the determined mode is referred to, and is inputted to the subtraction input side of the subtracter 107.

The output of the subtracter 107 is subjected to the DCT to determine a residual difference (which is referred to as a rough quantization residual difference) with the result of the rough quantization and the subtracter 128. The rough quantization residual difference is finely quantized (fine quantization on the same level as the normal coding in consideration of the coding amount control) to perform the variable-length coding while being inversely quantized, subjected to the inverse DCT and decoded to be stored in the image memory 121. The result of this coding and the coding result of the rough quantization determine the allocation of necessary data and a header or the like is added.

As an example of this output data, the sequence c shown in FIG. 65 is adopted, the decoding result of the picture which is subjected to the rough quantization is obtained only by reading the first half of the GOP. In addition, since the data of the rough quantization residual difference is small compared with finely quantized data, a more data-efficient constitution can be obtained than storing the extracted rough quantization data before the fine quantization data.

Figure 70:
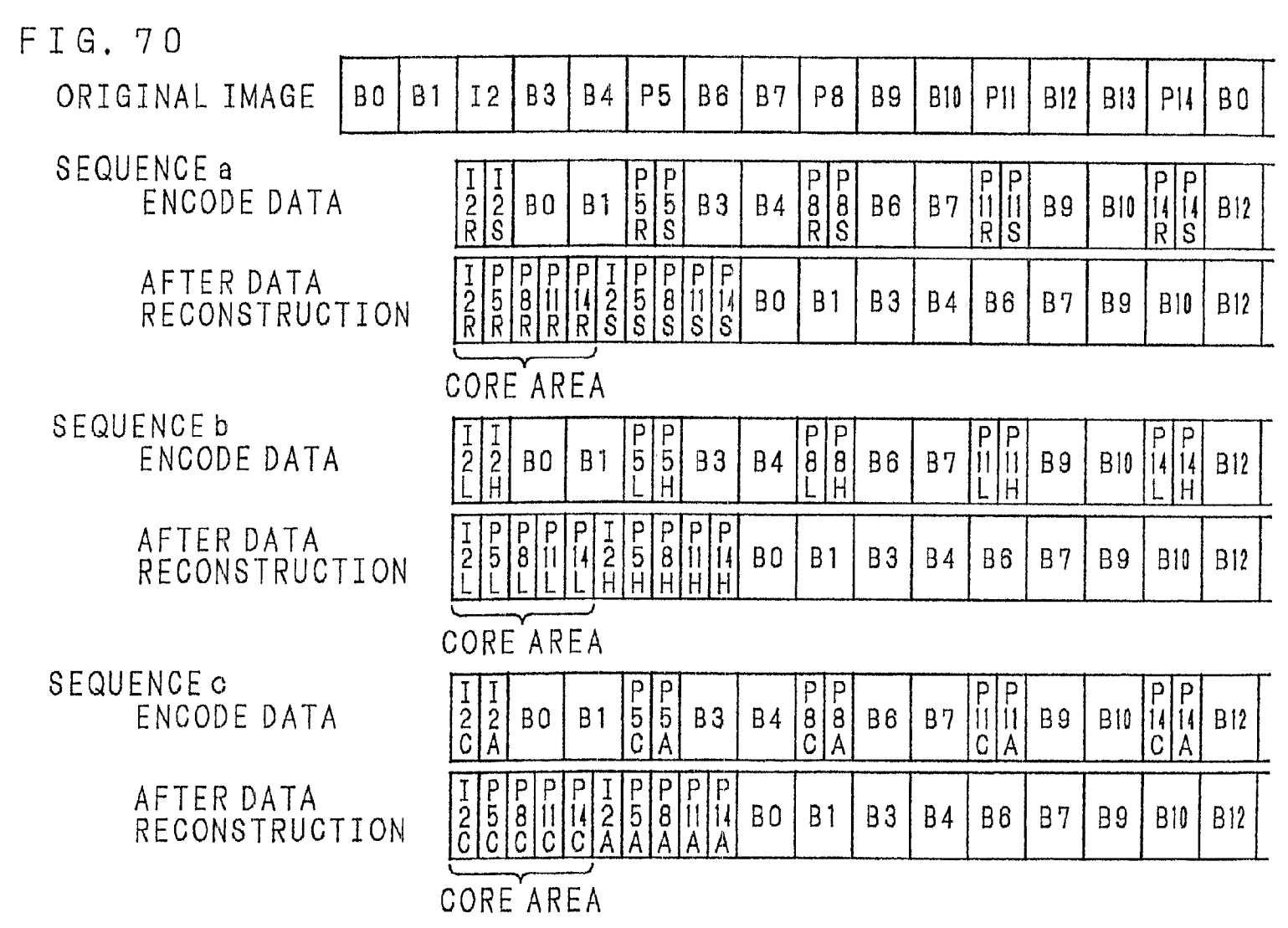

Further, as another example, variable processing such as an arrangement of the sequence c shown in FIG. 70 may be performed. Thus constituted, the ratio of the C component (component coded by performing the rough quantization) out of the whole largely reduces so that an allowance can be made in the reading speed from the medium to enable a skip search or the like. Further, as will be described later, when the only the I picture and the P picture are arranged in summary, the device of the invention is operated so that only the data which is subjected to the rough quantization of the I picture and the P pictures is decoded.

When the coding of the I picture is ended by allowing the I picture to pass through the subtracter 106, the B picture is coded with bidirectional prediction with the last P picture in the preceding GOP in terms of time. An output of the preprocessor 101 is compared with the data (arrows are omitted in FIG. 70) from the memory of the reference frame so that the motion vector is detected and the prediction mode and the frame structure are judged. On the basis of the result of judgment, the data in the reference frame memory in which the output of the preprocessor 101 most favorably agrees with the data from the reference frame memory is read as data in the forward direction portion and the backward direction portion from the image memory 120 so that the data thus read and the output result of the preprocessor 101 of the B picture are subtracted by the subtracter 106 (this result is referred to as time residual difference component for both P picture and B picture). The data in the forward direction portion and in the backward direction portion is read from the picture memory 121 so that the data and the output of the preprocessor 101 is subtracted by the subtracter 107 for orthogonal transform entropy coding. The same process is performed with respect to the P picture for coding the P picture.

Figure 69:
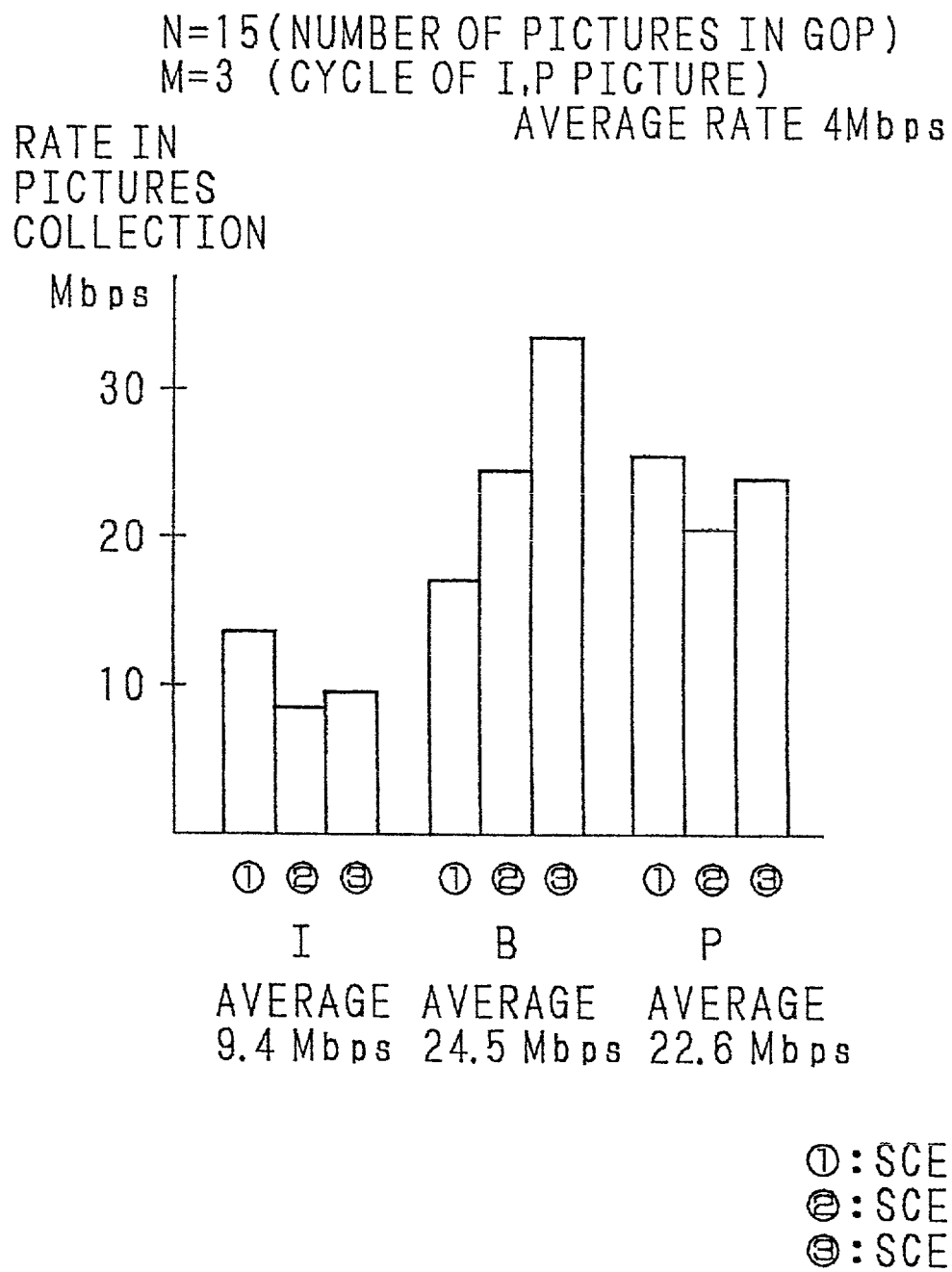
FIG. 69 is a view illustrating an example of the statistical amount of coded data in embodiments 12, 13 and 14.

FIG. 69 is a view showing an example of a statistical amount of the coded data, the view showing a distribution of the code amount at the time when the number of frames in the GOP: N=15 and cycle of the I picture and the P picture: M=3. It is shown in FIG. 69 that the I picture and the P picture account for about 50% of the whole. When the hierarchy is divided with the resolution, the frequency, and the quantization at least with respect to this part or the I picture as described above, the code amount which is to be played back further reduces so the travel time of the optical head can be shortened thereby facilitating the realization of the functions such as the skip search or the like.

FIG. 70 shows a processing sequence in the abovementioned case. In FIG. 70, an arrangement of the I picture, P pictures and B picture of the original picture are coded so that the processing described in embodiments 12, 13 and 14 are performed only with respect to the I picture and the P pictures out of the aforementioned pictures while the B picture is coded without hierarchization. A sequence in which the I picture and the P picture are processed in accordance with the processing shown in embodiment 12 is referred to as sequence b while a sequence in which the I picture and the P picture are processed in accordance with the processing shown in embodiment 14 is referred to as sequence c.

In each sequence, the data is constituted by fixing and arranging in summary at the front of the GOP the I picture component and the P picture component of respective low resolution components (R), the low frequency components (L) and the rough quantization component (C) by respective data reconstructor device 125. With the sequence a, the low resolution picture of the I picture and the P picture can be decoded only with the low resolution component (in the sequence a of FIG. 70, core area portion after the data reconstruction) of the I picture and P picture with the result that the device can easily code with skip search. Naturally, the data in the area other than the core area is not required to be arranged as shown in FIG. 70. It goes without saying that the data may be arranged in an order of frame numbers at the time of encoding.

With respect to the sequence b, the low frequency component of the I picture and the P picture can be formed only with the low frequency component (core area part after data reconstitution in the sequence b of FIG. 70) so that the device is capable of easily coping with the skip search. With respect to the sequence c, rough quantization picture of the I picture and P picture can be decoded only with the rough quantization component of the I picture and P picture (the core area part after data reconstruction in the sequence c of FIG. 70) so that the device can easily cope with the skip search. With respect to the sequence c, rough quantization picture of the I picture and P picture can be decoded only with the rough quantization component of the I picture and P picture (the core area part after data reconstruction in the sequence c of FIG. 70) so that the device can easily cope with the skip search.

For example, in a structure shown in FIG. 63, a coding loop including the reprocessor 104 is not used for the B picture so that the device may be operated in such a manner that the data is coded only with a coding loop including the preprocessor 101. In a structure shown in FIG. 66, all frequency components may be coded with the first variable-length encoder 126. Further, in a structure shown in FIG. 68, a fine quantization may be performed at the quantizer 110 for coding the data.

Most ideally, the basic data such as low frequency side data may be collected at the front of the GOP. It goes without saying that the data may be shifted a little so that the data may be overlapped with the front of the unit which constitutes an error correction code. Arranging the basic data corresponding to the unit of the error correction code in this manner can be practiced in the same manner in other embodiments.

Embodiment 15

Embodiment 15 of the present invention will be explained with respect to FIG. 71 and FIG. 72. FIG. 71 is a view showing the arrangement of DCT blocks and an example of an arrangement outline of the frequency component in bitstreams of one block. FIG. 71A shows that one macroblock is formed of the header of the macroblock, the DCT blocks Y1 to Y4 of a luminance signal, a DCT block U1 of a color difference signal (B-Y) and a DCT block V1 of a color difference signal (R-Y) with respect to the arrangement of the whole DCT block. FIG. 71B shows that one low-frequency component of the macroblock is formed with the macroblock header, the DCT blocks Y1L to Y4L of a luminance signal, the DCT block U1L of the color difference signal (B-Y) and a DCT block V1L of a color difference signal (R-Y) with respect to an arrangement of a low-frequency component DCT block.

Figure 71D:
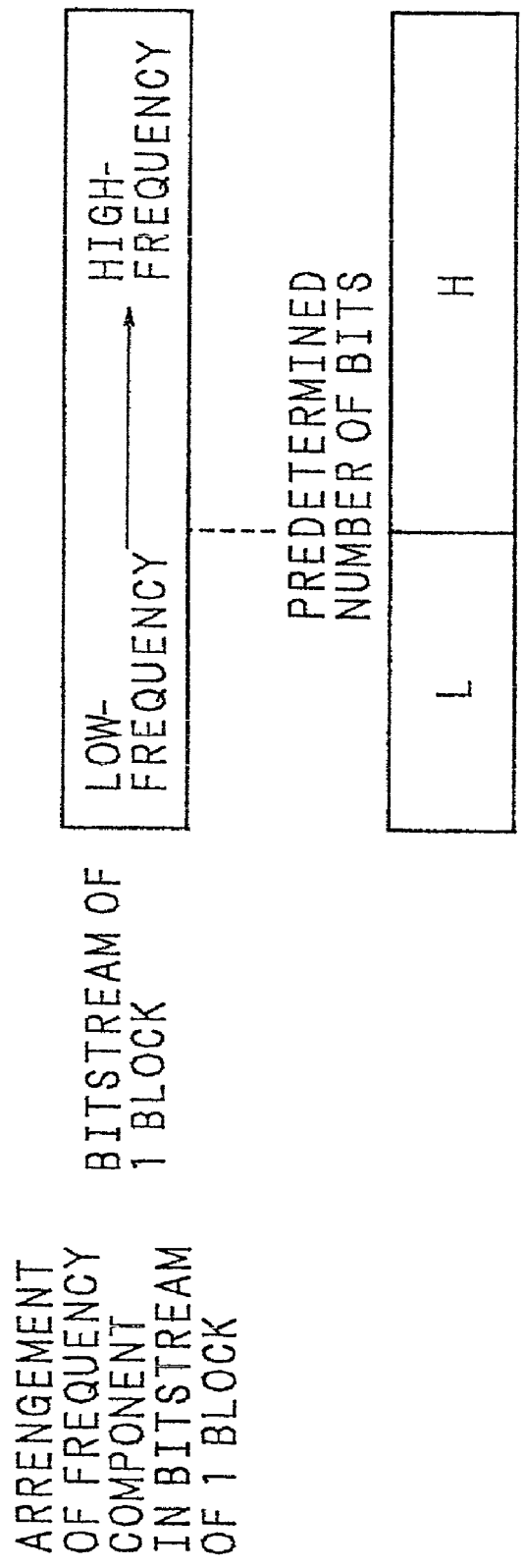
Figure 72A:
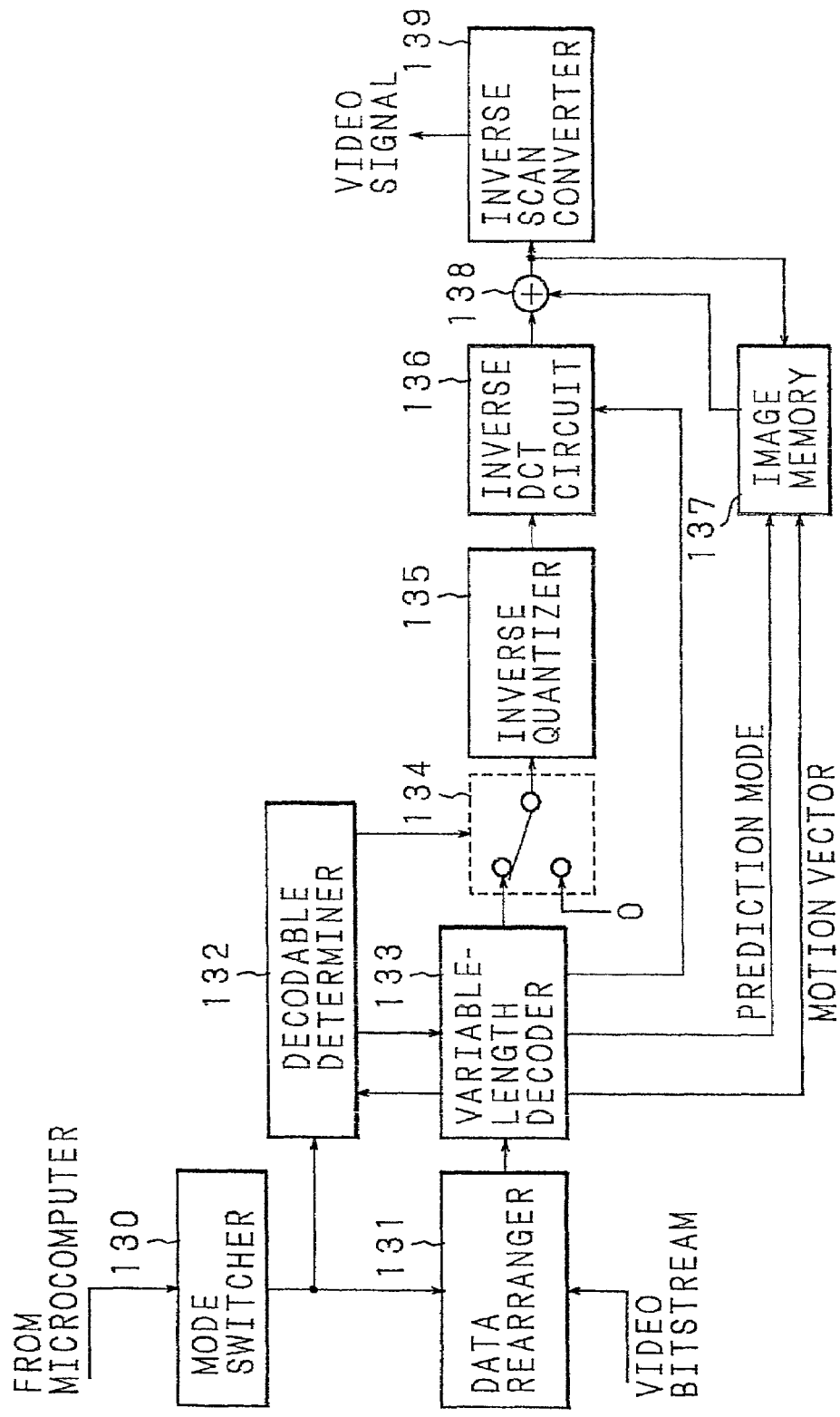
FIG. 72A is a block diagram of a digital video signal decoding unit in embodiment 15.

Further, FIG. 71C shows that one high-frequency macroblock is formed with the DCT blocks Y1H to Y4H of a luminance signal, the DCT block U1H of the color difference signal (B-Y) and the DCT block V1H of the color difference signal (R-Y) with respect to an arrangement of the high area component DCT block. FIG. 71D shows a concept of an arrangement of frequency component data in bit-streams of one block. FIGS. 72A and 72B are a block diagram showing a digital video signal decoding processing unit, and a view showing an operation concept thereof. In FIG. 72A, reference numeral 130 denotes a mode switcher as a mode switching means, 131 a data rearranger as a data rearranging means, 132 a decodable determiner, 133 a variable-length decoder and 134 a switch. The decodable determiner 132 and the switch 134 constitute a data operating means. Reference numeral 135 denotes an inverse quantizer, 136 an inverse DCT circuit, 137 an image memory, 138 an adder, and 139 an inverse scan converter.

Next, an operation will explained. The data shown in FIG. 71 is a code arrangement assembled in 8 bits (1 byte) for example, in the vertical direction. In each macroblock, information is described with respect to the macroblock which is referred to as the macroblock header. This information refers to, for example, an increment address, a quantization scale code, a motion vector, a marker bit, a macroblock pattern or the like.

The coded data of each DCT block follows this macroblock header. A method for embedding this data is constituted so that a byte is constituted with bitstreams to arrange each byte in order. Since each DCT block has a variable code length, the block boundary and the boundary between the header and the data is not completed in the unit of bytes. It often happens that the boundary exists in the midst of one unit of byte. The data in each block has a variable length, and a lower-frequency region is provided at a position nearer to the side of the macroblock head.

This data is divided into the a low frequency component (L) and a high-frequency component (H) to constitute a coded data as shown in FIG. 71B and 71C by setting a fixed length code amount which is irrelevant to the event as a maximum value (the event is a unit for providing one variable-length code, and in the case of the DC component, the DC component constitutes one event while in the case of the AC component a combination of non-zero DCT coefficient and the run length constitutes one event for performing run length coding. One event completes with a code referred to as EOB at the end of the block).

Next, an operation shown in FIG. 72 will be explained. In the beginning, a mode signal is inputted from a microprocessor or the like to the mode switcher 130, the signal indicating that the skip search is being performed, or the normal continuous playback being performed. In the meantime, the playback signal from the disc is amplified with an amplifier, and is digitally demodulated to perform an error correction by performing a differentiation operation from an output data obtained after a signal playback is performed with a clock which is subjected to phase synchronization and is outputted from a PLL or the like, followed by separating an audio signal from a layer of a certain system which constitutes video signal data and audio signal data. Then the bitstream of the video signal is extracted and is inputted to the data rearranger 131.

The output (control signal) of the mode switcher 130 is supplied to the data rearranger 131 and the decodable determiner 132. The data rearranger 131 obtains a control signal and reconnects the data before division from an L component and an H component shown in FIG. 71, or outputs only the L component to the variable-length decoder 133. The variable-length decoder 133 extracts a boundary of events in the L component region together with the decodable determiner 132. The portion up to the boundary is decoded and outputted to the switch 134. This switch 134 is connected so that no zero is inserted at the time of the normal playback. The switch 134, which is controlled with an output of the decodable determiner 132 inputs the decoded low-frequency component to the DCT block. In the meantime, the whole DCT block is constituted so that a zero is inserted into the high-frequency side of the DCT block.

At the time of decoding, the data of the DCT block constituted in the aforementioned manner is subjected to the inverse DCT process. Then, the reading of the image memory 137 is controlled in accordance with the cases of respective pictures to be added by the adder 138. In the case of the I pictures the output of the adder 138 is passed through. In the case of the P picture, the P picture is corrected only by the motion vector of the I picture and P picture to be added. In the case of the B picture, the B picture is corrected by the motion vector from both the I picture and the B picture to be added.

Further, the DCT mode and the prediction mode motion vector at this time are controlled on the basis of information obtained by decoding the header code. In accordance with the aforementioned process, the data which is subjected to the motion compensation prediction is decoded and is stored in the image memory 137. The picture is restored to the original constitution order of the GOP. The inverse scan converter 139 converts the buffering and the block scan into the raster scan in the output order of the picture.

Embodiment 15 is represented to be fixed in length even when the embodiment is shorter than the skip of the macroblock or the predetermined fixed length data. However, even when the length is shorter than the fixed length, the L component can be taken out with certitude by detecting the EOB every time. Consequently, it goes without saying that no problem is caused even when the L component data is connected to the subsequent block. Further, the EOB may be attached to the event demarcation as the L component data when the length exceeds the predetermined length. Further, it goes without saying that an information adding means for adding additional information such as an audio signal, a header or the like and a correction code is further provided to be added to the data in the high-frequency region though not particularly shown in the figures in the explanation of the aforementioned embodiments.

Embodiment 16

Figure 73A:
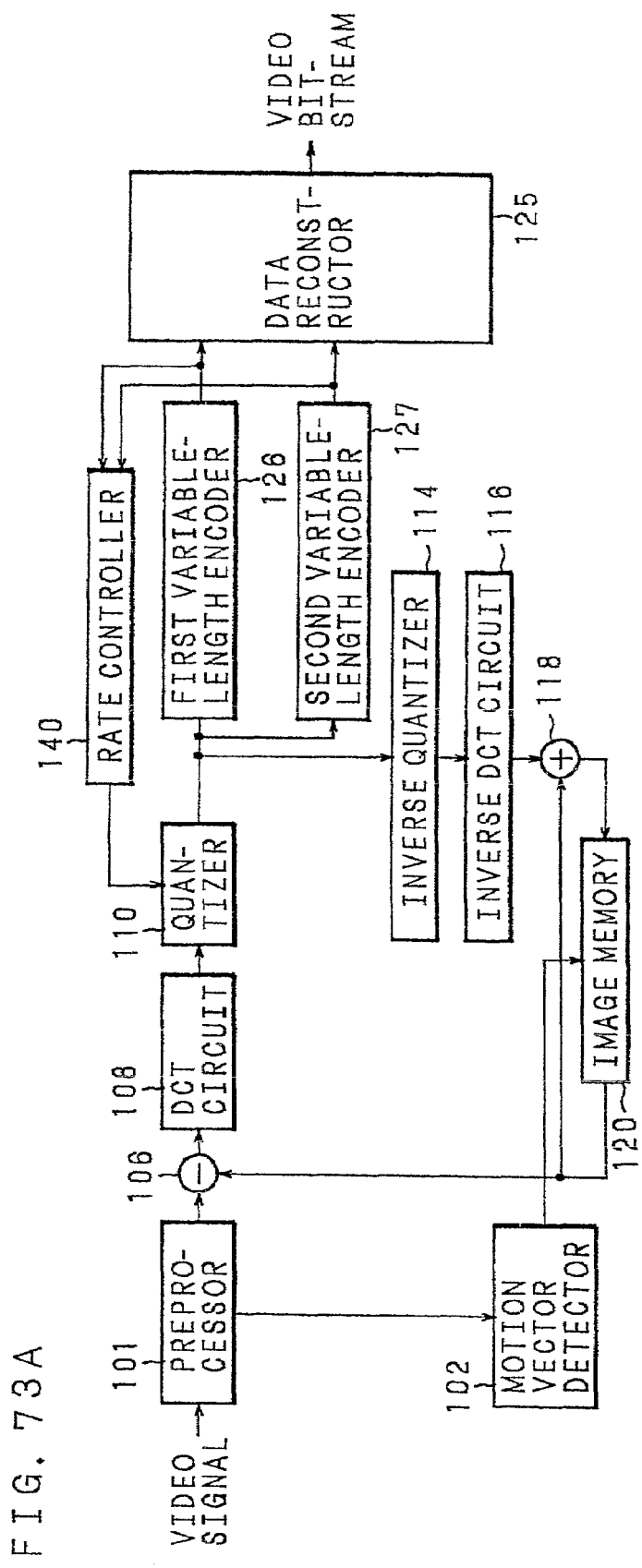
FIG. 73A is a block diagram showing a digital video signal coding unit in embodiment 16.
Figure 73B:
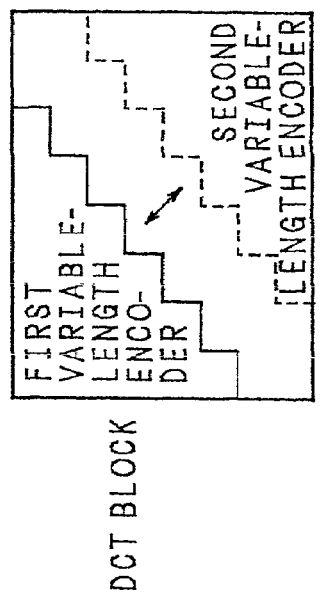
FIG. 73B is a view illustrating an operation concept of a digital video signal coding processing in embodiment 16.

Next, embodiment 16 of the present invention will be explained by referring to FIG. 73 and FIG. 74. FIGS. 73A and 73B are a block diagram of a digital video signal coding processing unit and a view showing an operation concept thereof. In FIG. 73A, reference numeral 140 denote a rate controller. Here, as encoding means, a first variable-length encoder 126 and a second variable-length encoder 127. Like parts or corresponding parts are denoted by like numeral in FIG. 63.

Next, an operation will be explained. An interlace input picture data is buffered with the preprocessor 101 to convert a raster scan into a block scan. The I picture is decoded without performing a calculation between frames using an output of the frame memory which is subjected to the intra-frame coding. Consequently, in the case of the I picture, nothing is inputted to the image memory 120 which is an input of the subtracter 106 so that the video signal passes through the subtracter 106.

This data is orthogonally converted into the frequency component by the DCT circuit 108, and is converted from the low frequency region into the block scan to be subjected to an appropriate quantization by the quantizer 110. A low-frequency region data up to the data of the DCT coefficient at a specific position out of this quantized data is subject to entropy coding and outputted to the data reconstructor 125 via the first variable-length encoder 126.

Further, the second variable-length encoder 127 performs the variable-length coding of the DCT coefficient after the data located after the aforementioned specific position. With respect to the coding of the motion vector and the DC component, only the first variable-length encoder 126 may be used at least. It is required that the EOB is added both to the L component and to the H component even in one block so that the boundary of the L component changes at rates without limitations of codes. The boundary of the L component can be changed at a rate by temporarily arranging an EOB code at a demarcation part of the L component and the H component.

In the meantime, the data quantized by the quantizer 110 is subjected to the inverse quantization by the inverse quantizer 114 to be inversely converted into a space component data by the inverse DCT circuit 116.

The I picture is decoded without performing a calculation between frames using an output of a frame memory which is subjected to the intra-frame coding. Consequently, in the case of the I picture, since nothing is inputted from the image memory 120 to the adder 118, the data is allowed to pass through the adder 118. The output of the adder 118 is used as data stored in the image memory 120. At least the I picture, or the I picture data and the P picture data are required to be stored in the image memory 120. That is because the I picture and the P picture data are required for decoding the B picture normally in the MPEG 1 and the MPEG 2 as reference data.

When the coding of the I picture is ended, the B picture is coded in the bidirectional prediction with the last P picture in the preceding GOP. Then, the output of the preprocessor 101 is compared with the data (arrows in the drawings omitted) from the reference frame memory to detect the motion vector and to judge the prediction mode and the frame structure. On the basis of the result of judgement, the data in the reference frame memory in which the output of the preprocessor 101 is most suitable with the data from the reference frame memory in the reference frame memory is read from the image memory 120 together with the data in the forward direction portion and in the backward direction portion. The data and the output result of the preprocessor 101 are subtracted by the subtracter 106 (the result is referred to as time residual difference component with respect to the P picture and the B picture). This time residual difference component is subjected to DCT process, quantization and variable-length coding process.

When the data is divided into the low-frequency region and the high-frequency region, the rate becomes indefinite in the frequency component. Consequently, since the data rate in the low-frequency region does not become definite, the scope in which an actuator of the head can be controlled cannot be completely compensated for. Here, the rate controller 140 renders the low-frequency component region variable. The rate controller 140 controls the rate so that a size of the low-frequency region becomes variable with respect to the target rate as shown in FIG. 73B.

In other words, while monitoring the output of the first variable-length encoder 126, the rate controller 140 reduces the size of the area occupied by data in the low-frequency region when the monitored output is larger than the target rate set by the application. When the code amount of the first variable-length encoder 126 is small, the rate controller 140 enlarges the area of the low frequency region. In this manner, while monitoring the code amount, the rate controller 140 appropriately changes the setting of the occupied area in the low-frequency region with respect to the first variable-length encoder 126 and the second variable-length encoder 127.

Additionally, for example, a temporary coding may be performed to determine the standard for setting of the occupied area of the low-frequency region from the result as to which region has larger number of codes and which region has smaller number of codes thereby setting the target rate.

Figure 74:
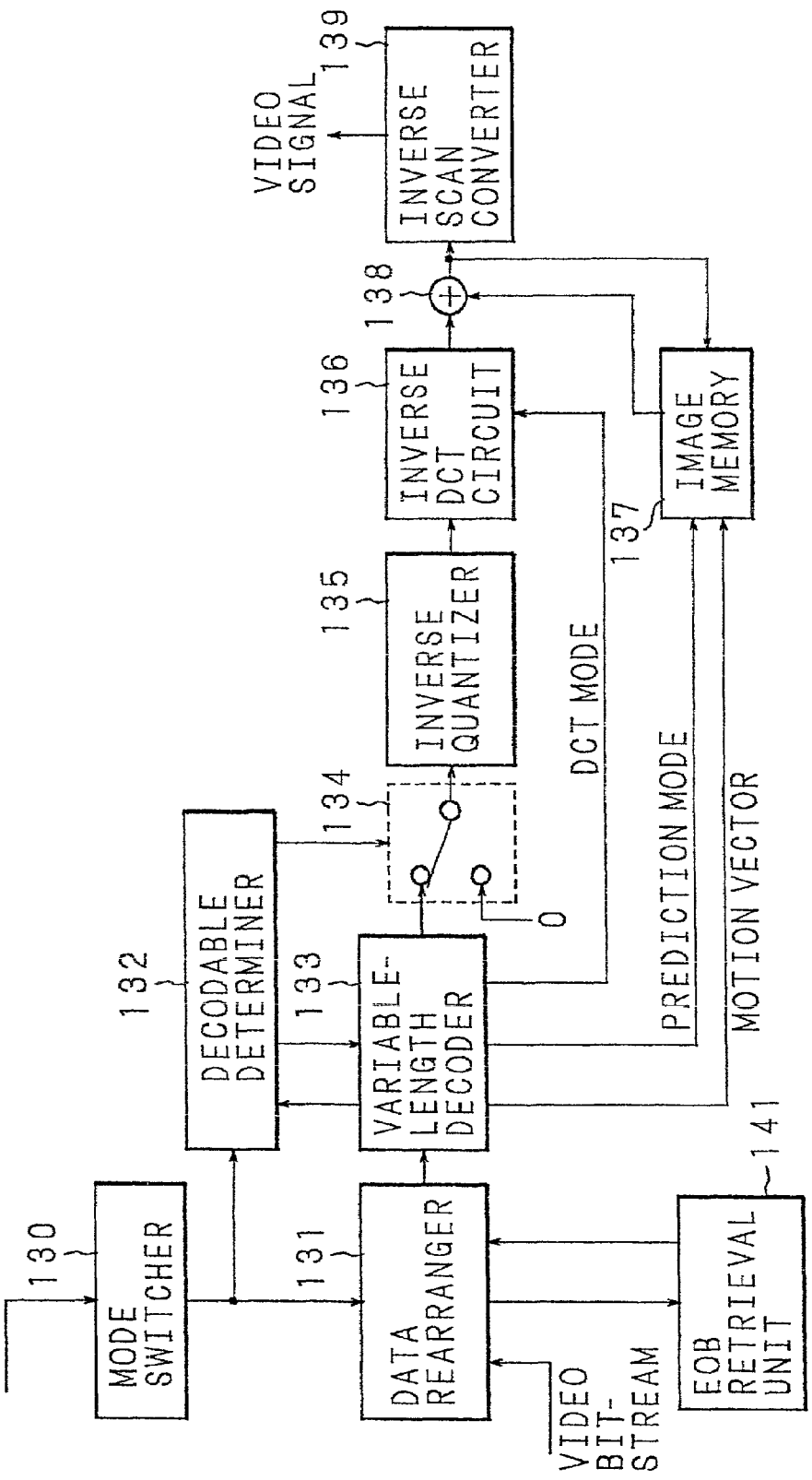
FIG. 74 is a block diagram of a digital video signal decoding unit in embodiment 16.

FIG. 74 is a block diagram of a digital video signal decoding processing unit, a view showing the decoding processing for decoding data coded as described above. In FIG. 74, reference numeral 141 denotes an EOB retrieval unit. Like parts or corresponding parts are denoted by like numerals in FIG. 72A. A mode signal indicative of a state such that the data is being skip searched or the normal continuous playback is being operated is inputted from a microcomputer or the like to the mode switcher 130. In the meantime, a playback signal from the disc is amplified by an amplifier so that the playback signal is differentiated with a clock which is subjected to PLL, for digital demodulation. An audio signal is separated from a system layer by conducting an error correction to extract video bitstreams to be inputted to the data rearranger 131. The output of the mode switcher 130 as mode switching means is supplied to the data rearranger 131 and the decodable determiner 132. The data rearranger 131 obtains this control signal to be operated so as to connect the data before the division from the L component and H component shown in FIG. 71. Otherwise, only the L component is outputted to the variable-length decoder 133 which serves as a decoding means without being connected to the H component.

Theoretically, it never happens that the L component is severed in the midst of the events. In consideration of a case where the signal quality such as skip search or the like is not favorable, the boundary of the events is confirmed with the variable-length decoder 133 and the decodable determiner 132 so that the portion up to the boundary is decoded and outputted to the switch 134. The switch 134 is operated in such a manner that it is always turned on with respect to the playback data with a good signal quality like at the normal playback. Here, the decodable determiner 132 and the switch 134 constitute a data operating means.

The switch 134 is controlled with the decodable determiner 132 so that a zero is inserted into the high-frequency side of the of the block from the low-frequency component which has been successfully decoded thereby constituting the DCT block. Then, the data is subjected to inverse DCT so that the output of the adder 138 is passed through with respect to the case of the I picture. In contrast, with respect to the P picture, the data is corrected and added by the portion of the motion vector in the I picture of the reference. With respect to the B picture, the reading of the image memory 137 is controlled and added by the adder 138 so that the B picture is corrected by the portion of the motion vector from the I picture and the P picture to be added. The DCT mode, and the prediction mode motion vector are controlled by decoding a code of the header. The data which is subjected to motion compensation prediction in this manner is decoded and is stored in the image memory 137. Then, the picture is rearranged into the original constitution order. The inverse scan converter 139 buffers the data and converts the data in the output order from the block scan to the raster scan.

Further, in the aforementioned explanation, an example is explained in which a size of the DCT coefficient is controlled. The number of events may be controlled instead. In this case, it sometimes happens that the L component does not attain a predetermined number of events and EOB is added. However, since the EOB retrieval unit 141 monitors the appearance of the EOB, the L component can be detected with certitude. Here, in particular, the data is reconstituted on the basis of the data in the low-frequency region, the data in the high-frequency region, and the EOB respectively. That is, the data rearranger 131 and the EOB retrieval unit 141 constitutes a data reconstructing means.

Since the energy after the DCT is naturally small, it goes without saying that the L component and the H component are desirably coded in the same manner with respect to the non-coded block which is not coded. With respect to the H component, the data excluding the L component is ideally run-length coded. BY setting the L component to 0, the H component may be coded. Since it is possible to cope with the structure same as the variable-length decoder of the normal MPEG, this one can be simplified in terms of circuits.

Embodiment 17

Figure 75:
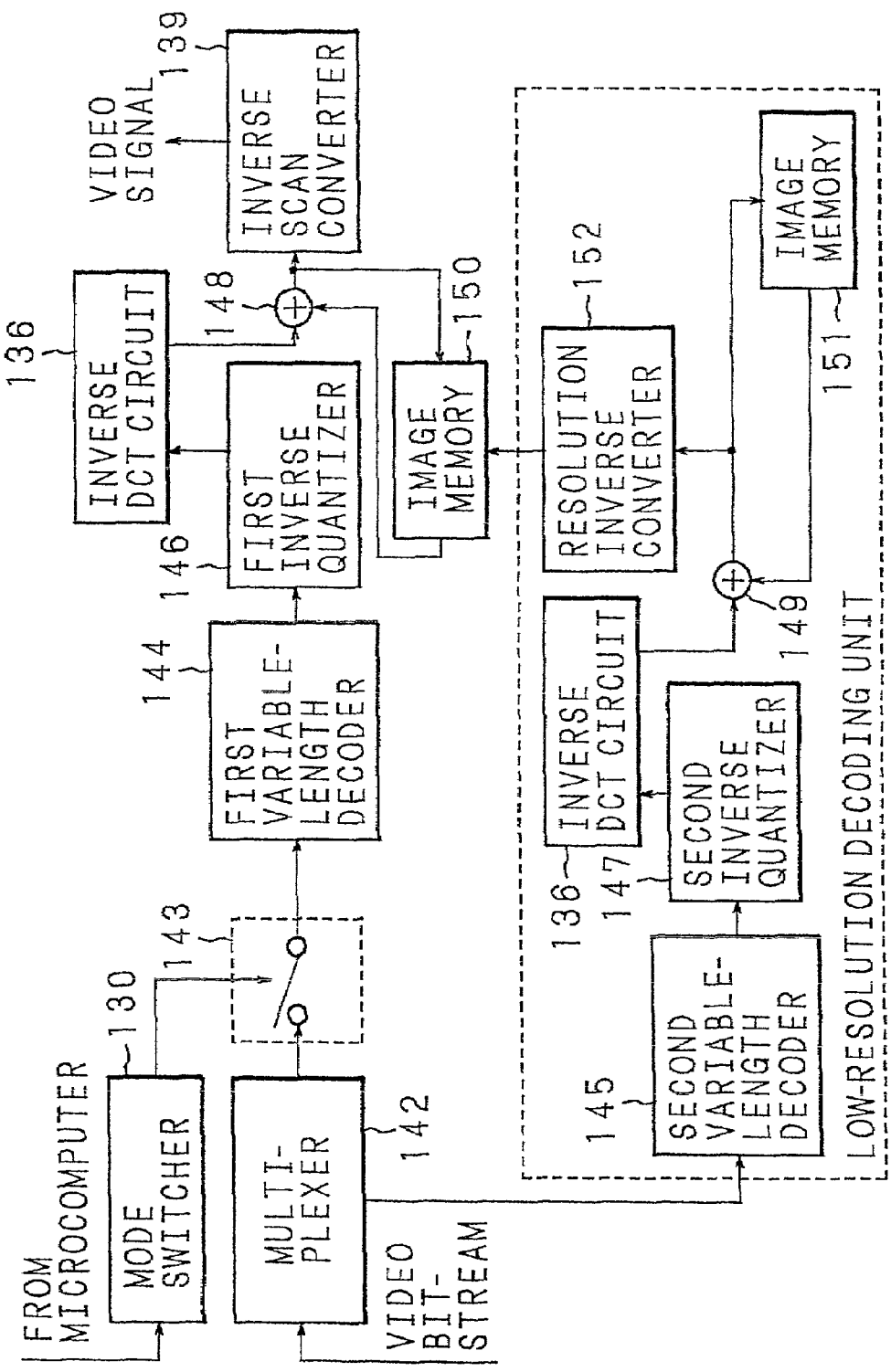
FIG. 75 is a block diagram of a digital video signal decoding unit in embodiment 17.

Embodiment 17 of the present invention will be explained on the basis of FIG. 75. FIG. 75 is a block diagram showing a digital video signal decoding processing unit. In FIG. 75, reference numeral 142 denotes a multiplexer, 143 a switch, 144 a first variable-length decoder, 145 a second variable-length decoder, 146 a first inverse quantizer, 147 a second inverse quantizer, 148 and 149 adders, 150 and 151 image memories, and 152 resolution inverse converter. FIG. 75 also shows a low resolution decoding unit as decoding means. Like parts or corresponding parts are denoted by like numerals in FIG. 72A and an explanation thereof is omitted.

Next, an operation of embodiment 17 will be explained. What is shown in FIG. 75 may be considered as corresponding to the processing block of the video data of a playback signal from the disc in the case where the coded data as described in FIG. 68 is recorded on an optical disc or the like. A mode signal indicative of a state such that a skip search is being performed or normal continuous playback is being performed is inputted from a microcomputer or the like to the mode switcher 130 as a mode switching means. In the meantime, the playback signal from the disc is amplified at the amplifier and a playback signal is differentiated with a clock subjected to PLL for digital demodulation. Then an audio signal is separated from the system layer to extract video bitstreams.

This extracted video bitstream is inputted to the multiplexer 142. The multiplexer 142 sends the data of the low resolution component to the second variable-length decoder 145 while sending the other data to the first variable-length decoder 144 via the switch 143.

The switch 143 is controlled by the mode switcher 130. As a mode, although only the output of the playback picture of the low resolution component is demanded at the skip search or the like, the switch 143 is operated to suspend the sending of redundant data in the case where the resolution residual difference component is played back halfways. Further, at the time of the normal playback, the switch 143 remains connected.

The second variable-length decoder 145 decodes a Huffman code and the run length code to be inversely quantized by the second inverse quantizer 147 and is converted from a frequency component into a space component by the inverse DCT circuit 136.

With respect to the I picture, the converted data is passed through the adder 149 to be stored in the image memory. In the case of the P picture, the first frame of the P picture is read from the I picture stored in the image memory and the P picture of the second frame or after is referred to the preceding P picture stored in the image memory and corrected by the motion vector portion to be subjected to the motion compensation prediction by the adder 149. In the case of the B picture, the same operation is performed on the basis of the I picture and the P picture.

In FIG. 75, a motion vector, a quantization parameter for inverse quantization and a prediction mode are outputted from the variable-length decoder. Such a motion vector, a quantization parameter and the a prediction mode are the same as shown in FIG. 74. A loop shown by a dot line block in FIG. 75 is a constitution unit for decoding a low resolution component. Since the decoding result is interpolated between pixels by the resolution inverse converter 152 as interpolation video generating means to compensate for the decoding result as resolution residual difference component, the decoding result is inputted to the image memory 150.

The decoding of the resolution residual component at the time of the normal playback is outputted as a picture by the inverse scan converter 139 in combination with the decoding result of the low resolution component (or in accordance with the division processing in the case where the decoding of the resolution residual component is performed by time division). The data can be decoded into the frequency component by the first variable-length decoder 144 via the switch 143. The first inverse quantizer 146 inversely quantizes the data and the inverse DCT circuit 136 decodes data into the resolution residual difference component data in the space region.

The image memory 150 refers to the pixel interpolation data of the low resolution component, and further the P picture refers to the I picture, the B picture refers to the I picture and the P picture so that the data is corrected in position by the motion vector portion with the result that the data is read from the image memory 150, and the motion compensation prediction is decoded by the adder 148.

Further, in the case of the skip search, to prevent the resolution residual difference component from being played back halfways, superfluous data is prevented by the switch 143 from being outputted from the inverse DCT circuit 136, by suspending the output of the resolution residual difference. Consequently, only the pixel interpolated data of the low resolution component is outputted (the operation will be the same even if a switch is provided on the input part of the image memory 150) via the image memory 150 and via the inverse scan converter 139.

Embodiment 18

Figure 76:
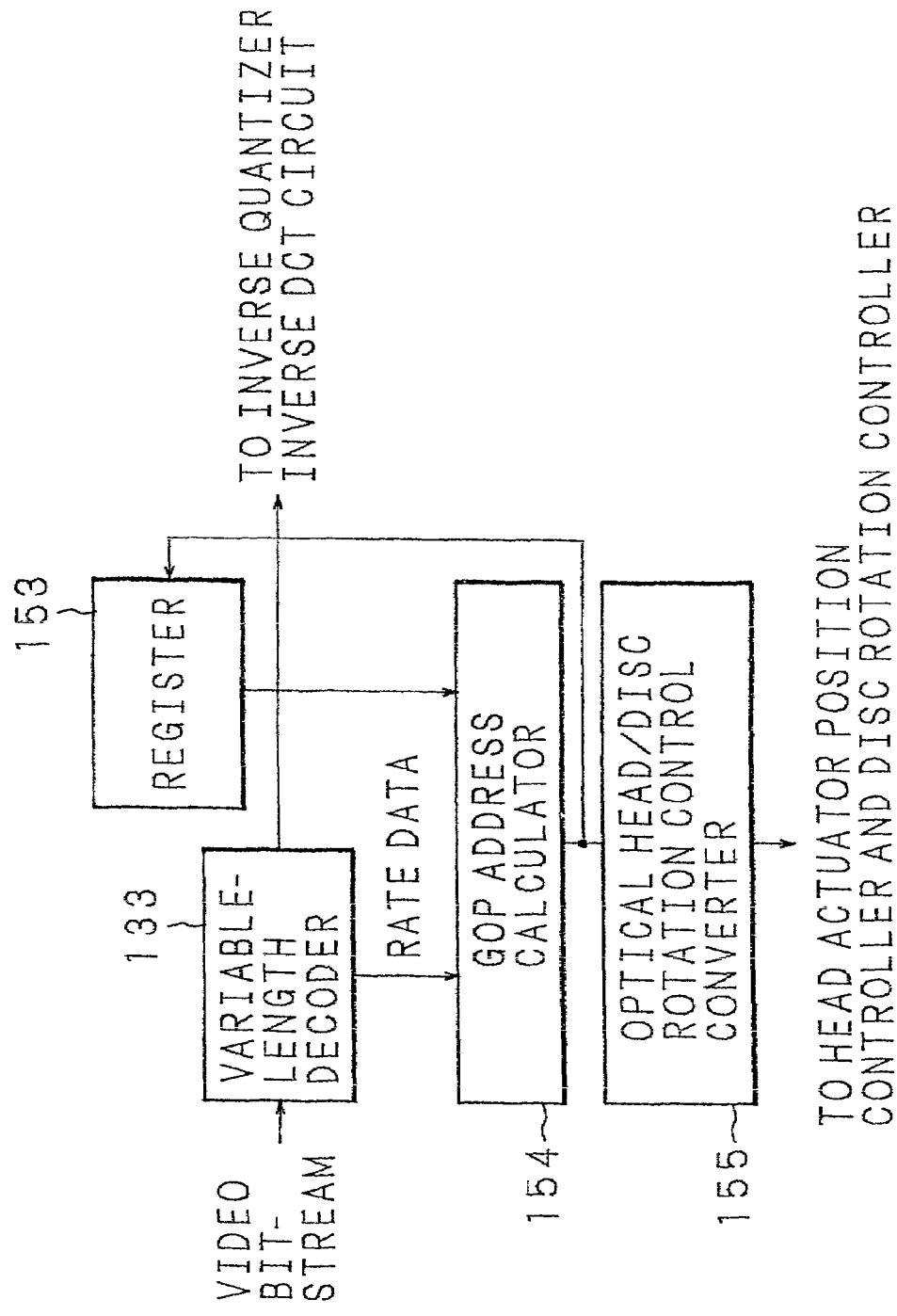
FIG. 76 is a block diagram of a GOP address generator and a disc controller in embodiment 18.
Figure 77:
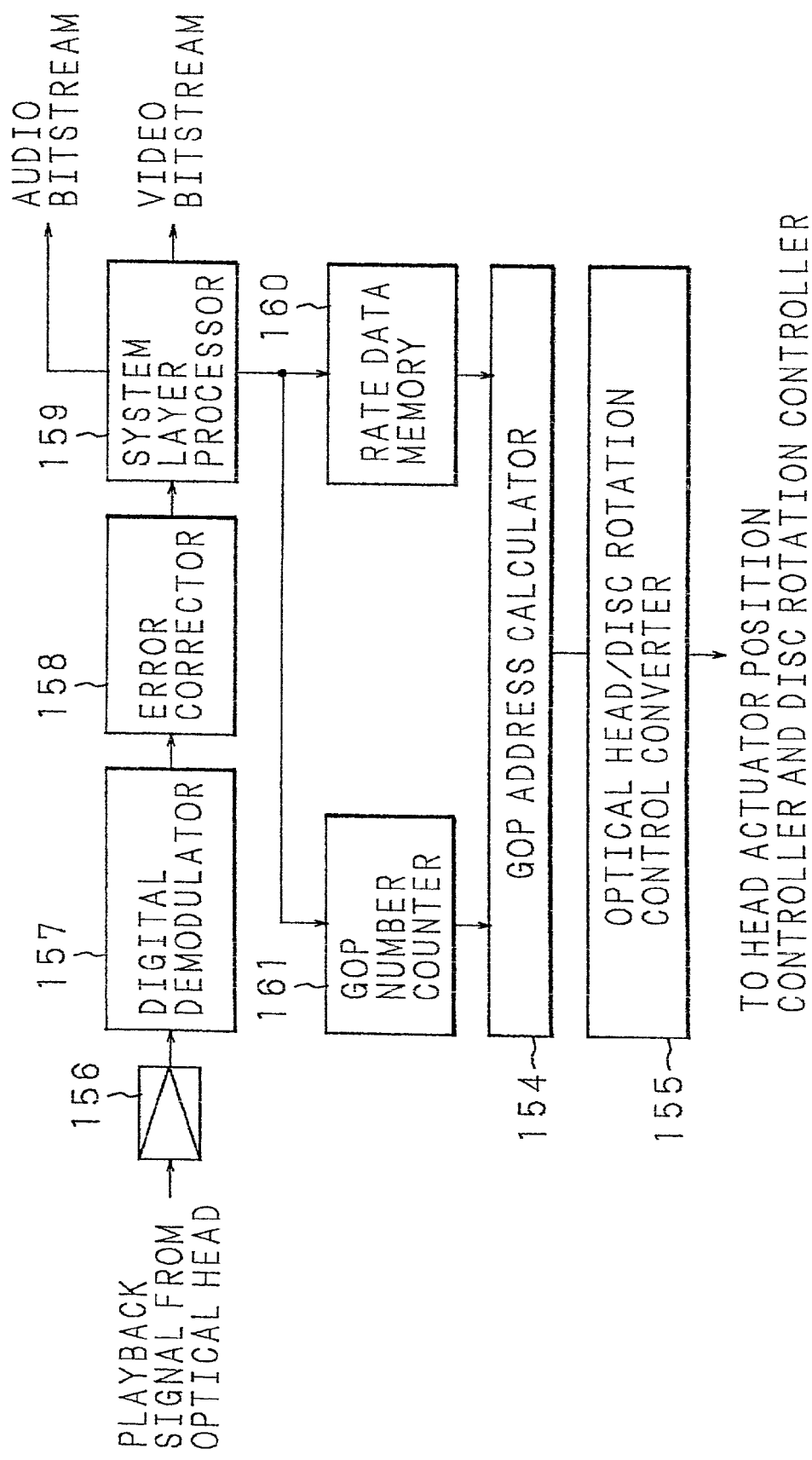
FIG. 77 is a block diagram of a GOP address generator and a disc controller including a playback processing in embodiment 18.

Embodiment 18 will be explained with respect to FIG. 76 and FIG. 77. FIG. 76 is a block diagram showing a GOP address generating unit and a disc control unit, the diagram showing, in particular, a processing block in the case of recording the aforementioned rate information on a sequence header. In FIG. 76, reference numeral 153 denotes a register, 154 a GOP address calculator, and 155 an optical head/disc rotation control converter as a head position converting means and as a disc rotation control converting means. Further, FIG. 77 is a block diagram showing a GOP address generating unit and a disc control unit including a playback processing, the diagram showing, in particular, a structure for performing a GOP playback from a disc on which the aforementioned rate information is collected at several places. Referring to FIG. 77, reference numeral 156 denote a playback amplifier, 157 a digital demodulator, 158 an error corrector, 159 a system layer processor, and 160 a rate data memory. The system layer processor 159 and the rate data memory 160 constitute a data rate information extracting means. Reference numeral 161 denotes a GOP number counter. The GOP address calculator 154 and the GOP number counter 161 constitute a position information calculating means.

Next, an operation of embodiment 18 will be explained. An overall rate of one program can be optimized by rendering the rate per one GOP variable as described in the conventional example with the result that the quality of the picture can be considerably improved. However, it is not apparent that the data falls on the front of the GOP until watching the data content. Also, in the case where it is desired that the software which has been matched halfway be played back again from that position, only way is to detect the starting position by retrieving the data on the disc minutely.

Here, in such a case, the rate control of the variable rate is set, in the beginning, to discrete rate goals such as 1 Mbits, 1.5 Mbits, 2 Mbits, 2.5 Mbits, 3 Mbits or the like so that each of the rate information in all the GOP is recorded on a disc. In particular, it would be most effective when the rate information with respect to each GOP is recorded on a TOC (Table of Content: a record region is assigned to the very beginning of the disc so that information such as the title, the recording time or the like is recorded), a semi-TOC or the like.

Further, the rate information with respect to GOP may be assembled in the sequence header of video bitstreams. For example, two hour software 14.4 k pieces of GOP. The rate information at this time may be represented with 3 bits when the rate information can be divided into five kinds of rates. Consequently, all the GOP rates can be recorded on the disc with 5.4 k (14.4 k pieces×3 bits/8 bits/bytes).

A high speed access can be made to a desired GOP by storing the rate information of each of the GOP in the rate data memory 160 shown in FIG. 77 and adding up the information length corresponding to the value.

The device will be explained with respect to FIG. 76. The Huffman code, the run length code are decoded and the header is deciphered so that the motion vector and the kind of picture are judged.

In the meantime, the sequence header is decoded so that the rate information is inputted to the GOP address calculator 154. In addition, the address information of the GOP which is currently accessed to is stored in the register 153 so that the GOP front address for the next accessed is calculated and stored in the register 153. At the same time, by using the optical head/disc rotation control converter 155 up to the front of the next GOP to be accessed, the position of the optical head is determined on the basis of the address. Then a control signal to the next access is calculated from a difference between the GOP which is being accessed and the front address to be accessed. Based on this control signal, the position control of the optical head actuator and the control of the disc rotation will be performed.

The playback processing will be explained by referring to FIG. 77. The optical head and the optical head rotation are controlled so as to read the data either directly or indirectly from the TOC region or the region corresponding to the TOC region (after the rate information description address is designated, this address portion is accessed to read the rate information). Then, the playback signal from the optical head is amplified with a playback amplifier 156 to detect the wave of this signal by the digital demodulator 157 to differentiate the signal into the digital signal for digital demodulation.

The playback signal which is digitally demodulated into a digital signal is inputted into the error corrector 158 to correct an error included in the playback signal. The data after the error correction is separated into the audio bitstreams, video bitstreams and other data items by the system layer processor 159.

For example, it is judged which kind of data (AV (video and audio) data, text data and binary data such as program or the like) this signal belongs to cut and classify the stream channel. In such a process, the aforementioned rate information is stored in the rate data memory 160.

In contrast, information as to which number of GOP is desired to be processed is generated by using the GOP number counter 161. On the basis of the address calculated by the GOP address calculator 154 the optical head actuator and the disc rotation speed of the disc are controlled.

In the aforementioned explanation, an example is given in which the GOP number counter 161 receives a signal from the system layer processor 159. In the case where a part which the user I/F such as the microcomputer substitutes a processing or in the case where the operation moves from the playback to the skip search, it would be more efficient to input address data from a variable-length decoder or the like for processing the video bitstream.

Embodiment 19

Figure 78:
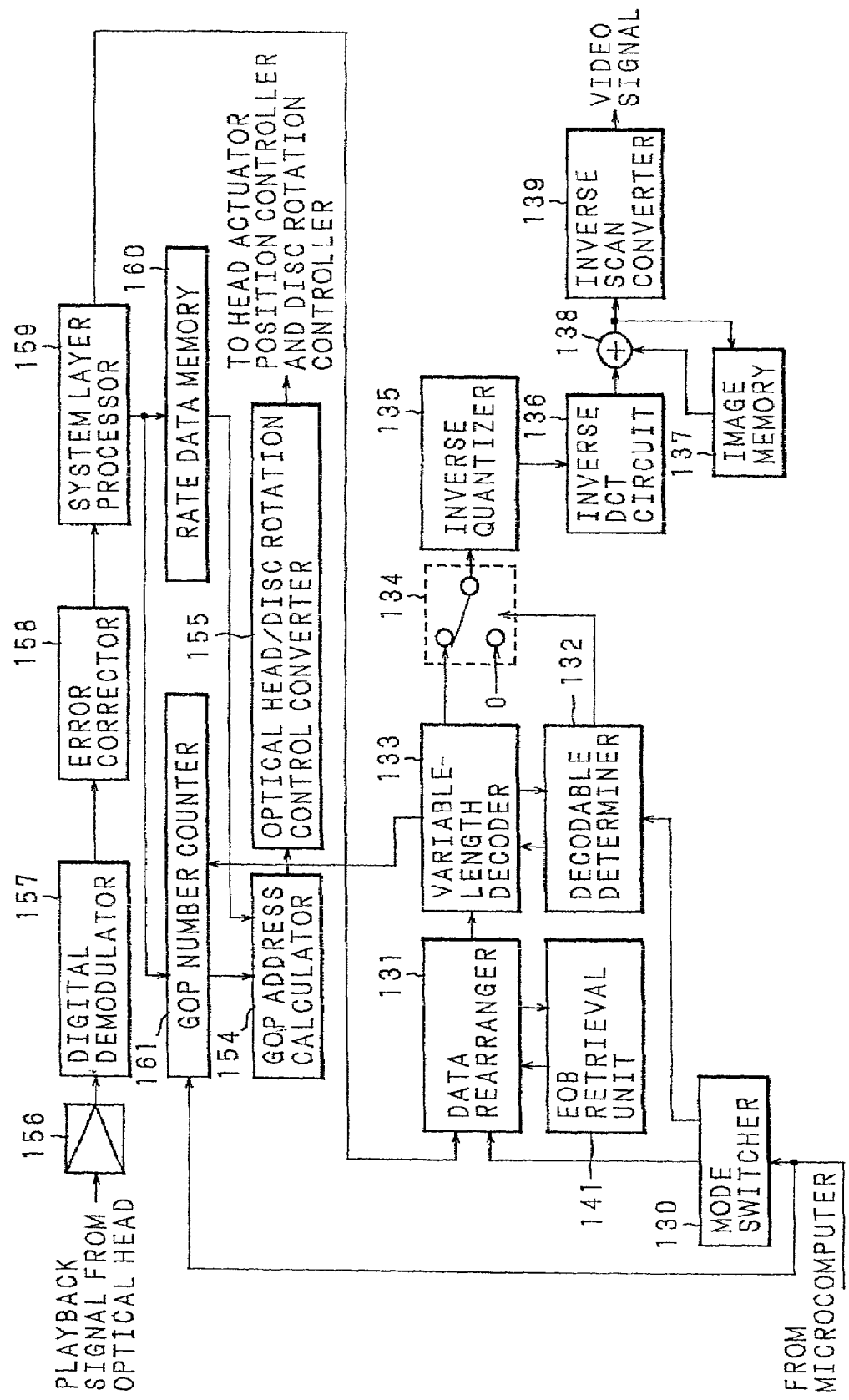
FIG. 78 is a block diagram of a digital video signal decoding unit when the division by the frequency and the division by the quantization in embodiment 19 are performed.
Figure 79:
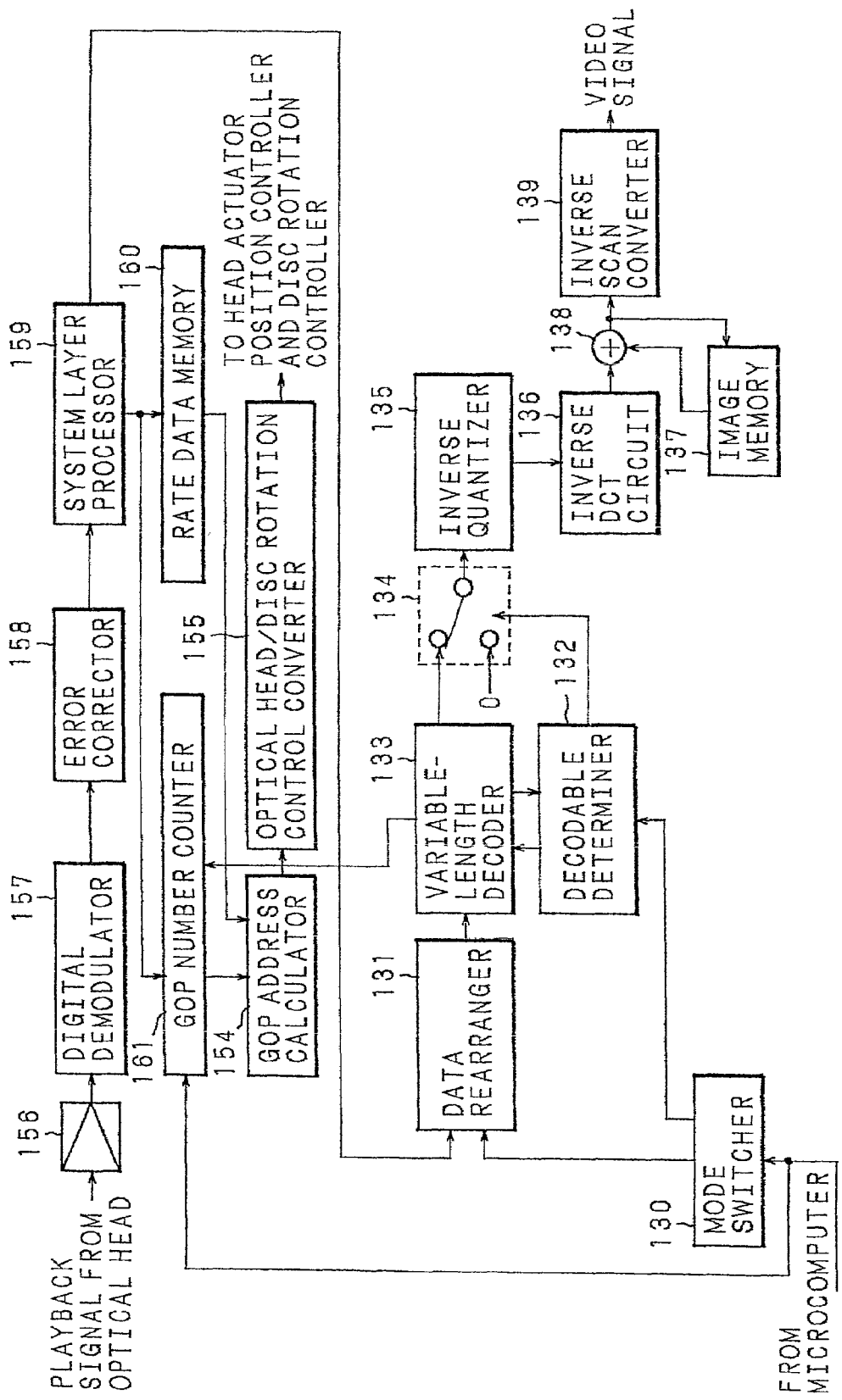
FIG. 79 is a block diagram of the digital video signal decoding unit when the division by the bit length in embodiment 19 is performed.

Next, embodiment 19 of the present invention will be explained based on FIG. 78, FIG. 79 and FIG. 80. An operation will be explained hereinbelow. FIG. 78 is a view showing a signal processing unit in the case in which the division by the frequency of the digital signal playback unit and the division by the quantization are performed, the view being a block diagram of a structure used in the playback processing in the case where the rate information is collected and recorded at several places on the disc. Like parts or corresponding parts are denoted by like symbols in the aforementioned embodiments in the drawings.

The optical head or the optical head rotation are controlled so that the data is either directly or indirectly read from the TOC region or the region corresponding to the TOC region (the rate information description address is designated). The playback signal is amplified with the playback amplifier 156. Then, this signal is detected by the digital demodulator 157 to be differentiated for digital demodulation. Consequently, the playback signal which becomes a digital data is inputted to the error corrector 158 to correct an error included in the playback signal. The data free from errors is separated into audio bitstreams and video bitstreams by the system layer processor 159 and other data is processed as well.

For example, it is judged which kind of data (AV) data, text data, or binary data or the like such as programs) this signal belongs to divide and classify stream channels. Out of them, the aforementioned rate information is stored in the rate data memory 160. In contrast, information is generated as to which number of the GOP is desired to be processed is generated by using the GOP number counter 161. Then the address is calculated by the GOP address calculator 154. On the basis of the address calculated by the GOP address calculator 154, the optical head actuator and the rotation speed of the disc are controlled.

In this manner, at the time of skip playback, skipping is performed on the disc to find the address of the GOP to be accessed. When the skipping is performed to make an access to a desired GOP, low-frequency region data obtained by using a structure described, for example, in embodiment 16 is played back and described on the screen while calculating the next address in the same manner.

A mode signal indicative of the state such that the data is being skip searched or a normal playback is being continuously performed is inputted from a microcomputer to the mode switcher 130. As described above, the video bitstream is extracted to be inputted into the data rearranger 131. The output of the mode switcher 130 is supplied to the data rearranger 131 and the decodable determiner 132. The data rearranger 131 obtains such a control signal to operate so that the data before division is reconnected from the L component and the H component in FIG. 71. Otherwise, the data rearranger 131 outputs only the L component to the variable-length decoder 133 without connecting the L component to the H component.

In embodiment 19, theoretically it does not happen that the L component is cut in the midst of the event. However, considering the case where a signal having an unfavorable signal quality of the skip search or the like is decoded, the boundary of the event is confirmed with the variable-length decoder 133 and the decodable determiner 132 for assurance so that a portion up to the boundary is decoded and outputted to the switch 134.

The switch 134 is controlled with an output from the decodable determiner 132 so that a zero is inputted to the high-frequency side of the block from the low-frequency component which has been successfully decoded to constitute the DCT block. Then the reading of the image memory 137 is controlled and added by the adder 128 so that the data is subjected to the inverse DCT in such a manner that the output of the adder 138 is passed through in the case of the I picture and the data is corrected by the motion vector portion to be added in the case of the P picture and the data is corrected by the motion vector portion from the I picture and the P picture and is added in the case of the P picture.

Further, the DCT mode and the prediction mode motion vector at this time are controlled by decoding the header code. In this manner, the data subjected to the motion compensation prediction is decoded and stored in the image memory 137 to constitute the picture in the original constitution order. At the inverse scan converter 139, the data is buffered to convert the data from the block scan to the raster scan in the output order of pictures. In addition, the switch 134 is not connected so that a zero is inserted at the time of the normal playback, but is controlled to operate and play back only the playback data.

Further, in the case where the data is divided and coded into the low frequency region and the high frequency region, there may be cases in which a quantization table which places an emphasis on the low frequency side, a quantization table which places an emphasis on the high frequency side, and a fine quantization irrespective of the frequency region quite evenly with respect to one quantization table are prepared. Such a case can be realized when two sets of the variable-length decoder and the inverse quantizer are provided as can be seen in the local decoder shown in FIG. 68. At that time, the data rearranger 131 has to be a multiplexer.

Next, an operation of embodiment 19 will be explained on the basis of FIG. 79. FIG. 79 is a view showing a signal processing unit in the case where division by the bit length of the digital signal playback unit is performed, the view being a block diagram for explaining an embodiment with respect to the playback processing in the case where the aforementioned rate information is collected and recorded particularly at several places on the disc. For example, at the very beginning of the playback of the disc which is a predetermined region on the recording medium, the optical head and the optical head rotation is controlled so that data is directly or indirectly read from the TOC region or a region corresponding to the TOC region (designating the rate information description address), and the playback signal from the optical head is amplified with the playback amplifier 156 so that this signal is detected with the digital demodulator 157 to be differentiated into a digital signal for digital demodulation.

As a consequence, the playback signal which has become a digital data is inputted to the error corrector 158 to correct an error included in the playback signal. The data free from errors is separated into audio bitstreams and video bitstreams and other data items are processed as well.

For example, this signal judges whether the data is video audio data, text data or binary data of programs or the like to cut and classify the stream channel. Out of such data, the aforementioned rate information is stored in the rate data memory 160. In the meantime, information is generated by the GOP number counter 161 as to which number of the GOP is desired to be processed, and the address is calculated by the GOP address calculator 154 to control the actuator and the rotation speed of the disc.

In this manner, the address of the GOP to be accessed at the time of the skip playback is searched for by skipping on the disc. When the desired GOP is accessed, the next address is calculated in the same manner and at the same time the data of the low frequency region obtained by using the structure described, for example, in embodiment 15 is played back to represent the data in one screen.

A mode signal indicative of the state such that the skip search is being performed or a normal continuous playback is being performed is inputted to the mode switcher 130 from the microcomputer or the like. The video bitstream is extracted and is inputted to the data rearranger 131. An output of the mode switcher 130 is supplied to the data rearranger 131 and the decodable determiner 132. The data rearranger 131 obtains this control signal to operated to reconnect data before the division from the L component and the H component of FIG. 71. Otherwise, the data rearranger 131 outputs only the L component to the variable-length decoder 133 without connecting the L component to the H component.

The variable-length decoder 133 and the decodable determiner 132 extract the boundary of the events in the L component so that the portion up to the boundary is decoded and outputted to the switch 134. The switch 134 is controlled by the output of the decodable determiner 132 so that a zero is inserted to the high-frequency side of the block from the low-frequency component which has been successfully decoded to constitute a DCT block. The data is subjected to the inverse DCT. In the case of the I picture, an output of the adder 138 is passed through. In the case of the P picture, the picture is corrected by the motion vector portion within the I picture of the reference to be added. The reading of the image memory 137 is controlled and added by the adder 138 so that the data is corrected by the motion vector portion.

Further, the DCT mode and the prediction mode motion vector are controlled by decoding the header code. In this manner, the data subjected to the motion vector prediction is decoded and stored in the image memory 137 to constitute the picture in the original order of the constitution of the GOP. The inverse scan converter 139 buffers the data to convert the data from the block scan to the raster scan. Further, the switch 134 is not connected to insert a zero at the time of the normal playback to perform connecting operation to play back only the playback data.

Next, an operation of FIG. 80 will be explained. FIG. 80 is a view showing a signal processing block in the case where the data is divided with the resolution of the digital signal playback part, the view being a block diagram explaining an embodiment with respect to the playback processing in the case, in particular, where the aforementioned rate information is collected at several places on the disc. The optical head and the rotation of the optical head is controlled so that the data is directly or indirectly (rate information description address designated) read from the TOC region or a region corresponding to the TOC region at the beginning of the disc playback, and the playback signal from the optical head is amplified by the playback amplifier 156. This signal is detected with a digital demodulator 157 to be differentiated into the digital signal for digital demodulation.

Consequently, the playback signal which has become digital data is inputted to the error corrector 158 in which an error included in the playback signal is corrected. The data free from errors is separated into audio bitstreams and video bitstreams by the system layer processor 159, and other data items are processed as well. For example, by judging whether the signal is video audio data, text data or binary data of programs or the like, the stream channel is cut and classified. Out of such data, the aforementioned rate information is stored in the rate data memory 160.

In the meantime, information is generated by the GOP number counter 161 as to which number of the GOP is desired to be processed, and the address is calculated by the GOP address calculator 154 to control the optical head actuator and the rotation speed of the disc. In this manner, the address of the GOP to be accessed at the time of the skip playback is searched for by skipping on the disc. When the desired GOP is accessed, the next address is calculated in the same manner and at the same time the data of the low frequency region obtained by using the structure described, for example, in embodiment 15 is played back to represent the data in one screen.

A mode signal indicative of the state such that the skip search is being performed or a normal continuous playback is being performed is inputted to the mode switcher 130 from a microcomputer or the like. The video bitstream is extracted and inputted to the multiplexer 142. The multiplexer 142 sends the low resolution component data to the second variable-length decoder 145 while sending other data items to the first variable-length decoder 144 via the switch 143. The switch 143 is controlled with the mode switcher 130. Despite that only the playback picture output of the low resolution component is demanded as a mode in skip search or the like, the switch 143 is operated so as to be turned off in the case where the resolution residual component is played back halfways. Further, when a playback operation is performed in which a good signal transmission quality is attained in such cases as the normal playback, the switch 143 is turned on.

The second variable-length decoder 145 decodes a Huffman code and a run-length code. The data is subjected to inverse quantization by the second inverse quantizer 147 to be converted from a frequency region to the space region by the inverse DCT circuit 136. When the data is the I picture, the data passes through the adder 149 to be stored in the image memory. When the data is the P picture, the P picture is referred to from the image memory followed by being corrected in position by the motion vector portion to be read to decode the motion compensation prediction by the adder 149. When the data is the B picture, the same operation is performed with respect to the I picture and the P picture.

Figure 80:
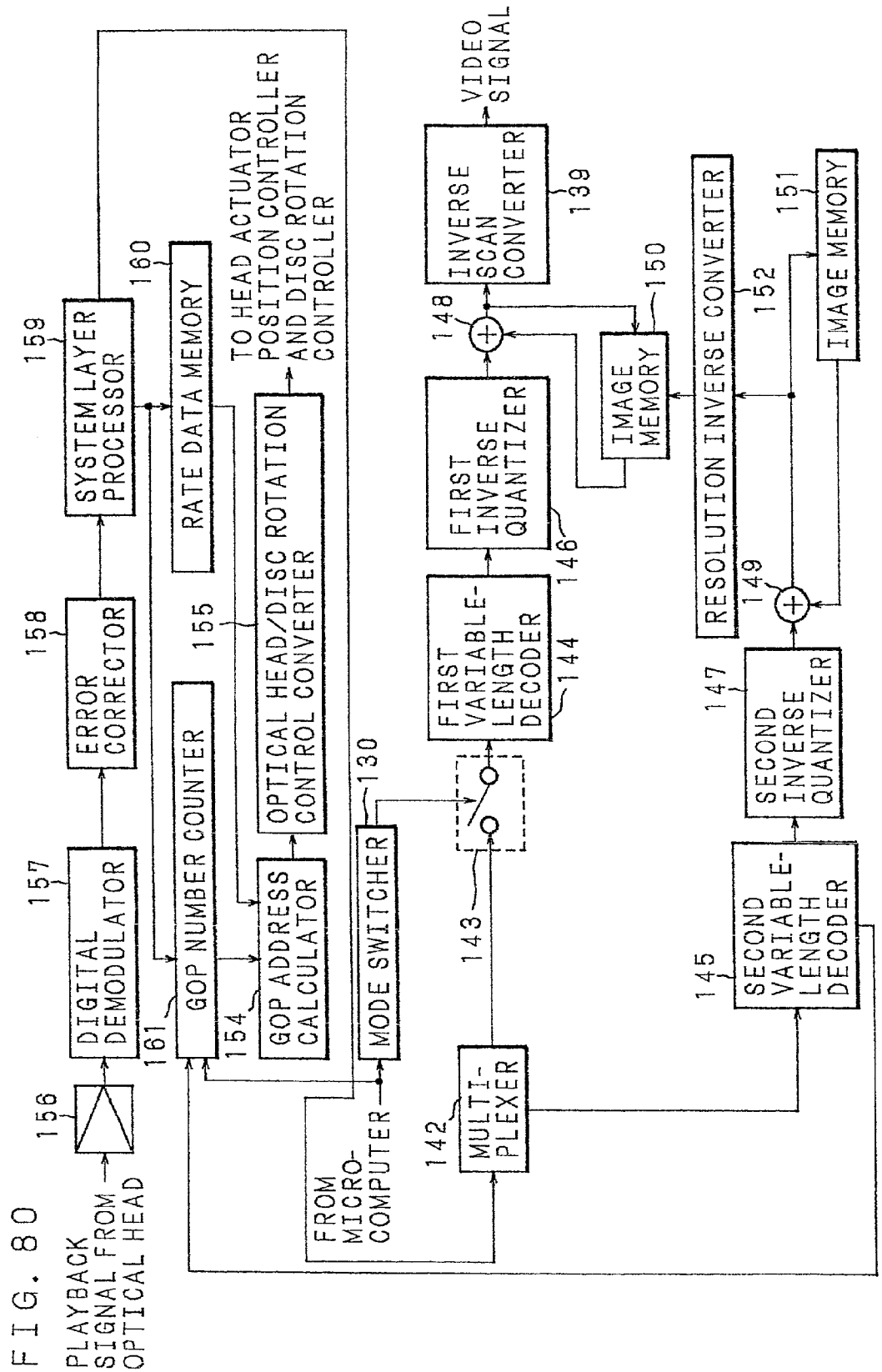
FIG. 80 is a block diagram of the digital video signal decoding unit when the division by the resolution in embodiment 19 is performed.

In FIG. 80, the motion vector, the quantization parameter for the inverse quantization, and the prediction mode are outputted from the variable length decoder. Since the flow of information is the same as FIG. 74, an explanation thereof is omitted. A loop on the low side of FIG. 75 is the decoding of the low resolution component. The decoding result is subjected to pixel interpolation by the resolution inverse converter 152 to compensate for the decoding result as the resolution residual difference, the data is inputted to the image memory 150.

Embodiment 20

Figure 81:
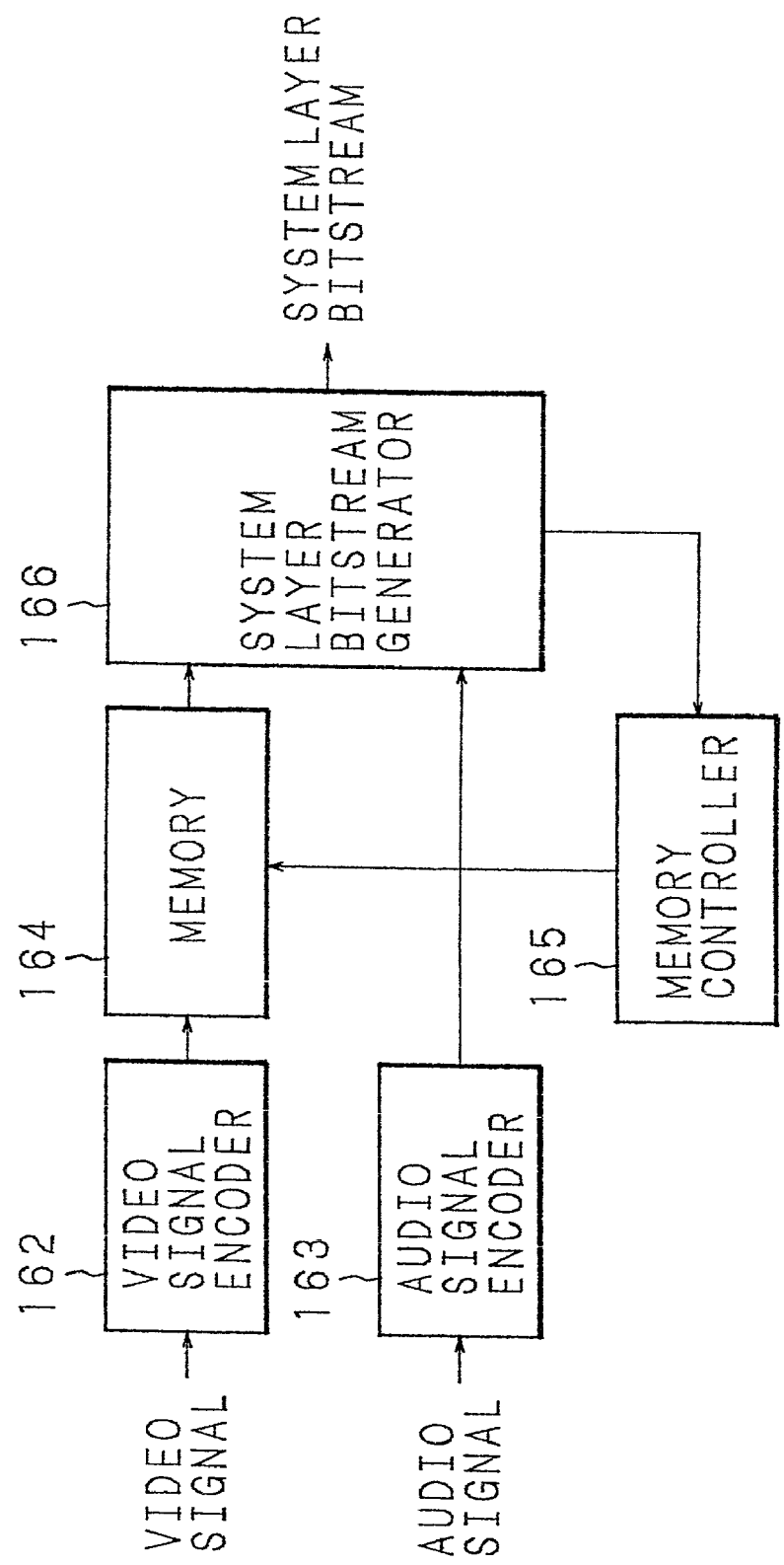
FIG. 81 is a block diagram of the digital video signal coding unit in embodiment 20.
Figure 82:
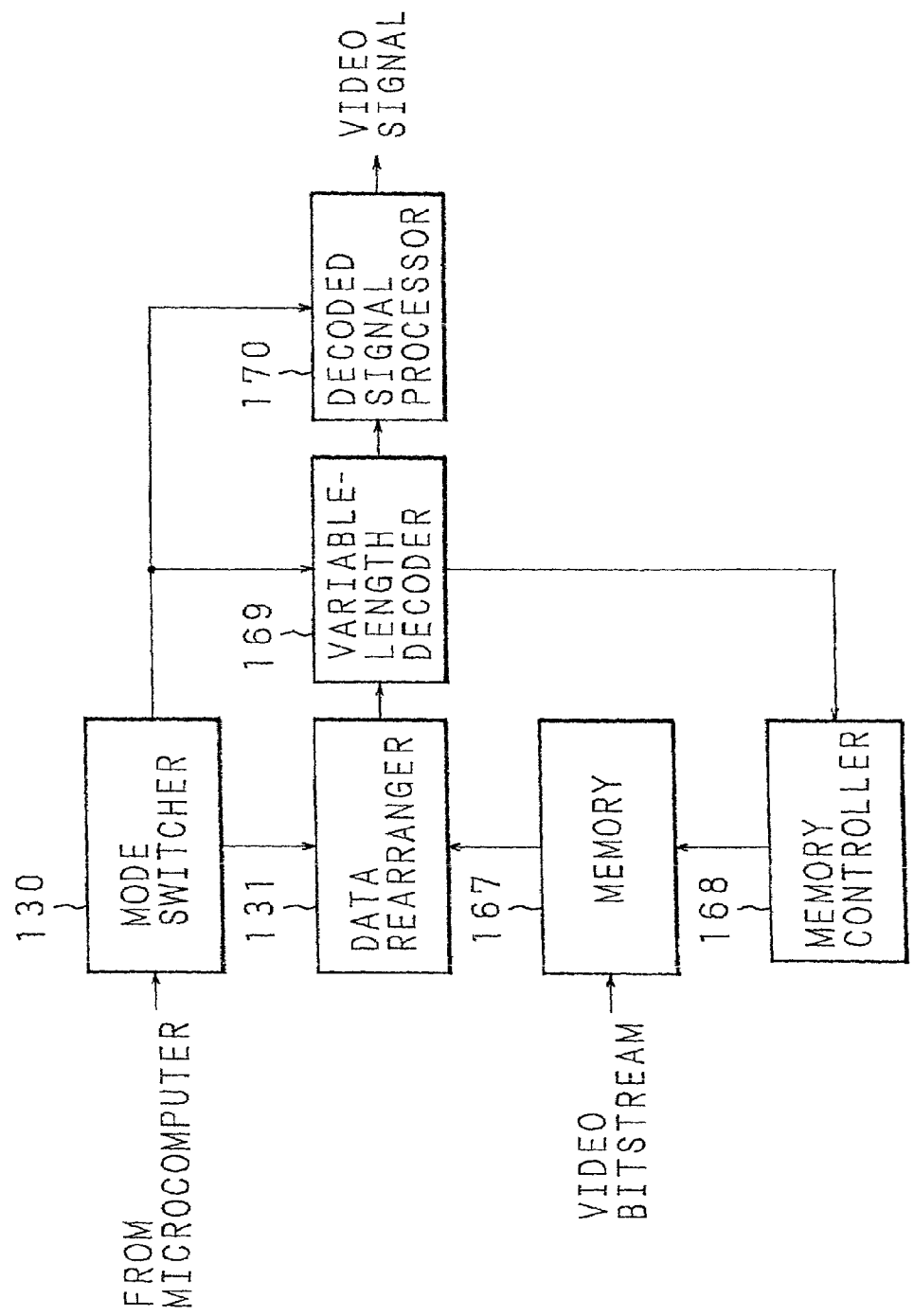
FIG. 82 is a block diagram of the digital video signal decoding unit in embodiment 20.

Next, embodiment 20 of the present invention will be explained with reference to FIG. 81, FIG. 82 and FIG. 83. FIG. 81 is a block diagram for coding process. FIG. 82 is a block diagram for decoding process. In FIGS. 81 and 82, reference numeral 162 denotes a video signal encoder as encoding means. 163 an audio signal encoder, 164 and 167 memories, 165 and 168 memory controllers. The memory 164 and the memory controller 168 constitute a data supplying means. Further, the video signal encoder 162 and the memory controller 165 constitute a code amount comparing means. Reference numeral 166 denotes a system layer bitstream generator. Reference numeral 169 denotes a variable-length decoder and 170 a decoded signal processor after the variable-length decoder. The variable-length decoder 169 and the decoded signal processor 170 serve as a data decoding means. The data rearranger 131 of FIG. 82 serves as a data reconstructing means.

In the beginning, an operation of a structure shown in FIG. 81 will be explained. Between the video signal encoder 162 and the system bitstream generator 166, the memory 164 is arranged. After the data is embedded between each of the GOPs of coded video signals, each of the GOPs is inputted to the system layer bitstream generator 166 while the audio signal is coded with the audio signal encoder 163 followed by being inputted to the system bitstream generator 166 along with a video signal to be subjected to an operation of adding headers or the like.

Figure 83A:
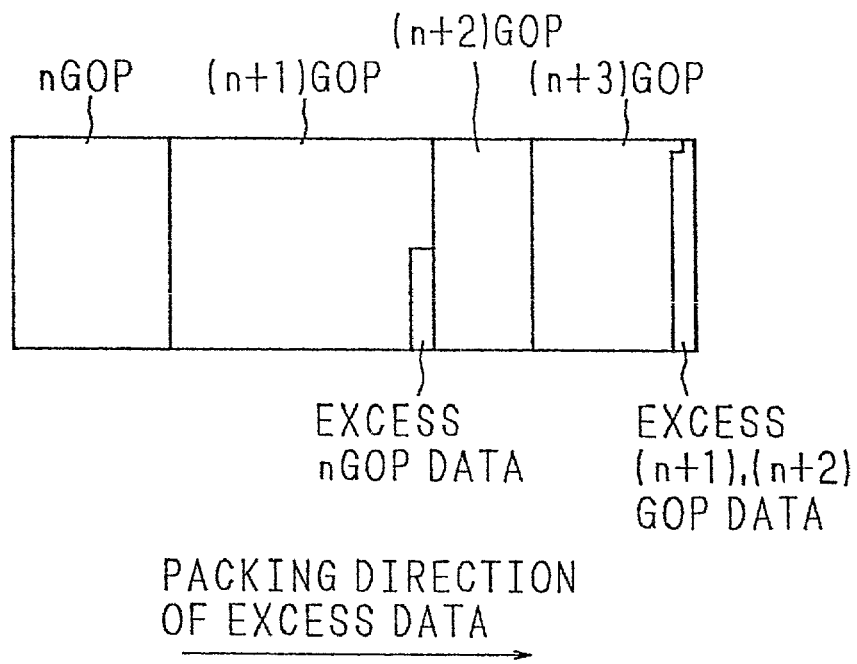
FIGS. 83A and 83B are views illustrating a concept of the processing with the digital video signal record and playback device in embodiment 20.

Here, data embedding operation in the memory 164 will be described. The memory controller 165 serves as a control circuit of the memory 164 to control the coded video signal controls video signal data so as to embed the space between each of the GOPs. A signal processing will be explained by referring to FIG. 83 hereinbelow. FIG. 83 is a view illustrating a concept of processing at the digital video signal record and playback device. For example, in the case where (n+1)GOP end halfways with respect to an access position of an optical head or a control unit of an error correction to generate a space of a data region when nGOP generates superfluous data with respect to the access position of the optical head and the control unit of an error control, the device of the invention is controlled so that, as shown in FIG. 83A, the superfluous nGOP data is embedded in a space part after (n+1)GOP, and in the same manner a little amount of residual data of (n+1)GOP which cannot be embedded in the space because nGOP is embedded and (n+2)GOP are embedded in a space part of (n+3)GOP (the data is embedded in a direction from the left to the right on the paper).

Figure 83B:
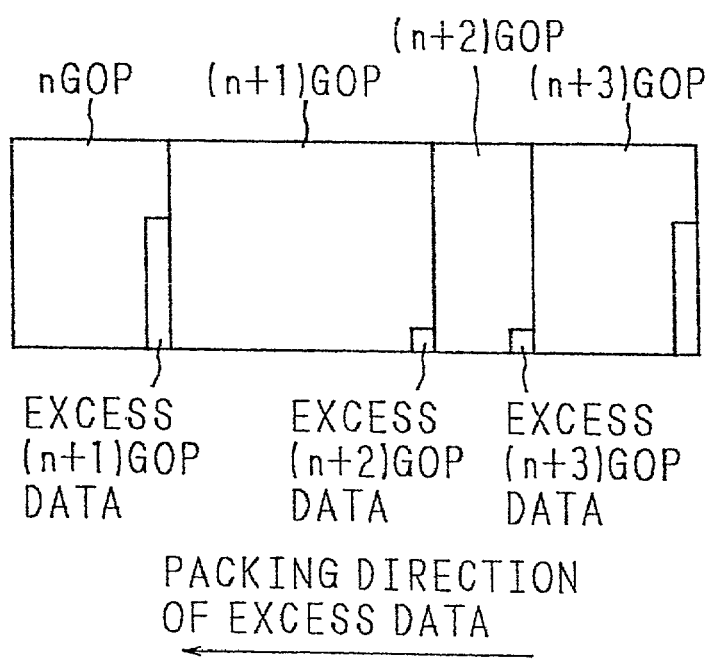

Further, as another method of control, the superfluous data is not sent in the backward direction as described above. As shown in FIG. 83B, when (n+2)GOP exceeds the access position a little so that the (n+3)GOP ends halfways with respect to the access position of the optical head and the control unit of the error control, the device of the present invention is controlled so that the superfluous (n+3)GOP data is embedded in the space part after the (n+2)GOP data, and in the same manner, the residual data of (n+2)GOP which cannot be embedded because (n+3)GOP is embedded is embedded in the space part of (n+1)GOP and (n+1)GOP which cannot be embedded is embedded in the space part of nGOP (in the embedding direction from the right to the left on the paper).

Next, an operation of a structure shown in FIG. 82 will be explained. The memory 167 is controlled by the memory controller 168 so that the data rearranged in accordance with the rule described with respect to the aforementioned FIGS. 83A and 83B is restored to the original state. For example, in the case where the data shown in FIG. 83A is restored, the device of the invention is operated so that the GOP data is restored to the original state such that nGOP portion which follows (n+1)GOP is connected to a part after nGOP data on the left side of the paper followed by connecting (n+1)GOP data thereafter and then connecting (n+1)GOP data following the (n+2)GOP data.

This rearranging rule is required to be defined in advance as a formatting rule of a medium so that the rule is recorded as flag information in a well-organized region following, for example, the TOC region. In the case where the rule is not defined, the rule must be clearly described somewhere on the medium.

Embodiment 21

Figure 84:
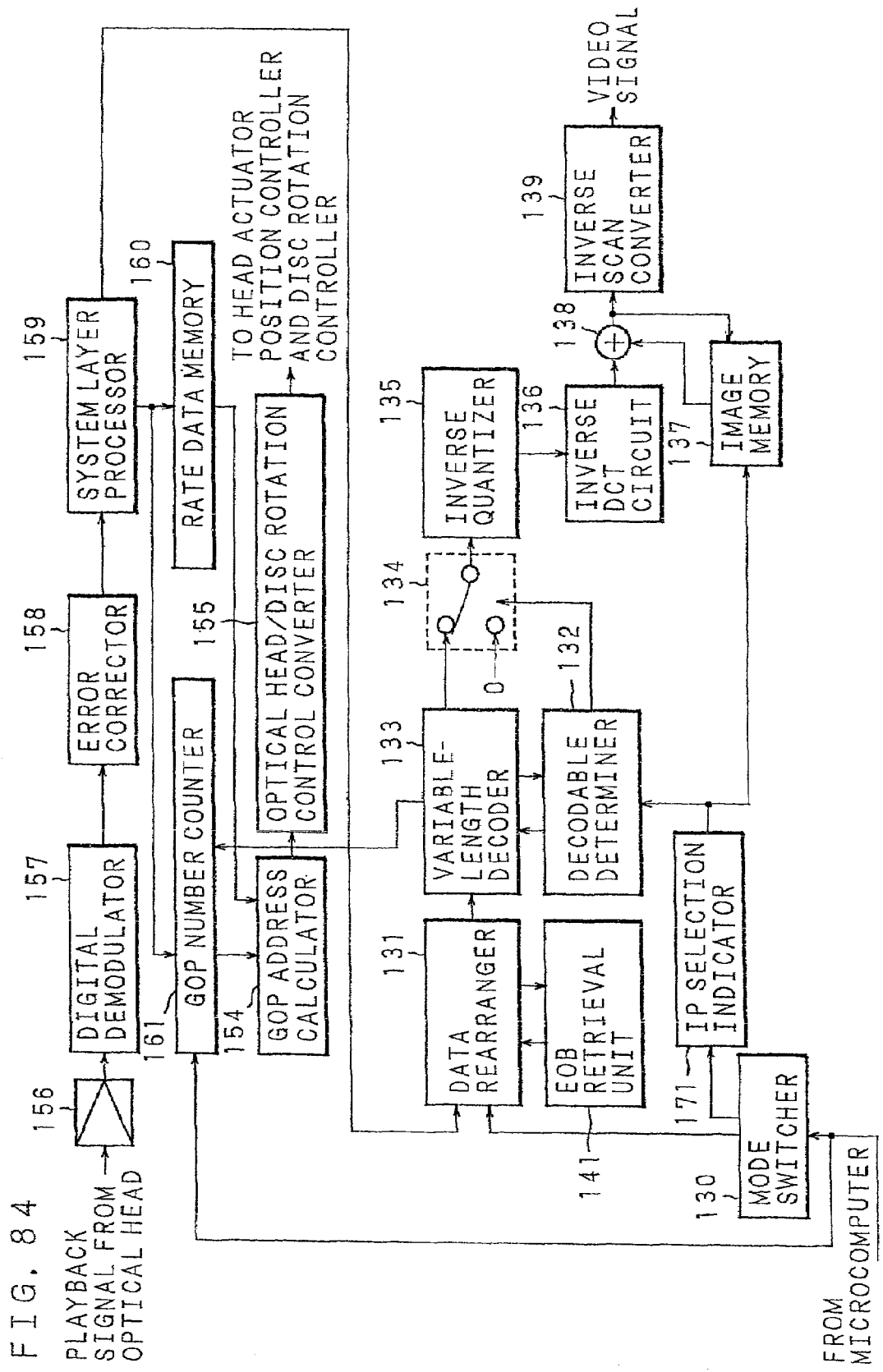
FIG. 84 is a block diagram of the digital video signal decoding unit when the division by the frequency or the division by the quantization in embodiment 21 is performed.
Figure 85:
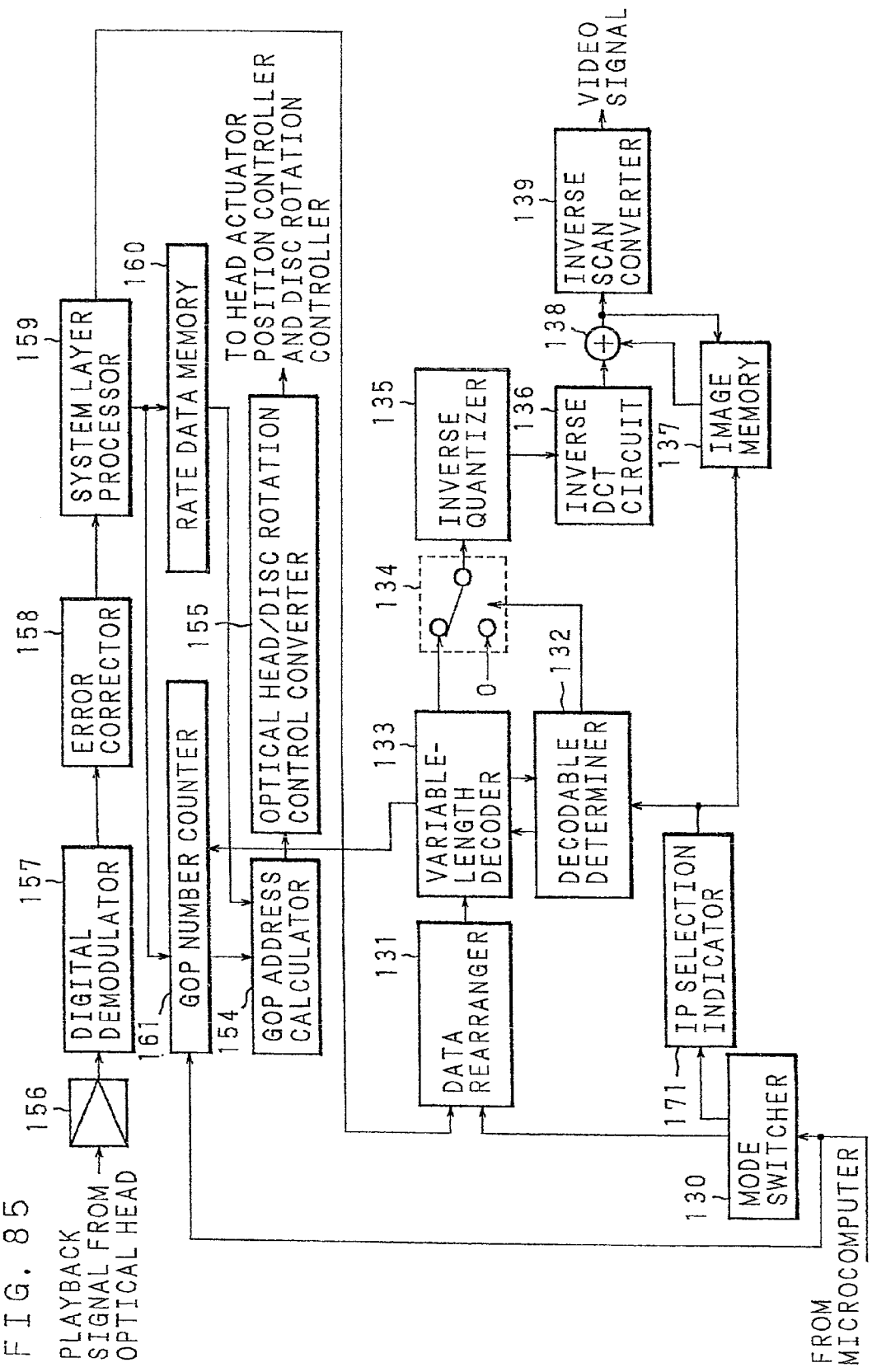
FIG. 85 is a block diagram of the digital video signal decoding unit when the division by the bit length or the division by the quantization in embodiment 21 is performed.
Figure 86:
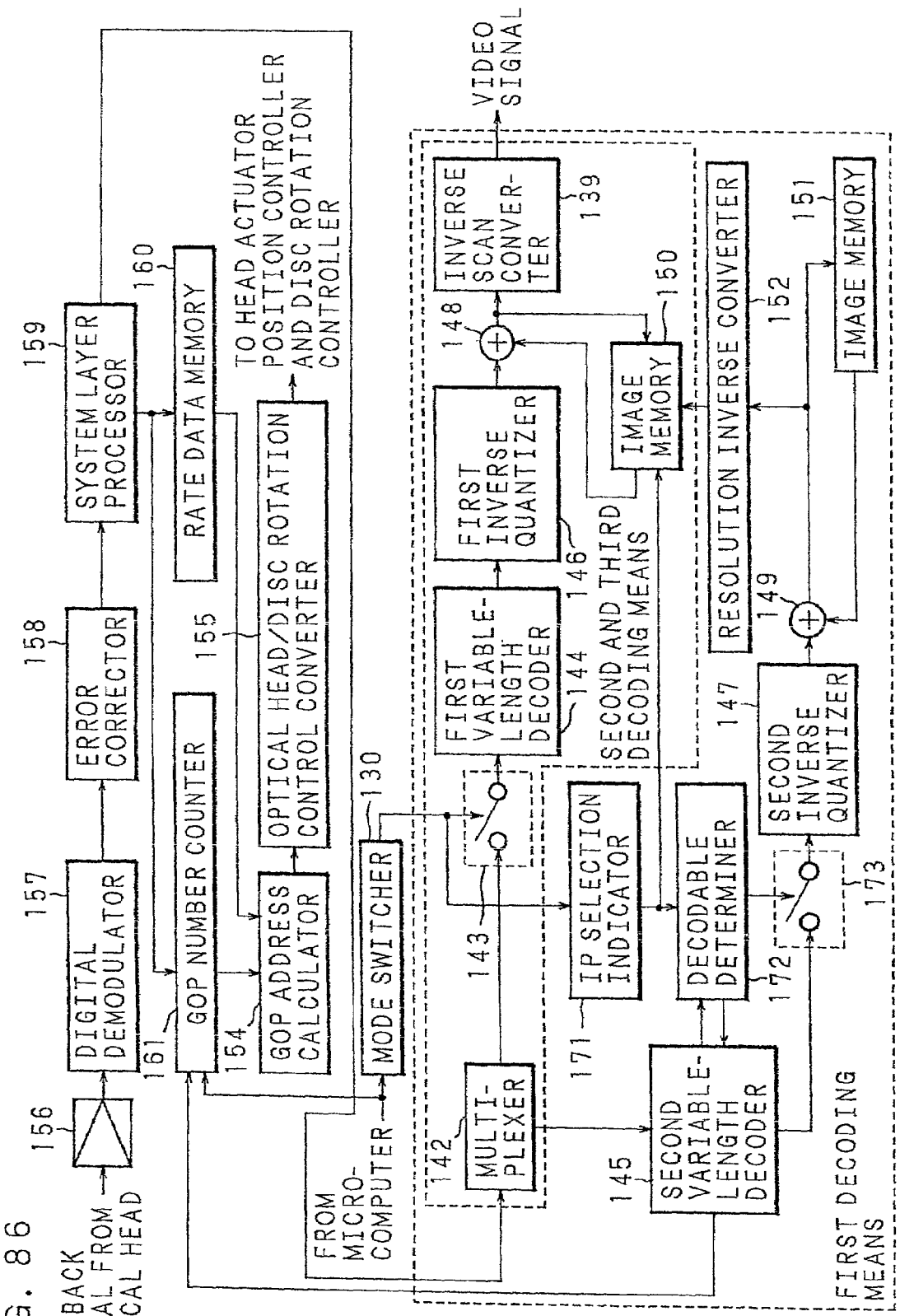
FIG. 86 is a block diagram of a digital video signal decoding unit when the division by the resolution or the division by the quantization in embodiment 21 is performed.

Next, embodiment 21 will be explained by referring to FIG. 84, FIG. 85 and FIG. 86. FIG. 84 is a block diagram representing a signal processing unit in the case where the division by the frequency at the digital signal playback part is performed, or the division by the quantization is performed. FIG. 85 is a block diagram representing a signal processing unit in the case where the division by the bit length at the digital signal playback part is performed, or the division by the quantization is performed. FIG. 86 is a block diagram representing a signal processing unit in the case where the division by the resolution at the digital signal playback unit is performed, or the division by the quantization is performed. In FIGS. 84, 85 and 86, reference numeral 171 denotes an IP selection indicator, 172 a decodable determiner and 173 a switch. In FIG. 86, corresponding parts are shown as an example of the first decoding means, the second decoding means and the third decoding means. Like parts or corresponding parts in FIGS. 84, 85 and 86 are denoted by like numerals, and an explanation thereof will be omitted.

Next, an operation of embodiment 21 will be explained. In FIGS. 84 and 85, an optical head or the rotation of the optical head are controlled so that the data is read directly or indirectly (the rate information described address being designated) from a TOC region or a region corresponding to the TOG region. A playback signal from the optical head is amplified by the playback amplifier 156. This signal is detected by the digital demodulator 157 to be differentiated into a digital signal for digital demodulation. Consequently, the playback signal which has become digital data is inputted to the error corrector 158 to correct an error included in the playback signal. The data free from errors is separated into audio bitstreams, and video bitstreams by the system layer processor 159 and other data items are processed as well. In FIGS. 84, 85 and 86, a control signal is inputted into the IP selection indicator 171 from the mode switcher 130 as a mode switching means for switching the decoding means on the basis of the special playback speed. Embodiment 21 is controlled so that the embodiment 21 is switched over between a mode of displaying only the I picture or a mode of displaying the I picture and the P picture with this control signal and the skip search speed.

When skip search speed is 100 times, the GOP must be outputted with a considerable thinning if both the I picture and the P picture are outputted on the screen. Consequently, the picture seems quite unnatural with respect to the movement of the played back screen. In such a case, to remove the unnaturalness, the mode is required to be switched to a mode of playing back only the I picture. The decodable determiner 132 (172 in FIG. 86) is designated to suspend the decoding of not only the B picture but also the P picture (the switch 173 serves for this function in FIG. 86). At the same time, the image memory 137 (150 and 151 in FIG. 86) is controlled to display only the I picture.

The screen display of the I picture and the P picture is normally favorable up to a speed of 15 times speed, but the screen display of only the I picture is more favorable at a speed of 15 times speed or more. That is because when the whole I picture and the whole P picture are displayed at a speed of 15 times speed, the continuity of the motion is extremely deteriorated since the GOP which can be played back in the subsequent process is located at a place of the 5th GOP from the GOP currently displayed even if the screen is renewed for each frame. Further, when number of frames in the GOP is N=15 and the I picture and the P picture has a cycle of M=3, the all the P pictures are decoded but only the I picture and the second frame of the P picture (third and the ninth frame in the GOP) are outputted, much finer skip search can be performed.

As described above, the data state is divided and recorded by dividing the data state on the basis of the predetermined condition of the following cases such as a case where the data is recorded by dividing the frequency region to the predetermined position of each GOP read from the recording medium for recording data, a case where the data is recorded by dividing the data by the resolution, and a case in which the data is divided by the quantization level to be recorded. Then when the first data which is the basic data in the playback data and the second data excluding the basic first data is played back from data collectively arranged, a decoding means is provided to obtain one of the playback pictures out of the following cases; a case in which all the first and the second data is decoded, and a case in which a playback picture is obtained which corresponds to the low-frequency region of the I picture and P picture or the number of thinned pixels. Then, the decoding means to be used at the time of the special playback may be switched on the basis of the special playback speed.

It goes without saying that the setting of the way of displaying the I picture and the P picture may be changed at the time of the playback in the positive direction and at the time of the playback in the negative direction. Since the P picture can be decoded only in the positive direction of time, it is necessary to store screens which exist before the P picture to be decoded at the time of the reverse direction playback. Consequently, it is necessary to use superfluous memory for that portion. To facilitate the reverse direction playback without using such superfluous memory, the I picture and the P picture may be played back at the time of the skip search in the positive direction and only the I picture is played back at the time of the reverse direction skip search.

Embodiment 22

Figure 87:
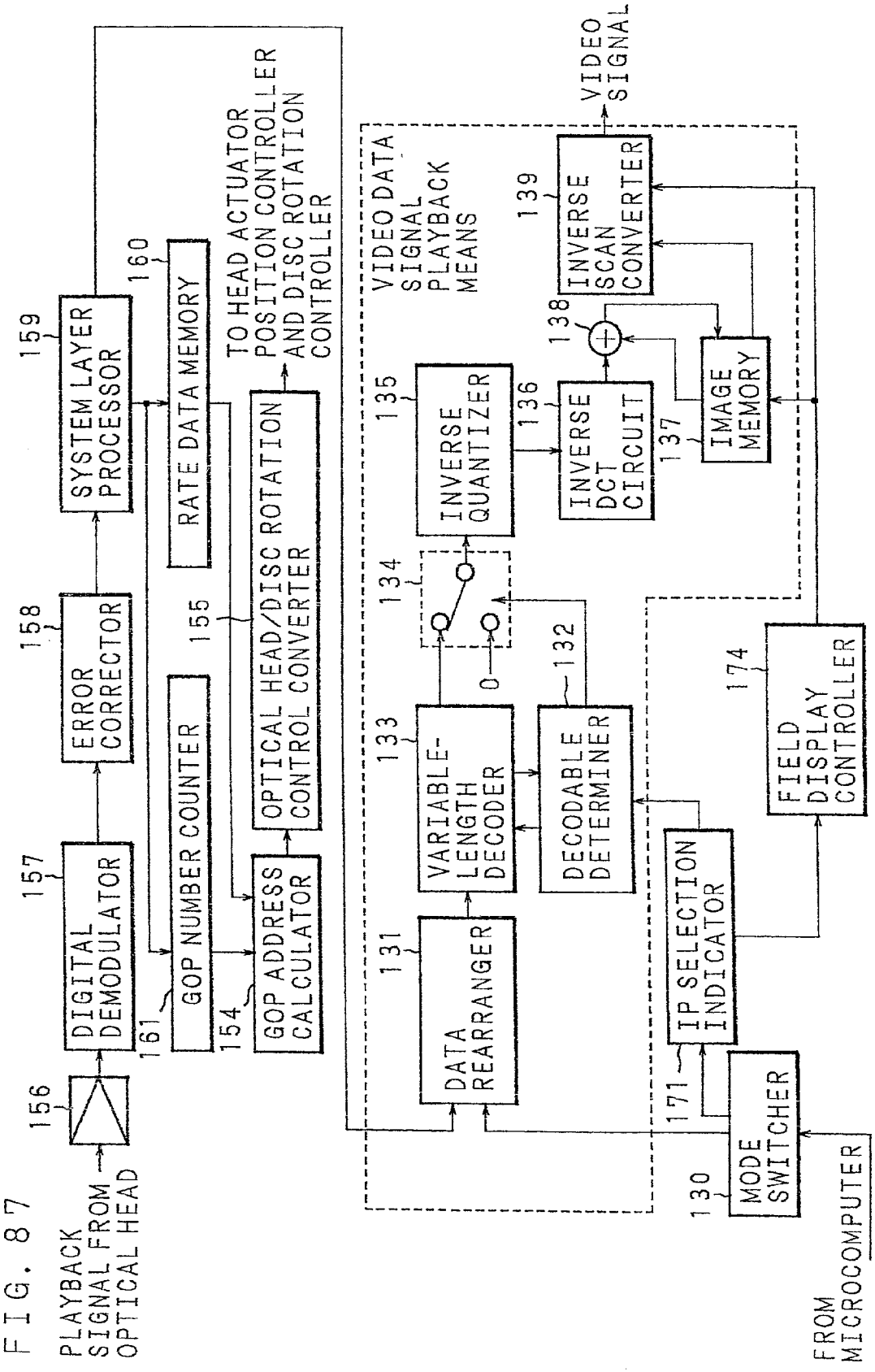
FIG. 87 is a block diagram of the digital video signal decoding unit when the division by the frequency or the division by the quantization in embodiment 22 is performed.
Figure 88:
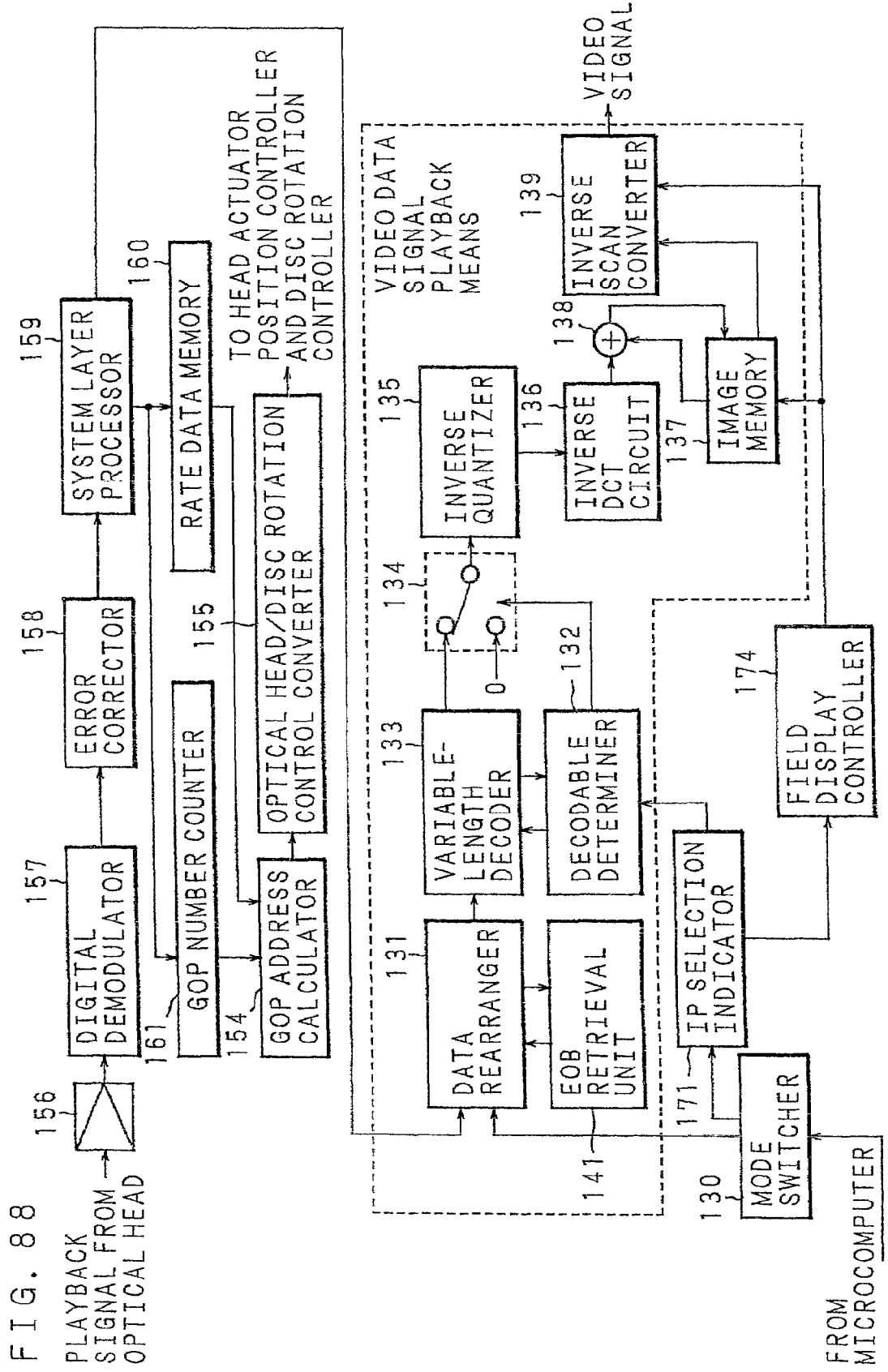
FIG. 88 is a block diagram of the digital video signal decoding unit when the division by the bit length or the division by the quantization in embodiment 22 is performed.
Figure 89A:
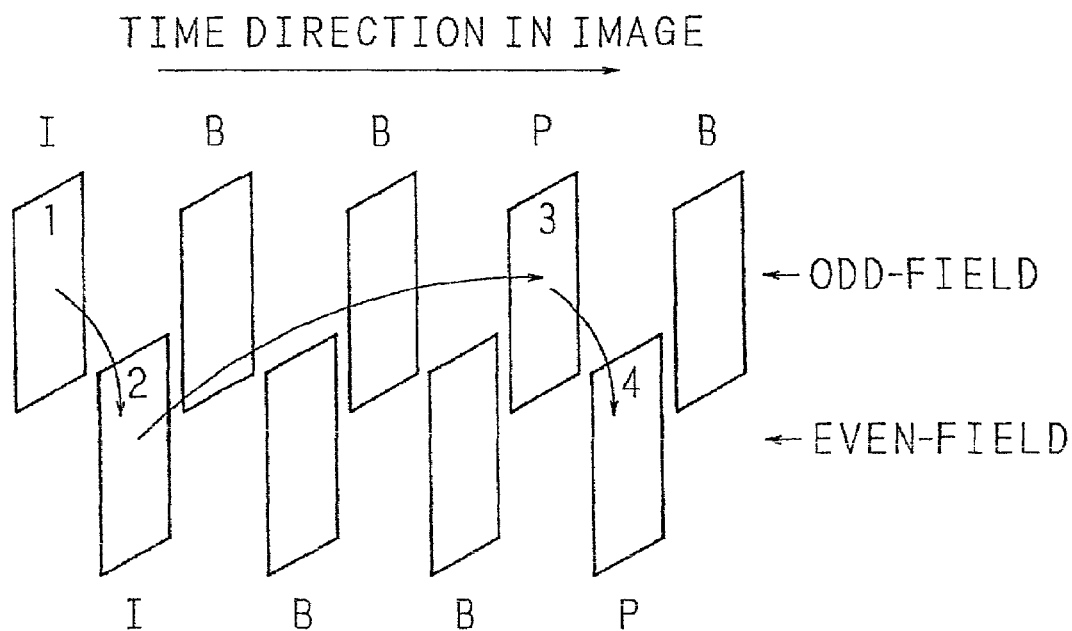
FIGS. 89A and 89B are views showing the concept of processing at the time of skip search in embodiment 22.
Figure 89B:
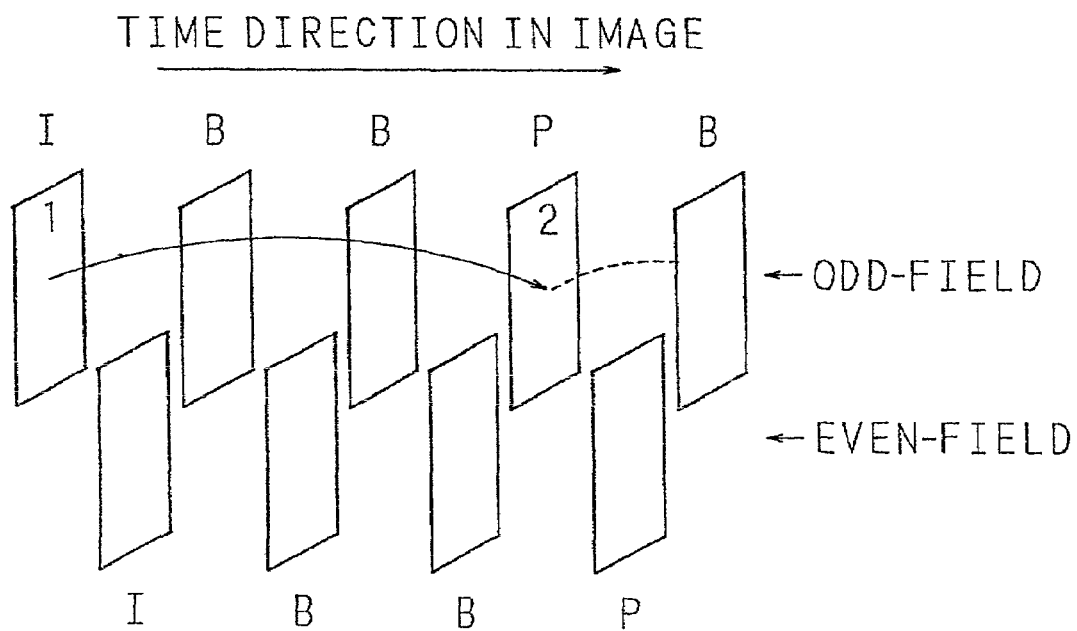

Embodiment 22 will be explained on the basis of FIGS. 87, 88, 89 and 90. FIG. 87 is a block diagram showing a signal processing unit in the case where the division by the frequency at the digital signal playback part is performed, or the division by the quantization is performed. FIG. 88 is a block diagram showing a signal processing unit in the case where the division by the bit length at the digital signal playback unit is performed. FIG. 89 is a view explaining a concept of processing at the time of the skip search. In FIGS. 87 and 88, reference numeral 174 denotes a field display controller. A system layer processor 159 serves as a video data extracting means. Further, FIGS. 87 and 88 shows corresponding parts as one example of video data decoding and playback means. Reference numeral 130 denotes a mode switcher as a mode switching means. Like parts or corresponding parts are denoted by like numerals in the aforementioned embodiments in the drawings.

Next, an operation of embodiment 22 will be explained. In FIGS. 87 and 88, an optical head and the rotation of the optical disc are controlled so that the data is directly or indirectly (the rate information described address being designated) read from a TOC region or a region corresponding to the TOC region. A playback signal from the optical head is amplified by the playback amplifier 156. This signal is detected by a digital demodulator 157 to be differentiated into a digital signal for digital demodulating. Consequently, the playback signal which has become digital data is inputted to the error corrector 158 to correct an error included in the playback signal. The data free from errors is separated into audio bitstreams, and video bitstreams by the system layer processor 159 and other data items are processed as well.

When, for example, the I picture and the P picture are continuously outputted to the screen at the time of the skip search, the screen is outputted in the order denoted by arrows shown in FIG. 89. At this time, the even-field of the I picture and the odd-field of the P picture are continuous at the time of the skip search whereas there are four vacant fields between them in the encode data. In other words, the playback speed in encode data is five times as fast as the playback speed in the space between the odd-field and the even-field of the I picture. Therefore, the motion of the I picture varies in an unnatural manner due to the change in the playback speed from one time speed to five times speed for each field.

This is replaced on the same screen as the odd field or the even field of the I picture. Otherwise, a screen is prepared by embedding the average of the upper and lower scan lines in consideration of the interlace for output. The image memory 137 shown in FIGS. 87 and 88 is controlled by using the field display controller 174 so as to constitute the same screen in the subsequent P picture. Consequently, a skip amount between fields which is a space between fields coded at the time of recording data on each field of the picture which is played back can be uniformly obtained with the result that the jerkiness (unnatural motion) becomes inconspicuous.

Figures 90A, 90B:
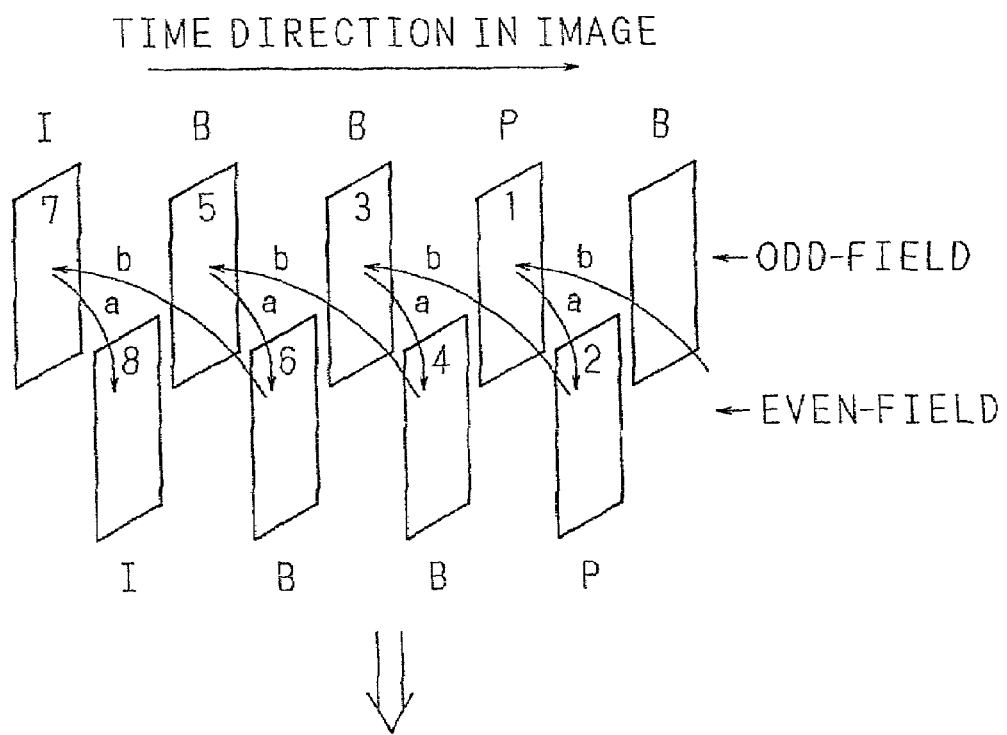
FIGS. 90A and 90B are views showing a concept of processing at the time of the inverse playback in embodiment 22.

Further, FIG. 90 is a view explaining a concept of processing at the time of the reverse playback, a view particularly showing a field order at the time of the reverse playback. Hereinafter, a field order at the time of the reverse playback will be explained on the basis of FIG. 90. At the time of the reverse playback, the reverse playback is performed in the unit of frame constituting a pair of the odd field and the even field. Specifically, when the operation moves from the odd number field to the even number field, the playback is performed in the same direction as time on the image (a playback operation in which the process a is traced in FIG. 90). When the operation moves from the even number field to the odd number field, the two field portion is reversely sent in a direction reverse to time on the image (a skip operation in which the process b is traced in FIG. 90A).

However, when the aforementioned playback process is taken, a three times speed playback is provided with the result that a playback picture is provided which moves in an awkward manner to see so that the order of motion can not be felt smoothly. When the image memory 137 is controlled by the field display controller 174 in FIGS. 87 and 88 so that the playback picture is displayed in the reverse direction one screen after another in the unit of field in the order of odd number, even number, odd number and even number as shown in FIG. 90B. Then since the skip amount between the fields can be almost uniformly obtained, the jerkiness becomes inconspicuous. However, with respect to the synchronous signal at this time, a normal odd number and even number field relation is required to be maintained without inverting the field synchronization signal.

The image memory 137 does not receive the output of the adder 138 as it is to take a display method independent for each of the fields, but the output of the adder 138 is received independently from the image memory 137. To perform such an operation, the order may be changed by providing a buffer as a separate device. A memory may be used which has three ports in which an address control may be set independently. The aforementioned operation can be realized even when the data is multiplexed with a memory which can be operated at a very fast operation speed to read the data. Further, since the inverse scan converter 139 provides at least a memory of at least one field plus one splice, it goes without saying that such buffering function may be incorporated in the inverse scan converter 139.

Further, with respect to the slow playback out of the special playback, the jerkiness becomes conspicuous when the same frame is outputted repetitively. Consequently, the frame is reconstituted and outputted so that the playback interval becomes equal. For example, in the case of the slow playback at ⅓ times speed, it does not happen that, for example, after decoded I frame is outputted three times, the decoded B frame is outputted three times. Instead, the first one frame is constituted of an odd number field of the I frame. On the even number field side, the average of the upper and the lower lines may be taken.

In such a constitution, no picture shift appears in the vertical direction of the screen due to line shifts in the interlaced picture so that a stable picture can be obtained. The subsequent one frame outputs the original I frame, and the subsequent one frame constitutes one frame with the odd number field of the I frame (on the even number field side, the average of the upper and lower lines may be taken). Then the subsequent one frame outputs the original B frame, and the subsequent one frame constitutes one frame with an even number field of the B frame (on the odd number field side the average of the upper and lower lines may be taken). Consequently, a slow playback can be realized at an equal interval in terms of time.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A method for recording, on a storage medium, digital video information obtained by coding a digital video signal using motion compensation prediction, said digital video information comprising intra-coded I-picture data, predictive-coded P-picture data and bidirectionally predictive-coded B-picture data:

said digital video information comprising video data units, each of said video data units comprising a sequence of said I-picture data, said P-picture data and said B-picture data, wherein each of said video data units has a control data packet containing control information for reproducing said digital video information, said control data packet preceding I-picture data of a corresponding video data unit, wherein said control information includes a start address of a previous video data unit and a next video data unit, and address information identifying an end of said I-picture data contained in the corresponding video data unit, wherein a reproducing apparatus accesses said control data packet during playback operation and uses said control information included in said control data packet for reproducing said digital video information.

2. An apparatus for reproducing digital video information contained in a storage medium created according to the method of claim 1, wherein said control information is used to reproduce said digital video information.

3. A method for reproducing digital video information contained in a storage medium created according to the method of claim 1, wherein said control information is used to reproduce said digital video information.

4. A method for recording according to claim 1, wherein said control information includes bit rate information of said digital video information.

5. An apparatus for reproducing digital video information contained in a storage medium created according to the method of claim 1, which performs speed play by accessing I-picture data based on said control information.

6. A method for recording digital video information on a storage medium, said digital video information being obtained by coding a digital video signal using motion compensation prediction, said digital video information comprising intra-coded I-picture data, predictive-coded P-picture data and bidirectionally predictive-coded B-picture data, said method comprising:

forming video data units, each of said video data units comprising a sequence of said I-picture data, said P-picture data and said B-picture data, creating a control data packet containing control information for reproducing said digital video information, said control information including a start address of a previous video data unit and a next video data unit, and information for identifying an end of said I-picture data contained in the corresponding video data unit, said control data packet preceding I-picture data of a corresponding video data unit, forming a system stream comprising said video data units, each of said video data units having said control data, and recording said system stream on said storage medium.

7. An apparatus for reproducing digital video information contained in a storage medium containing digital video information recorded by a method according to claim 6, wherein said reproducing apparatus accesses said control data packet during playback operation and uses said control information included in said control data packet for reproducing said digital video information.

8. A method for recording digital video information according to claim 6, wherein said control information includes bit rate information of said digital video information.

9. A method for recording, on a storage medium, digital video information obtained by coding a digital video signal using motion compensation prediction, said digital video information comprising intra-coded I-picture data, predictive-coded P-picture data and bidirectionally predictive-coded B-picture data, said digital information comprising:

digital video information comprising video data units, each video data unit comprising a sequence of said I-picture data, said P-picture data and said B-picture data; and control information including position information representing an end position of said I-picture data included in said video data unit, said control information preceding I-picture data of a corresponding video data unit;

wherein a reproducing apparatus recognizes the I-picture data based on said position information.

10. A method for recording according to claim 9, wherein said position information is represented by a data amount of I-picture data.

11. A reproducing apparatus for reproducing digital video information contained in a storage medium created according to the method of claim 9, wherein said control information is used to reproduce said digital video information.

12. A reproducing method for reproducing digital video information contained in a storage medium created according to the method of claim 9, wherein said control information is used to reproduce said digital video information.

13. A method for recording digital video information on a storage medium, said digital video information being obtained by coding a digital video signal using motion compensation prediction, said digital video information comprising intra-coded I-picture data, predictive-coded P-picture data and bidirectionally predictive-coded B-picture data, said method comprising steps of:

forming video data units, each video data unit comprising a sequence of said I-picture data, said P-picture data and said B-picture data;

creating control information unit including position information representing an end position of said I-picture data included in said video data unit, said control information preceding I-picture data of a corresponding video data unit, and recording said video data unit and said control information unit on said storage medium.

14. A An apparatus for reproducing digital video information contained in a storage medium containing digital video information recorded by a method according to claim 13, wherein said reproducing apparatus recognizes said I-picture data based on said position information.

15. An apparatus for reproducing digital video information contained in a storage medium created according to the method of claim 9, which performs speed play by accessing I-picture data based on said control information.

* * * * *